United States Patent
Kuroda et al.

(10) Patent No.: US 7,096,119 B2
(45) Date of Patent: Aug. 22, 2006

(54) NAVIGATION SYSTEM, DATA SERVER, TRAVELING ROUTE ESTABLISHING METHOD AND INFORMATION PROVIDING METHOD

(75) Inventors: Koichi Kuroda, Kanagawa-ken (JP); Takuo Ishiwaka, Kanagawa-ken (JP); Toru Takagi, Kanagawa-ken (JP); Susumu Fujita, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 11/176,666

(22) Filed: Jul. 8, 2005

(65) Prior Publication Data
US 2006/0009907 A1   Jan. 12, 2006

Related U.S. Application Data

(62) Division of application No. 10/618,731, filed on Jul. 15, 2003, now Pat. No. 6,937,934, which is a division of application No. 10/283,218, filed on Oct. 30, 2002, now Pat. No. 6,604,045.

(30) Foreign Application Priority Data

| Nov. 1, 2001 | (JP) | ............... P2001-336613 |
| Nov. 2, 2001 | (JP) | ............... P2001-337316 |
| Nov. 26, 2001 | (JP) | ............... P2001-359568 |
| Dec. 11, 2001 | (JP) | ............... P2001-377111 |
| Dec. 11, 2001 | (JP) | ............... P2001-377255 |

(51) Int. Cl.
   *G01S 5/02* (2006.01)

(52) U.S. Cl. .............. 701/208; 701/209; 701/213; 701/202

(58) Field of Classification Search ........ 701/201, 701/202, 203, 204, 205, 206, 207, 208, 209, 701/210, 213, 211, 212; 342/357.1–357.14
See application file for complete search history.

(56) References Cited

U.S. PATENT DOCUMENTS

| 6,339,745 B1 * | 1/2002 | Novik .............. 701/208 |
| 6,377,210 B1 | 4/2002 | Moore |
| 6,430,496 B1 | 8/2002 | Smith et al. |
| 6,470,268 B1 * | 10/2002 | Ashcraft et al. .......... 701/209 |
| 6,539,360 B1 * | 3/2003 | Kadaba .............. 705/28 |
| 6,816,784 B1 * | 11/2004 | Khan et al. ............ 701/213 |
| 6,990,409 B1 * | 1/2006 | Khan et al. ............ 701/204 |

FOREIGN PATENT DOCUMENTS

| JP | 4-331313 | 11/1992 |
| JP | 05-241507 | 9/1993 |
| JP | 5-241507 | 9/1993 |
| JP | 05-289997 | 11/1993 |

(Continued)

*Primary Examiner*—Richard M. Camby
(74) *Attorney, Agent, or Firm*—McDermott Will & Emery LLP

(57) ABSTRACT

A navigation system, portable information processing device and its control program, data server, information processing server, navigation method, traveling route establishing method, information providing method, and area information providing method are disclosed having a portable terminal (10,54,210) to read out code data, indicative of area information of a destination and routed spots, from a print product (112,114). The code data are converted into area information and stored in a storage unit (23,66,72, 123,223, 232,323), from which particular area information is retrieved and transmitted to an on-vehicle navigation device (30,58,104,230) by which a traveling route of the vehicle is established on the basis of area information to guide the vehicle to the destination.

47 Claims, 71 Drawing Sheets

FOREIGN PATENT DOCUMENTS

| | | |
|---|---|---|
| JP | 5-313572 | 11/1993 |
| JP | 07-311738 | 11/1995 |
| JP | 8-005394 | 1/1996 |
| JP | 9-036798 | 2/1997 |
| JP | 09-138131 | 5/1997 |
| JP | 9-166449 | 6/1997 |
| JP | 9-189566 | 7/1997 |
| JP | 10-089976 | 4/1998 |
| JP | 10-307038 | 11/1998 |
| JP | 11-051671 | 2/1999 |
| JP | 11-55741 | 2/1999 |
| JP | 11-304502 | 11/1999 |
| JP | 2000-352522 | 12/2000 |
| JP | 2001-147129 A | 5/2001 |
| JP | 2001-147133 | 5/2001 |
| JP | 2001-148092 A | 5/2001 |
| JP | 2001-280978 | 10/2001 |

* cited by examiner

AREA INFORMATION OF DESTINATION AND ROUTED SPOTS

FIG.27B
FIG.27A
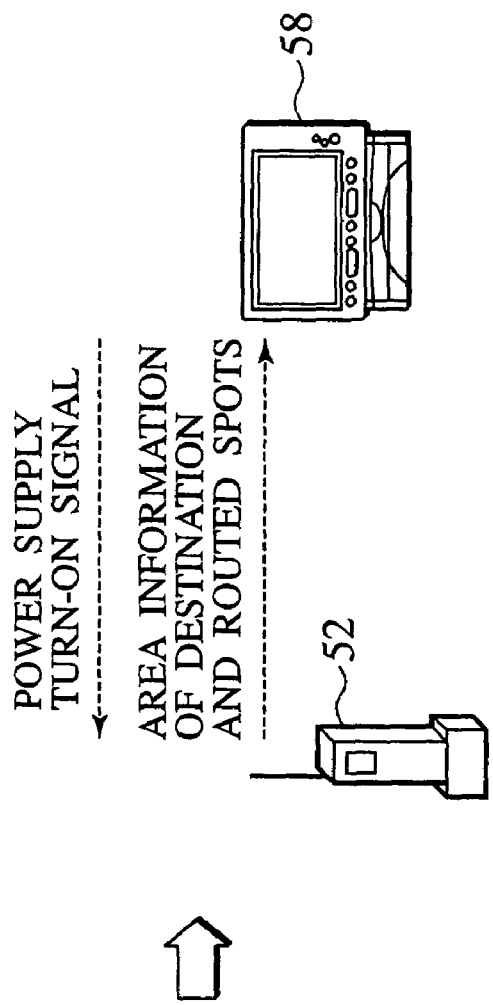
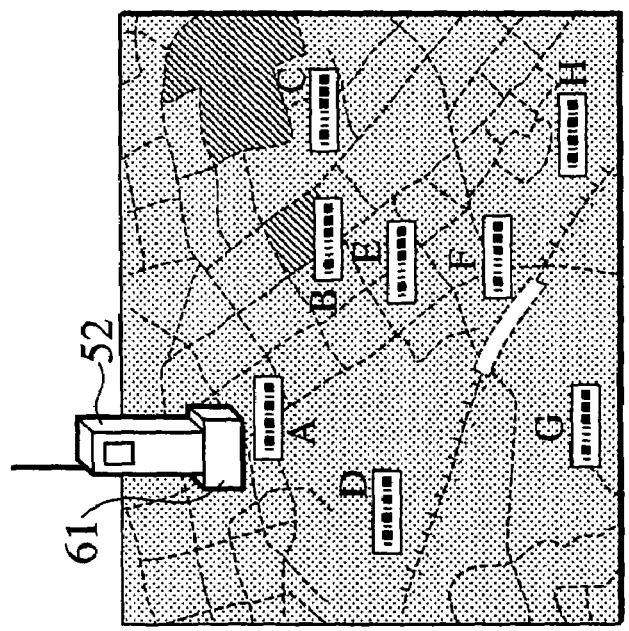

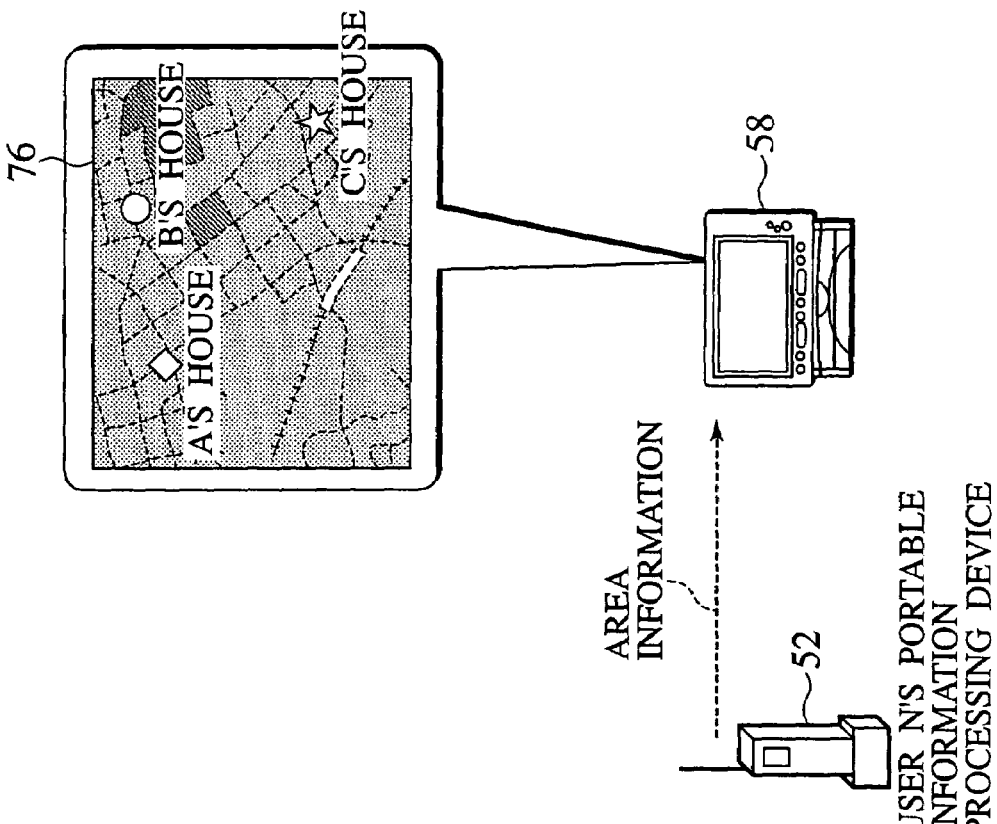
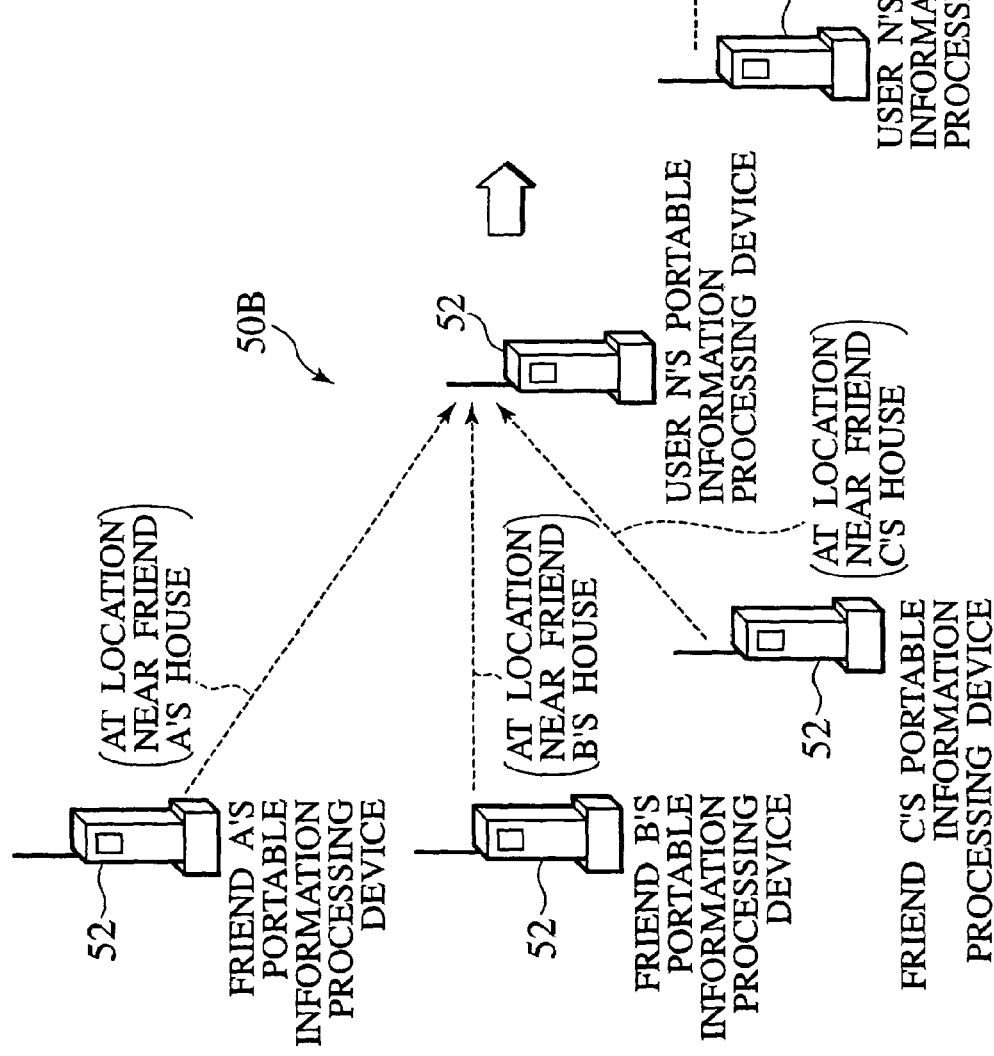

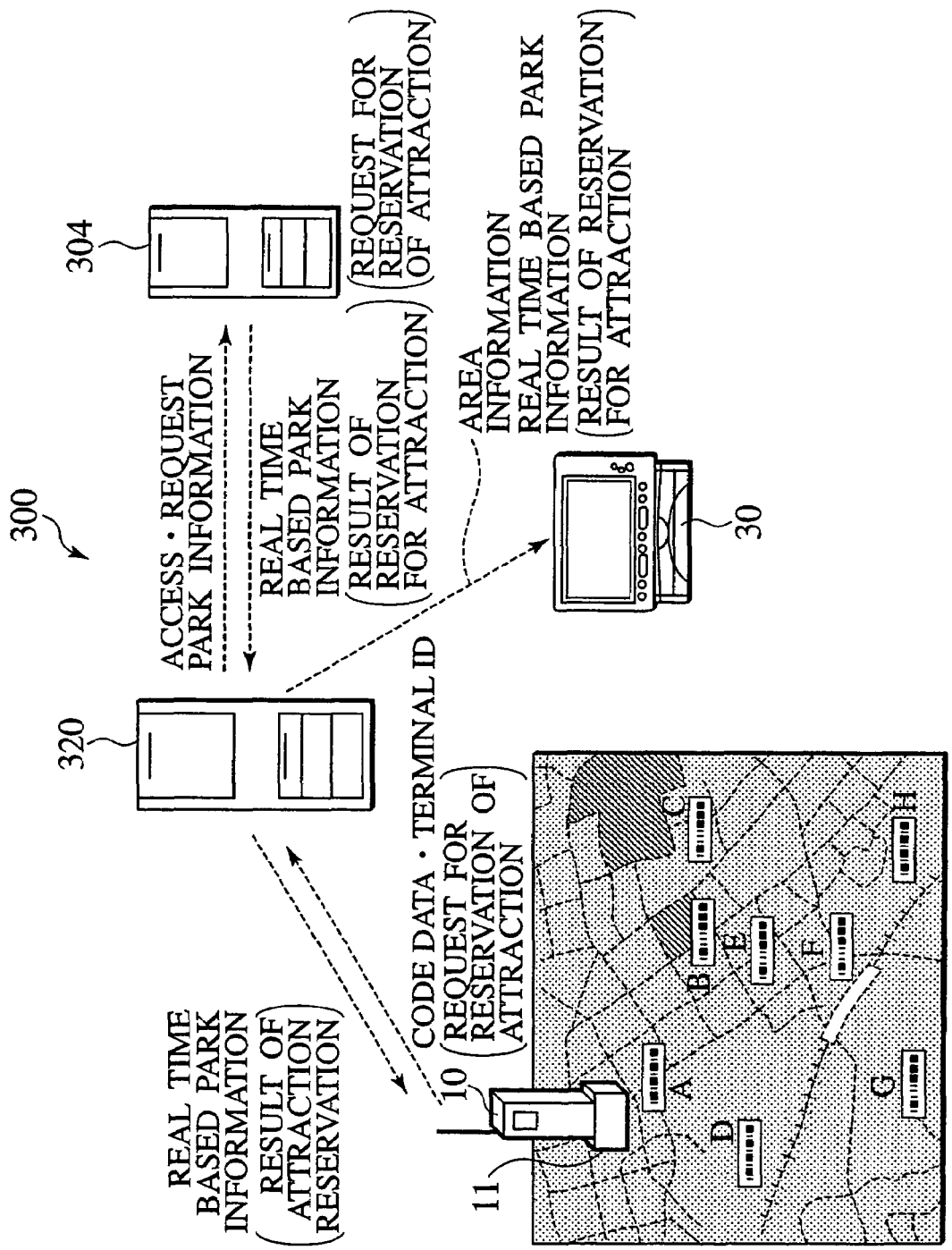

NAVIGATION SYSTEM, DATA SERVER, TRAVELING ROUTE ESTABLISHING METHOD AND INFORMATION PROVIDING METHOD

RELATED APPLICATION

This application is a divisional of application Ser. No. 10/618,731 filed Jul. 15, 2003 now U.S. Pat. No. 6,937,934, which is a divisional of application Ser. No. 10/283,218, now U.S. Pat. No. 6,604,045, filed Oct. 30, 2002.

BACKGROUND OF THE INVENTION

1. Field of the Invention

The present invention relates to navigation system for vehicles and, more particularly, to a navigation system for a vehicle, a data server, a traveling route establishing method and an information providing method to be carried out with the navigation system.

2. Description of the Related Art

In related art, on-vehicle navigation devices have been widely in use to guide a vehicle along a traveling route in accordance with an operational input made by a user. Attempts have been heretofore been made to realize the on-vehicle navigation device through the use of GPS (Global Positioning System) that provides the current position of the vehicle whereby when a destination and routed spots are input by the user, the on-vehicle navigation device operates to establish an optimum traveling route starting from the current position of the vehicle and the destination via the routed spots to allow the vehicle to properly be guided with a desired map being displayed over a display unit.

With the on-vehicle navigation device set forth above, it has been a usual practice for the user to input the destination and routed spots in various ways, such as a first way of retrieving the destination and routed spots while scrolling a map provided over the display unit and designating the destination and routed spots on the map, and a second way of causing a list of names of principal points to be displayed over the display unit to allow a desired destination and routed spots to be selected from the list.

SUMMARY OF THE INVENTION

However, with the input methods described above, the user undergoes an increased complexity in operation, resulting in an increased load to be experienced by the user. To address such an issue, various attempts have been made involving Japanese Patent Application Laid-Open No. H5-241507, which discloses a map note printed with bar code at areas corresponding to locations of principal intersections and tourist spots, etc., which are read out with a bar code scanner connected to an on-vehicle navigation device to enable the destination and routed spots to be inputted.

With the on-vehicle navigation device of such a structure, a capability of inputting the destination and routed spots with the use of the bar codes provides an ease for the user to execute the operational input of the destination and routed spots, resulting in favorable convenience for using.

In the meantime, a drive plan is not always prepared by the user after riding in the vehicle installed with the on-vehicle navigation device, and, rather, there are many instances where the user prepares the drive plan at a home outside the vehicle by referring to a tourist guide.

However, the related art on-vehicle navigation device, with such a structure disclosed in Japanese Patent Application Laid-Open No. H5-241507, the operational inputs for the destination and routed spots involving the bar code input operation are made possible to be carried out only within the vehicle. Thus, if the drive plan is prepared at a site outside the vehicle, there is a need for the user to memorize the destination and routed spots in a way of some kind whereupon, after riding on the vehicle, the user needs to input these destination and routed spots into the on-vehicle navigation device. As a result, despite the preliminarily preparing the drive plan outside the vehicle, a difficulty is encountered in promptly starting the vehicle after riding on the same, or the user suffers a complicated input operations for the destination and routed spots based on the user's memory.

The present invention has been completed with the above view in mind and has an object of the present invention to provide a navigation system for a vehicle, a data server, a traveling route establishing method and an information providing method which are easy to operate in a simple manner with a high accuracy to enable input operation of a destination and routed spots into a remotely placed on-vehicle navigation device installed on a vehicle at a site outside the vehicle in a highly reliable fashion.

The first aspect of the present invention provides a navigation system for executing route guidance for a vehicle, comprising: a portable information processing device operative to read out code data indicative of map information from a print product and to transmit the code data; a code data processing unit operative to convert the code data into area information indicative of a location on a map coordinate system, to store the area information, to read out the stored area information and to transmit the read out area information; and an on-vehicle navigation device installed on a vehicle and operative to establish a traveling route in response to the area information transmitted from the code data processing unit to execute route guidance for the vehicle along the established traveling route.

BRIEF DESCRIPTION OF THE DRAWINGS

The present invention will now be described with reference to the accompanying drawings wherein:

FIGS. 27A and 27B are typical views showing modes in which a navigation system of the sixth embodiment according to the present invention is applied, with FIG. 27A illustrating a mode in which code data are read out from a print product such as a map note with the portable information processing device and FIG. 27B illustrating another mode in which area information are transmitted from the portable information processing device to the on-vehicle navigation device over a short-range communication system;

FIGS. 29A and 29B are typical views showing modes in which a navigation system of a seventh embodiment according to the present invention is applied, with FIG. 29A illustrating a mode in which area information are transmitted to a portable information processing device of a user N from portable information processing devices of a plurality of friends A, B and C, and FIG. 29B illustrating the other mode in which area information, that are collected in the portable information processing device of the user N, are transmitted to an on-vehicle navigation device;

FIG. 72 is a typical view showing another application of the navigation system shown in FIG. 65, with the navigation system incorporating a park information providing service with the use of the information server comprised of a park information providing server to which the data server of the navigation system is able to access to obtain real time based park information which are transmitted to the portable terminal or the on-vehicle navigation device;

DETAILED DESCRIPTION OF THE PREFERRED EMBODIMENTS

With reference to each of the above described drawings in turn, and using like numerals to designate similar parts throughout the several drawings, a preferred embodiments and several alternative embodiments will now be described.

(First Preferred Embodiment)

Figure 1:
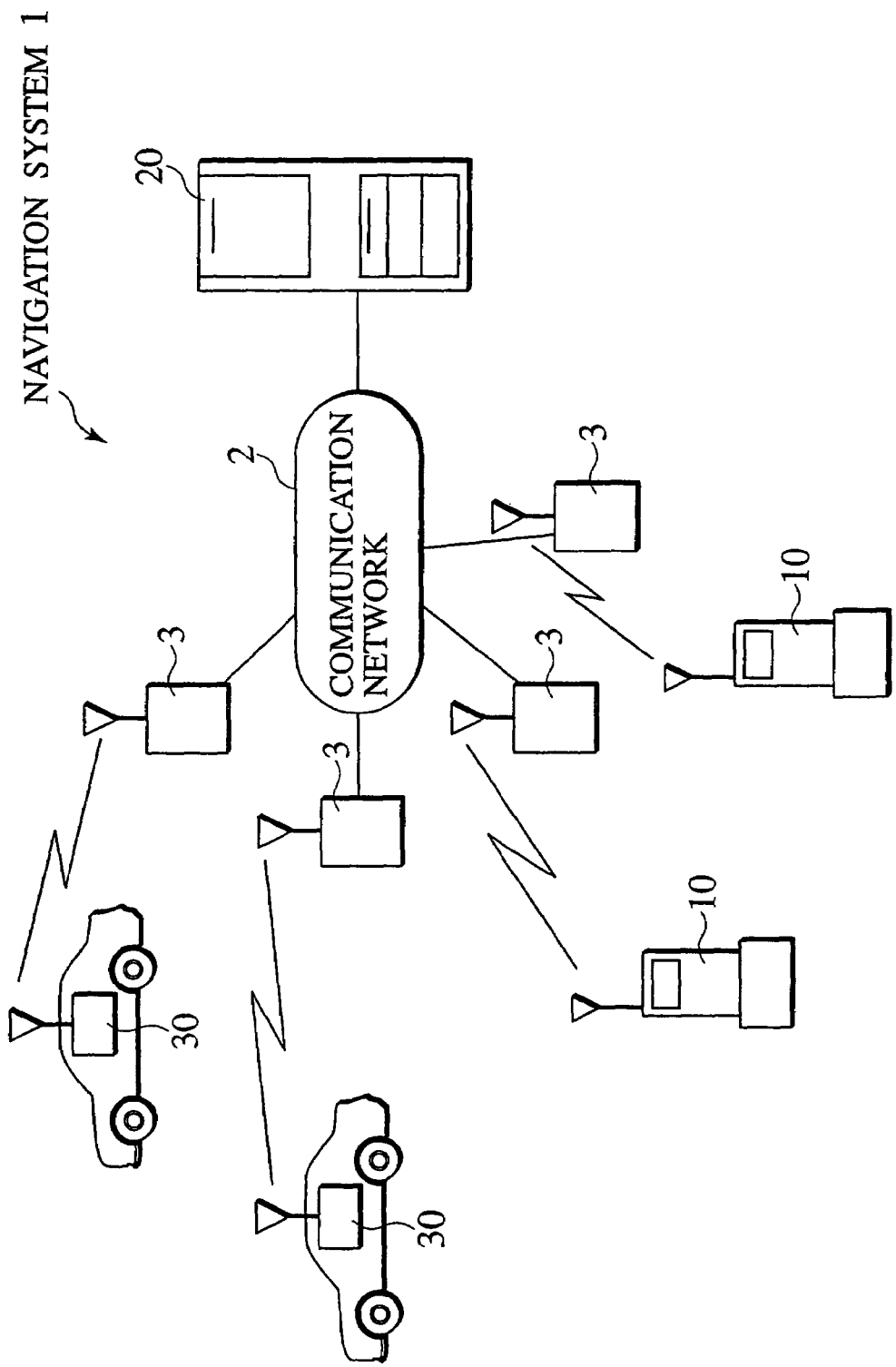
FIG. 1 is a schematic overall view of a navigation system of a first embodiment according to the present invention.

Referring to FIG. 1, there is schematically shown a navigation system 1 of an embodiment according to the present invention. The navigation system 1 is shown having an arrangement that includes portable terminals 10 which are freely portable and functions as a portable information processing device, a data server 20, serving as an information processing device, and on-vehicle navigation devices 30, with data being transmitted and received with these components over a communication network 2 such as an Internet. In particular, connected to the communication network 2 are the data server 20 and a plurality of radio communication base stations 3 which allow a radio communication to be established between the portable terminals 10 and the radio communication base stations 3. With such a communication, data transmitted from the portable terminal 10 is received with the data server 20 via the radio communication base station 3 and the communication network 2. Further, a capability of radio communication between the on-vehicle navigation device 30 and the radio communication base station 3 allows data transmitted from the data server 20 to be received with the on-vehicle navigation device 30 via the communication network 2 and the radio communication base station 3.

With the navigation system 1, the portable terminal 10 is designed to read out code data, such as bar codes or map code numbers printed on a print product such as a map note, to enable a user to designate a destination or a routed spot of a vehicle to travel for thereby producing area information indicative of such destination or routed spots. The data server 20 stores this area information and is enabled to deliver area information to the on-vehicle navigation device 30 on request. The on-vehicle navigation device 30 determines an optimum rout, indicative of a specified destination path, on the basis of the area information transmitted from the data server 20 such that the vehicle (hereinafter referred to as an own vehicle) on which the on-vehicle navigation device 30 is installed is guided on a route so as to arrive at the destination via the routed spots designated by the on-vehicle navigation device 30.

It is to be noted here that code data refers to data which is correlated with given information in a one to one correspondence based on a particular code system, with area information representing a location on a detailed coordinate system, i.e. the destination and the routed spots.

Figure 2:
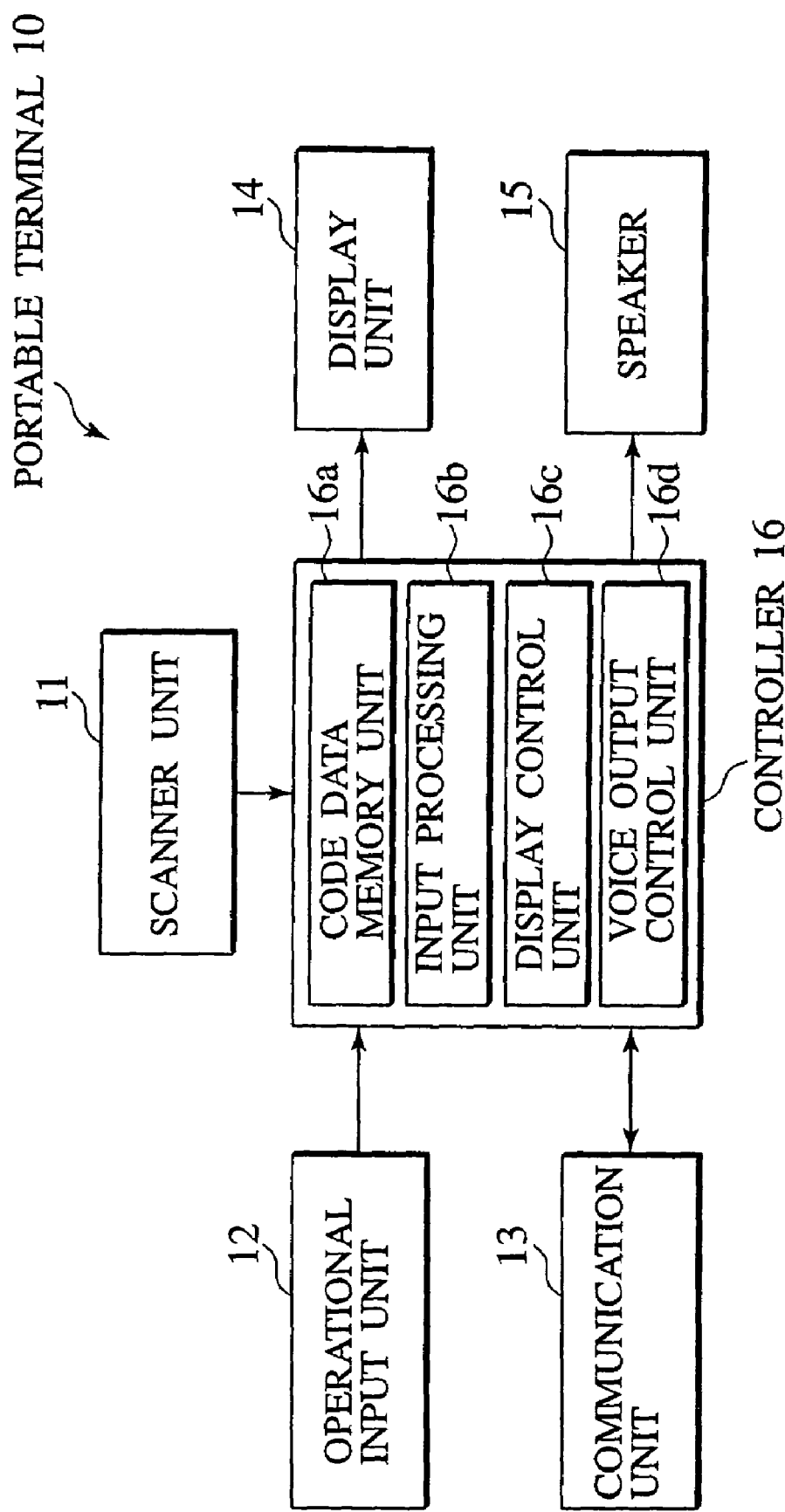
FIG. 2 is a block diagram of a portable terminal forming part of the navigation system shown in FIG. 1.

As shown in FIG. 2, the portable terminal 10, that serves as a code data transmission source, is comprised of a scanner unit 11 that serves as a code data read out unit, an operational input unit 12, a communication unit 13 that servers as a transmitter and a receiver, a display unit 14, a speaker 15 and a controller 16.

The scanner unit 11 is responsive to an operational input made by the user and serves to optically reads out desired code data, such as code data indicative of the destination and routed spots of the own vehicle to travel, from a print product such as a map note having printed thereon code data such as bar codes indicative of locations of principal intersections and tourist spots. The code data, such the bar codes, read out with the scanner unit 11 is inputted to the controller 16.

The operational input unit 12 serves as a user interface, for receiving operational inputs applied by the user, and includes ten keys and a jog dial. If the user executes the operational input using the operation input unit 12, the operational input unit 12 produces an output signal in dependence on the operational input with the output signal being inputted to the controller 16.

The communication unit 13 is controlled with the controller 16 to permit the radio communication between the radio communication base station 3 and the communication unit 13 that transmits or receives data via the communication network 2. Data transmitted from the portable terminal 10 is supplied to the radio communication base station 3 from the communication unit 13 from which data is then applied to the data server 20 via the communication network 2.

The display unit 14 provides a display of images and sentences in response to controlled operation of the controller 16. Further, the speaker 15 produces a voice like a beep sound in response to control operation of the controller 16.

The controller 16 serves to execute an operational control program for thereby controlling entire operation of the portable terminal 10. In particular, the controller 16 executes the operational control program and, to this end, includes a code data memory unit 16a, an input processing unit 16b, a display control unit 16c and a voice output control unit 16d to perform respective functions.

The code data memory unit 16a temporarily stores code data such as bar codes read out from the map note with the scanner unit 11.

The input processing section 16b executes a variety of processing operations in dependence on the operation inputs applied by the user utilizing the operational input unit 12. In particular, when the user utilizes the operational input unit 12 and executes the operation input for transmitting code data read out from the map note with the scanner unit 11, the input processing unit 16b reads out code data temporarily stored in the code data memory unit 16a and executes the processing to transmit read out code data to the data server 20 from the communication unit 13.

The display control unit 16c controls operation of the display unit 14 to allow the same to provide a display of the image and the sentences over the display unit 14. In particular, the display control unit 16c operates to provide a display of information correlated with code data over the display unit 14 in response to code data read out from the print product, such as the map note, with the scanner unit 11.

The voice output control unit 16d controls the operation of the speaker 15 and generates the voice over the speaker 15. In particular, when code data is read out from the print product such as the map note with the scanner unit 11, the voice output control unit 16d operates to output the voice, such as the beep sound, over the speaker 15 for informing the user about the reading of code data.

More particularly, the portable terminal 10 set forth above is realized by coupling a small sized scanner to a portable phone, with a program being incorporated in the portable phone to permit the same to play as roles as the code data memory unit 16a, the input processing unit 16b, the display control unit 16c and the voice output control unit 16d. Also, in addition to the portable phone, the portable phone 10 may be widely applied to a variety of portable communication terminals, such as personal data assistants (PDA), note type personal computers and palm-top computers etc., which can be freely portable and execute given data processing. In actual practice, the small sized scanner is coupled to each portable communication terminal which is incorporated with the program such that it plays as roles as the code data memory unit 16a, the input processing unit 16b, the display control unit 16c and the voice output control unit 16d.

Figure 3:
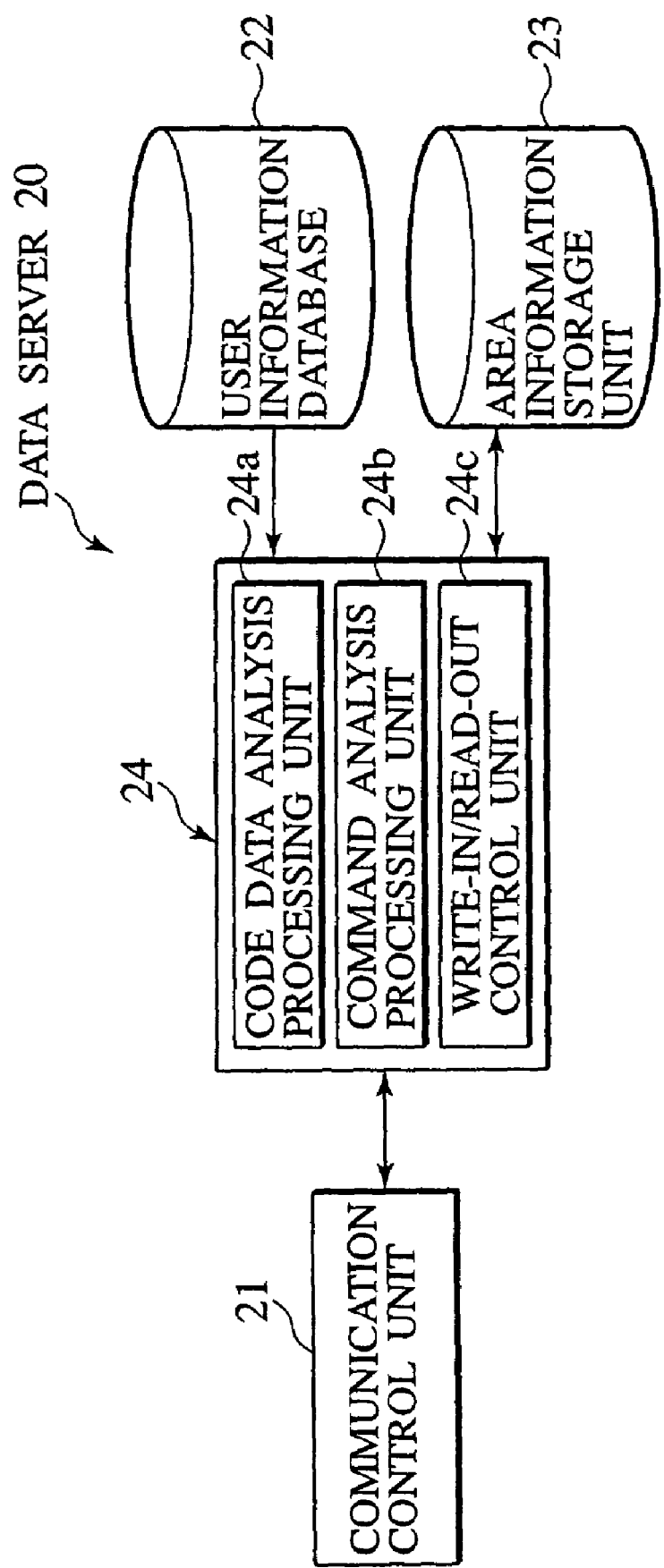
FIG. 3 is a block diagram of a data server forming part of the navigation system shown in FIG. 1.

As shown in FIG. 3, the data server 20 is comprised of a communication control unit 21, a user information database 22, an area information storage unit 23 and a control unit 24.

The communication control unit 21 serves to control transmission and receipt of data over the communication network 2. Information such as code data and a variety of commands, which is transmitted from the communication unit 13 of the portable terminal 10 via the radio communication base station 3 and the communication network 2, is received with the communication control unit 21 and supplied to the control unit 24. Further, area information read out from the area information storage unit 23 with the control unit 23 is then transmitted to the on-vehicle navigation device 30 from the communication control unit 21 via the communication network 2 and the radio communication station 3 in a manner as will be subsequently described.

The user information database 22 stores user-related information, registered as a user who utilizes the navigation system 1, i.e., more specifically, various sorts of information such as a terminal ID that forms an identification information of the portable terminal 10 used by the user, or a on-vehicle navigation ID that forms an identification information of the on-vehicle navigation device 30 which the user uses.

The area information storage unit 23 serves to temporarily store area information correlated with code data, transmitted from the portable terminal 10, according to control of the control unit 24. The area information storage unit 23 stores therein area information, correlated with code data transmitted from the portable terminal 10, in a correlation with the terminal ID of the portable terminal 10 that forms a source of transmission of code data. Thus, designating the terminal ID allows area information, stored in a correlation with the designated terminal ID, to be read out from the area information storage unit 23.

The control unit 24 serves to execute the operational control program and controls the entire operation of the data server 20. In particular, the control unit 24 is operative to execute an operational control program and, to this end, includes code data analysis processing unit 24a, a command analysis processing unit 24b, and a write-in and read-out control unit 24c to perform respective functions.

The code data analysis processing unit 24a serves to analyze code data, which is transmitted from the portable terminal 10 to the data server 20 over the radio communication base station 3 and the communication network 2, and obtains area information correlated with such code data. In particular, the code data analysis processing unit 24a has a conversion table which is described with code data and associated various information both of which are correlated with respect to one another for each code system, with code data transmitted from the portable terminal 10 being converted to area information in correlation with such code data by referring to the conversion table.

The command analysis processing unit 24b serves to analyze commands, which are transmitted from the portable terminal 10 to the data server 20 over the communication network 2 and the radio communication base station 3 and which are received with the communication control unit 21, and performs various processing operations in accordance with the commands. More particularly, if the portable terminal 10 is operated to issue a request command for requesting area information to be read out from the area information storage unit 23 and to be transmitted to the on-vehicle navigation device 30, the command analysis processing unit 24b operates to analyze such command to permit the write-in and read-out control unit 24c to operate. When this takes place, the command analysis processing unit 24b reads out relevant area information from the area information storage unit 23 and proceeds to transmit read out area information from the communication control unit 21 to the on-vehicle navigation device 30.

The write-in and read-out control unit 24c serves to control area information, converted from the code data with the code data analysis processing unit 24a, to be correlated with the terminal ID of the portable terminal 10, serving as the source of transmission of code data, and to be written in the area information storage unit 23, while in response to the command analyzed with the command analysis processing unit 24b, controlling area information so as to be read out from the area information storage unit 23. Area information, read out from the area information storage unit 23 by the write-in and read-out control unit 24c, is then transmitted to the on-vehicle navigation device 30 from the communication control unit 21 over the communication network 2 and the radio communication base station 3.

Figure 4:
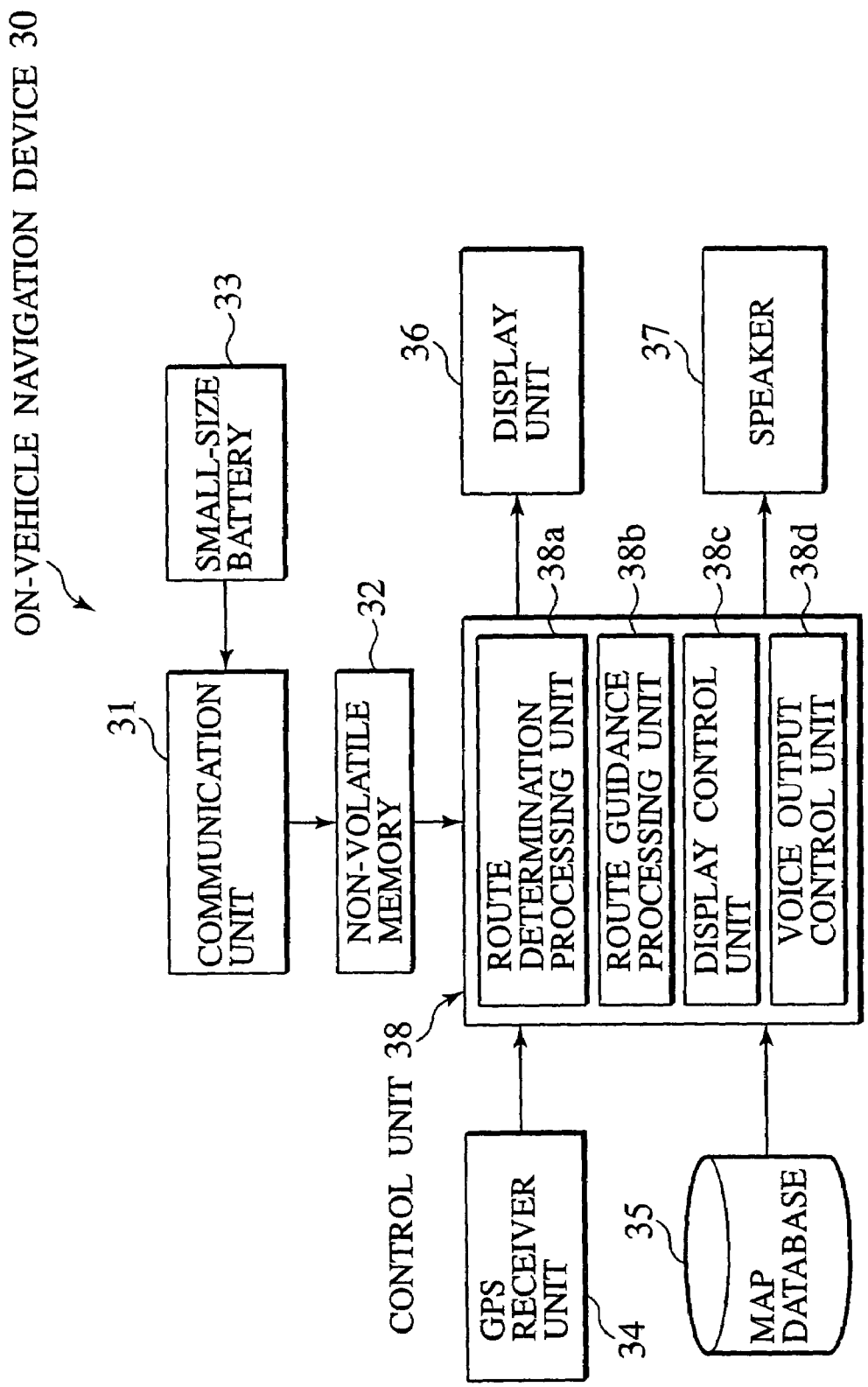
FIG. 4 is a block diagram of an on-vehicle navigation device forming part of the navigation system shown in FIG. 1.

As shown in FIG. 4, the on-vehicle navigation device 30 is comprised of a communication unit 31, a non-volatile memory 32, a small size battery 33, a GPS receiver unit 34, a map database 35, a display unit 36, a speaker 37 and a control unit 38.

The communication unit 31 serves to perform transmission and receipt of data between the communication unit 31 and the radio communication base station 3 over the communication network 2 through radio communication. Area information (area information correlated with code data indicative of the destination and the routed spots read out from the map note with the scanner unit 11 of the portable terminal 10 transmitted from the data server 20 is supplied to the on-vehicle navigation device 30 over the communication network 2 and the radio communication base station 3 and is received with the communication unit 31.

The non-volatile memory 32 serves to temporarily store area information that is transmitted from the data server 20 to the on-vehicle navigation device 30 and received with the communication unit 31.

The small size battery 33 includes a Li ion battery and is connected to communication unit 31 to be used as a power supply thereof. The presence of power output supplied from the small battery 33 to the communication unit 31 enables the communication unit 31 to be operative for receiving data even when a main power supply is shut off.

The GPS receiver unit 34 receives a GPS signal from a GPS satellite to obtain area information indicative of a current position of the own vehicle on which the on-vehicle navigation device 30 is installed. Area information, indicative of the current position of the own vehicle, obtained from the GPS receiver unit 34 is supplied to the control unit 38.

The map database 35 is comprised of a computer readable medium such as a CD-ROM in which necessary map data is registered. The map database 35 is arranged so as to allow map data of a designated district to be read out in a sequence in accordance with the processing of the control unit 38.

The display unit 36 serves to provide a display of map data and a variety of information, read out from the map database 35, in dependence on control of the control unit 38. Further, the speaker 37 provides a voice for designating a travel direction in dependence on the control unit 38.

The control unit 38 serves to execute an operational control program for controlling entire operation of the on-vehicle navigation device 30. In particular, execution of the operational control program with the control unit 38 allows respective functions of a traveling route establishment (determination) processing unit 38*a*, a route guidance processing unit 38*b*, a display control unit 38*c* and a voice output control unit 38*d*.

The route establishment processing unit 38*a* serves to process for determining or establishing a traveling route of the own vehicle on the basis of area information (area information correlated with code data indicative of the destination and the routed spots read out from the print product, such as the map note, with the scanner unit 11 of the portable terminal 10) which is received with the communication unit 31 and temporarily stored in the non-volatile memory 32 and which is transmitted from the data server 20, and area information indicative of the current position of the own vehicle obtained with the GPS receiver unit 34. Namely, upon turning on of the main power supply of the on-vehicle navigation device 30 to start-up the same, the route establishment processing unit 38*a* reads out area information indicative of the destination and the routed spots from the non-volatile memory 32. Then, the route establishment processing unit 38*a* establishes the traveling route of the own vehicle starting from the current position of the own vehicle to the destination via the designated routed spots on the basis of area information indicative of the destination and the routed spots read out from the non-volatile memory 32 and area information indicative of the current position of the own vehicle obtained with the GPS receiver unit 34.

The route guidance processing unit 38*b* serves to guide the own vehicle to allow the same to properly travel along the traveling route established with the route establishment processing unit 38*a*. In particular, as the traveling route is established with the route establishment processing unit 38*a*, the route guidance processing unit 38*b* reads out a desired map data from the map database 35 to provide a display of the same over the display unit 36. In addition, the route guidance processing unit 38*b* grasps the current position of the own vehicle on the basis of area information obtained with the GPS receiver unit 34, with a subsequent processing being executed to overlay the current position of the own vehicle over the map data to compel the resulting data to be displayed over the display unit 36. Further, when the own vehicle comes nearer to the intersection at which the own vehicle is to be turned right or left, the route guidance processing unit 38*b* operates to designate the traveling direction of the own vehicle by means of the voice outputted from the speaker 37.

The display control unit 38*c* serves to control the operation of the display unit 36 in dependence on the processing of the route guidance processing unit 38*b*, with the desired map data and associated various information being displayed over the display unit 36.

The voice output control unit 38*d* serves to control the operation of the speaker 37 in dependence on the processing of the route guidance processing unit 38*b*, thereby causing the speaker 37 to produce the voice for designating the traveling direction of the own vehicle.

Figure 5:
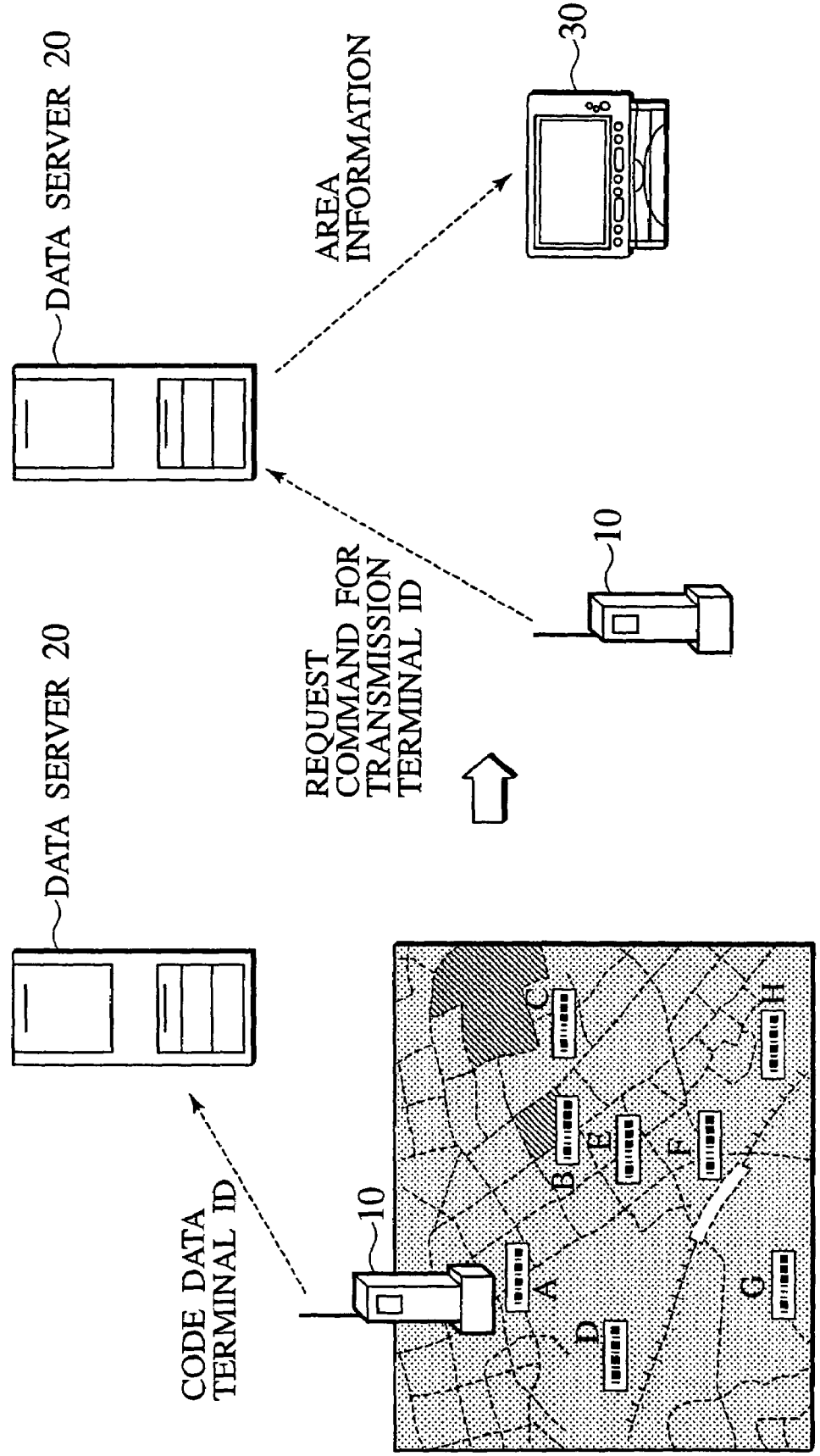
FIGS. 5A and 5B are typical views showing examples in which the navigation system of the first embodiment is applied, with FIG. 5A illustrating a mode in which code data are transmitted from the portable terminal to a data server and FIG. 5B illustrating another mode in which area information is transmitted from the data server to the on-vehicle navigation device.

With such a structure of the navigation system 1 set forth above, when preparing a drive plan outside the own vehicle in a user's home, as shown in FIG. 5A, using the scanner unit 11 of the particular portable terminal 10 and reading out code data such as the bar codes printed on the print product such as the map note enables the user to designate a desired destination and routed spots. More particularly, as the desired code data is entirely read out with the scanner unit 11 of the portable terminal 10 handled by the user and the operation input unit 12 of the portable terminal 10 is operated to input a command such that code data is to be transmitted, or as soon as the desired code data is completely terminated, code data read out from the print product such as the map note with the scanner unit 11 is arranged to be automatically transmitted to the data server 20 from the portable terminal 10 together with the terminal ID indicative of identification information of the particular portable terminal 10.

Further, upon receipt of code data and terminal ID transmitted from the portable terminal 10, the data server 20 operates to convert such code data into area information indicative of a designated position on a detailed coordinate system of the designated destination and routed spots, with converted area information being stored in the information storage unit 23 in correlation with the terminal ID.

In subsequent step, when the user rides on the own vehicle and uses the operation input unit 12 of the portable terminal 10 for executing the operational input to request area information of the desired destination and routed spots to be transmitted to the on-vehicle navigation device 30, as shown in FIG. 5B, the portable terminal 10 issues a request command, for request of area information to be transmitted, and the terminal ID, indicative of identification information of the particular portable terminal 10, which are transmitted to the data server 20. Upon receipt of such a request command for requesting area information to be transmitted, the data server 20 reads out particular area information, indicative of the desired destination and routed spots designated by the user, from the area information storage unit 23, with read out area information being transmitted again to the on-vehicle navigation device 30.

Upon receipt of area information transmitted from the data server 20, the on-vehicle navigation device 30 serves to store received area information in the non-volatile memory 32 until the main power supply is turned on. Subsequently, when the main power supply is turned on, the on-vehicle navigation device 30 reads out area information stored in the non-volatile memory 32 and, on the basis of read out area information, operates to establish a desired traveling route for the own vehicle to enable the own vehicle to be guided on a path determined with the traveling route.

Figure 6:
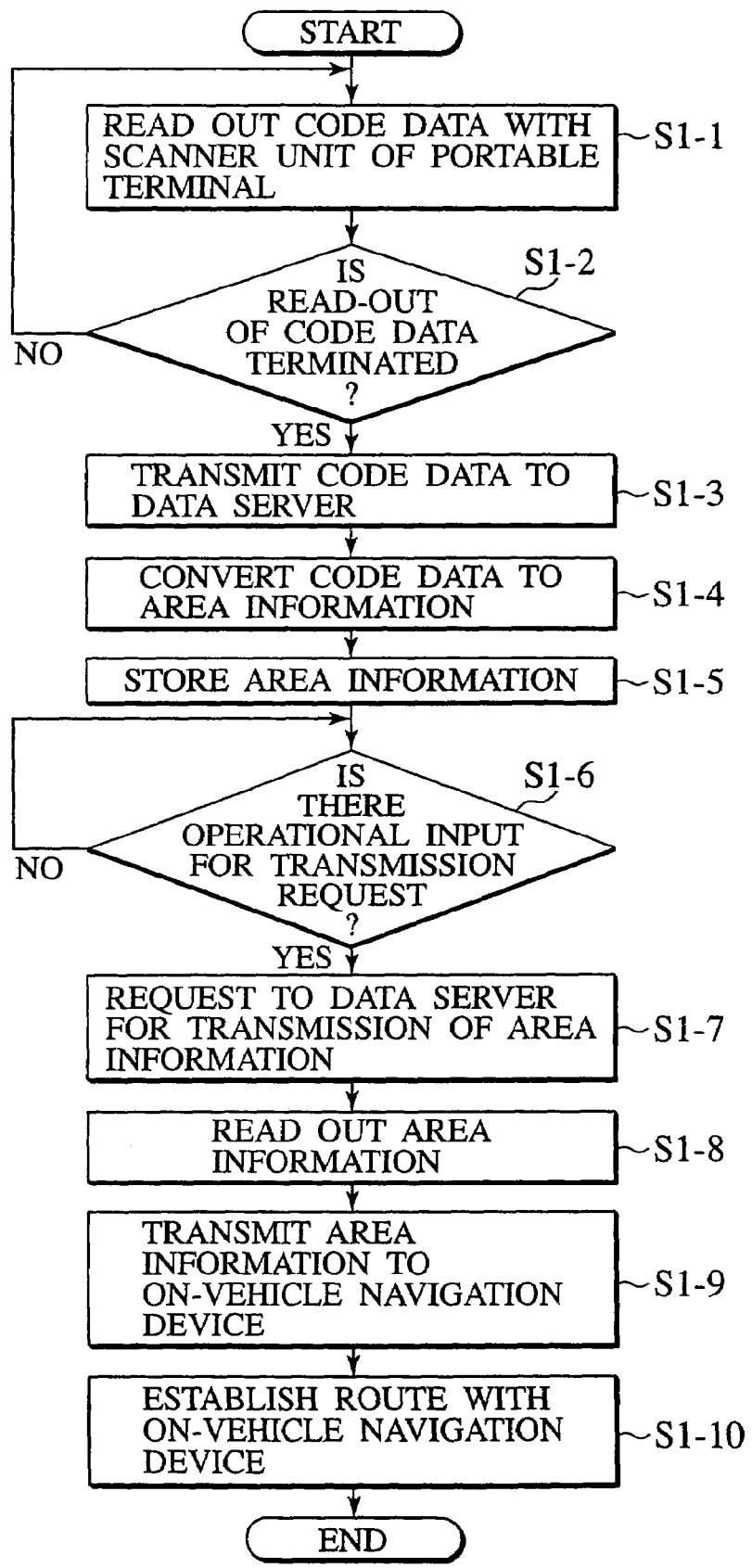
FIG. 6 is a flow chart illustrating the basic sequence of operations of the navigation system shown in FIG. 1.

Now, the basic sequence of operations of the navigation system 1 is described below in detail with reference to a flow chart of FIG. 6.

Figure 7:
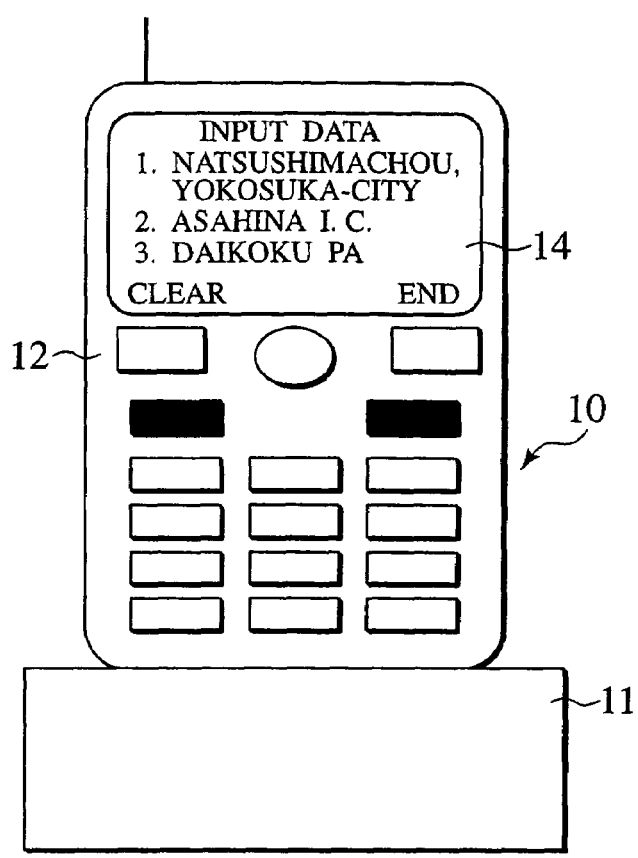
FIG. 7 is a view illustrating the portable terminal with a display unit provided with a display of information corresponding to read out code data.

First, in step S1-1, in response to user's operation, code data indicative of the destination and routed spots are read out from the print product such as the map note with the scanner unit 11 of the portable terminal 10. The code data read out with the scanner unit 11 are then temporarily stored in the code data memory unit 16*a* of the controller 16. Further, when code data are read out with the scanner unit 11, the beep sound is produced by the speaker 15 in dependence on control of the voice output control unit 16*d* of the controller 16, or information correlated with code data as shown in FIG. 7 are displayed over the display unit 14 in dependence on control of the display control unit 16*c* of the controller 16. In such a manner, the user is provided with an indication that code data has been read out.

In next step S1-2, the user executes the operational input indicative of termination of reading-out operation with the operation input unit 12 of the portable terminal 10. Alternatively, the scanner unit 11 reads out code data indicative of the termination of the reading-out operation. With such operation, the controller 16 of the portable terminal 10 operates to discriminate if the command is issued by the user to indicate that the reading-out operation of code data for designating the desired destination and routed spots has been terminated.

Figure 8:
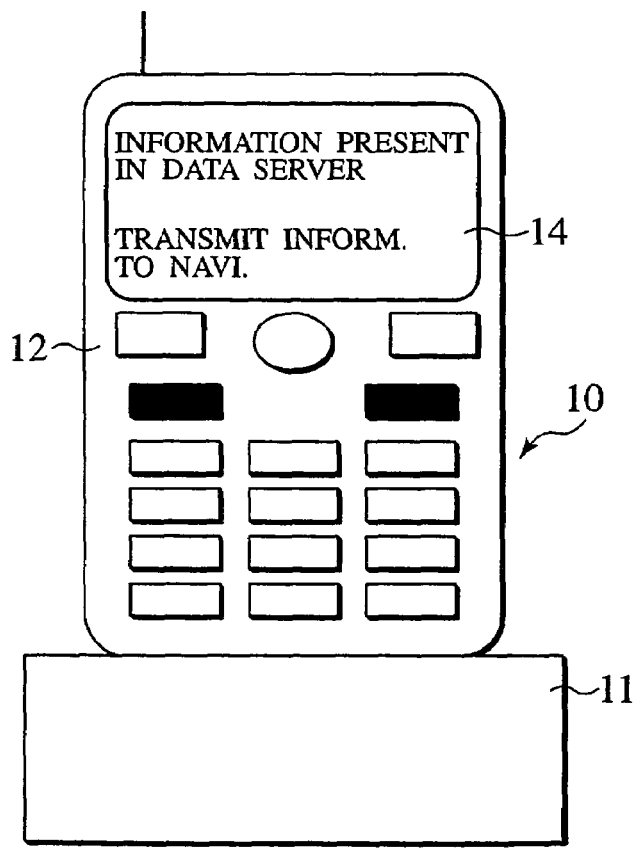
FIG. 8 is a view illustrating the portable terminal with the display unit provided with a display of information indicative of read out code data being transmitted to the data server.

Upon discrimination of the command indicating that the reading-out of code data has been terminated, then in step S1-3, code data indicative of the destination and routed spots temporarily stored in the code data memory unit 16*a* are read out from the code data memory unit 16*a* either in response to the user's operational input or in an automatic fashion, with read out code data as well as the terminal ID indicative of identification information of the particular portable terminal 10 being transmitted from the communication unit 13 to the data server 20 over the radio communication base station 3 and the communication network 2. Further, when this takes place, in response to control of the display control unit 16*c* of the controller 16, the display unit 14 is provided with a display of information indicating that code data has been transmitted to the data server 20 as viewed in FIG. 8.

With code data, indicative of the destination and routed spots designated by the user, being transmitted from the portable terminal 10, the communication control unit 21 of the data server 10 receives such code data. In subsequent step S1-4, code data transmitted from the portable terminal 10 are converted into area information. In succeeding step S1-5, upon control of the writing-in and reading-out control unit 24*c*, such area information is stored in the area information storage unit 23 in correlation with the terminal ID. Also, when the code data analysis processing unit 24*a* of the control unit 24 operates to convert code data into area information, the code data analysis processing unit 24*a* is operative to specify a model of the on-vehicle navigation device 30, to which area information is to be transmitted, on the basis of an on-vehicle navigation ID indicative of identification information of the on-vehicle navigation device 30 stored in the user information database 22, while converting code data into area information so as to comply with a data format of map data treated in the on-vehicle navigation device 30.

In next step S1-6, the controller 16 of the portable terminal 10 discriminates whether the operational input is executed by the user through the use of the operational input unit 12 of the portable terminal 10 to provide a request command for area information, stored in the data server 20, to be transmitted to the on-vehicle navigation device 30.

When it is discriminated that the request command is issued for requesting area information, stored in the data server 20, to be transmitted to the on-vehicle navigation device 30, then in step S1-7, the input processing unit 16*b* of the controller 16 generates an instruction command on transmitting area information. Then, the instruction command and the terminal ID are transmitted from the communication unit 13 to the data server 20 over the communication network 2 and the radio communication base station 3.

With the request command on transmitting area information being issued from the portable terminal 10, the communication control unit 21 of the data server 20 receives this request command. In step S1-8, the request command is analyzed with the command analysis processing unit 24*b* of the control unit 24 and, in response to such a request command, the writing-in and reading-out control unit 24*c* of the control unit 24 reads out area information stored in the area information storage unit 23 on the basis of the terminal ID. In succeeding step S1-9, area information read out from the area information storage unit 23 is transmitted from the communication control unit 21 to the relevant on-vehicle navigation device 30, to which transmission of area information is designated, over the communication network 2 and the radio communication base station 3.

Area information transmitted to the on-vehicle navigation device 30 is received with the communication unit 31 and temporarily stored in the non-volatile memory 32 until the main power supply of the on-vehicle navigation device 30 is turned on. With the main power supply of the on-vehicle navigation device 30 being turned on, operation proceeds to read out area information stored in the non-volatile memory 32, i.e., area information indicative of the destination and routed spots designated by the user. In subsequent step S1-10, on the basis of area information read out from the non-volatile memory unit 32 and area information indicative of the current position of the own vehicle obtained with the GPS receiver unit 34, a desired traveling route of the own vehicle is established with the route establishment processing unit 38*a*. Then, the navigation system 1 conducts a route guidance with the route guidance processing unit 38*b* in accordance with the traveling route established with the route establishment processing unit 38*a*, completing a series of operations.

As previously mentioned above, the navigation system 1 to which the present invention is applied is structured such that reading out code data such as the bar codes printed on the print product such as the map note with the scanner unit 11 of the portable terminal 10 of the user enables the destination and routed spots established along the desired traveling route for the own vehicle to be designated. With such a structure, code data read out with the portable terminal 10 is converted into area information on the detailed coordinate system with the data server 20 and stored therein, with area information indicative of the destination and routed spots being supplied to the on-vehicle navigation device 30 on request. Accordingly, with such navigation system 1, in an event that the user prepares the drive plan outside the own vehicle, the user is able to input the destination and routed spots outside the vehicle in an easy manner using the portable terminal 10, providing a capability for the user to immediately initiate the vehicle to travel without inputting the destination and routed spots after riding on the own vehicle. Further, with the navigation system 1 thus constructed, an ability of reading out the designated destination and routed spots through code data such as the bar codes provides an ease in operation with an improved convenience for use.

Moreover, while the navigation system 1 set forth above has been exemplarily illustrated as one example in which a concept of the present invention is applied, the present invention is not limited to the precise construction stated above and many alternatives, modifications, and variations will be apparent to those skilled in the art without departing from the scope of the present invention. More particularly, although the navigation system 1 of the first embodiment has been described in conjunction with an example in which area information indicative of the destination and routed spots stored in the data server 20 is transmitted to the on-vehicle navigation device 30 from the data server 20 upon receipt of the request command on transmitting area information, it may be altered such that area information is automatically transmitted to the on-vehicle navigation device 30 from the data server 20.

In such a case, the data server 20 operates to convert code data transmitted from the portable terminal 10 into area information and specifies the particular on-vehicle navigation device 30, to which area information is to be transmitted, on the basis of the terminal ID and code data transmitted from the portable terminal 10, resulting in an ability of performing communication between the communication unit 31 of the specified on-vehicle navigation device 30 and the data server 20 to allow area information to be transmitted to the on-vehicle navigation device 30. When this takes place, as previously mentioned above, since the communication unit 31 of the on-vehicle navigation device 30 is enabled to receive data at all times upon receipt of electric power supply from the small size battery 33, area information transmitted from the data server 20 is received with the communication unit 31 of the on-vehicle navigation device 30, even when the main power supply of the on-vehicle navigation device 30 is turned off, and temporarily stored in the non-volatile memory 32.

As set forth above, in an event that transmission of area information to the on-vehicle navigation device 30 from the data server 20 is automatically executed, there is no need for using the portable terminal 10 to perform the operation input for the command of requesting area information to be transmitted, it is possible to realize the navigation system with a further improved facility.

Furthermore, while the navigation system 1 of the first embodiment has been described in conjunction with a case in which code data is read out from the print product such as the map note using the portable terminal 10, it is apparent to those skilled in the art that the portable terminal 10 may be replaced with a fixed type information processing terminal such as a personal computer placed either in the user's house or user's job site. In such a case, a small size scanner may be coupled to the fixed type information processing terminal to which a program is installed to render the same to play roles as the code data memory unit 16a, the input processing unit 16b, the display control unit 16c and the voice output control unit 16d.

(Second Preferred Embodiment)

Figure 9:
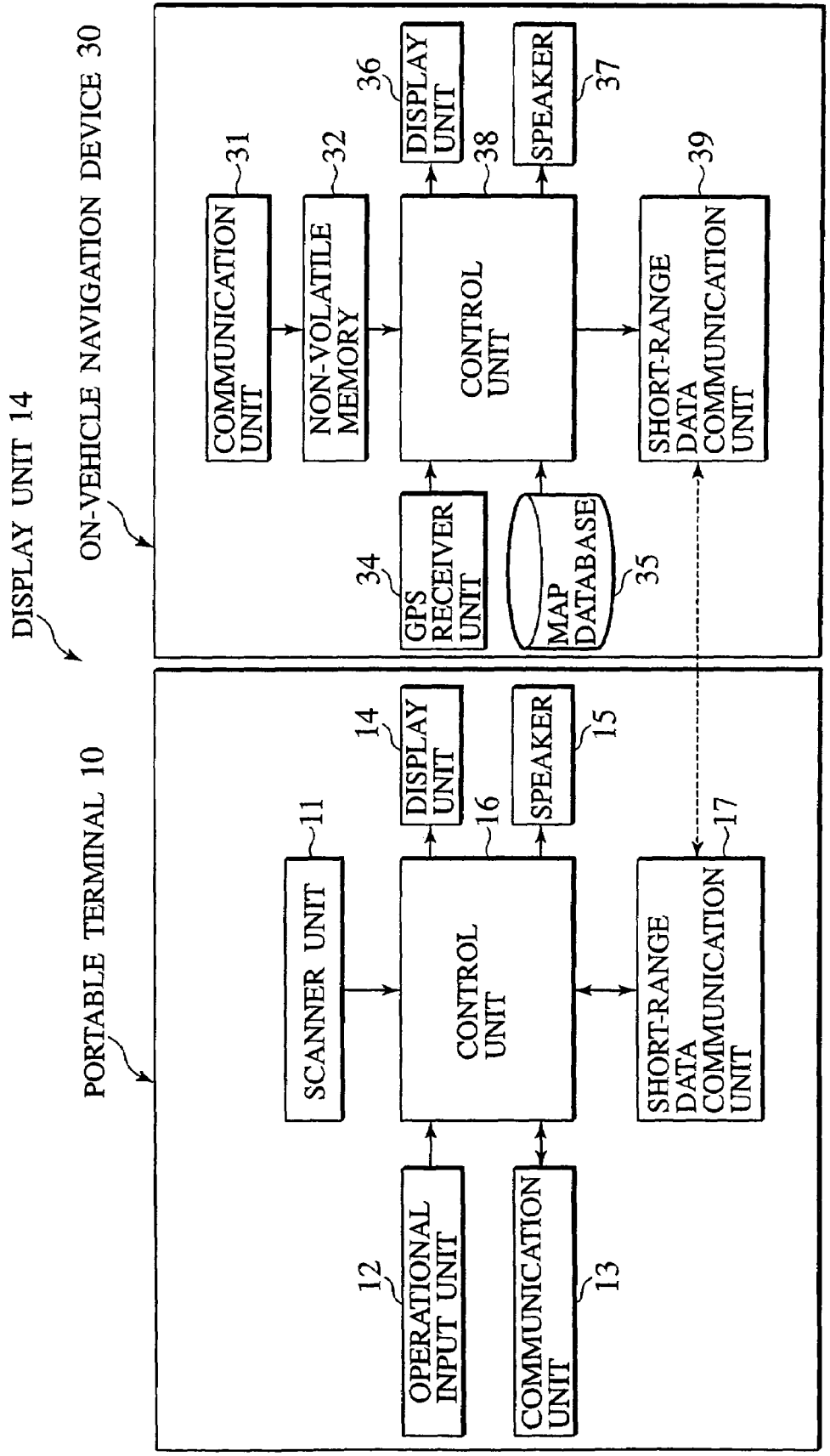
FIG. 9 is a block diagram illustrating a portable terminal and an on-vehicle navigation device forming a navigation system of a second embodiment according to the present invention.

Next, a navigation system of a second embodiment according to the present invention is described below with reference to FIG. 9. As shown in FIG. 9, the navigation system 1A of the second embodiment is identical with that of the second embodiment except that the portable terminal 10 and the on-vehicle navigation device 30, with like parts bearing the same reference numerals as those used in the first embodiment to omit a redundant description of the same parts while a detailed description is given only to the portable terminal 10 and the on-vehicle navigation device 30. The portable terminal 10 and the on-vehicle navigation device 30 include short-range communication units 17, 39, respectively, providing a capability of performing data communication in a short-range between the portable terminal 10 and the on-vehicle navigation device 30 using Bluetooth or IrDA. With the navigation system 1A of the second embodiment, when the user rides on the own vehicle carrying out the portable terminal 10 and turns on the main power supply of the on-vehicle navigation device 30, a communication link is established between the portable terminal 10 and the on-vehicle navigation device 30. When this takes place, area information indicative of the destination and routed spots stored in the data server 20 is transmitted from the data server 20 to the on-vehicle navigation device 30 on the basis of a data transmission flag of the portable terminal 10 and is received with the on-vehicle navigation device 30.

With the on-vehicle navigation device 30 of the second embodiment, as set forth above, since the area information stored in the data server 20 is arranged to be transmitted to the on-vehicle navigation device 30 after the main power supply of the on-vehicle navigation device 30 is turned on, there is no need for the communication unit 31 of the on-vehicle navigation device 30 to be coupled with the small size battery 33.

With the navigation system 1A of the second embodiment previously mentioned, when the user reads out the desired code data from the print product such as the map note using the scanner unit 11 of the portable terminal 10 with the read out code data being transmitted to the data server 20 from the portable terminal 10, the data transmission flag of the portable terminal 10 is turned on. That is, with the navigation system 1A of the second embodiment, the portable terminal 10 is structured to store the presence of or the absence of code date, to be transmitted to the data server 20, in the form of a data transmission flag such that when code data is transmitted from the portable terminal 10 to the data server 20, the portable terminal 10 operates to turn on the transmission flag.

Figure 10:
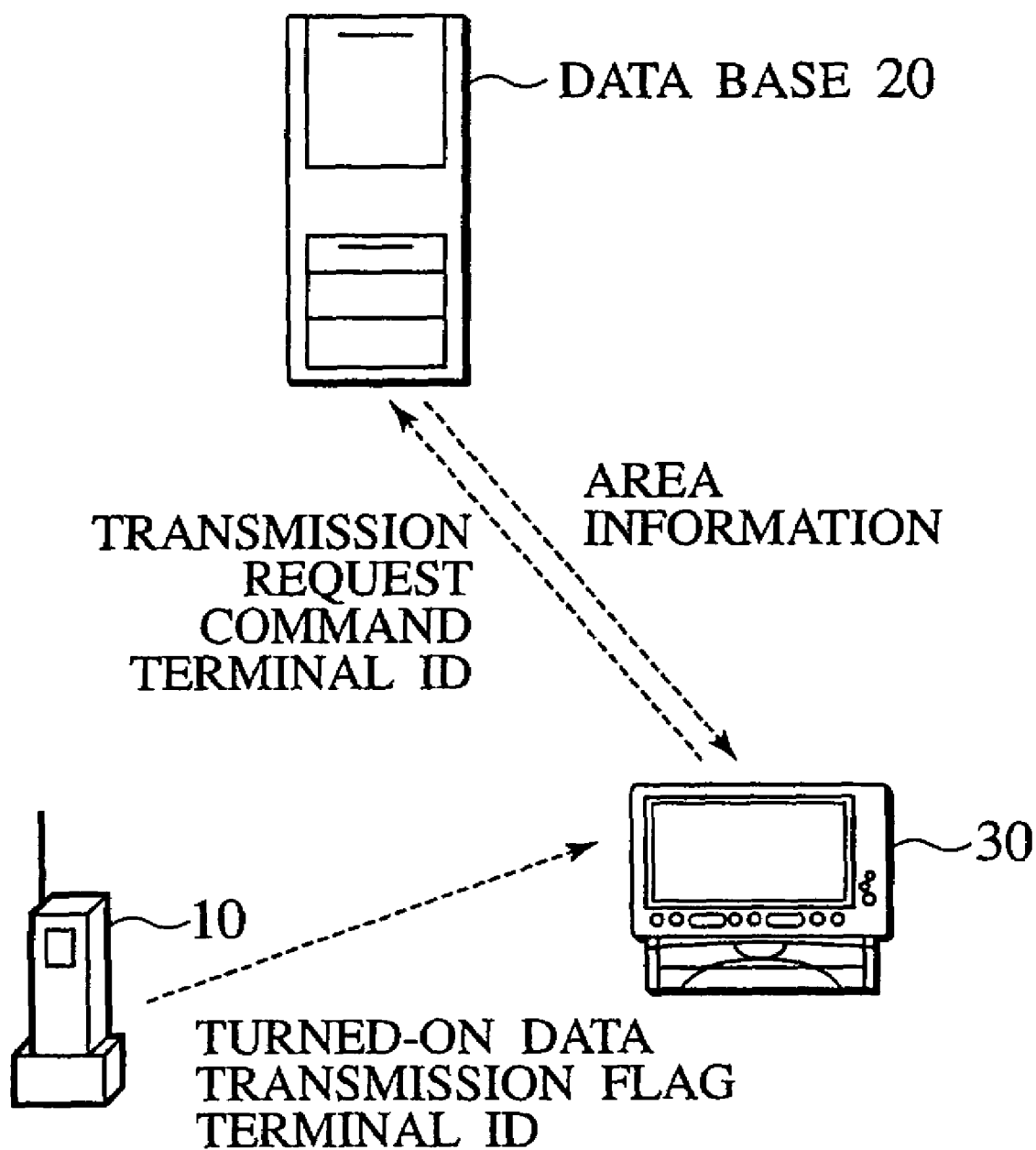
FIG. 10 is a typical view schematically illustrating a mode in which the navigation system of the second embodiment is applied.

Under such a condition set forth above, when the user rides on the own vehicle carrying out the portable terminal 10 and turns on the on-vehicle navigation device 30, the communication link is established over the short-range data communication such as Bluetooth between the portable terminal 10 and the on-vehicle navigation device 30. When this takes place, as shown in FIG. 10, information indicative of the data transmission flag being turned on is automatically transmitted together with the terminal ID to the on-vehicle navigation device 30 from the portable terminal 10. With information indicative of the turned on data transmission flag being transmitted from the portable terminal 10 to the on-vehicle navigation device 30, the data transmission flag of the portable terminal 10 is turned off.

Further, if information indicative of the on-state data transmission flag is transmitted from the portable terminal 10, then, the on-vehicle navigation device 30 issues the request command on area information to be transmitted to the data server 20, with the request command and the terminal ID of the portable terminal 10 being transmitted from the communication unit 31 to the data server 20. Upon receipt of the request command from the on-vehicle navigation device 30, the data server 20 reads out intended area information from the area information storage unit 23 on the basis of the terminal ID transmitted with the request command, with read out area information being transmitted to the on-vehicle navigation device 30. Under such a condition, the desired traveling route for the own vehicle is established in the on-vehicle navigation device 30 to allow the route guidance to be conducted along with such traveling route.

Figure 11:
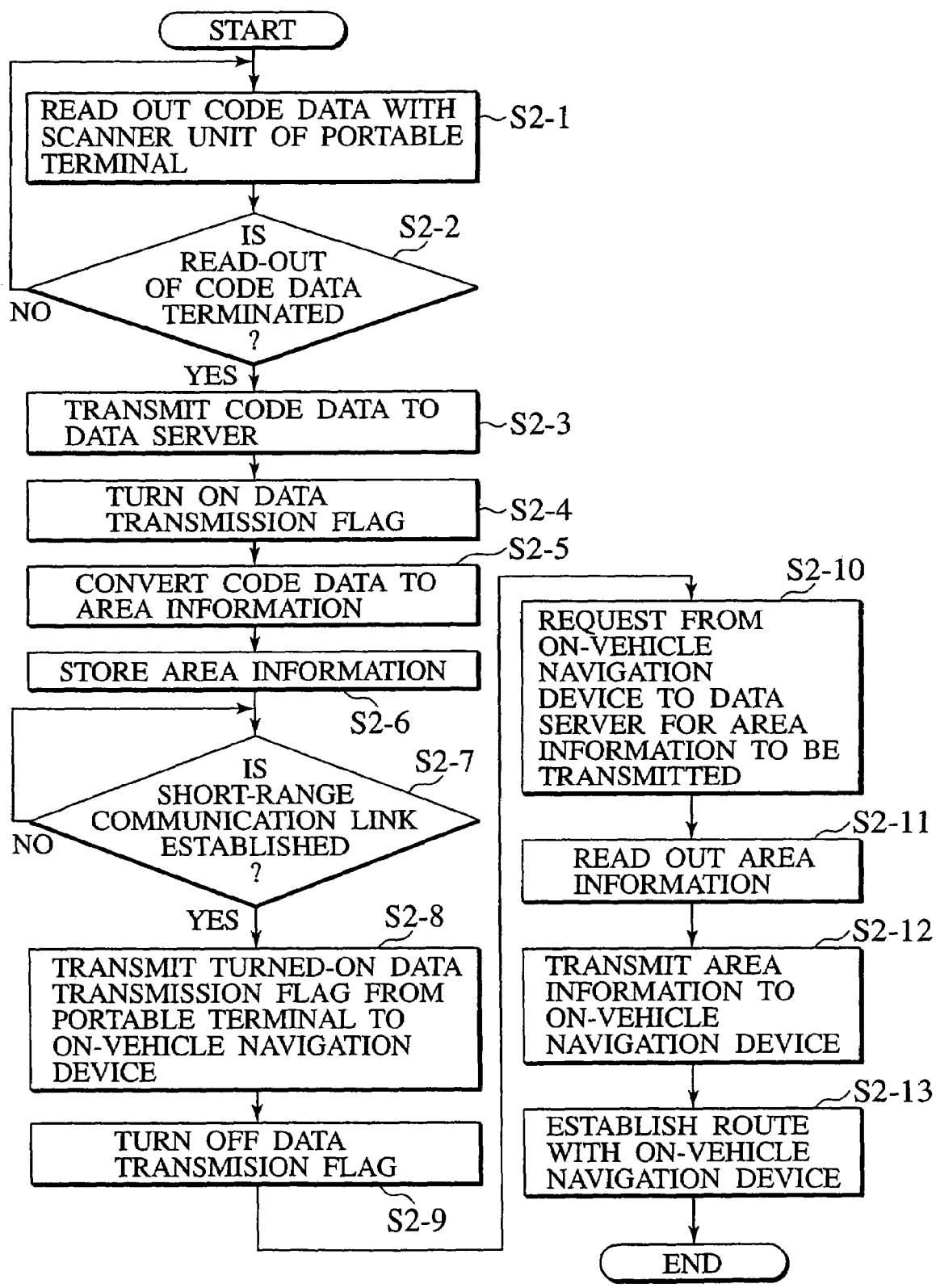
FIG. 11 is a flow chart illustrating the basic sequence of operations of the navigation system shown in FIG. 9.

Now, the basic sequence of operations of the navigation system 1A of the second embodiment is described below in detail with reference to a flow chart of FIG. 11.

First, in step S2-1, in accordance with the user's operation, the scanner unit 11 of the portable terminal 10 reads out code data indicative of the destination and routed spots from the print product such as the map note. In step S2-2, discrimination is made as to whether the user has indicated the termination of reading out code data.

When it is discriminated that the termination of reading out code data is indicated, in step S2-3, code data read out with the scanner unit 11 of the portable terminal 10 as well as the terminal ID indicative of the identification information of the portable terminal 10 are transmitted from the portable terminal 10 to the data server 20. With code data being transmitted from the portable terminal 10 to the data server 20, in step S2-4, the data transmission flag of the portable terminal 10 is turned on.

With code data indicative of the destination and routed posts designated by the user being transmitted from the portable terminal 10, in step S2-5, the data server 20 operates to convert code data into area information, with area information being stored in the area information storage unit 23 in correlation with the terminal ID in step S2-6.

Subsequently, when the user carries the portable terminal 10 into the own vehicle and the on-vehicle navigation device 30 is turned on, in step S2-7, discrimination is made as to whether or not the short-range data communication link is established between the portable terminal 10 and the on-vehicle navigation device 30.

As the short-range communication is established between the portable terminal 10 and the on-vehicle navigation device 30, in step S2-8, information indicating that the data communication flag of the portable terminal 10 is turned on, i.e., information indicating that area information indicative of the destination and routed spots designated by the user is stored in the data server 20, as well as the terminal ID of the portable terminal 10 are automatically transmitted from the portable terminal 10 to the on-vehicle navigation device 30. When information, indicating that the data transmission flag is turned on, is transmitted from the portable terminal 10 to the on-vehicle navigation device 30, in step S2-9, the data transmission flag of the portable terminal 10 is turned off.

Moreover, when information indicative of the off-state data transmission flag is transmitted from the portable terminal 10 to the on-vehicle navigation device 30, in step S2-10, the on-vehicle navigation device 30 issues a request command on transmitting area information to the data server 20. And, the request command and the terminal ID of the portable terminal 10 are transmitted from the communication unit 31 of the on-vehicle navigation device 30 to the data server 20.

With the request command being issued from the on-vehicle navigation device 30, in step S2-11, the data server 20 responds to this request command and reads out area information stored in the area information storage unit 23, i.e., area information indicative of the destination and routed spots designated by the user on the basis of the terminal ID. In succeeding step S2-12, area information read out from the area information storage unit 23 is transmitted from the data server 20 to the on-vehicle navigation device 30.

With area information being transmitted from the data server 20 to the on-vehicle navigation device 30, in step S2-13, the on-vehicle navigation device 30 operates to establish a traveling route of the own vehicle on the basis of area information, transmitted from the data server 20, and area information indicative of the current position of the own vehicle obtained with the GPS receiver unit 34. Thus, the on-vehicle navigation device 30 operates to perform the route guidance in accordance with the traveling route, completing a series of operations in the navigation system 1A of the second embodiment.

With such a structure of the navigation system of the second embodiment set forth above, when the user carries the portable terminal into the own vehicle and turns on the main power supply of the on-vehicle navigation device 30 to establish the short-range communication link between the portable terminal 10 and the on-vehicle navigation device 30, area information indicative of the destination and routed spots stored in the data server 20 is automatically transmitted from the data server 20 to the on-vehicle navigation device 30. This results in no need for the user to execute the operational input for commanding area information to be transmitted using portable terminal 10, with a resultant further increase in a facility.

Figure 12:
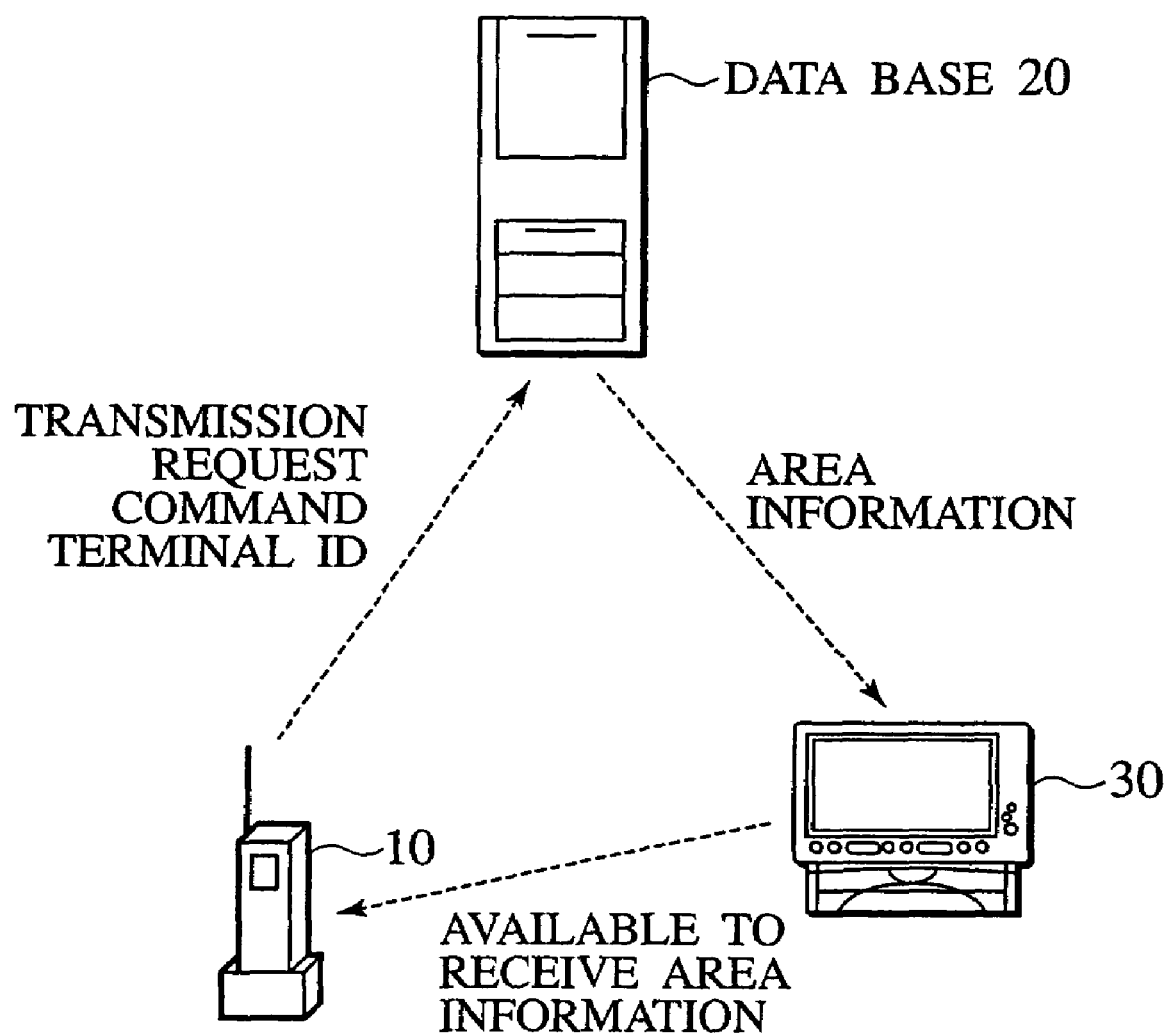
FIG. 12 is a typical view schematically illustrating another mode in which the navigation system of the second embodiment is applied.

Also, while the second embodiment has been described with reference to an example in which when the short-range communication link is established between the portable terminal 10 and the on-vehicle navigation device 30, the portable terminal 10 transmits information indicative of the on-state data transmission flag to the on-vehicle navigation device 30 which in turn issues the request command to the data server 20, as shown in FIG. 12, it may be altered such that the establishment of the communication link based on the short-range data communication between the portable terminal 10 and the on-vehicle navigation device 30 permits the portable terminal 10 to discriminate the on-vehicle navigation device 30 being started up whereby the portable terminal 10 issues the request command to the data server 20 in response to the data transmission flag with the request command being transmitted to the data server 20 which in turns automatically transmits area information to the on-vehicle navigation device 30. In such an alternative case, there is no need for the user to use the portable terminal 10 to execute the operational input for commanding area information to be transmitted, resulting in a further improved facility.

(Third Preferred Embodiment)

Now, a navigation system of a third embodiment according to the present invention is described below with reference to FIGS. 13A and 13B. The navigation system 1B of the third embodiment has the same basic structure as those of first and second embodiments except for a method of utilizing the navigation system. In particular, the navigation system 1B of the third embodiment includes a data server 20B that is comprised of an area information storage unit 23B provided with personal folders serving as record areas for respective users. The personal folder is structured to store information that is read out with other user using his portable terminal 10. With such a structure, information items read out with respective portable terminals 10 of plural users are collectively stored in the personal folder of a particular user, with a resultant capability for the collected information items to be transmitted to a particular on-vehicle navigation device 30.

The navigation system 1B is extremely effective in a case where a traveling route is to be established especially in a situation where a certain user drives the vehicle carrying the on-vehicle navigation device 30 to sequentially call at a plurality of friend's homes.

Hereinafter, a detailed description is made in conjunction with an example in a situation where the certain user N calls at a friend's house A, a friend's house B and a friend's house C, respectively, by traveling the vehicle carrying the on-vehicle navigation device 30. In such a situation, the user N preliminarily takes a contact with the friends A, B, C and requests information, related to locations of respective individuals, to be transmitted to the data server 20B. In this connection, the user N instructs information for specifying own folder in the data server 20B, i.e., the terminal ID of the own portable terminal 10, to the friends A, B and C.

With the navigation system 1B, upon receipt of request from the user N, the friends A, B and C operate respective portable terminals 10 such that code data such as the bar codes indicative of locations, printed on the map note, in the vicinity of individual houses are read out with the scanner units 11 of the respective portable terminals 10 and that read out code data is transmitted to the user N's folder of the data server 20B. Upon terminations of operations of the respective portable terminals 10 executed by the friends A, B and C, as shown in FIG. 13A, code data read out with the scanner units 11 of the portable terminals 10 carried by the friends A, B and C, respectively, i.e., code data indicative of the locations in the vicinity of the houses of the friends A, B and C, are transmitted, with identification information such as the terminal ID of the user N, from the respective portable terminals 10 to the data server 20, respectively.

Upon receipt of code data, indicative of the locations in the vicinity of the houses of the friends A, B and C, and the terminal ID of the user N's portable terminal 10, the data server 20B converts code data into area information, based on a detailed coordinate system, which are stored in the user N's folder provided in the area information storage unit 23B. During such operation, the folder of the user N is specified based on code data, indicative of the locations in the vicinity of the houses of the friends A, B and C, and the terminal ID, indicative of the portable terminal 10 of the user N, which are transmitted from the portable terminals 10 of the friends A, B and C.

Figure 13:
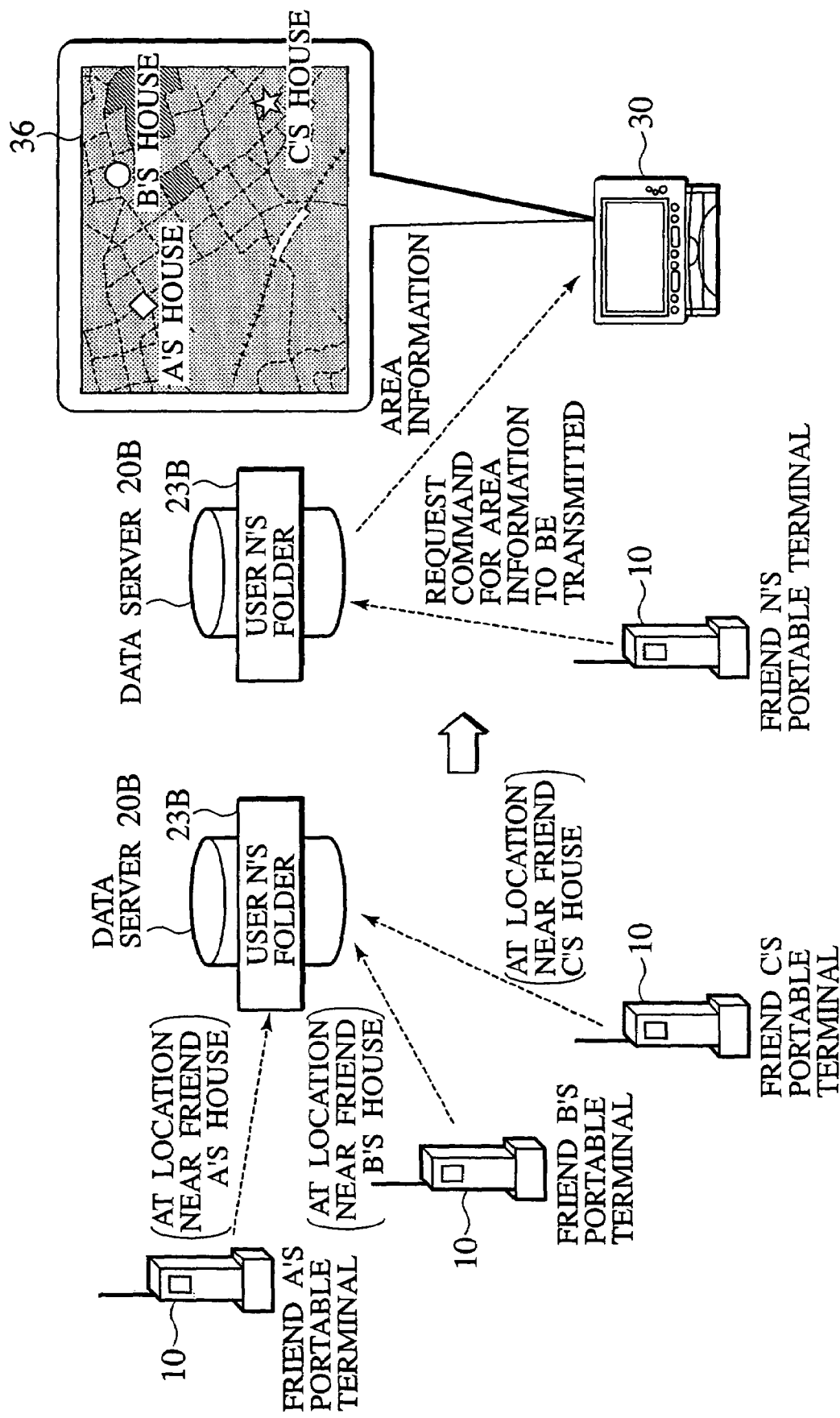
FIGS. 13A and 13B are typical views showing modes in which a navigation system of a third embodiment according to the present invention is applied, with FIG. 13A illustrating a mode in which code data are transmitted to the data server from portable terminals of a plurality of users and FIG. 13B illustrating another mode in which area information, that are collected in the data server, are transmitted to the on-vehicle navigation device.

As shown in FIG. 13B, if, in response to the operational input executed by the user N, a request command, on transmission of area information, and the terminal ID of the portable terminal 10 of the user N are transmitted from the portable terminal 10, the data server 20B specifies the folder of the user N in the area information storage unit 23B on the basis of the transmitted terminal ID and reads out area information stored in the folder of the user N, i.e. area information indicative of the locations in the vicinity of the houses of the friends A, B and C, with read out area information being transmitted to the on-vehicle navigation device 30.

Upon receipt of area information indicative of the locations in the vicinity of the friends A, B and C transmitted from the data server 20B, the on-vehicle navigation device 30 operate to establish a traveling route passing through the spots near the houses of the friends A, B and C on the basis of these area information and area information indicative of the current position of the vehicle obtained with the GPS receiver unit 34. Thus, the on-vehicle navigation device 30 operates to execute the routes guidance to allow the vehicle to travel along the established traveling route.

Figure 14:
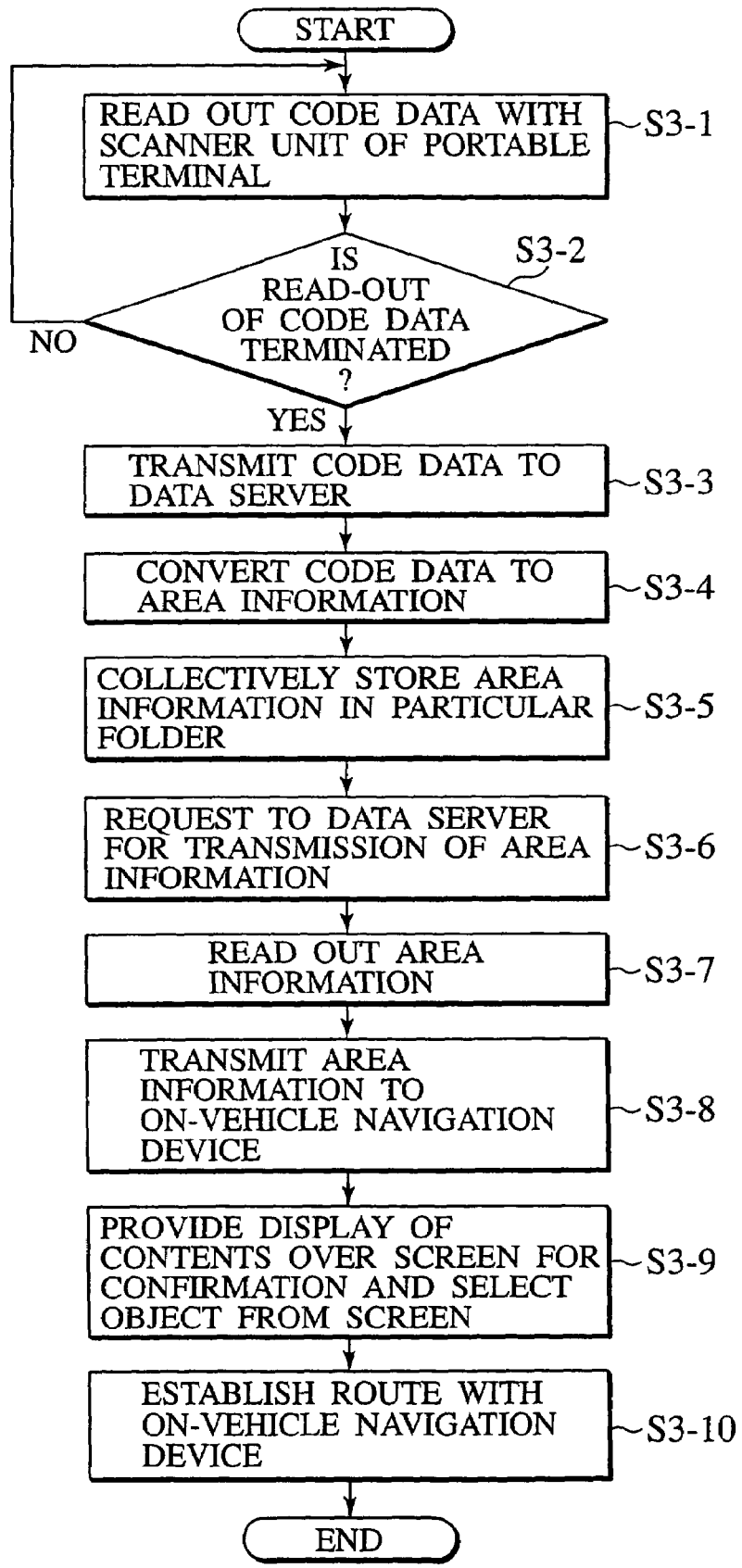
FIG. 14 is a flow chart illustrating the basic sequence of operations of the navigation system of the third embodiment.

Now, the basis sequence of operations of the navigation system 1B of the third embodiment is described below with reference to a flow chart of FIG. 14.

First, in step S3-1, in response to the operational inputs executed by the plural users, the scanner units 11 of the plural terminals 10 read out code data from the print products such as the map notes, respectively. In step S3-2, operation is executed to discriminate if the command is issued indicating the termination of reading out of code data by the respective users.

If it is discriminated that the command is issued indicating the termination of reading out of code data, then in step S3-3, code data, read out with the scanner units 11 of the respective portable terminals 10, and information (terminal ID), specifying the particular folder to which information is to be transmitted, are transmitted from the respective portable terminals 10 to the data server 20B. With code data being transmitted from the respective portable terminals 10 to the data server 20B, in step S3-4, the data server 20B converts code data into respective area information. In step S3-5, these area information are stored and collected in the specified folder of the area information storage unit 23B to which these area information are designated to be transmitted.

In succeeding step S3-6, in response to the operational input made by the particular user, the portable terminal 10 sends the request command to the data server 20B for requesting area information to be transmitted. In an alternative practice, the request command on transmission of area information is automatically supplied from the portable terminal 10 or the on-vehicle navigation device 30 to the data server 20B.

Upon receipt of the request command for transmission of area information, in step S3-7, the data server 20B reads out area information, collectively stored in the specified folder in the area information storage unit 23B, i.e., area information indicative of the destinations and routed spots designated by the plural users. In next step S3-8, area information read out from the area information storage unit 23B are transmitted from the data server 20B to the on-vehicle navigation device 30.

Figure 15:
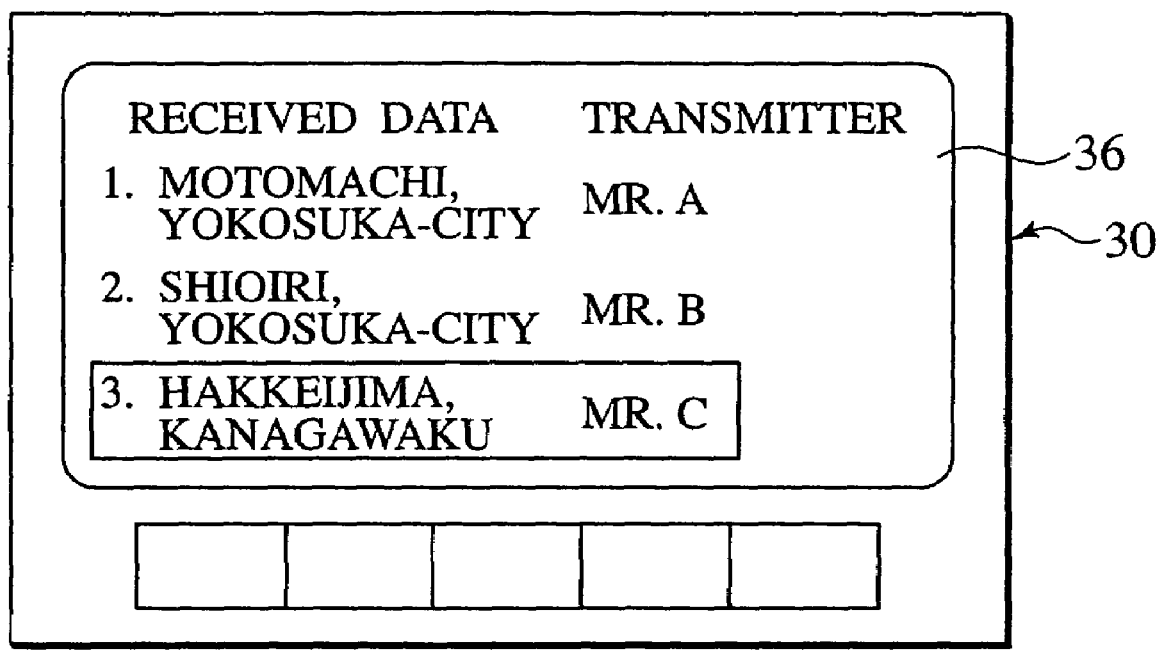
FIG. 15 is a view illustrating an on-vehicle navigation device with a display unit provided with a screen for confirming the content of area information transmitted from a data server.

Upon receipt of area information transmitted from the data server 20B, in step S3-9, the display unit 36 of the on-vehicle navigation device 30 provides a display of a screen for allowing the user to confirm the contents of area information as shown in FIG. 15. When this takes place, the user referrers to the screen of the display unit 36 and selects desired area information over the display screen. Then, in step S3-10, the on-vehicle navigation device 30 establish the traveling route of the own vehicle on the basis of area information selected by the user and area information indicative of the current position of the own vehicle obtained with the GPS receiver unit 34. Thus, the own vehicle is guided with the on-vehicle navigation device 30 along the established traveling route, thereby completing a series of operations of the navigation system 1B of the third embodiment.

With the navigation system 1B of the third embodiment previously mentioned, since area information obtained by the plural users are collectively stored in the data server 20B with these area information being enabled to be utilized by the particular user to allow the on-vehicle navigation device 310 to establish the desired route, it is possible to realize the navigation system with an extremely high utility value.

Figure 16B:
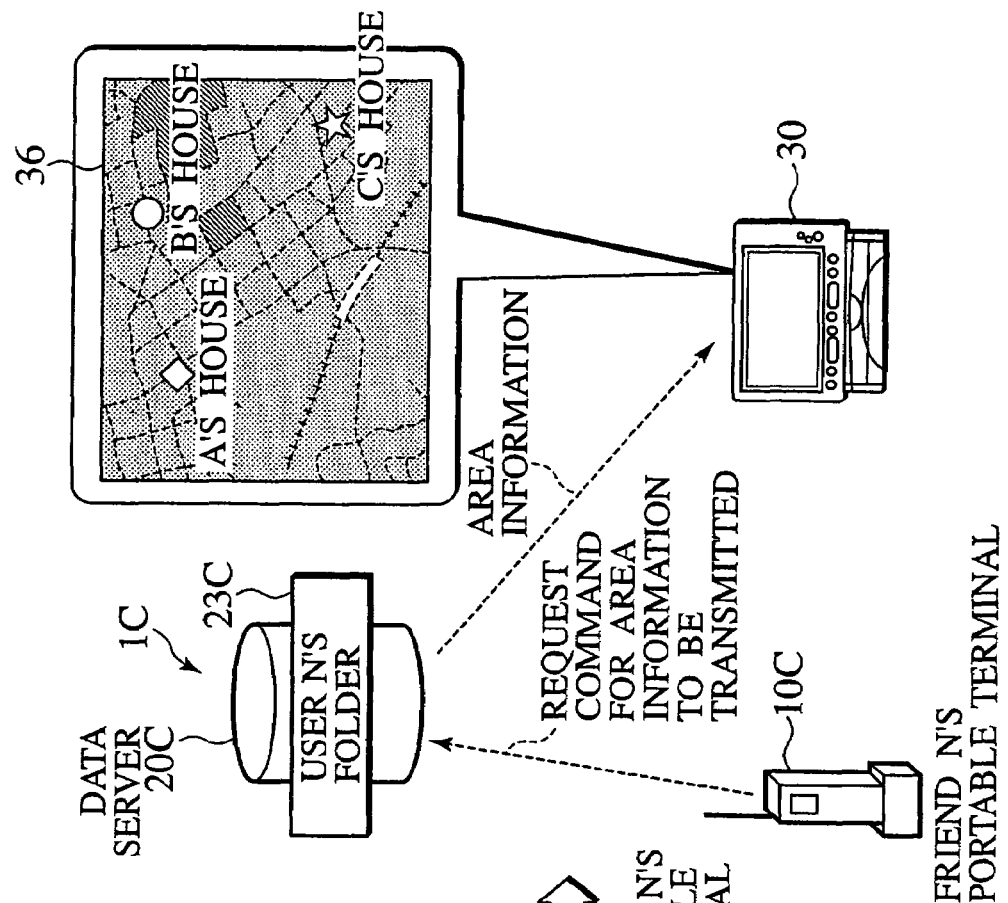
FIGS. 16A and 16B are typical views showing modes in which the navigation system of the third embodiment according to the present invention is applied, with FIG. 16A illustrating the mode in which code data are transmitted to the data server from portable terminals of a plurality of users and FIG. 16B illustrating the other mode in which area information, that are collected in the data server, are transmitted to the on-vehicle navigation device.
Figure 16A:
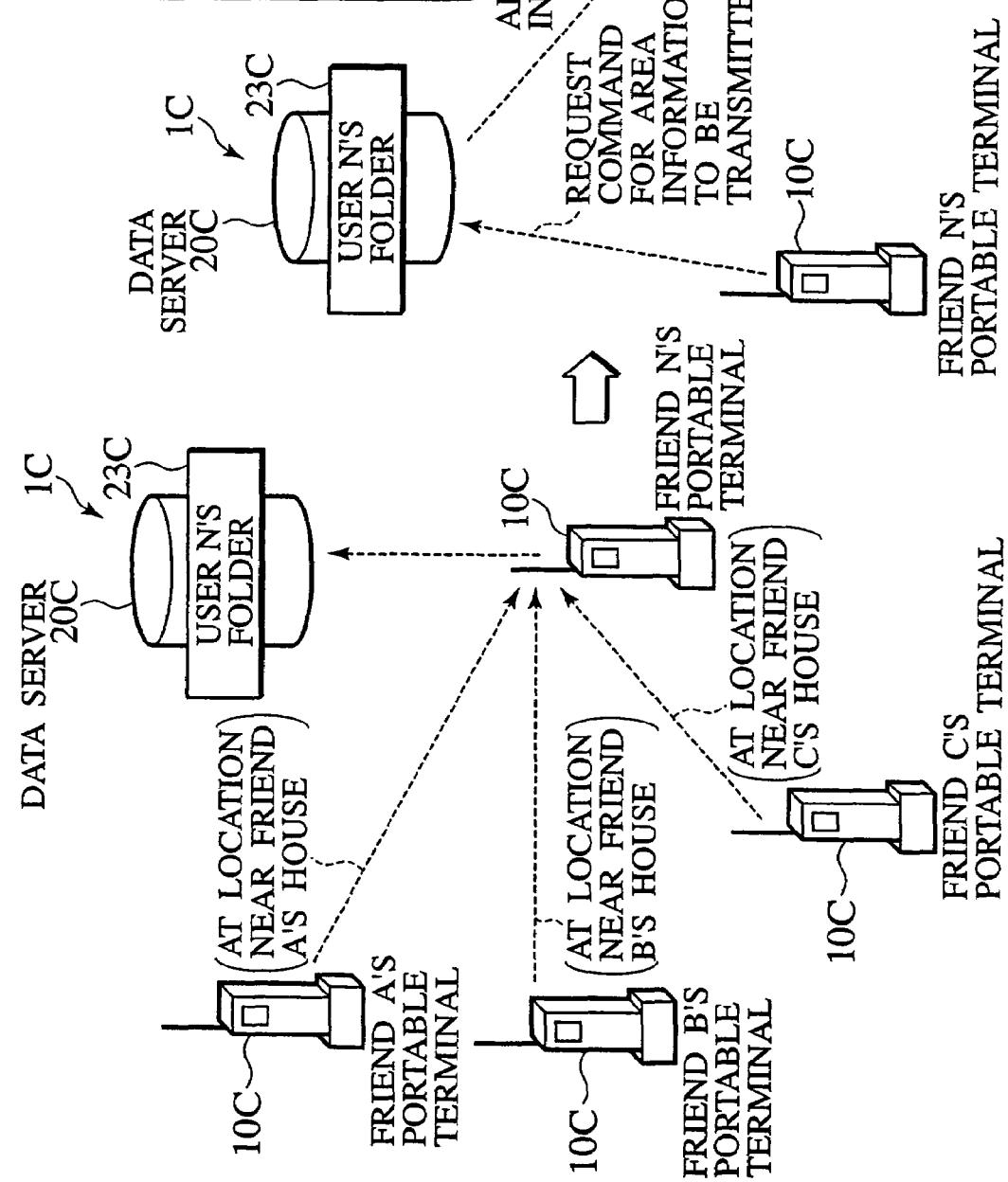

While the navigation system of the third embodiment has been described in conjunction with an example in which the plural users use the respective portable terminals 10 to read out code data which are in turn transmitted to the particular folder, as shown in FIG. 16A, it may be altered such that code data read out with the portable terminals 10 of the plural users are transmitted to the portable terminal 10 of the particular user and collectively stored therein with code data collectively stored in the portable terminal 10 of the particular user being configured to be transmitted to the data serve 20B from the particular portable terminal 10.

Figure 17:
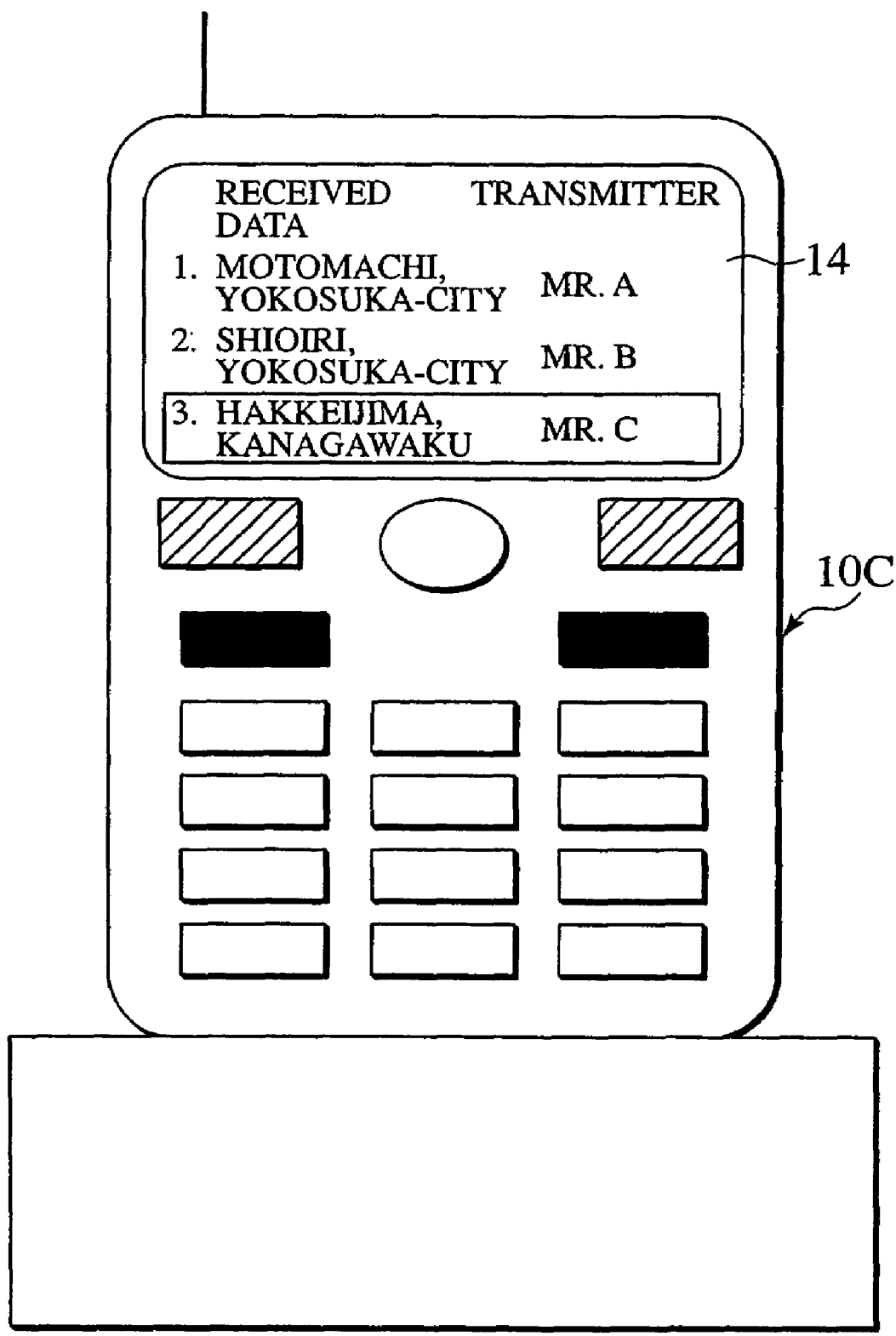
FIG. 17 is a view illustrating the portable terminal with a display unit provided with a display of information corresponding to code data transmitted from another portable terminal.

A detailed example of the alternative set forth above is given below with reference to an example shown in FIG. 16A. As shown in FIG. 16A, an alternative navigation system 1C is comprised of a plurality of portable terminals 10C owned by the friends A, B and C, and a portable terminal 10 of the user N, and a data server 20C provided with an area information storage unit 23C provided with a folder of the user N. With such a structure, code data indicative of the locations near the houses of the friends A, B and C, respectively, are initially read out with the scanner units of the portable terminals 10C at respective sites of the friends A, B and C, with read out code data being transmitted to the portable terminal 10C of the user N. Upon receipt of code data transmitted from the portable terminals 10C of the friends A, B and C, respectively, the portable terminal 10C of the user N collectively stores these code data, with information correlated with these code data being displayed over a display unit 14 as viewed in FIG. 17. Under such condition, if the user N selects desired code data referring to the display screen of the display unit 14, the selected code data are then transmitted to the data server 20C from the portable terminal 10C of the user N.

Upon receipt of selected code data transmitted from the portable terminal 10C of the user N, the data server 20C converts these code data into area information, respectively, which are in turn stored in the folder of the user N provided in the area information storage unit 23C of the data server 20C. As shown in FIG. 16B, if the request command on transmission of area information is issued from the portable terminal 10C of the user N responsive to the operational input executed by the user N, then, operation is executed to read out area information stored in the folder of the user N in the area information storage unit 23C, i.e., area information selected by the user N, with read out area information being transmitted to the on-vehicle navigation device 30.

Upon receipt of area information transmitted from the data server 20C, the on-vehicle navigation device 30 established a desired traveling route of the own vehicle on the basis of these area information and area information indicative of the current position of the own vehicle obtained with the GPS receiver unit. Thus, the on-vehicle navigation system 1C serves to guide the own vehicle along the desired traveling route.

With such an exemplary structure set forth above, like in the other example previously mentioned, since the navigation system is configured to allow area information individually obtained by the plural users to be collected in the data server 20C thereupon these area information are utilized by the particular user to enable the on-vehicle navigation device 30 to establish the desired traveling route, it is possible to realize the navigation system with an extremely high utility value.

Furthermore, while in the examples set forth above, the on-vehicle navigation device 30 has been described with reference to the example in which the traveling route of the vehicle is established for guiding the vehicle on the basis of area information, read out at respective sites of the portable terminals 10C of the plural users and collected in the data server 20C, and area information indicative of the current position of the own vehicle, the on-vehicle navigation device 30 may be altered such that it determines a traveling route responsive to an operational input made by a particular user and, subsequently, if area information individually obtained by portable terminals 10C of a plurality of users are transmitted, the on-vehicle navigation device 30 adds respective area information, obtained by the portable terminals 10C of the plural users, to the previously determined traveling route to provide a newly established traveling route. It may be preferable that the traveling route determined by the on-vehicle navigation device 30 is suitably altered in dependence on an operational input made by the portable terminal 10C of the particular user or in dependence on an operational input made by the portable terminal 10C of another user.

(Fourth Preferred Embodiment)

Now, a navigation system 1D of a fourth embodiment according to the present invention is described below with reference to FIGS. 18A and 18B. The navigation system 1D of the fourth embodiment has the same basic structure as those of first and second D of the fourth embodiment and includes a data server 20D that is comprised of an area information storage unit 23D provided with a group serving as a common record area shared with a plurality of users. The group folder is configured to store area information that can be transmitted to a plurality of on-vehicle navigation devices 30, respectively, which are configured to enable respective desired traveling routes to be established on the basis of such area information.

The navigation system 1D is extremely effective especially when compelling the on-vehicle navigation devices 30 of the respective vehicles in a case where the plural users run their respective vehicles installed with respective non-vehicle navigation devices 30 and go to a common appointed place designated by a particular user.

A detailed description will be given in conjunction with a situation where the users A, B and C run the vehicle installed with the on-vehicle navigation devices 30, respectively, to go to the common appointed place designated by the particular user A.

Figure 18B:
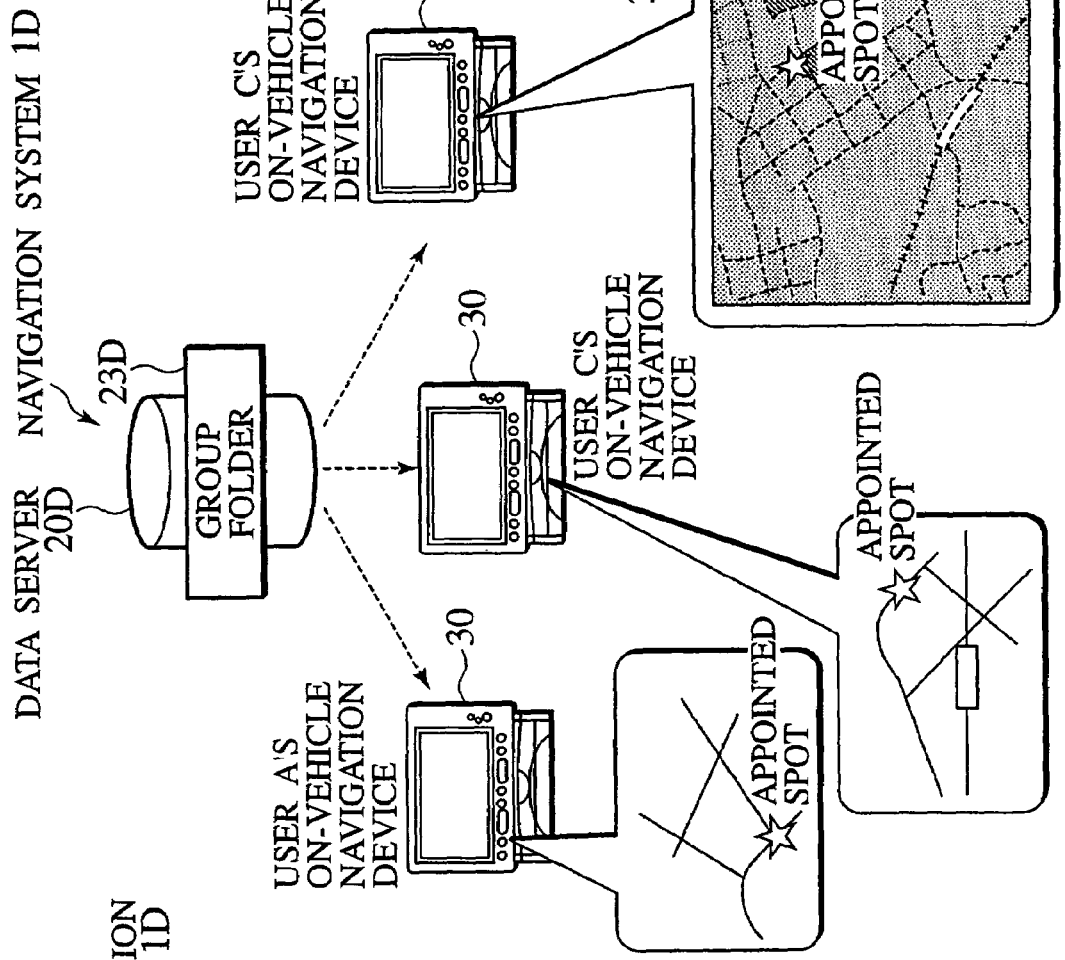
FIGS. 18A and 18B are typical views showing modes in which the navigation system of a fourth embodiment according to the present invention is applied, with FIG. 18A illustrating a mode in which code data are transmitted to a data server from a particular portable terminal and FIG. 18B illustrating another mode in which area information are transmitted from the data server to a plurality of on-vehicle navigation devices.
Figure 18A:
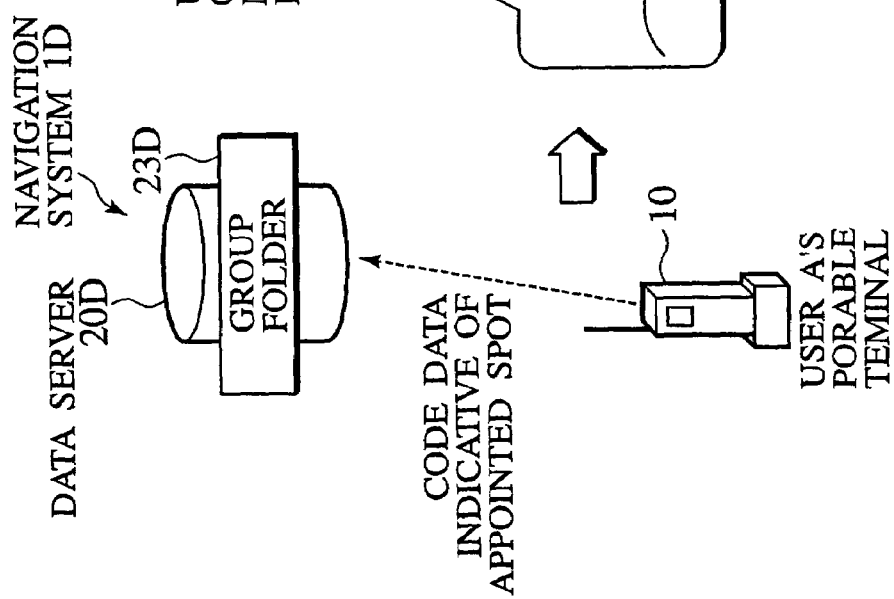

With the navigation system 1D of the fourth embodiment, as the user A operates the portable terminal 10 in such a way to cause the scanner unit 11 of the portable terminal 10 to read out code data such as the bar code indicative of a location at the common appointed place printed on a print product such as a map note with read out data being transmitted to the group folder in the data server 20D, as shown in FIG. 18A, code data read out with the scanner unit 11 of the portable terminal 10 of the user A, i.e., code data indicative of the appointed place, is transmitted with identification information of the terminal ID of the portable terminal 10 of the user A from the portable terminal 10 of the user A to the data server 20D.

The data server 20D converts this code data into area information, which in turn is stored in the group folder of the area information storage unit 23D of the data server 20D.

During such operation, the group folder is specified based on the terminal ID of the portable terminal 10 of the user A that is transmitted with code data indicative of the location of the appointed place from the portable terminal 10 of the user A.

With such a configuration, if a request command for the transmission of area information is issued with the terminal ID of the portable terminal A of the user A in response to an operational input made by the user A, as viewed in FIG. 18B, the data server 20D specifies the group folder of the area information storage unit 23D on the basis of the transmitted terminal ID and reads out area information indicative of the appointed place designated by the user A, with read out area information being transmitted to the on-vehicle navigation devices 30 carried with the vehicles of the users A, B and C, respectively.

Then, the on-vehicle navigation devices 30 carried with the vehicles of the users A, B and C operate to establish respective desired traveling routes directed to the common appointed place, respectively, on the basis of area information indicative of the appointed place and area information indicative of current positions of the respective vehicles obtained with the GPS receiver units 34. Thus, the navigation system 1D performs the route guidance to run the vehicles along respective traveling routes.

Figure 19:
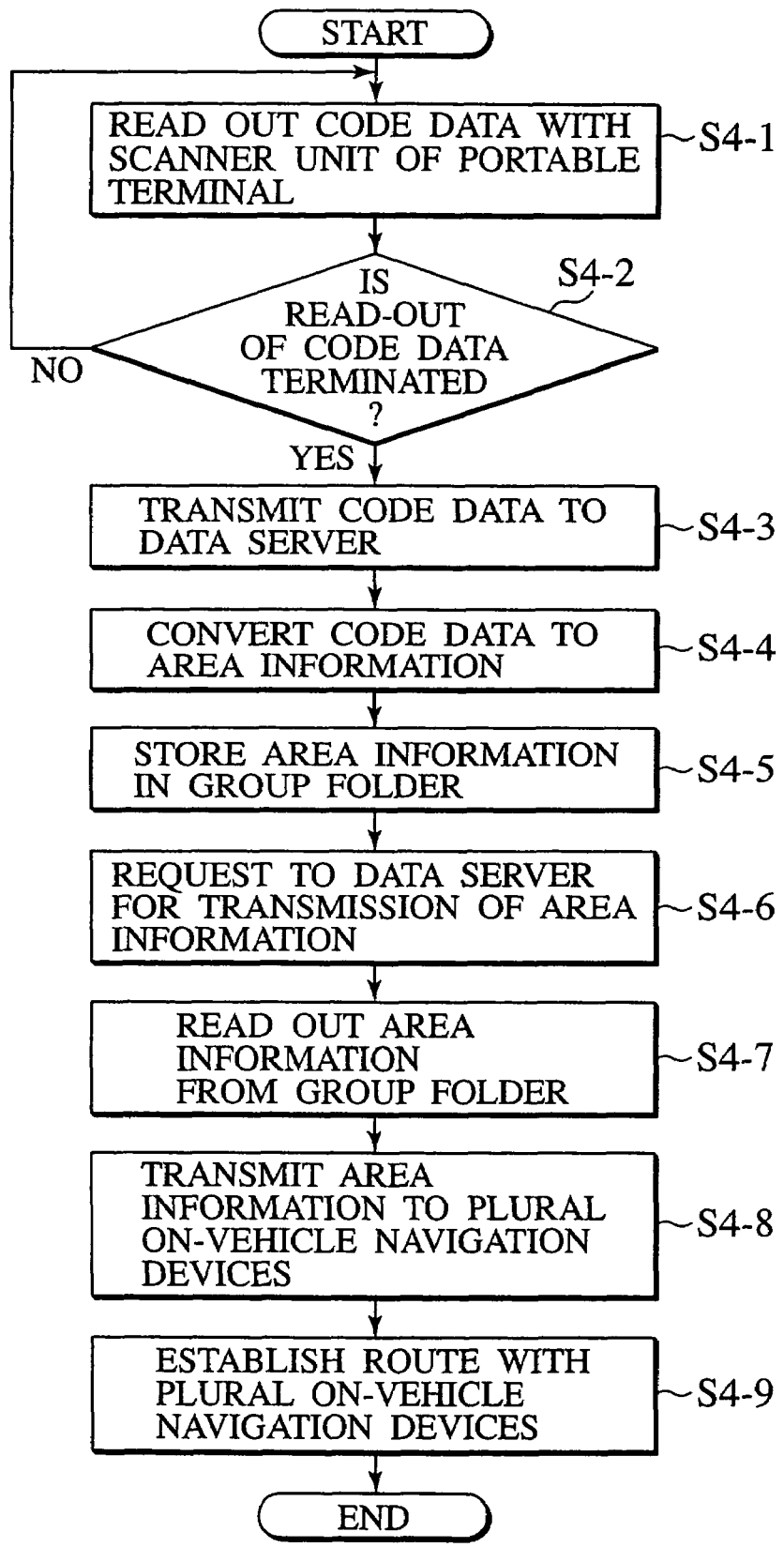
FIG. 19 is a flow chart illustrating the basic sequence of operations of the navigation system of the fourth embodiment.

Now, the basic sequence of operations of the navigation system 1D of the fourth embodiment is described below with reference to a flow chart of FIG. 19.

First, in step S4-1, in response to the operational input made by the particular user, the scanner unit 11 of the portable terminal 10 reads out code data indicative of the location of the appointed place from the print product such as the map note. In step S4-2, operation is executed to discriminate whether an instruction is issued from the user for indicating the termination of the reading out of code data.

If it is discriminated that the instruction was issued for indicating the termination of the reading out of code data, then in step S4-3, code data indicative of the location of the appointed place read out with the scanner unit 11 of the portable terminal 10 is transmitted, with information for specifying the group folder to which information is to be addressed, from the portable terminal 10 to the data server 20D. Upon receipt of code data indicative of the location of the appointed place transmitted from the portable terminal 10, in step S4-4, the data server 20D converts code data into area information, with this area information being stored in the group folder in the area information storage unit 23D to which area information is designated to be transmitted.

In succeeding step S4-6, in response to the operational input made by the particular user, the request command is issued from the portable terminal 10 to the data server 20D to request area information to be transmitted, or the command is automatically issued to the data server 20D from the portable terminal 10 or the on-vehicle navigation device 30.

Upon receipt of the command for requesting area information to be transmitted, in step S4-7, the data server 20D operates to read out area information stored in the group folder in the area information storage unit 23D, i.e., area information indicative of the location related to the appointed place designated by the particular user. In subsequent step S4-8, area information read out from the group folder in the area information storage unit 23D is transmitted from the data server 20D to the plural on-vehicle navigation devices 30.

Upon receipt of area information transmitted from the data server 20D, the plural on-vehicle navigation devices 30 determine respective traveling routes of the vehicles, installed with respective on-vehicle navigation devices 30, on the basis of area information transmitted from the data server 20D and area information indicative of the current positions of the vehicles installed with respective on-vehicle navigation devices 30. Thus, the respective no-vehicle navigation devices 30 operate to guide the respective vehicles along the respective traveling routes, thereby completing a series of operations of the navigation system 1D of the fourth embodiment.

With the navigation system of the fourth embodiment set forth above, since area information obtained by the particular user is stored in the data server 20D with such area information being enabled to be utilized by the plural users to permit the plural on-vehicle navigation devices 30 to determine the respectively traveling routes on the basis of the respective area information, it is possible to realize the navigation system with an extremely high utility value.

(Fifth Preferred Embodiment)

A navigation system of a fifth embodiment according to the present invention is described below with reference to FIG. 20.

Figure 20:
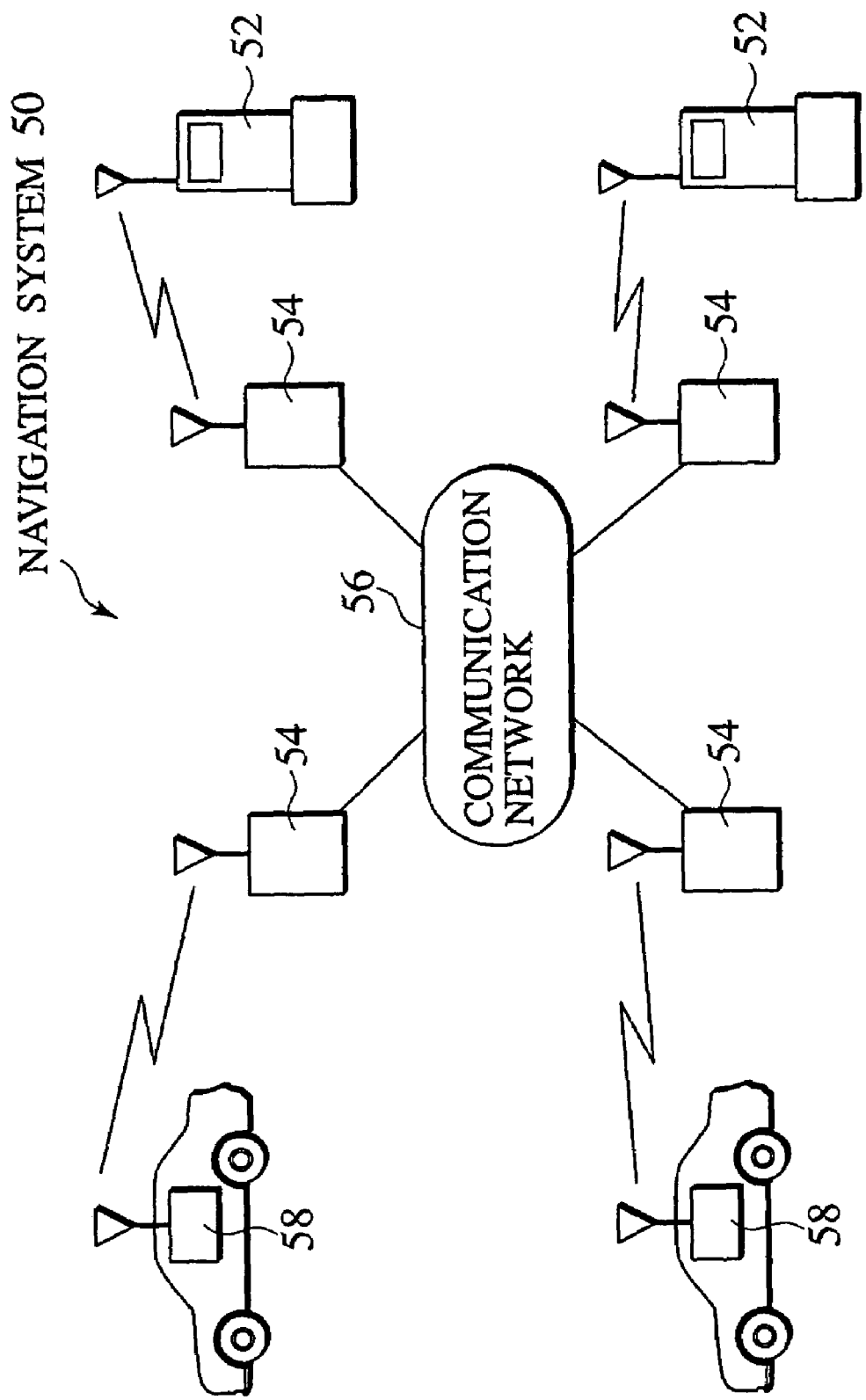
FIG. 20 is a schematic overall view of a navigation system of a fifth embodiment according to the present invention.

Referring to FIG. 20, the navigation system 50 is comprised of a portable type information processing device 52, a radio communication station 54, a communication network 56 and an on-vehicle navigation device 58.

With such a navigation system 50, the data server forming parts of the navigation systems of the first to fourth embodiments are dispensed with and, in place thereof, data is transmitted to and received between the portable type information processing device 52 and the on-vehicle navigation device 58 installed on a own vehicle over the communication network 56. That is, a plurality of radio communication stations 54 are connected to the communication network 56, providing a capability for radio communication to be established between the portable information processing devices 52 and the radio communication stations 54 and between the on-vehicle navigation devices 58 and the radio communication stations 54. With such a capability, information transmitted from the portable information processing device 52 is received with the on-vehicle navigation device 58 over the radio communication station 54 and the communication network 56.

With the navigation system 50 thus arranged, using the portable type information processing device 52 and reading out information such as code data composed of bar codes or map code number printed on a print product such as a map note enable a user to designate a destination and routed spots for the own vehicle to travel at a site outside the vehicle to allow area information indicative of the destination and the routed spots to be stored in the portable information processing device 52 from which area information is supplied to the on-vehicle navigation device 58 on request. The on-vehicle navigation device 58 is operative to establish an optimum traveling route for the own vehicle on the basis of area information transmitted from the portable type information processing device 52 and executes a route guidance for the own vehicle such that the own vehicle arrives at the destination via the routed spots along optimum traveling route.

Figure 21:
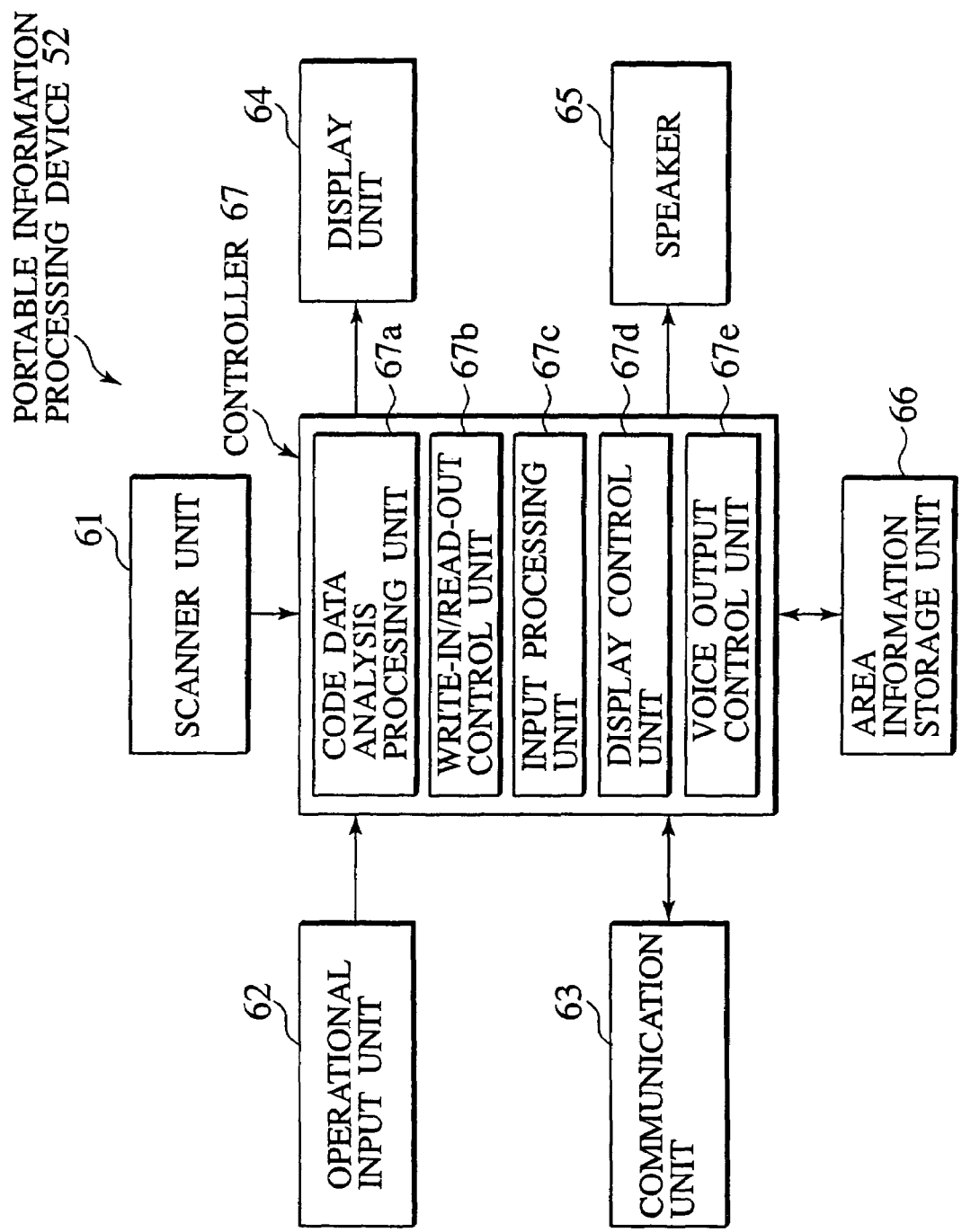
FIG. 21 is a block diagram of a portable information processing device forming part of the navigation system shown in FIG. 20.

As shown in FIG. 21, the portable type information processing device 52 is comprised of a scanner unit 61, an operation input unit 62, a communication unit 63, a display unit 64, a speaker 65, an area information storage unit 66 and a controller 67.

The scanner unit 61 serves to optically reads out desired code data, such as code data indicative of the destination and the routed spots for the own vehicle to travel, according to operational inputs of the user from the print product such as the map note printed with code data such as the bar codes indicative of the positions involving principal intersections and tourist spots. The code data, such the bar codes, read out with the scanner unit 61 is inputted to the controller 67.

The operation input unit 62 serves as a user interface, for receiving operational inputs applied by the user, and includes ten keys and a jog dial. If the user executes the operational inputs using the operation input unit 62, the operation input unit 62 produces output signals in dependence on the operational inputs with the output signals being inputted to the controller 67.

The communication unit 63 is controlled with the controller 67 to permit the radio communication between the radio communication station 54 and the communication unit 63 to allow data to be transmitted or received over the communication network 56. Data transmitted from the portable type information processing device 52 is supplied to the radio communication station 54 from the communication unit 63 from which data is then applied to the on-vehicle navigation device 58 over the communication network 56.

The display unit 64 provides a display of images and sentences in response to controlled operation of the controller 67. Further, the speaker 65 produces a voice like a beep sound in response to control operation of the controller 67.

The area information storage unit 66 operates to temporarily store area information on a map coordinate system such as the destination and the routed spots correlated with code data read out from the print product such as the map note with the scanner unit 61.

The controller 67 serves to execute an operational control program for thereby controlling entire operation of the portable type information processing device 52. In particular, the controller 67 executes the operational control program and, to this end, includes a code data analysis processing unit 67a, a write-in/read-out control unit 67b, an input processing unit 67c, a display control unit 67d and a voice output control unit 16e to perform respective functions. Also, an operation control program that causes the portable type information processing device 52 to realize a variety of functions may be preliminarily incorporated in the portable type information processing device 52 when the same is provided to the user. Alternatively, after the portable information processing device 52 is provided to the user, the operational control program may be transmitted to the portable type information processing device 52 from a data server, that provides a transmission service, over the communication network 56 and the radio communication station 54 to be incorporated into the portable type information processing device 52.

The code data analysis processing unit 67a serves to analyze code data read out from the print product such as the map note with the scanner unit 61 and provides area information on the map coordinate system correlated to the destination and routed spots corresponding to code data. In particular, the code data analysis processing unit 67a contains a conversion table in which code data and associated various information are described for each code system to enable code data, read out from the print product such as the map note with the scanner unit 61, to be converted to area information on the map coordinate system corresponding to code data by referring to the conversion table.

The write-in/read-out control unit 67b serves to control area information, converted from code data with the code data analysis processing unit 67a, to be written in the area information storage unit 66 while, in response to the operational input made by the user through the use of the operation input unit 62, controlling area information, designated by the user among area information stored in the area information storage unit 66, to be read out from the area information storage unit 66. Area information read out from the area information storage unit 66 with the write-in/read-out control unit 67b is transmitted from the communication unit 63 to the on-vehicle navigation device 58 over the communication network 2 and the radio communication station 54.

The input processing section 67c executes a variety of processing operations in dependence on the operational inputs applied by the user utilizing the operation input unit 12. In particular, when the user utilizes the operation input unit 67c and executes the operational input for transmission of particular information stored in the area information storage unit 66, the input processing unit 67c operates the write-in/read-out control unit 67b in response to the operational input. Thus, particular area information, designated by the user among area information stored in the area information storage unit 66, is read out and transmitted to the on-vehicle navigation device 58.

The display control unit 67d controls operation of the display unit 64 to allow the same to provide a display of the image and the sentences over the display unit 64. In particular, the display control unit 67d operates to provide a display of information correlated with code data over the display unit 64 in response to code data read out from the print product, such as the map note, with the scanner unit 61.

The voice output control unit 67e controls the operation of the speaker 65 and generates the voice over the speaker 65. In particular, when code data is read out from the print product such as the map note with the scanner unit 61, the voice output control unit 67e operates to output the voice, such as the beep sound, over the speaker 65 for informing the user about the reading of code data.

More particularly, the portable type information processing device 52 can be realized with a structure in which a small size scanner is coupled to a portable phone, which is incorporated with an operational control program to achieve various functions of the code data analysis processing unit 67a, the write-in/read-out control unit 67b, the input processing unit 67c, the display control unit 67d and the voice output control unit 67e. Also, the portable type information processing device 52 may also be widely applied to various devices, which are portable and have communication capabilities as well as given information processing abilities, such as a portable data assist (PDA), a note type personal computer and a palm-type personal computer, etc., with these devices being incorporated with the operational control program to achieve the same various functions as those of the code data analysis processing unit 67a, the write-in/read-out control unit 67b, the input processing unit 67c, the display control unit 67d and the voice output control unit 67e which are previously mentioned.

Figure 22:
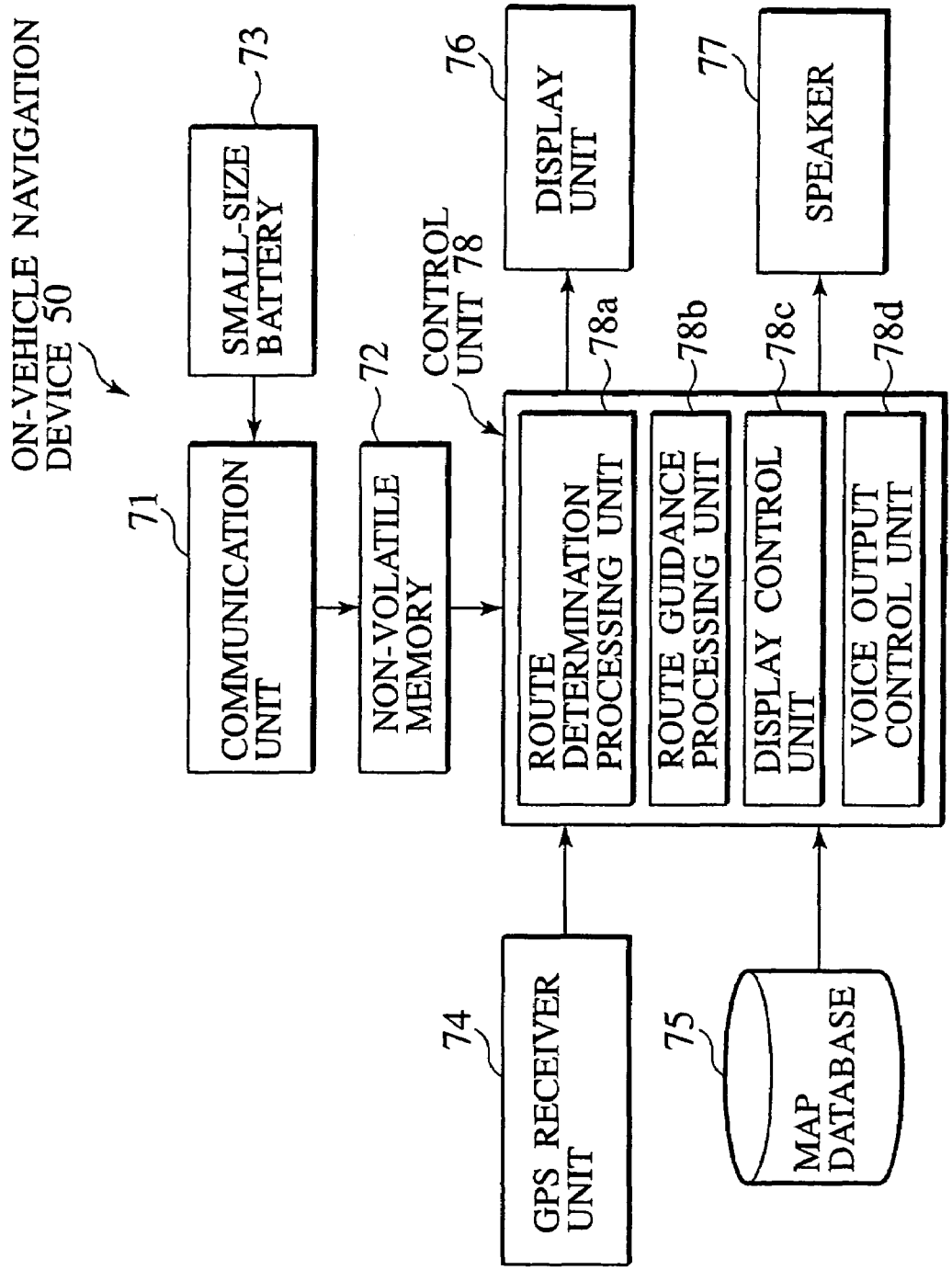
FIG. 22 is a block diagram of an on-vehicle navigation device forming part of the navigation system shown in FIG. 20.

As shown in FIG. 22, the on-vehicle navigation device 58 is comprised of a communication unit 71, a non-volatile memory 72, a small size battery 73, a GPS receiver unit 74, a map database 75, a display unit 76, a speaker 77 and a control unit 78.

The communication unit 71 serves to perform transmission and receipt of data between the communication unit 71 and the radio communication station 54 over the communication network 56 through radio communication. Area information (area information on the map coordinate system indicative of the destination and the routed spots correlated with code data read out from the map note with the scanner unit 61 of the portable type information processing device 52) transmitted from the portable type information processing device 52 is supplied to the on-vehicle navigation device 58 over the communication network 56 and the radio communication station 54 and is received with the communication unit 71.

The non-volatile memory 72 serves to temporarily store area information which is transmitted from the portable type information processing device 52 to the on-vehicle navigation device 58 and received with the communication unit 71.

The small size battery 73 includes a Li ion battery and is connected to communication unit 71 to be used as a power supply thereof. The presence of power output supplied from the small battery 73 to the communication unit 71 enables the communication unit 71 to be operative for receiving data even when a main power supply is shut off.

The GPS receiver unit 74 receives a GPS signal from a GPS satellite to obtain area information indicative of the current position of the own vehicle on which the on-vehicle navigation device 58 is installed. Area information, indicative of the current position of the own vehicle, obtained from the GPS receiver unit 73 is supplied to the control unit 78.

The map database 75 is comprised of a computer readable medium such as a CD-ROM in which necessary map data is registered. The map database 75 is arranged so as to allow map data of a designated district to be read out in a sequence in accordance with the processing of the control unit 78.

The display unit 76 serves to provide a display of map data and a variety of information, read out from the map database 75, in dependence on control of the control unit 78. Further, the speaker 77 provides a voice for designating a travel direction in dependence on the control unit 78.

The control unit 78 serves to execute an operational control program for controlling entire operation of the on-vehicle navigation device 58. In particular, execution of the operational control program with the control unit 78 allows respective functions of a route establishment processing unit 78*a*, a route guidance processing unit 78*b*, a display control unit 78*c* and a voice output control unit 78*d*.

The route establishment processing unit 78*a* serves to process for establishing a traveling route of the own vehicle on the basis of area information (area information on the map coordinate system for the destination and routed spots correlated with code data read out from the print product, such as the map note, with the scanner unit 61 of the portable type information processing unit 52) which is received with the communication unit 71 and temporarily stored in the non-volatile memory 72, and area information indicative of the current position of the own vehicle obtained with the GPS receiver unit 74. That is, upon turning on of the main power supply of the on-vehicle navigation device 58 to start-up the same, the route establishment processing unit 78*a* reads out area information indicative of the destination and the routed spots from the non-volatile memory 72. Then, the route establishment processing unit 78*a* establishes the traveling route of the own vehicle starting from the current position of the own vehicle to the destination via the designated routed spots on the basis of area information indicative of the destination and the routed spots read out from the non-volatile memory 72 and area information indicative of the current position of the own vehicle obtained with the GPS receiver unit 74.

The route guidance processing unit 78*b* serves to guide the own vehicle to allow the same to properly travel along the traveling route established with the route establishment processing unit 78*a*. In particular, as the traveling route is established with the route establishment processing unit 78*a*, the route guidance processing unit 78*b* reads out a desired map data from the map database 75 to provide a display of the same over the display unit 76. In addition, the route guidance processing unit 78*b* grasps the current position of the own vehicle on the basis of area information obtained with the GPS receiver unit 74, with a subsequent processing being executed to overlay the current position of the own vehicle over the map data to compel the resulting data to be displayed over the display unit 76. Further, when the own vehicle comes nearer to the intersection at which the own vehicle is to be turned right or left, the route guidance processing unit 78*b* operates to designate the traveling direction of the own vehicle by means of the voice outputted from the speaker 77.

The display control unit 78*c* serves to control the operation of the display unit 76 in dependence on the processing of the route guidance processing unit 78*b*, with the desired map data and associated various information being displayed over the display unit 76.

The voice output control unit 78*d* serves to control the operation of the speaker 77 in dependence on the processing of the route guidance processing unit 78*b*, thereby causing the speaker 77 to produce the voice for designating the traveling direction of the own vehicle.

Figure 23B:
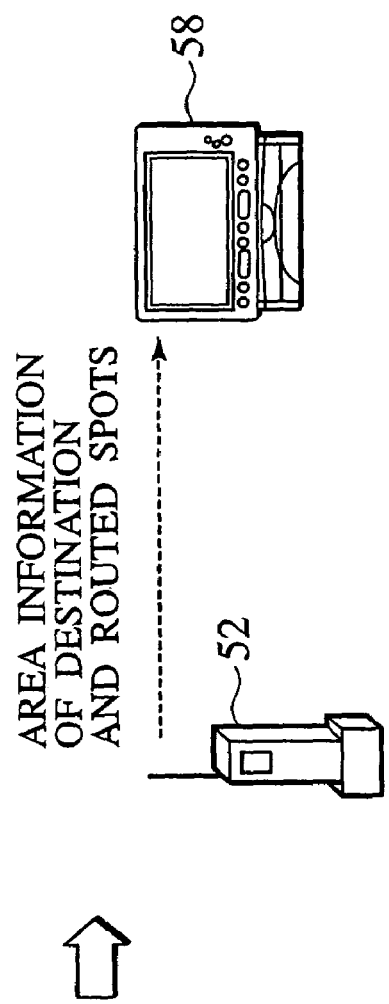
FIGS. 23A and 23B are typical views showing examples in which the navigation system of the fifth embodiment is applied, with FIG. 23A illustrating a mode in which bar codes are read out from a print product such as a map note with a portable information processing device and FIG. 23B illustrating another mode in which area information is transmitted from the portable information processing device to the on-vehicle navigation device.
Figure 23A:
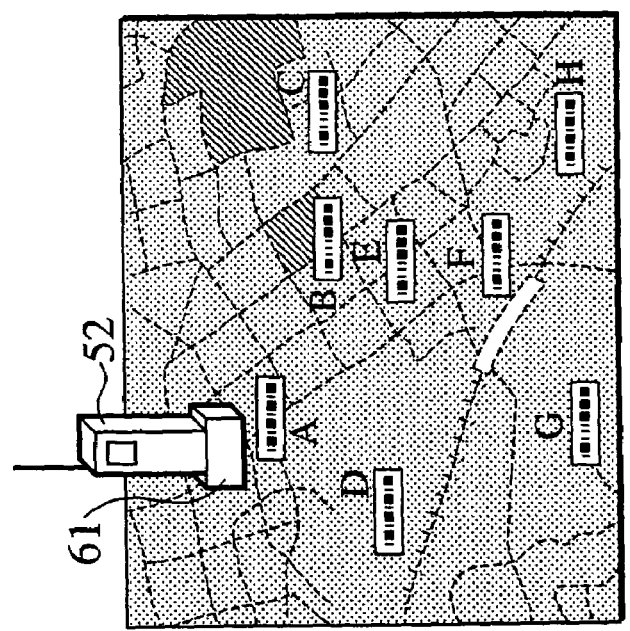

With such a structure of the navigation system 50 set forth above, when preparing a drive plan outside the own vehicle in a user's home, as shown in FIG. 23A, using the scanner unit 61 of the portable information processing device 52 and reading out code data such as the bar codes printed on the print product such as the map note enable the user to designate a desired destination and routed spots. And, code data indicative of the destination and routed spots read out with the scanner unit 61 is converted into area information on the map coordinate system through control of the control unit 67 of the portable type information processing device 52 and temporarily stored in the area information storage unit 66. Under a condition in which the reading out of desired code data has been completely executed, when the user executes the operational input to issue a request command on transmission of area information using the operation input 62 of the portable type information processing device 52, or in an automatic fashion when the reading out of desired code data has been completely executed, area information indicative of the destination and routed spots stored in the area information storage unit 66 is transmitted from the portable type information processing device 52 to the on-vehicle navigation device 58 in a manner as shown in FIG. 23B.

Upon receipt of area information of the destination and routed spots transmitted from the portable type information processing device 52, the on-vehicle navigation device 58 operates to store received area information in the non-volatile memory 72 until the main power supply is turned on. And, when the main power supply is turned on, the on-vehicle navigation device 58 operates to read out area information of the destination and routed spots stored in the non-volatile memory 72 and, on the basis of such read out area information, establish a traveling route of the own vehicle to allow the own vehicle to be guided along such traveling route.

Figure 24:
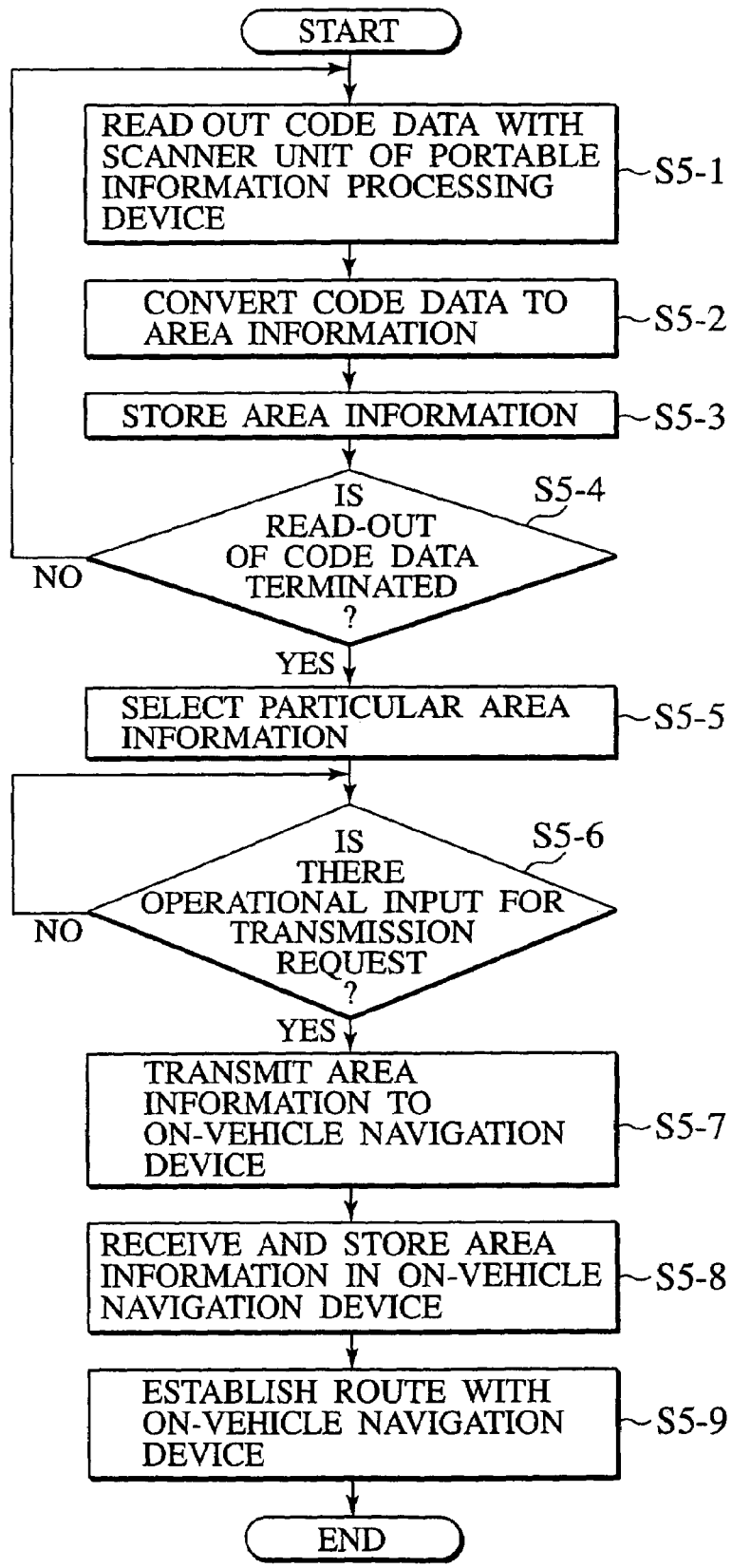
FIG. 24 is a flow chart illustrating the basic sequence of operations of the navigation system shown in FIG. 20.

Now, the basic sequence of operations of the navigation system 50 is described below in detail with reference to a flow chart of FIG. 24.

Figure 25:
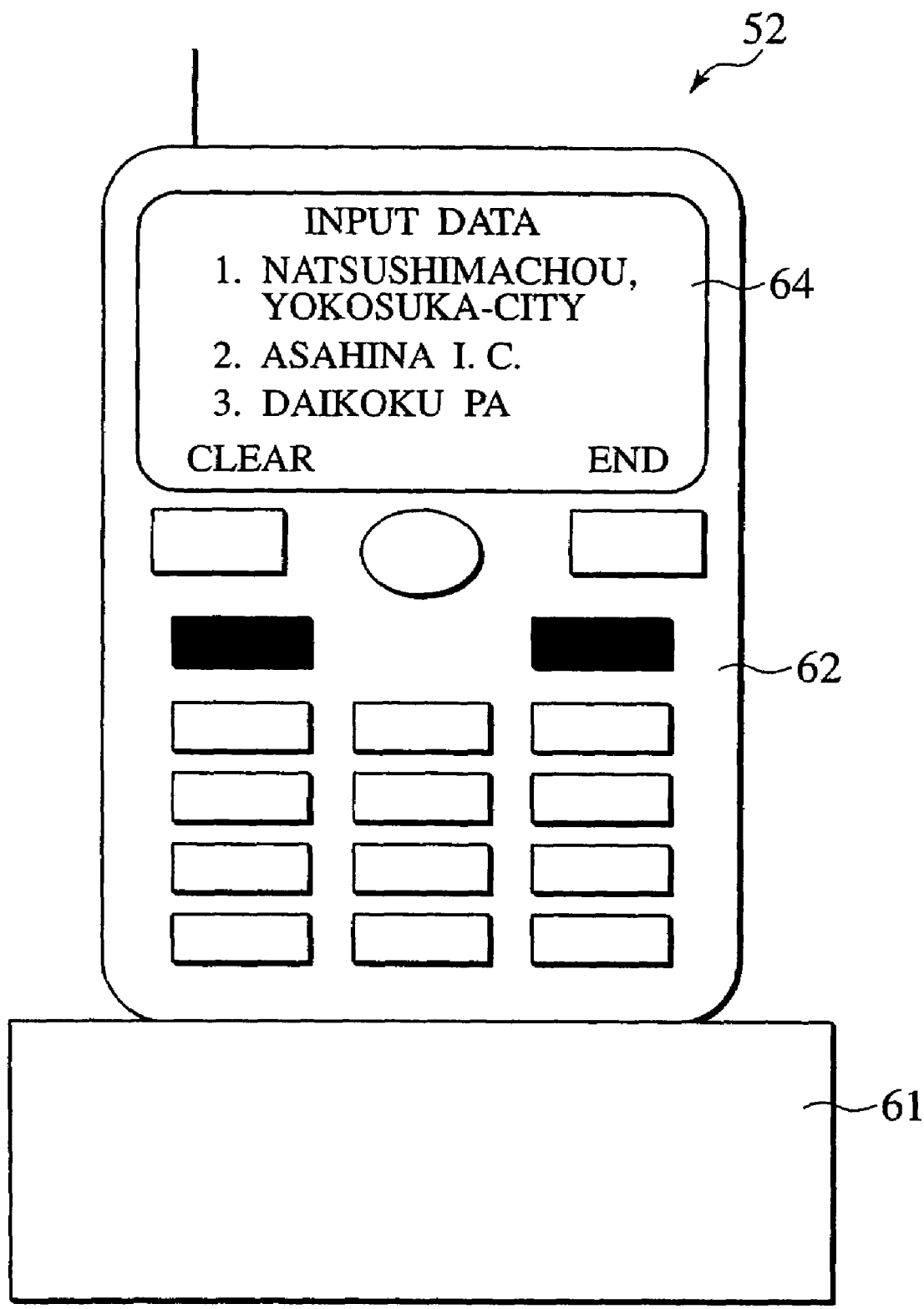
FIG. 25 is a view illustrating the portable information processing device with a display unit provided with a display of information corresponding to read out code data.

First, in step S5-1, in response to user's operation, code data indicative of the destination and routed spots is read out from the print product such as the map note with the scanner unit 61 of the portable type information device 52 and is supplied to the control unit 67. When code data is read out with the scanner unit 61, the beep sound is produced by the speaker 65 in dependence on control of the voice output control unit 67e of the control unit 67, or information correlated with code data as shown in FIG. 25 is displayed over the display unit 64 in dependence on control of the display control unit 67d of the controller 67. In such a manner, the user is provided with an indication that code data has been read out.

In subsequent step S5-2, code data read out with the scanner unit 61 and supplied to the control unit 67 is converted into area information indicative of the location of the destination and routed spots on the map coordinate system in the code data analysis processing unit 67a of the control unit 67. In succeeding step S5-3, upon control of the write-in/read-out control unit 67b, such area information converted with the code data analysis processing unit 67a is written in the area information storage unit 66.

In succeeding step S5-4, when the operation input indicative of the reading out being terminated is made by the user from the input unit 62 of the portable type information processing device 52, or when the scanner unit 61 reads out code data indicative of the reading out being terminated, the input processing unit 67c of the control unit 67 discriminates as to whether or not the command is issued by the user to indicate the reading out of code data indicative of the destination and routed spots being terminated. In the absence of indication of the reading out of code data being terminated, the operation returns to step S5-1 for a repeated cycle of the same operations.

On the contrary, in the presence of indication of the reading out of code data being terminated, in step S5-5, the input processing unit 67c of the control unit 67 responds to the operational input made by the user using the operation input unit 62 of the portable type information processing device 52 and operates to select particular area information designated by the user among area information stored in the area information storage unit 66. In next step S5-6, the input processing unit 67c of the control unit 67 discriminates as to whether or not the request command is issued by the user to transmit selected area information to the on-vehicle navigation device 58.

When it is discriminated that the operational input is made by the user to issue the request command to transmit selected area information to the on-vehicle navigation device 58, then in step S5-7, particular area information designated by the user among area information stored in the area information storage unit 66 is read out through control of the write-in/read-out control unit 67b of the control unit 67, with read out area information being transmitted from the communication unit 63 to the relevant on-vehicle navigation device 58 over the communication network 56 and the radio communication station 54.

In step S5-8, selected area information transmitted to the on-vehicle navigation device 58 is received with the communication unit 71 and temporarily stored in the non-volatile memory 72 until the main power supply of the on-vehicle navigation device 58 is turned on. With the main power supply of the on-vehicle navigation device 58 being turned on, operation proceeds to read out selected area information stored in the non-volatile memory 72, i.e., area information indicative of the destination and routed spots designated by the user. In subsequent step S5-9, on the basis of selected area information read out from the non-volatile memory unit 72 and area information indicative of the current position of the own vehicle obtained with the GPS receiver unit 74, a desired traveling route of the own vehicle is established with the route establishment processing unit 78a. Then, the navigation system 50 conducts a route guidance with the route guidance processing unit 78b in accordance with the traveling route established with the route establishment processing unit 78a, completing a series of operations.

As previously mentioned above, the navigation system 50 of the fifth embodiment enables the user to read out code data such as the bar codes printed on the print product such as the map note with the scanner unit 61 of the portable type information processing device 52 to allow the user to designate the destination and routed spots. With such a structure, code data read out with the scanner unit 61 of the portable type information processing device 52 is converted into area information on the detailed map coordinate system with the control unit 67 and temporarily stored in the area information storage unit 66, with area information indicative of the destination and routed spots being supplied to the on-vehicle navigation device 58 if desired. Accordingly, with such navigation system 150, in an event that the user prepares the drive plan outside the own vehicle, the user is able to input the destination and routed spots at the site outside the vehicle in an easy manner using the portable type information processing device 52, providing a capability for the user to immediately initiate the vehicle to travel without inputting the destination and routed spots after riding on the own vehicle. Further, with the navigation system 50 thus constructed, an ability of reading out the designated destination and routed spots through code data such as the bar codes provides an ease in operation with an extremely improved convenience for use.

While the navigation system 50 set forth above has been exemplarily illustrated as one example of the fifth embodiment, the present invention is not limited to the precise construction stated above and many alternatives, modifications, and variations will be apparent to those skilled in the art without departing from the scope of the present invention. More particularly, although the navigation system 50 has been described in conjunction with the example in which area information indicative of the destination and routed spots stored in the area information storage unit 66 of the portable type information processing device 52 is transmitted to the on-vehicle navigation device 58 from the portable type information processing device 52 responsive to the operational input made by the user to issue the request command on transmission of area information, it may be altered such that area information is automatically transmitted to the on-vehicle navigation device 58 from the portable type information processing device 52.

In such a case, the portable type information processing device 52 operates to convert code data into area information, when entire reading out of code data with the scanner unit 61 has been terminated, with area information being suitably transmitted to the on-vehicle navigation device 58. When this takes place, as previously mentioned above, since the communication unit 71 of the on-vehicle navigation device 58 is enabled to receive data at all times upon receipt of electric power supply from the small size battery 73, area information transmitted from the portable type information processing device 52 is received with the communication unit 71 of the on-vehicle navigation device 58, even when the main power supply of the on-vehicle navigation device 58 is turned off, and temporarily stored in the non-volatile memory 72.

As set forth above, in an event that transmission of area information to the on-vehicle navigation device 58 from the portable type information processing device 58 is automatically executed, there is no need for the portable type information processing device 52 to be manually operated for issuing the request command on area information to be transmitted, the navigation system can be realized to have a further improved facility.

(Sixth Preferred Embodiment)

Figure 26:
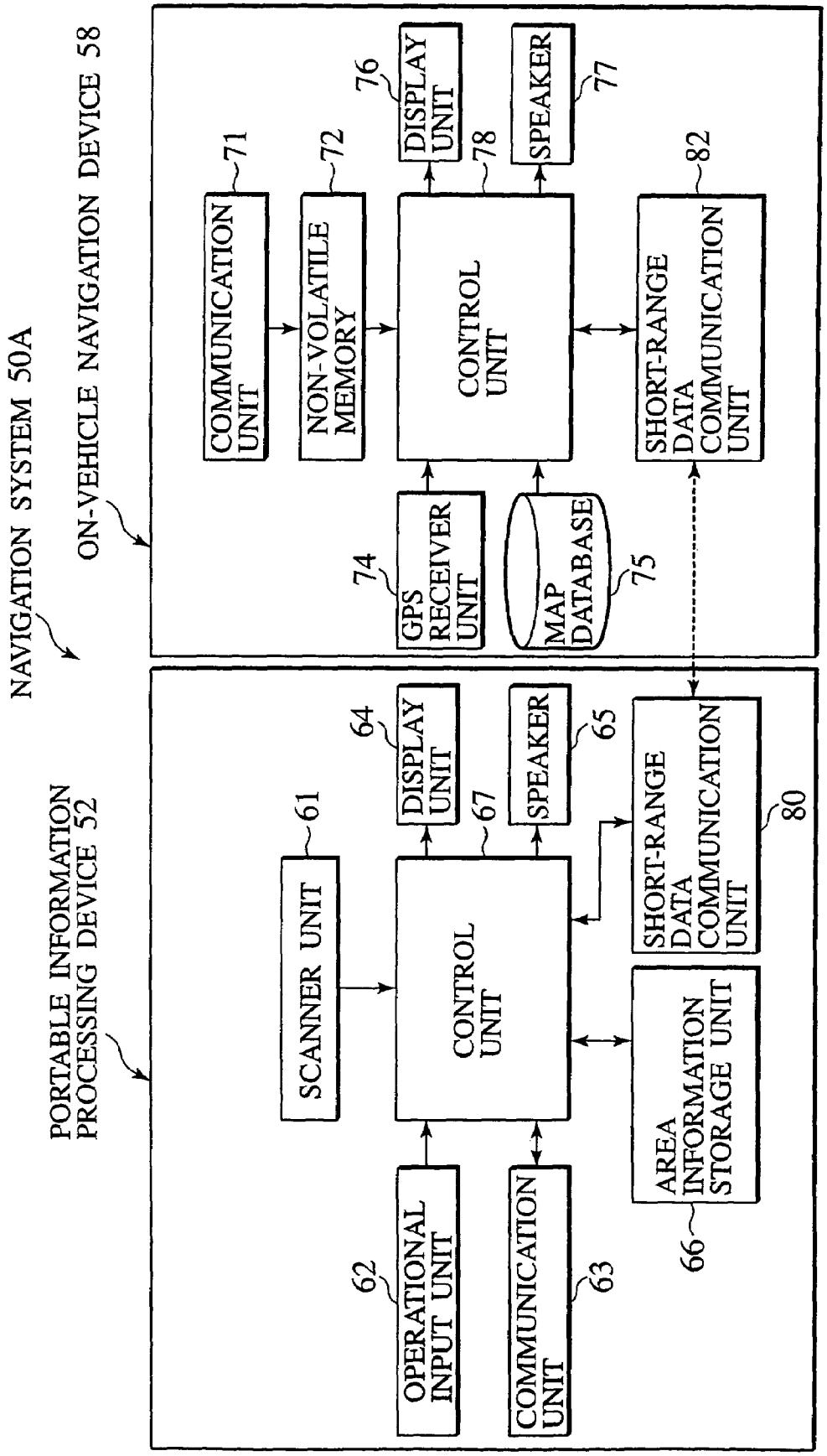
FIG. 26 is a block diagram illustrating a portable information processing device and an on-vehicle navigation device forming a navigation system of a sixth embodiment according to the present invention.

Next, a navigation system of a sixth embodiment according to the present invention is described below with reference to FIG. 26. As shown in FIG. 26, the navigation system 50A is identical with that of the fifth embodiment except that the portable type information processing device 52 and the on-vehicle navigation device 58, with like parts bearing the same reference numerals as those used in the fifth embodiment to omit a redundant description of the same parts while a detailed description is given only to the portable type information processing device 52 and the on-vehicle navigation device 58. The portable type information processing device 52 and the on-vehicle navigation device 58 include short-range communication units 80, 82, respectively, providing a capability of performing data communication in a short-range between the portable type information processing device 52 and the on-vehicle navigation device 58 using Bluetooth or IrDA. With the navigation system 50A of the sixth embodiment, when the user rides on the own vehicle carrying out the portable type information processing device 52 and turns on the main power supply of the on-vehicle navigation device 58, a power turn-on signal indicative of the main power supply of the on-vehicle navigation device 58 being turned on is transmitted from the on-vehicle navigation device 58 to the portable type information processing device 52. Upon receipt of the power turn-on signal, area information indicative of the destination and routed spots on the map coordinate system is transmitted to the on-vehicle navigation device 58 due to the short-range communication.

With the navigation system 50A of the sixth embodiment, since area information stored is transmitted from the portable type information processing device 52 to the on-vehicle navigation device 58 after the main power supply of the on-vehicle navigation device 58 is turned on, there is no need for the communication unit 71 of the on-vehicle navigation device 58 to be coupled with the small size battery 73.

With the navigation system 50A of the sixth embodiment previously mentioned, under a condition in which the user reads out the desired code data from the print product such as the map note using the scanner unit 61 of the portable type information processing device 52 to allow read out code data to be converted into area information which in turn is stored in the information storage unit 66, as the user carries this portable type information processing device 52 into the own vehicle to start up the on-vehicle navigation device 58, the communication link is established due to the short-range data communication such as Bluetooth between the portable type information processing device 52 and the on-vehicle navigation device 58. Under such a situation, since the short-range data communication unit 82 of the on-vehicle navigation device 58 is configured to conduct a search for the nearest counter part to which communication is made, the presence the short-range data communication unit 80 of the portable type information processing device 52 carried by the user into the own vehicle becomes the nearest communication counter part, resulting in an establishment of the communication link between the portable type information processing device 52 and the on-vehicle navigation device 58. With the communication link being established between the portable type information processing device 52 and the on-vehicle navigation device 58, as viewed in FIG. 27B, the power turn on signal indicative of the main power supply of the on-vehicle navigation device 58 being turned on is transmitted from the on-vehicle navigation device 58 to the portable type information processing device 52.

Upon receipt of the power turn-on signal from the on-vehicle navigation device 58, the portable type information processing device 52 confirms that the communication unit 71 of the on-vehicle navigation device 58 remains in a condition in which data communication is enabled, and reads out area information, indicative of the location on the map coordinate system indicative of the destination and routed spots, stored in the area information storage unit 66, with read out area information being transmitted to the on-vehicle navigation device 58. Thus, the on-vehicle navigation device 58 operates to establish the traveling route of the own vehicle to allow the own vehicle to be guided along with the traveling route.

Figure 28:
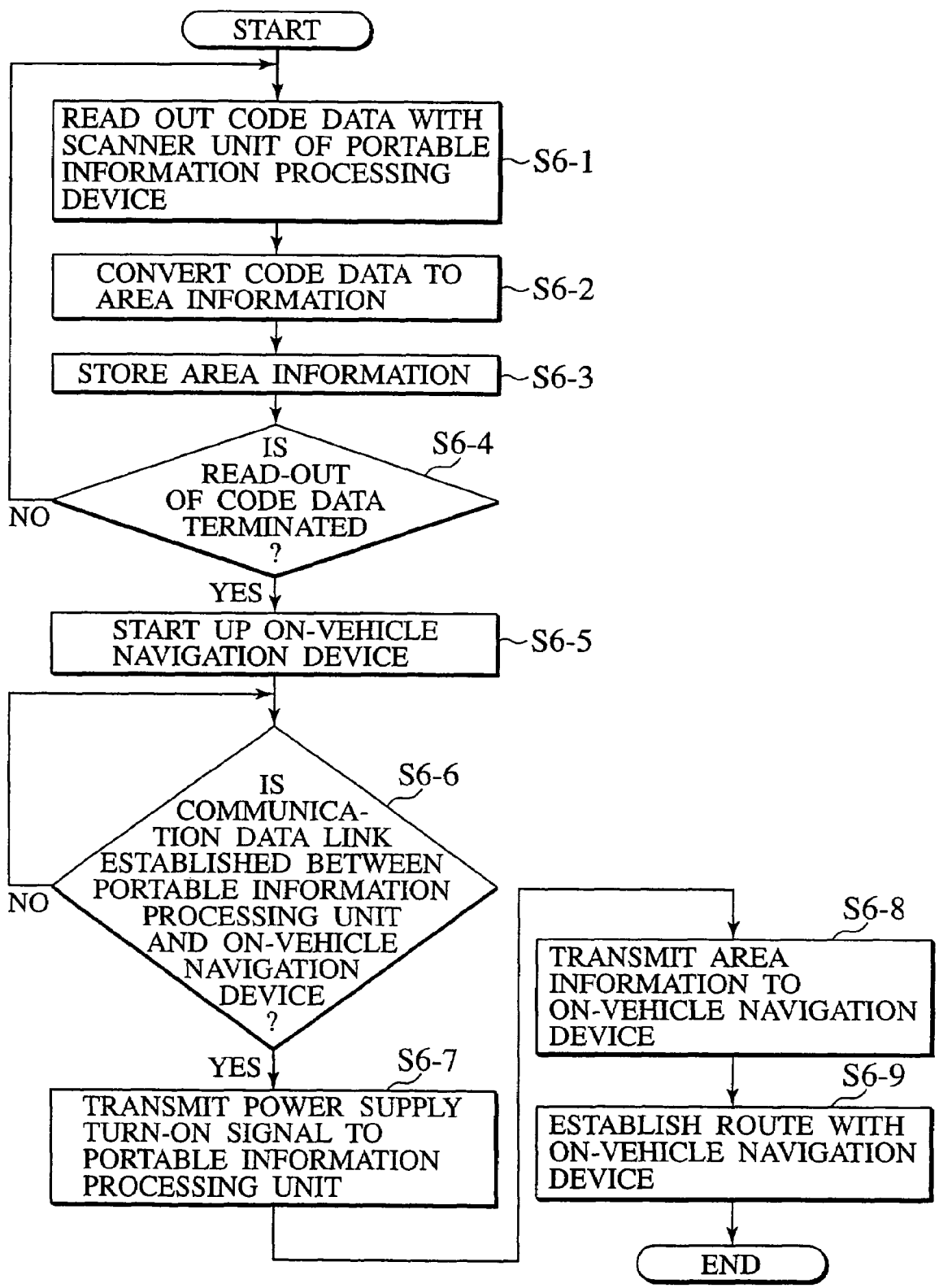
FIG. 28 is a flow chart illustrating the basic sequence of operations of the navigation system of the sixth embodiment.

Now, the basic sequence of operations of the navigation system 50A of the sixth embodiment is described below in detail with reference to a flow chart of FIG. 28.

First, in step S6-1, in accordance with the user's operation, the scanner unit 61 of the portable type information processing device 52 reads out code data indicative of the destination and routed spots from the print product such as the map note. In step S6-2, code data read out with the scanner unit 61 is converted into area information indicative of the location of the destination and routed spots on the map coordinate system with the code data analysis processing unit 67 of the control unit 67. In succeeding step S6-3, area information converted with the code data analysis processing unit 67*a* is written in the area information storage unit 66 in dependence on control of the write-in/read-out control unit 67*b* of the control unit 67.

In next step S6-4, the input processing unit 67*c* of the control unit 67 operates to discriminate as to whether or not the operational input is made by the user to indicate the reading out of code data for designating the destination and routed spots has been terminated. In the absence of the indication indicative of the reading out of code data being terminated, the operation returns to step S6-1 to repeatedly execute the same operations.

On the contrary, in the presence of the indication indicative of the reading out of code data being terminated, the portable type information processing device 52 is carried into the own vehicle installed with the on-vehicle navigation device 58 and, in step S6-5, when the on-vehicle navigation device 58 is turned on, the communication link is established between the portable type information processing device 52 and the on-vehicle navigation device 58 due to the short-range data communication such as Bluetooth in step S6-6. In subsequent step S6-7, the power turn-on signal indicative of the main power supply of the on-vehicle navigation device 58 being turned on is transmitted from the on-vehicle navigation device 58 to the portable type information processing device 52 via the short-range data communication.

In response to the power turn-on signal transmitted from the on-vehicle navigation device 58 to the portable type information processing device 52, as the portable type information processing device 52 confirms that the communication unit 71 of the on-vehicle navigation device 58 remains in the situation to be able to receive data, in step S6-8, the write-in/read-out control unit 67*b* of the control unit 67 of the portable type information processing device 52 controls such that area information is read out from the area information storage unit 66, with read out area information being transmitted from the communication unit 63 of the portable type information processing device 52 to the on-vehicle navigation device 58 through the short-range data communication.

With area information being transmitted from the portable type information processing device 52 to the on-vehicle navigation device 58, in step S6-9, the on-vehicle navigation device 58 operates to establish a traveling route of the own vehicle on the basis of area information, transmitted from the portable type information processing device 52, and area information indicative of the current position of the own vehicle obtained with the GPS receiver unit 74. Thus, the on-vehicle navigation device 58 operates to perform the route guidance in accordance with the traveling route, completing a series of operations in the navigation system 50A of the sixth embodiment.

With such a structure of the navigation system 50A of the sixth embodiment set forth above, when the user carries the portable type information processing device 52 into the own vehicle and turns on the main power supply of the on-vehicle navigation device 58 to establish the short-range communication link between the portable type information processing device 52 and the on-vehicle navigation device 58, area information indicative of the location on the map coordinate system of the destination and routed spots stored in the portable type information processing device 52 is automatically transmitted from the portable type information processing device 52 to the on-vehicle navigation device 58. This results in no need for the user to execute the operational input for commanding area information to be transmitted using portable type information processing device 52, with a resultant further increase in a facility.

Also, while the navigation system of the sixth embodiment has been described with reference to an example in which the power turn-on signal indicative of the main power supply of the on-vehicle navigation device 58 being turned on is transmitted from the on-vehicle navigation device 58 to the portable type information processing device 52 through the short-range data communication, the power turn-on signal may be transmitted over the communication network 56. Namely, when the main power supply of the on-vehicle navigation device 58 is turned on, the power turn-on signal is transmitted from the on-vehicle navigation device 58 to the portable type information processing device 52 over the communication network 56. And, the portable type information processing device 52 responds to this power turn-on signal to confirm a situation in that the communication unit 71 of the on-vehicle navigation device 58 is enabled to receive data whereupon area information of the destination and routed spots is transmitted to the on-vehicle navigation device 58 over the communication network 56. Then, the on-vehicle navigation device 58 establish the traveling route of the own vehicle on the basis of received area information to allow the own vehicle to be guided along with the traveling route.

With such an alternative set forth above, since no operational input is required for the user to request the transmission of area information using the portable type information processing device 52, a further improved facility is obtained in the navigation system. Also, since such an alternative has no need for the short-range data communication units 80, 82 to be provided between the portable type information processing device 52 and the on-vehicle navigation device 58, the portable type information processing device 52 and the on-vehicle navigation device 58 have simplified structures, respectively, with a resultant capability of realizing the navigation system with the various advantages previously mentioned.

(Seventh Preferred Embodiment)

Now, a navigation system of a seventh embodiment according to the present invention is described below with reference to FIGS. 29A and 29B. The navigation system 50B of the seventh embodiment has the same basic structure as those of fifth and sixth embodiments except for a method of utilizing the navigation system. In particular, the navigation system 50B of the seventh embodiment includes a plurality of portable type information processing devices 52 and an on-vehicle navigation device 58, with plural portable type information processing devices 52 being configured to have capabilities in which area information is transmitted to and received from one another. With such capabilities, the portable type information processing device 52 carried by one driver is adapted to collectively store information read out using portable type information processing devices 52 of other plural users with collected information being enabled to be transmitted to the on-vehicle navigation device 58 from the portable type information processing device 52 of the one driver.

The navigation system 50B is extremely effective in a case especially when establishing a traveling route under a situation where a certain user drives the vehicle installed with the on-vehicle navigation device 58 to sequentially call at a plurality of friend's homes.

A detailed description is made hereinafter in conjunction with an example in a situation where a certain user N calls at a friend's house A, a friend's house B and a friend's house C by traveling the vehicle installed with the on-vehicle navigation device 58. In such a situation, the user N preliminarily takes a contact with the friends A, B, C and requests area information, related to locations of respective individuals, to be transmitted to the portable type information processing device 52 owned by the user N.

With the navigation system 50B, upon receipt of request from the user N, the friends A, B and C operate respective portable type information processing devices 52 such that code data such as the bar codes indicative of locations, printed on the map note, in the vicinity of individual houses are read out with the scanner units 61 of the respective portable type information processing devices 52. Code data read out with the scanner units 61 of the portable type information processing devices 52 carried by the friends A, B and C are converted into area information indicative of the locations on the map coordinate system, respectively, with the control units 67 of the respective portable type information processing devices 52. And, as viewed in FIG. 29A, area information indicative of the locations in the vicinity of the houses of the friends A, B and C are configured to be transmitted from the portable type information processing devices 52 owned by the friends A, B and C, respectively, to the portable type information processing device 52 of the user N.

Such area information may be transmitted using an electronic mail function incorporated in the portable type information processing device 52. In order for data, transmitted from the portable type information processing devices 52 of the friends A, B and C to the portable type information processing device 52 of the user N, to be discriminated as area information necessary for establishing the traveling route with the on-vehicle navigation device 58, the electronic mail may have a subject added with a specific heading such as "navigator . . . ", or the electronic mail may have header or footer added with an identification flag indicative of area information.

Figure 30:
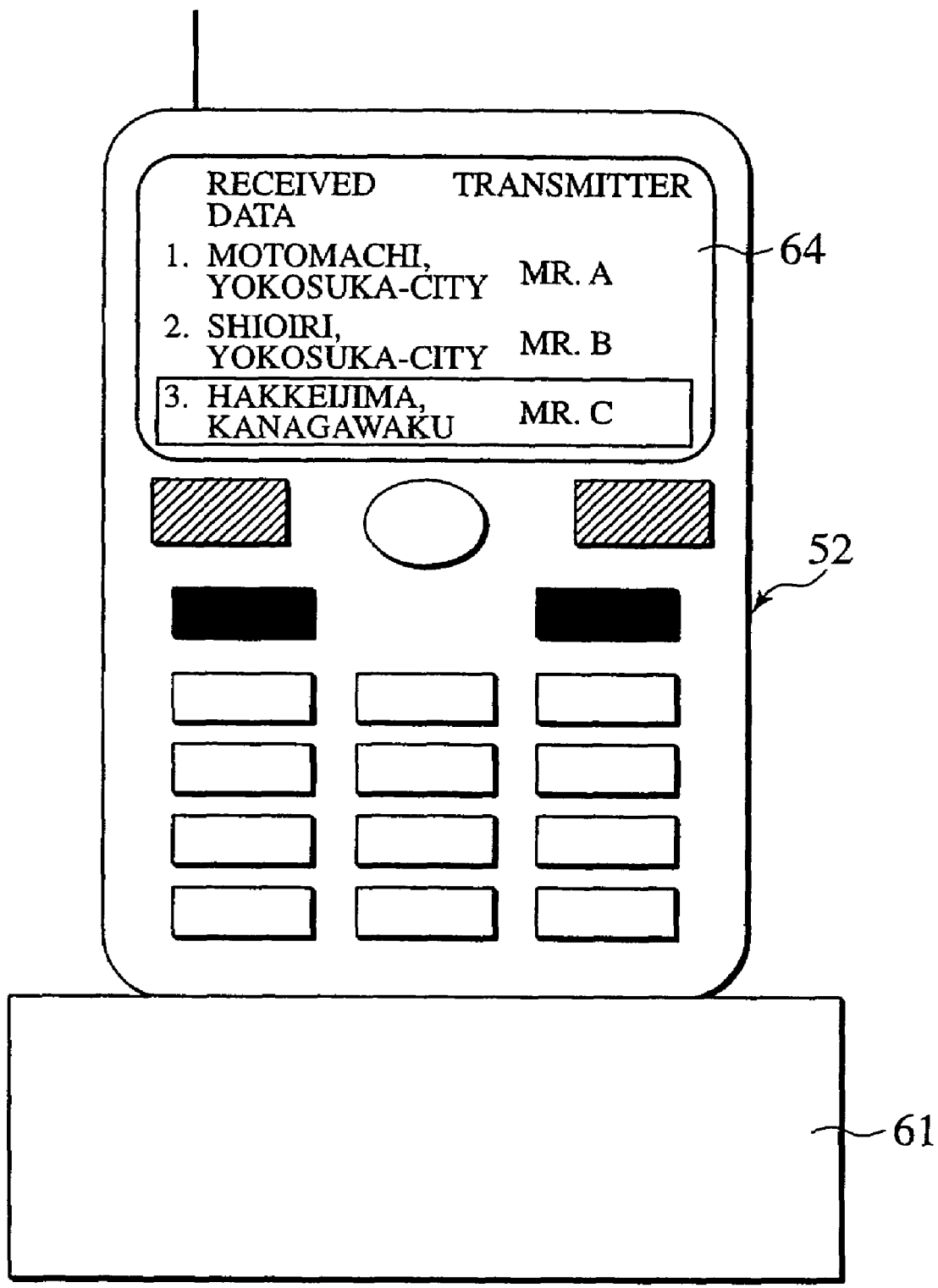
FIG. 30 is a view illustrating the portable information processing device of the user N with a display unit provided with a screen for confirming the contents of area information transmitted from the portable information processing devices of the friends A, B and C.

Upon receipt of area information, indicative of the locations in the vicinity of he houses of the friends A, B and C, transmitted from the portable type information processing devices 52 owned by the friends A, B and C, the portable type information processing device 52 of the user N collects these area information and stores them in the area information storage unit 66 while rendering information, including the names of districts correlated with these area information or sources of area information to be transmitted, to be displayed over the display unit 64 as viewed in FIG. 30. And, if desired area information is selected by the user referring to the screen of the display unit 64, selected area information is read out from the area information storage unit 66, with read out area information being transmitted to the on-vehicle navigation device 58 from the portable type information processing device 52 of the user N as shown in FIG. 29B.

Upon receipt of area information transmitted from the portable type information processing device 52 of the user N, the on-vehicle navigation device 58 operate to establish a traveling route on the basis of these area information and area information indicative of the current position of the own vehicle obtained with the GPS receiver unit 74. Thus, the on-vehicle navigation device 58 operates to execute the routes guidance to allow the own vehicle to travel along the established traveling route.

Figure 31:
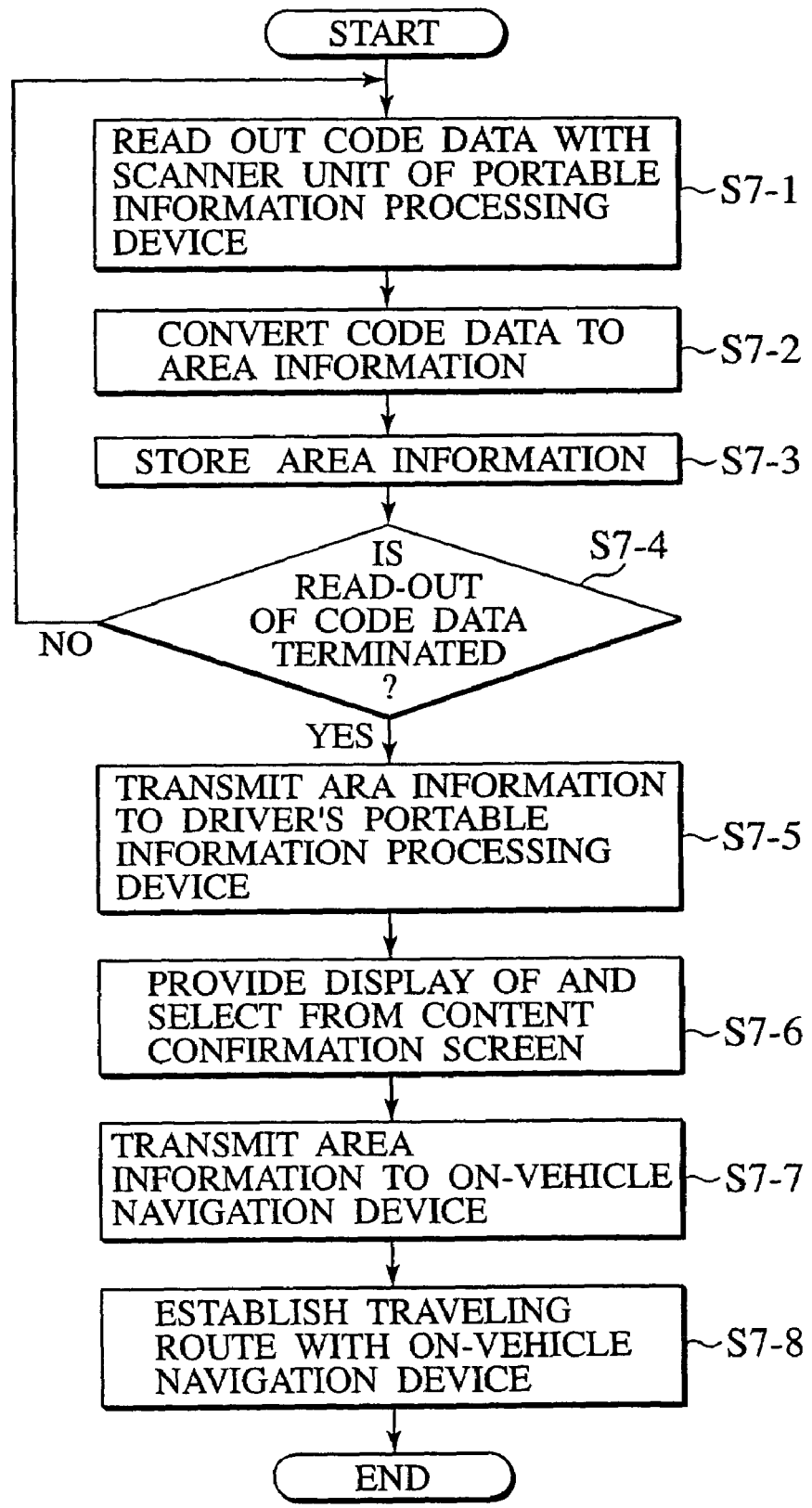
FIG. 31 is a flow chart illustrating the basic sequence of operations of the navigation system of the seventh embodiment.

Now, the basis sequence of operations of the navigation system 50B of the seventh embodiment is described below with reference to a flow chart of FIG. 31.

First, in step S7-1, in response to the operational inputs executed by the plural users, the scanner units 61 of the plural portable type information processing devices 52 read out code data from the print products such as the map notes, respectively. In step S7-2, code data read out with these portable type information processing device 52 are converted into area information indicative of he locations on the map coordinate system, respectively. In step S7-3, area information converted from code data are temporarily stored in the area information storage unit 66.

In succeeding step S7-4, operations are executed for the respective portable type information processing devices 52, respectively, to discriminate if the operational inputs are made by the respective users to indicate the reading out of code data being terminated using the individual portable type information processing devices 52. And, the portable type information processing device 52, for which the user has made the operational input to indicate the reading out of code data being terminated, reads out area information stored in the area information storage unit 66 and, in step S7-5, such area information is transmitted to the portable type information processing device 52 owned by the driver of the own vehicle installed with the on-vehicle navigation device 58.

Upon receipt of area information transmitted from the portable type information processing devices 52 of the respective users, the portable type information processing device 52 of the driver temporarily stores such area information in the area information storage unit 66. In succeeding step S7-6, the display unit 64 of the portable type information processing device 52 of the driver provides a display of a screen for allowing the driver to confirm the contents of area information as shown in FIG. 30. When this takes place, the driver referrers to the screen of the display unit 64 and selects desired area information over the display screen. Then, in step S7-7, area information selected by the user is read out from the area information storage unit 66, with read out area information being transmitted to the on-vehicle navigation device 58. Upon receipt of area information transmitted from the portable type information processing device 52 of the driver, in step S7-8, the control unit 78 of the on-vehicle navigation device 58 establish the traveling route of the own vehicle on the basis of area information transmitted from the portable type information processing device 52 of the driver and area information indicative of the current position of the own vehicle obtained with the GPS receiver unit 74. Thus, the own vehicle is guided with the on-vehicle navigation device 58 along the established traveling route, thereby completing a series of operations of the navigation system 50B of the seventh embodiment.

With the navigation system 50B of the seventh embodiment previously mentioned, since area information obtained by the plural users are collected with the portable type information processing device 52 of the driver with these area information being enabled to be utilized by the driver to allow the on-vehicle navigation device 58 to establish the desired route, it is possible to realize the navigation system with an extremely high utility value.

(Eighth Preferred Embodiment)

Figure 32B:
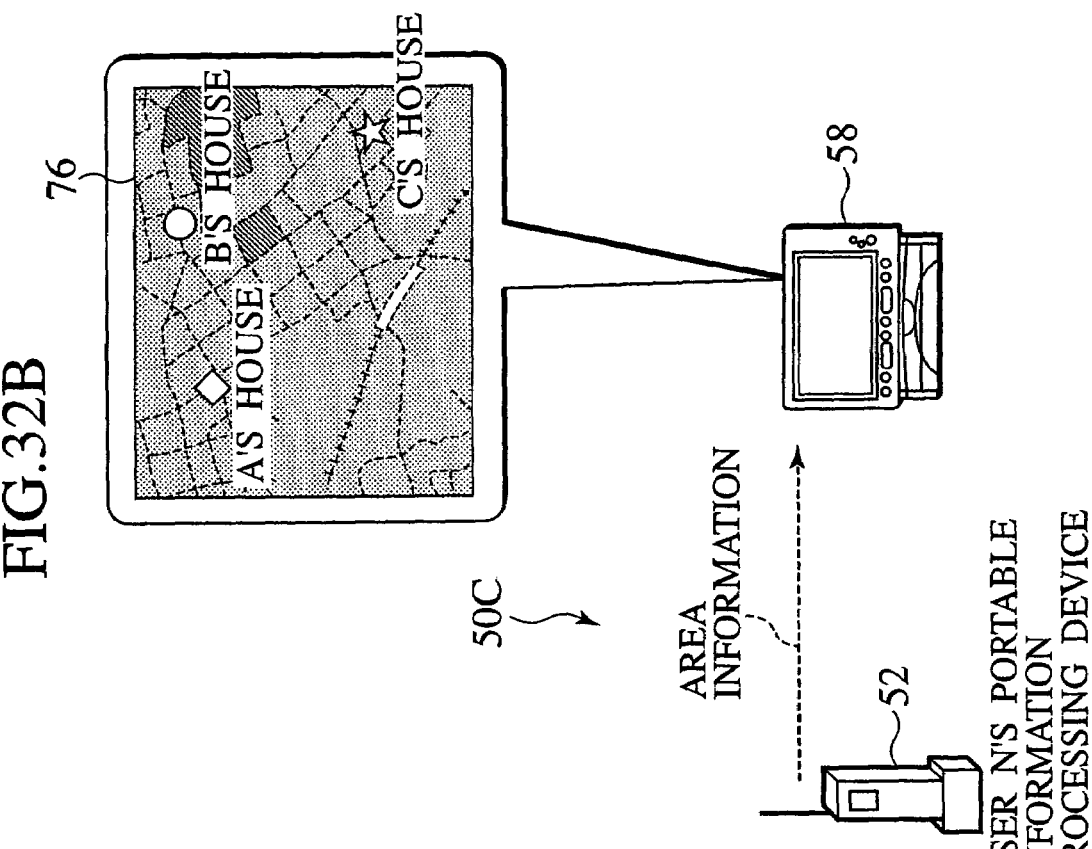
FIGS. 32A and 32B are typical views showing modes in which a navigation system of an eighth embodiment according to the present invention is applied, with FIG. 32A illustrating a mode in which area information are downloaded from a portable information processing device of a friend A to a portable information processing device of a user N, and FIG. 32B illustrating the other mode in which area information is transmitted to an on-vehicle navigation device.

Now, a navigation system 50C of an eighth embodiment according to the present invention is described below with reference to FIGS. 32A and 32B. The navigation system 50C of the eighth embodiment has the same basic structure as those of the fifth and sixth embodiments like the seventh embodiment except for a method of utilizing the navigation system. That is, with the navigation system 50C of the eighth embodiment, one portable type information processing device 52 is enabled to down load area information transmitted from another portable type information processing device 52 such that information read out by one user using the own portable type information processing device 52 is enabled to be utilized by another user.

The navigation system 50C is extremely effective especially when establishing a traveling route with the on-vehicle navigation devices 58 in a case where a certain user drives a vehicle installed with an on-vehicle navigation devices 58 and go to an appointed place designated by another user.

A detailed description will be given in conjunction with a particular case in which a certain user N runs the vehicle installed with the on-vehicle navigation devices 58 to go to the appointed place designated by a friend A.

With the navigation system 50C of the eighth embodiment, when the friend A designates the appointed place, the scanner unit 61 of the own portable type information processing device 52 is operated to read out code data such as the bar code indicative of the location at the appointed place printed on the print product such as the map note. Such code data is converted to area information indicative of the location on the map coordinate system with the control unit 67 of the portable type information processing device 52 owned by the friend A and stored in the area information storage unit 66. In this connection, the control unit 67 is configured to enable an access permit to be acquired from other users with respect to area information indicative of the appointed place.

Figure 32A:
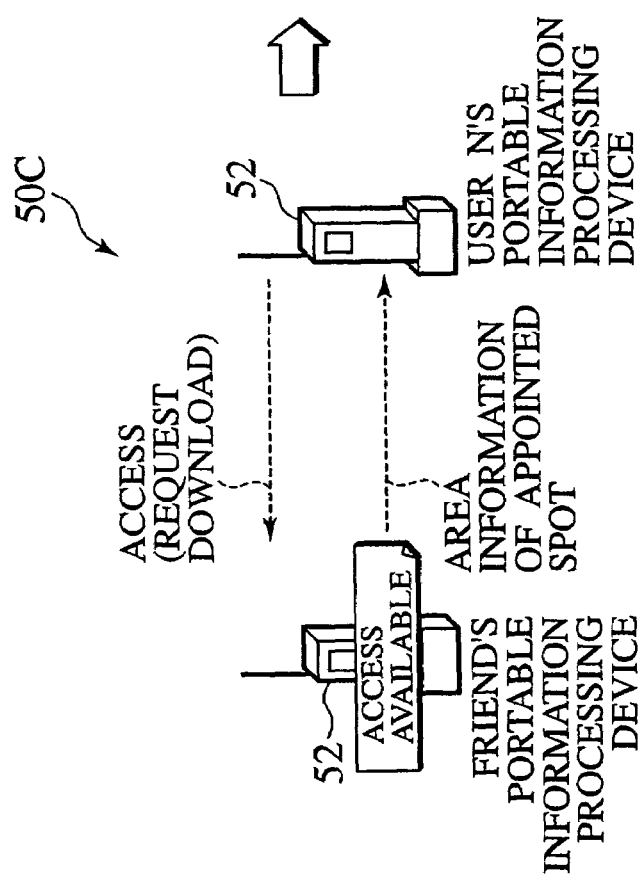

As shown in FIG. 32A, the user N operates to access the portable type information processing device 52 of the friend A using the own portable type information processing device 52. More particularly, such an access method may include an expedient in which access of data permitted by the user A is opened on a specified URL provided in the own portable type information processing device 52 to allow the user N to utilize an Internet connection protocol such as C-HTML for the portable type information processing device for enabling access into the specified URL provided in the portable type information processing device 52 of the friend A. Further, when the user N operates to access to the specified URL provided in the portable type information processing device 52 of the friend A using the own portable type information processing device 52, area information whose access is permitted by the user A is displayed in a table over the display unit 64 of the portable type information processing device 52 of the user N.

Referring to the table displayed over the display unit 64 of the portable type information processing device 52, the user N selects area information, from among area information displayed in the table, to be down loaded, and executes the operational input to down load selected area information. This results in down loading of area information, indicative of the location of the appointed place designated by the friend A, from the portable type information processing device 52 of the friend A to the portable type information processing device 52 of the user N.

As the portable type information processing device 52 of the user N down loads area information indicative of the location of the appointed place transmitted from the portable type information processing device 52 of the friend A, this area information is temporarily stored in the area information storage unit 66. And, when the operational input is made by the user N for this area information to be transmitted to the on-vehicle navigation device 58, this area information is read out from the area information storage unit 66, with read out area information being transmitted to the on-vehicle navigation device 58 as viewed in FIG. 32B.

Upon receiving area information indicative of the location of the appointed place transmitted from the portable type information processing device 52 of the user N, the on-vehicle navigation device 58 operates to establish a traveling route of the vehicle on the basis of this area information and area information indicative of the current position of the vehicle obtained with the GPS receiver unit 74 and executes the route guidance for the vehicle along with the established traveling route.

Figure 33:
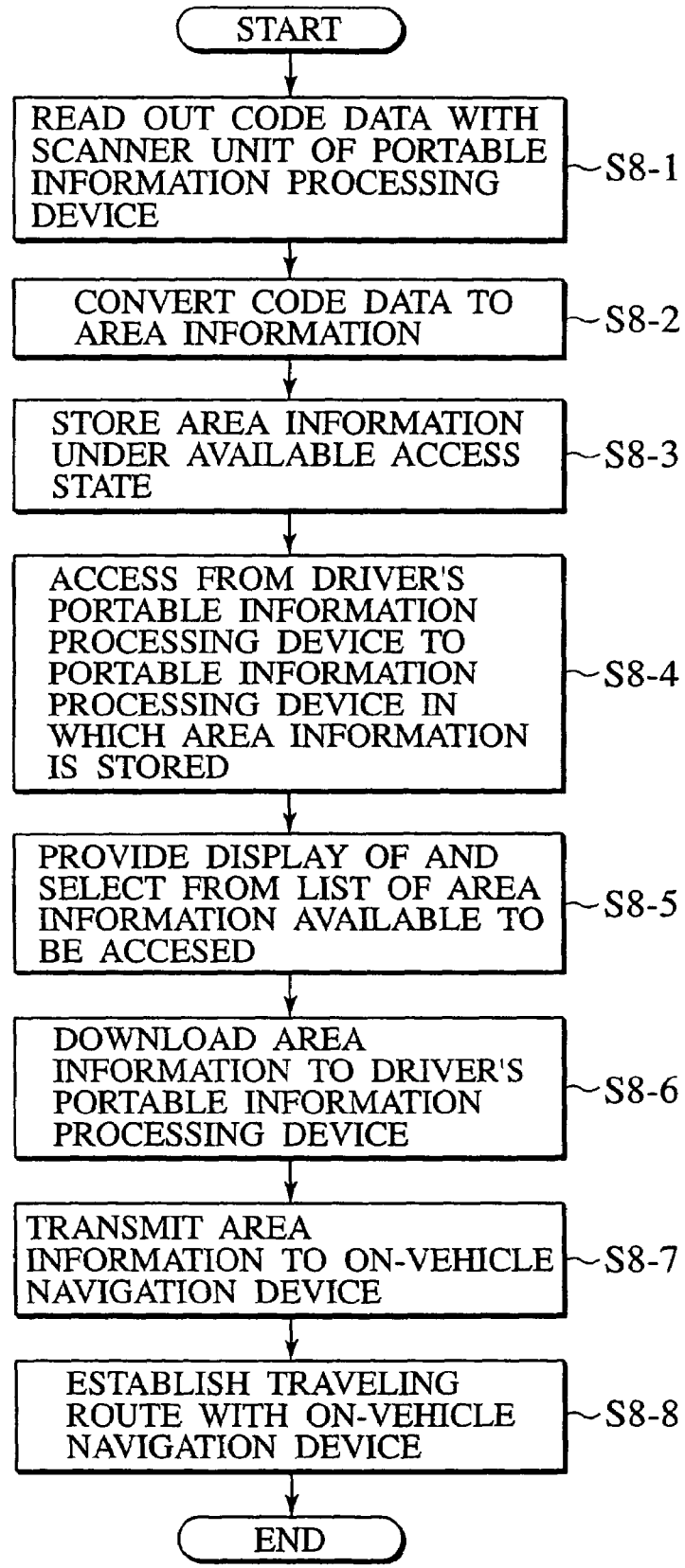
FIG. 33 is a flow chart illustrating the basic sequence of operations of the navigation system of the eighth embodiment.

Now, the basic sequence of operations of the navigation system 50C of the eighth embodiment is described below with reference to a flow chart of FIG. 33.

First, in step S8-1, in response to the operational input made by the particular user, the scanner unit 61 of the portable type information processing device 52 reads out code data, indicative of the location of the appointed place, from the print product such as the map note. In step S8-2, code data read out with the portable type information processing device 52 of the particular user is converted into area information indicative of the location on the map coordinate system. In subsequent step S8-3, area information converted from code data is temporarily stored in the area information storage unit 66 under a state enabling access by other users.

In succeeding step S8-4, if the portable type information processing device 52 owned by the driver of the own vehicle installed with the on-vehicle navigation device 58 is operated to access the portable type information processing device 52 of the particular user, then in step S8-5, the table of area information is displayed over the display unit 64 of the portable type information processing device 52 of the driver. And, if the driver selects a desired area information referring to the screen displayed over the display unit 64, then in step S8-6, area information selected by the driver is down loaded from the portable type information processing device 52 owned by the particular user to the portable type information processing device 52 owned by the driver.

In subsequent step S8-7, in response to the operational input made by the driver or in an automatically controlled fashion, down loaded area information is transmitted to the on-vehicle navigation device 58. In next step S8-8, the on-vehicle navigation device 58 establishes the traveling route of the own vehicle on the basis of area information, indicative of the appointed place, transmitted from the portable type information processing device 52 of the driver and area information indicative of the current position of the own vehicle obtained with the GPS receiver unit 74. Thus, the own vehicle is guided with the on-vehicle navigation device 58 along the established traveling route, thereby completing a series of operations of the navigation system 50C of the seventh embodiment.

With the navigation system 50C of the eighth embodiment previously mentioned, since area information obtained by the particular user using the own portable type information processing device 52 is enabled to be utilized by other user to permit the other on-vehicle navigation device 58 to establish the desired route based on such area information, it is possible to realize the navigation system with an extremely high utility value.

(Ninth Preferred Embodiment)

A navigation system of a ninth embodiment according to the present invention is described below with reference to FIG. 34.

Figure 34:
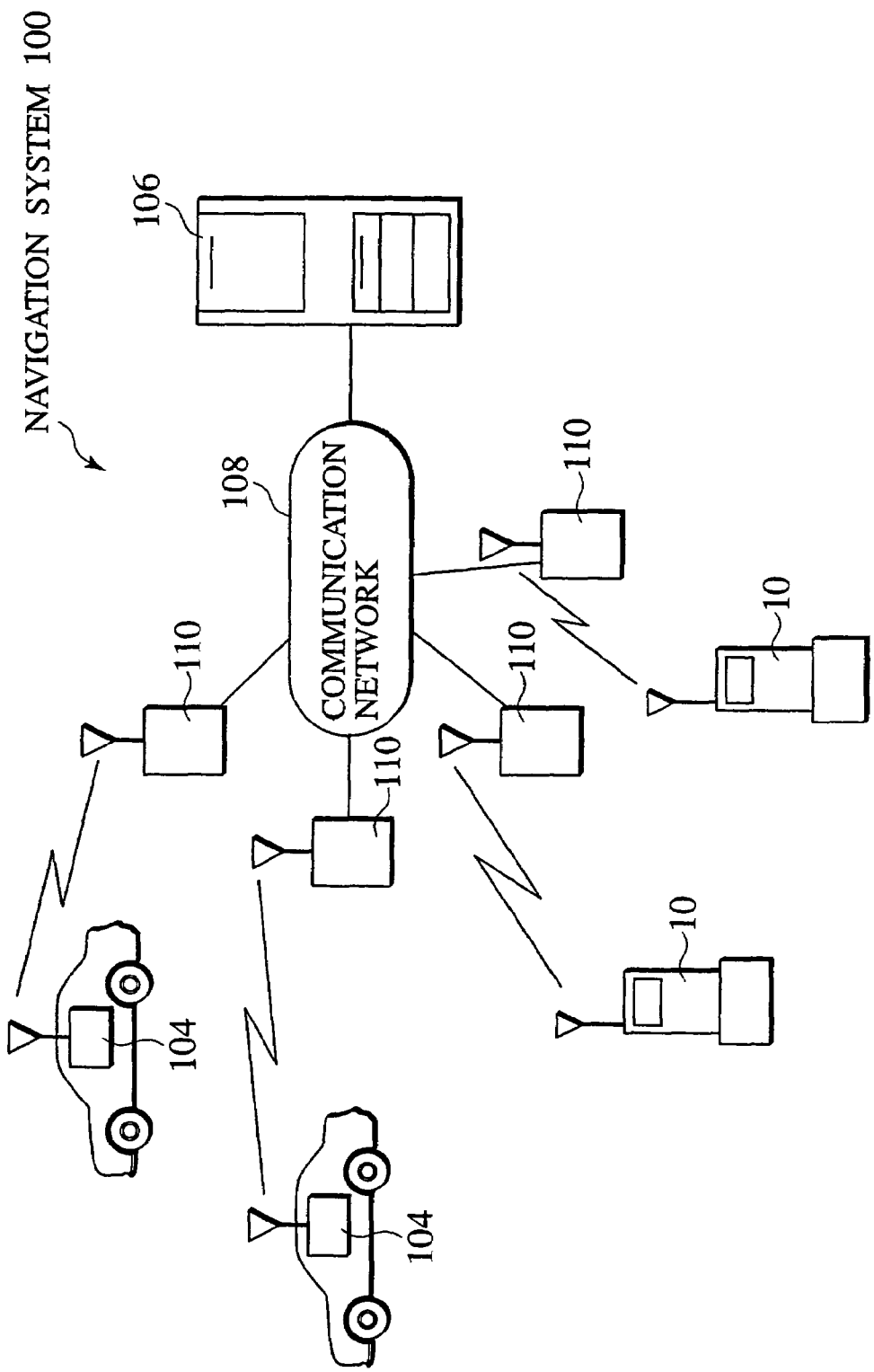
FIG. 34 is a schematic overall view of a navigation system of a ninth embodiment according to the present invention.

In FIG. 34, the navigation system 100 is shown including the portable terminal 10 of a freely portable type, an on-vehicle navigation device 104 installed in an own vehicle, and an information processing data server 106 which is connected to a network 108 over which data communication is established between the on-vehicle navigation device 104 and the information processing server 106. In addition, a plurality of radio communication stations 110 are connected to the network 108, with a resultant capability of radio communication between the portable terminal 10 and the radio communication station 110 and between the on-vehicle navigation device 104 and the radio communication station 110. With such a configuration, data transmitted from the portable terminal 10 is enabled to be received with the non-vehicle navigation device 104 over the radio communication station 110 and the communication network 108 while data transmitted from the navigation device 104 is enabled to be received with the information processing server 106 over the radio communication station 110 and the communication network 108. The portable terminal 10 has the same structure as that of the navigation system of the first embodiment and, therefore, bears the same reference numeral as that of the first embodiment for omitting redundant description.

With such a structure of the navigation system 100 set forth above, the portable terminal 10 is operative to read out code data such as bar codes and map code numbers printed on the print product such as the map note and configured to allow a user to designate area information, indicative of a destination and routed spots of a vehicle to run, at a site outside thereof to enable code data indicative of area information of these destination and routed spots to be supplied to the on-vehicle navigation device 104. Further, with the structure of the navigation system 100, in a case where code data supplied from the portable terminal 10 to the on-vehicle navigation device 104 is different from a code system available in the on-vehicle navigation device 104, the information processing server 106 is configured to convert such code data into code data of the code system available in the on-vehicle navigation device 104 and supplied thereto. With such a configuration, the on-vehicle navigation device 104 is supplied with converted code data from the information processing server 106 and, on the basis of such converted code data, operates to establish an optimum traveling route to enable the own vehicle, installed with the navigation device 104, to be guided along the optimum traveling route.

Figure 35B:
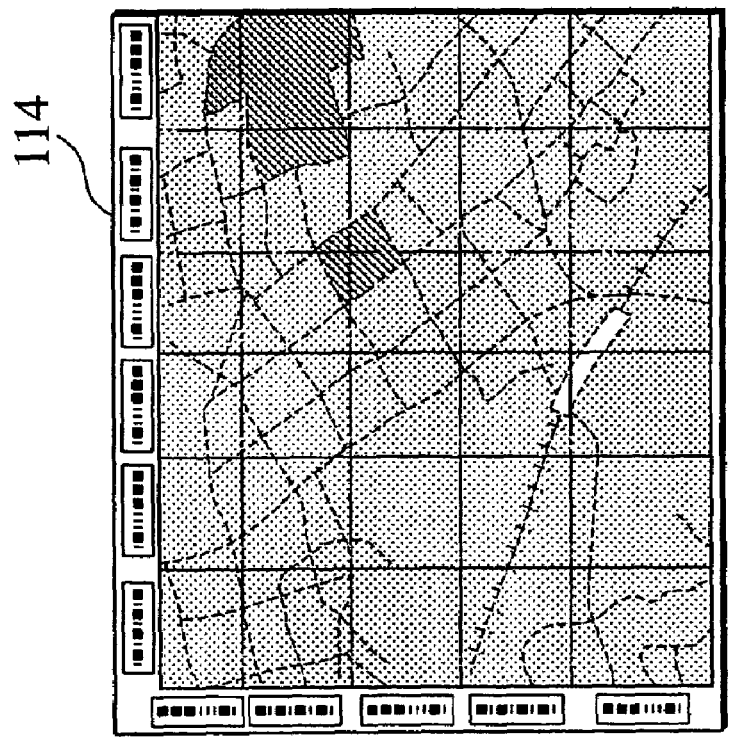
FIGS. 35A and 35B show examples of map notes to be used in the navigation system of the ninth embodiment shown in FIG. 34, with FIG. 35A illustrating the map note printed with bar codes, indicative of area information, located on points in the vicinity of principal intersections and tourist spots, while FIG. 35B illustrating the map note with a map being substantially equally divided into mesh-like areas with each area printed with vertically orientated bar code and a laterally orientated bar code.
Figure 35A:
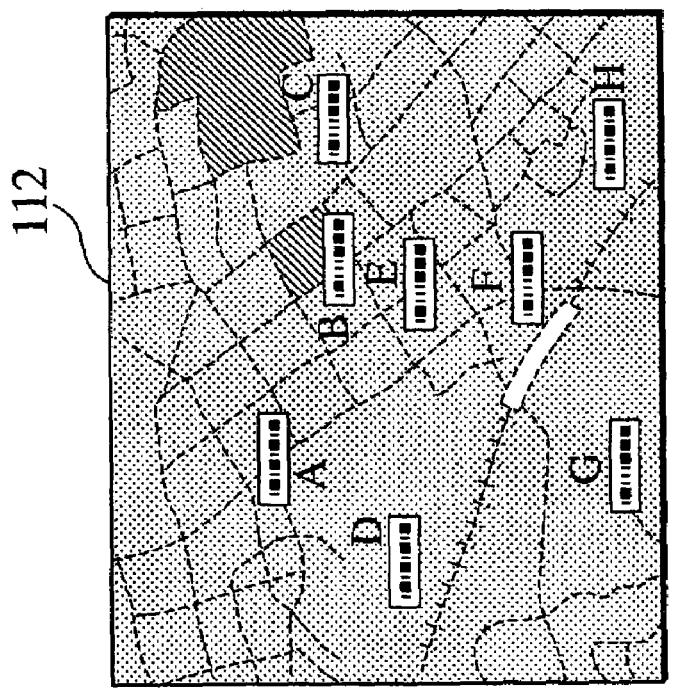

Examples of the map notes to be used in the navigation system 100 are illustrated in FIGS. 35A and 35B. The map note 112 shown in FIG. 35A is printed with bar codes, indicative of area information indicative of spots, in the vicinity of locations such as principal intersections and tourist spots on a map. An ability of reading out such bar codes enables the user to designate each district spot among the principal intersections and tourist spots. In addition, though not shown, front and rear surfaces of the map 112 are printed with Japan Book Code that forms a code for specifying this map note 112. The presence of this Japan Book Code to be read out enables the map note 112 to be specified. This Japan Book Code is widely printed on books, together with a character of ISBN, which are in general available in a market.

On the contrary, the map note 114 shown in FIG. 35B has a map divided into mesh-like areas in a substantially equal size, with each area having a bar code representing a vertical sequential order and another bar code representing a lateral sequential order. Thus, by reading out these vertical and lateral bar codes, it is enabled to designate a particular area at an intersecting area between these bar codes. Further, though not shown in the figure, the front and rear surfaces of the map note 114 are printed with Japanese Book Code that forms a bar code for specifying this map note. Thus, by reading out Japan Book Code, this map note can be specified.

Thus, while the map note 112 shown in FIG. 35A and the map note shown in FIG. 35B are different from one another in the code system of code data printed in respective sheets, the navigation system 100 to which the present invention is applied is configured to have a capability of using both the map notes 112, 114 with different code systems.

Figure 36:
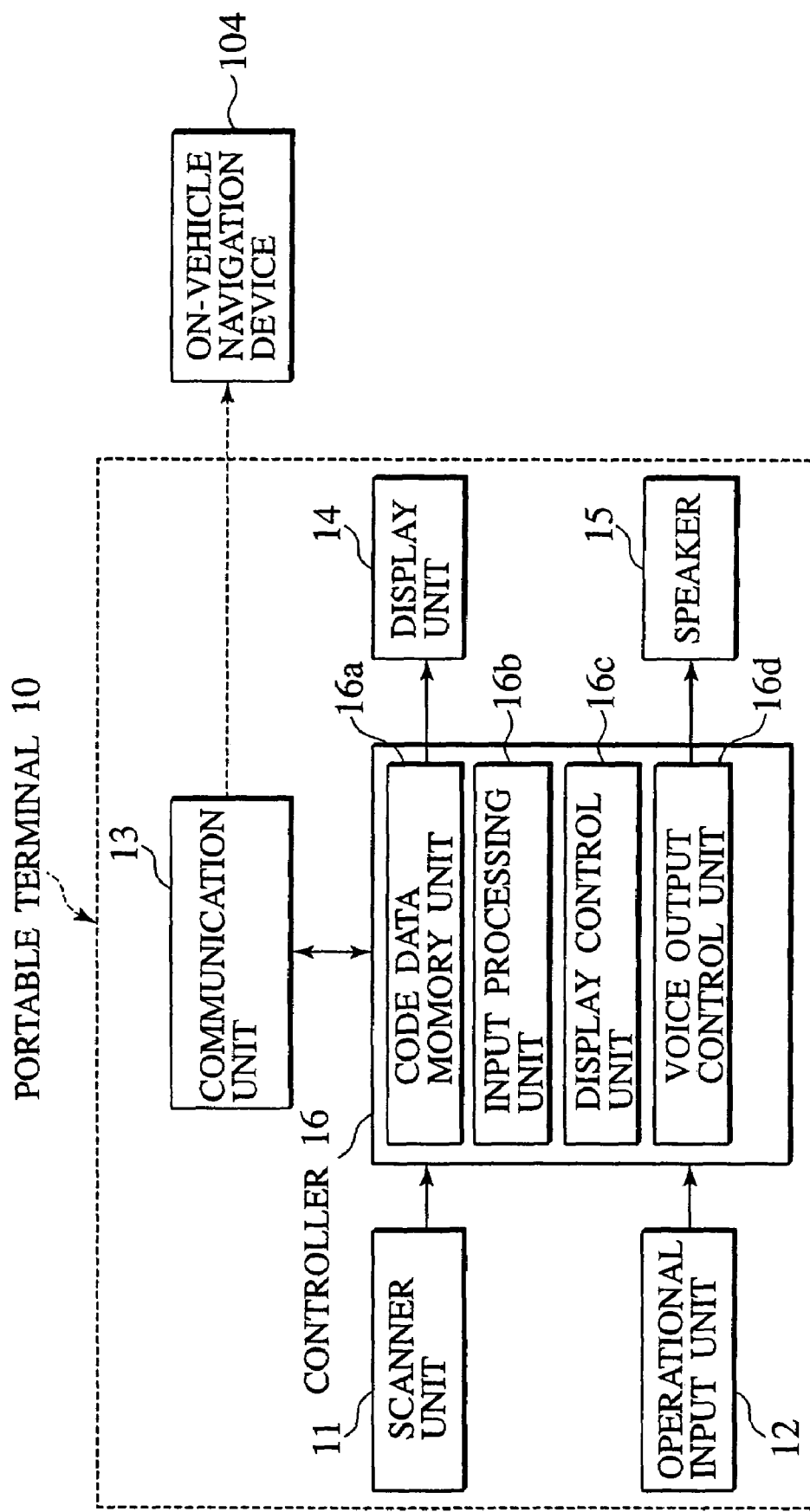
FIG. 36 is a block diagram of a portable terminal forming part of the navigation system shown in FIG. 34.

An example of the portable terminal 10 is shown in FIG. 36 and has the same structure as that of FIG. 2 which shows the part of the first embodiment, with like parts bearing the same reference numerals as those of the portable terminal shown in FIG. 2. Thus, a detailed description of the same is herein omitted for the sake of simplicity of description.

Figure 37:
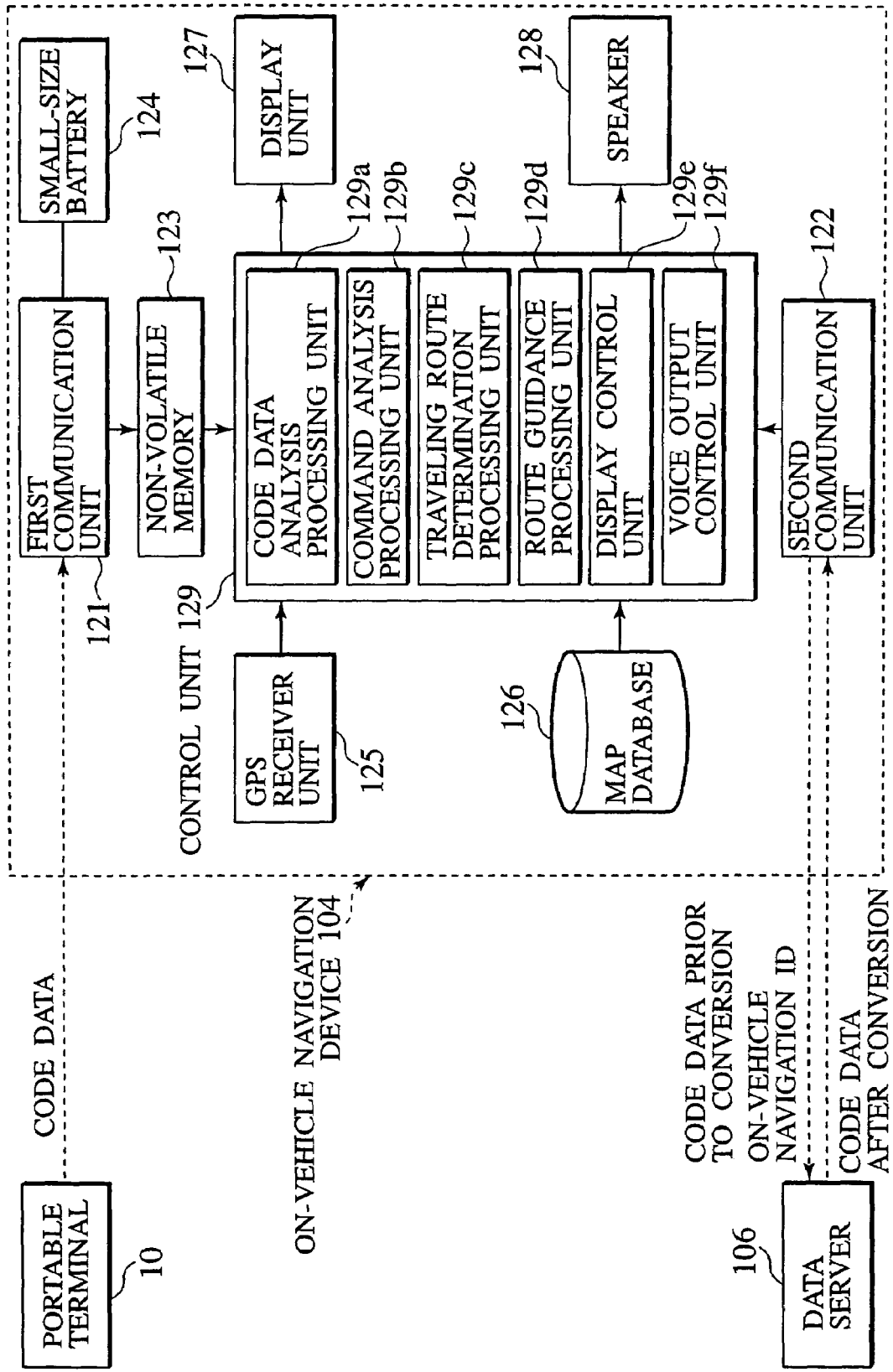
FIG. 37 is a block diagram of an on-vehicle navigation device forming part of the navigation system shown in FIG. 34.

As shown in FIG. 37, the on-vehicle navigation device 104 is comprised of a first communication unit 121, a second communication unit 122, a non-volatile memory 123, a small size battery 124, a GPS receiver unit 125, a map database 126, a display unit 127, a speaker 128 and a control unit 129.

The first communication unit 121 serves to transmit data to and receives data from the portable terminal 10. That is, with code data indicative of desired area information, a given command, or code data, for specifying the print product such as Japanese Book Code, being transmitted from the portable terminal 10, the first communication unit 121 is operative to receive various code data transmitted from the portable terminal 10 over the communication network 108 due to radio communication with the radio communication base station 110.

The second communication unit 122 serves to perform data communication with the information processing server 106. That is, when it is discriminated by the control unit 129 that the code system of code data transmitted from the portable terminal 10 is different from that available with the on-vehicle navigation device 104, the second communication unit 122 achieves radio communication with the radio communication base station 110. During such radio communication, an on-vehicle navigation ID forming an identification information to specify a relevant on-vehicle navigation device 104 is added to code data transmitted from the portable terminal 10, with these information being transmitted to the information processing server 106 over the communication network 108. Further, when code data of the code system available with the on-vehicle navigation device 104 is transmitted from the information processing server 106, the second communication unit 122 operates to achieve radio communication with the radio communication base station 110 to receive code data, transmitted from the information processing server 106, over the communication network 108.

The non-volatile memory 123 is connected to the first communication unit 121 and configured to temporarily store various code data that is transmitted from the portable terminal 10 to the on-vehicle navigation device 104 and received with the first communication unit 121.

The small size battery 124 includes a Li ion battery and is connected to the first communication unit 121 to be used as a power supply thereof. The presence of power output supplied from the small battery 124 to the first communication unit 121 enables the first communication unit 121 to be operative for receiving data even when a main power supply is shut off.

The GPS receiver unit 125 receives a GPS signal from a GPS satellite to obtain area information indicative of a current position of the own vehicle on which the on-vehicle navigation device 104 is installed. Area information, indicative of the current position of the own vehicle, obtained from the GPS receiver unit 125 is supplied to the control unit 129.

The map database 126 is comprised of a computer readable medium such as a CD-ROM in which necessary map data is registered. The map database 126 is arranged so as to allow map data of a designated district to be read out in a sequence in accordance with the processing of the control unit 129.

The display unit 127 serves to provide a display of map data and a variety of information, read out from the map database 126, in dependence on control of the control unit 129. Further, the speaker 128 provides a voice for designating a travel direction in dependence on the control unit 129.

The control unit 129 serves to execute an operational control program for controlling entire operation of the on-vehicle navigation device 104. In particular, execution of the operational control program with the control unit 129 allows respective functions of a code data analysis processing unit 129*a*, a command analysis processing unit 129*b*, a route establishment processing unit 129*c*, a route guidance processing unit 129*d*, a display control unit 129*e* and a voice output control unit 129*f*.

The code data analysis processing unit 129*a* is operative to respond the start-up operation of the on-vehicle navigation device 104 when the main power supply of the on-vehicle navigation device 104 is turned on. When this takes place, the code data analysis processing unit 129*a* reads out various code data temporarily stored in the non-volatile memory 123 and analyzes these code data to obtain area information and commands correlated with these code data. Here, in an event that code data transmitted from the portable terminal 10 is based on the code system disabled to be analyzed with the code data analysis processing unit 129*a*, such code data transmitted from the portable terminal 10 is converted with the information processing server 106 into the code system that can be analyzed with the code data analysis processing unit 129*a* whereupon converted code data is supplied thereto again. Then, the code data analysis processing unit 129a analyzes code data converted with the information processing server 106, thereby obtaining area information and command correlated with such code data.

The command analysis processing unit 129b serves to executes various operations based on various commands, obtained with the code data analysis processing unit 129a, and other various commands supplied from the portable terminal 10 or the information processing server 106.

The route establishment processing unit 129c serves to execute establishment of a traveling route, starting from the current position of the own vehicle to the destination via the routed spots, of the own vehicle on the basis of area information (area information correlated with code data read out from the print product, such as the map note 112 or 114, with the scanner unit 11 of the portable terminal 10) which is obtained with the code data analysis processing unit 129a, and area information indicative of the current position of the own vehicle obtained with the GPS receiver unit 125.

The route guidance processing unit 129d serves to guide the own vehicle to allow the same to properly travel along the traveling route established with the route establishment processing unit 129c. In particular, as the traveling route is established with the route establishment processing unit 129c, the route guidance processing unit 129d reads out a desired map data from the map database 126 to provide a display of the same over the display unit 127. In addition, the route guidance processing unit 129d grasps the current position of the own vehicle on the basis of area information obtained with the GPS receiver unit 125, with a subsequent processing being executed to overlay the current position of the own vehicle over the map data to compel the resulting data to be displayed over the display unit 127. Further, when the own vehicle comes nearer the intersection at which the own vehicle is to be turned right or left, the route guidance processing unit 129d operates to designate the traveling direction of the own vehicle by means of the voice outputted from the speaker 128.

The display control unit 129e serves to control the operation of the display unit 127 in dependence on the processing of the route guidance processing unit 129d, with the desired map data and associated various information being displayed over the display unit 127.

The voice output control unit 129f serves to control the operation of the speaker 128 in dependence on the processing of the route guidance processing unit 129d, thereby causing the speaker 128 to produce the voice for designating the traveling direction of the own vehicle.

Figure 38:
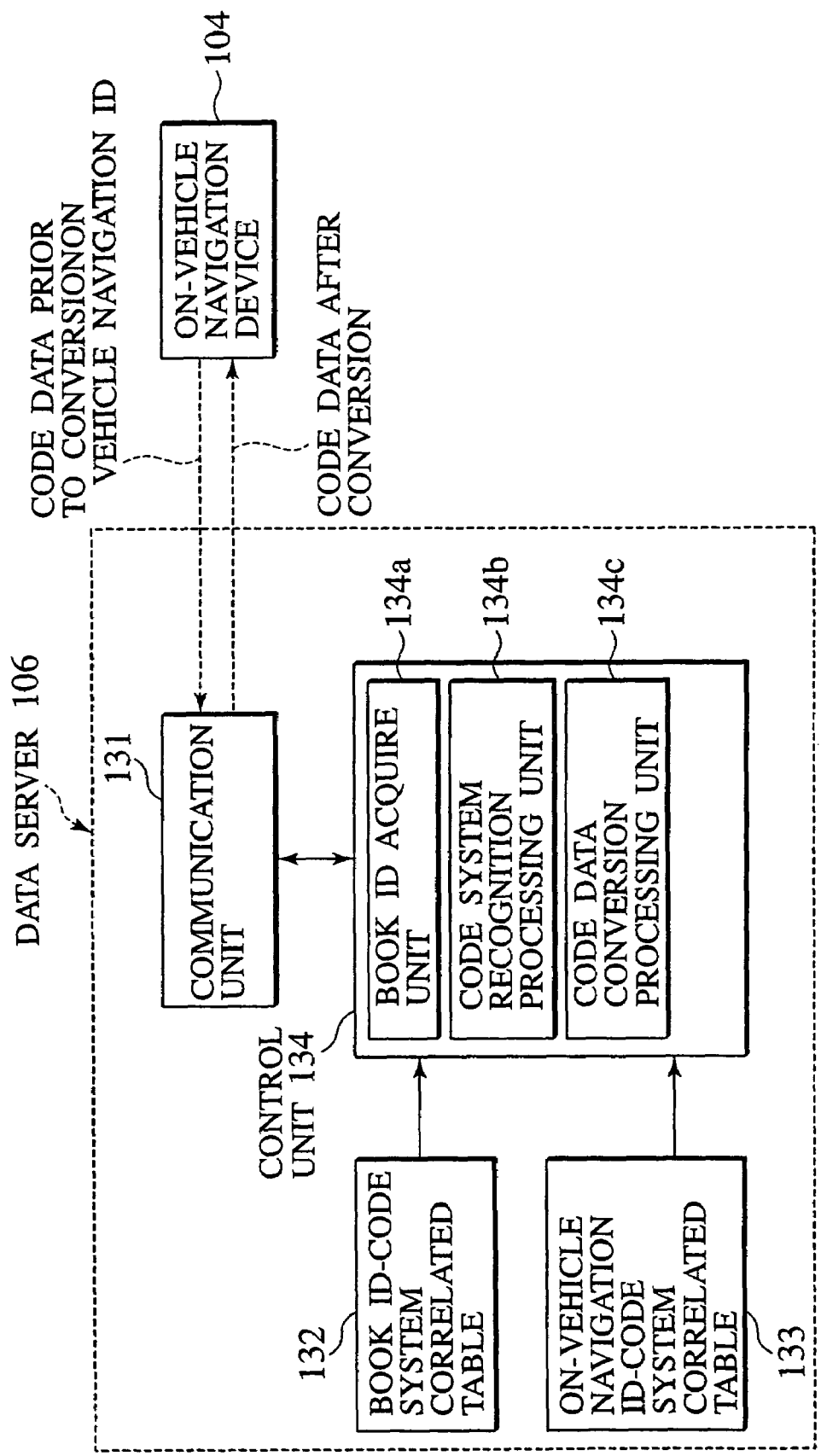
FIG. 38 is a block diagram of an information processing server forming part of the navigation system shown in FIG. 34.

As shown in FIG. 38, the information processing server 106 is comprised of a communication unit 131, a book ID-code system correlated table 132, an on-vehicle navigation ID-code system correlated table 133, and a control unit 134.

The communication unit 131 serves to control transmission of and receipt of data over the communication network 108. Various information such as various code data and various commands such as the on-vehicle navigation ID, which are transmitted from the on-vehicle navigation device 104 over the radio communication base station 110 and the communication network 108, are received with the communication control unit 131 and supplied to the control unit 134. Further, as will be described later, code data converted with the control unit 134 into the code system that can be treated in corresponding relationship in the on-vehicle navigation device 104 is transmitted from the communication unit 131 to the on-vehicle navigation device 104 over the communication network 108 and the radio communication base station 110.

The book ID-code system correlated table 132 includes a correlated table in which the relationship is given between the book ID obtained from the code data, for specifying the print product, such as Japanese Book Code and the code system of code data printed on the print product specified with such a book ID. By referring to the book ID-code system correlated table 132 with the control unit 134, it is enabled to recognize the code system, on the basis of the book ID, of code data printed on the print product specified with such book ID. Also, the correlated table described in the book ID code system correlated table may be updated at any time if desired.

The on-vehicle navigation ID-code system correlated table 133 includes a correlated table in which the relationship is given between the on-vehicle navigation ID forming identification information for specifying the on-vehicle navigation device 104 registered as the on-vehicle navigation device 104 for which a service of the information processing server 106 is to be provided, and the code system that can be treated in the corresponding relationship in the on-vehicle navigation device 104. Referring to the on-vehicle navigation ID-code system correlated table 133 with the control unit 134, it is enabled to recognize the code system, on the basis of the on-vehicle navigation ID, that can be treated in the corresponding relationship in the on-vehicle navigation device 104 specified with such on-vehicle navigation ID. Also, the correlated table described in the on-vehicle navigation ID-code system correlated table 133 may be updated at any time if desired like the correlated table described in the book ID-code system correlated table 132.

The control unit 134 serves to execute the operational control program and controls the entire operation of the information processing server 106. In particular, the control unit 134 is operative to execute an operational control program and, to this end, includes a book ID acquire unit 134a, a code system recognition processing unit 134b and a code data conversion processing unit 134c to perform respective functions.

The book ID acquire unit 134a analyzes code data, such as Japan Book Code, which is transmitted from the on-vehicle navigation device 104 and received with the communication unit 131 for specifying the print product, thereby acquiring the book ID contained in code data such as Japanese Book Code.

The code system recognition processing unit 134b refers to the book ID-code system correlated table 132 and, based on the book ID acquired with the book ID acquire unit 134a, recognizes the code system of code data printed on the print product specified with such book ID. In addition, the code system recognition processing unit 134b refers to the on-vehicle navigation ID-code system correlated table 133 and, on the basis of the on-vehicle navigation ID which is transmitted from the on-vehicle navigation device 104 and received with the communication unit 131, recognizes the code system that can be treated in the corresponding relationship in the on-vehicle navigation device 104.

The code data conversion processing unit 134c serves to convert code data indicative of area information and various commands, transmitted from the on-vehicle navigation device 104 and received with the communication unit 131, on the basis of the code system of code data printed on the print product recognized with the code system recognition processing unit 134b and the code system that can be treated in the corresponding relationship in the on-vehicle navigation device 104.

Figure 39:
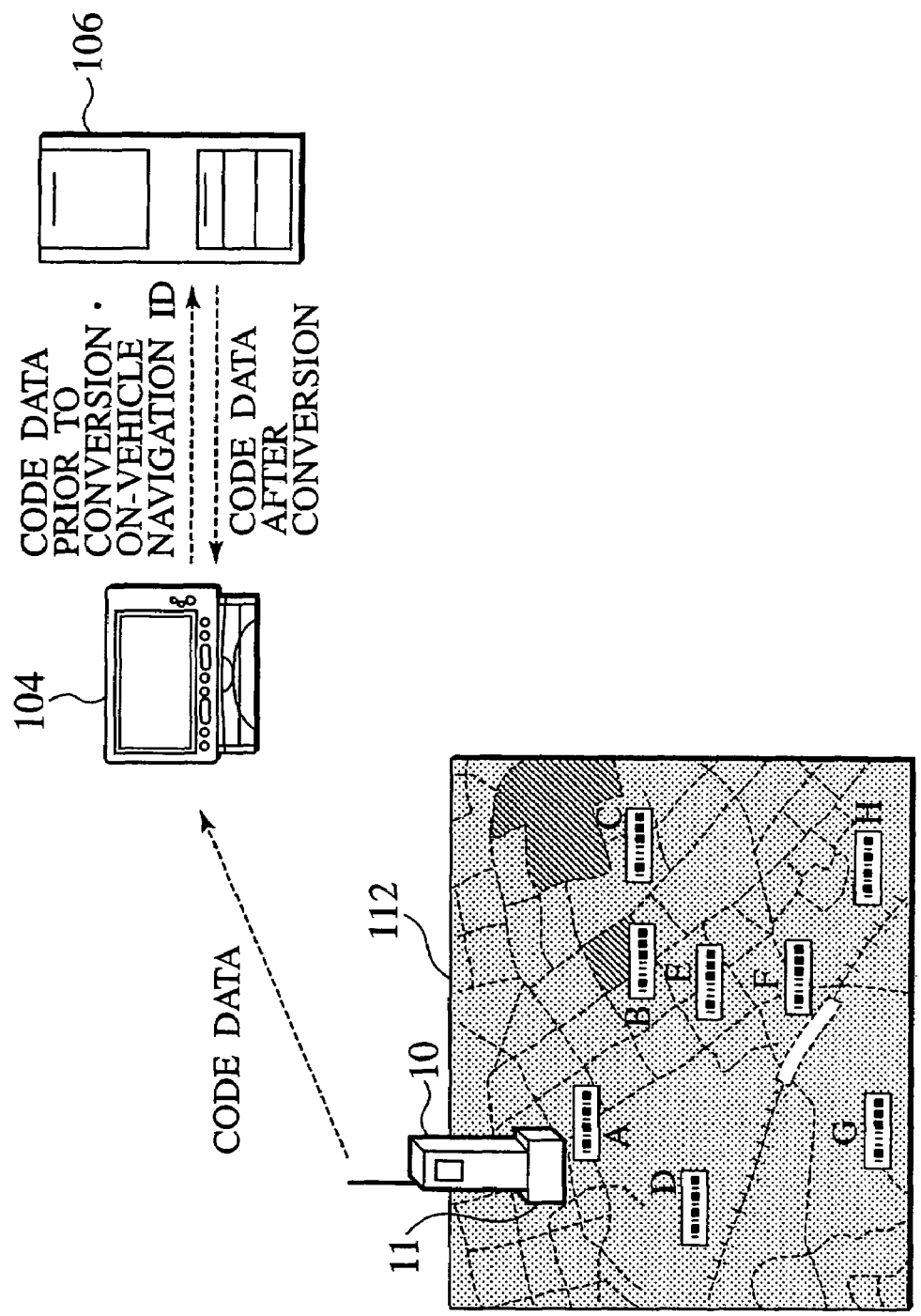
FIG. 39 is a typical view showing an example in which the navigation system of the ninth embodiment is applied.

With such a structure of the navigation system 100 set forth above, when preparing a drive plan at a site, such as a home, outside the vehicle for the user, as shown in FIG. 39, reading code data such as the bar code printed on the print product such as the map note 112 with the scanner unit 11 of the portable terminal 10 enables area information such as the destination and routed spots of the vehicle to run to be designated outside the vehicle. After the uses the scanner unit 11 of the portable terminal 10 to completely read out code data indicative of desired area information and code data such as Japan Book Code, executing operational input using the operational input unit 12 of the portable terminal 10 for code data to be transmitted allows code data, indicative of area information such as the destination and routed spots, and code data such as Japanese Book Code to be transmitted to the on-vehicle navigation device 104.

Upon receipt of respective code data transmitted from the portable terminal 10, the on-vehicle navigation device 104 holds received respective code data in the non-volatile memory 123 until the main power supply is turned on. When the main power supply is turned on, the on-vehicle navigation device 104 reads out respective code data stored in the non-volatile memory 123. During such operation, in the absence of these code data that can be treated in the corresponding relationship in the relevant on-vehicle navigation device 104, these code data and the on-vehicle navigation ID are transmitted to the information processing server 106.

Upon receipt of code data indicative of area information, code data such as Japan Book Code, and the on-vehicle navigation ID transmitted from the on-vehicle navigation device 104, the information processing server 106 obtains the book ID from the Japan Book Code and, based on this book ID, recognizes the code system of code data printed on the print product such as the map note 112 while recognizes the code system that can be treated in the corresponding relationship in the on-vehicle navigation device 104 on the basis of the on-vehicle navigation ID. Then, the information processing server 106 converts code data indicative of area information, received from the on-vehicle navigation device 104, into code data of the code system that has the correspondence in the on-vehicle navigation device 104, with converted code data being transmitted again to the on-vehicle navigation device 104.

Upon receipt of code data converted into the code system, that can be treated in the corresponding relationship in the relevant on-vehicle navigation device 104, from the information processing server 106, the on-vehicle navigation device 104 analyzes this code data and obtains area information corresponding to such code data. Thus, the on-vehicle navigation device 104 establishes a traveling route of the own vehicle on the basis of such area information to guide the own vehicle along the established traveling route.

Figure 40:
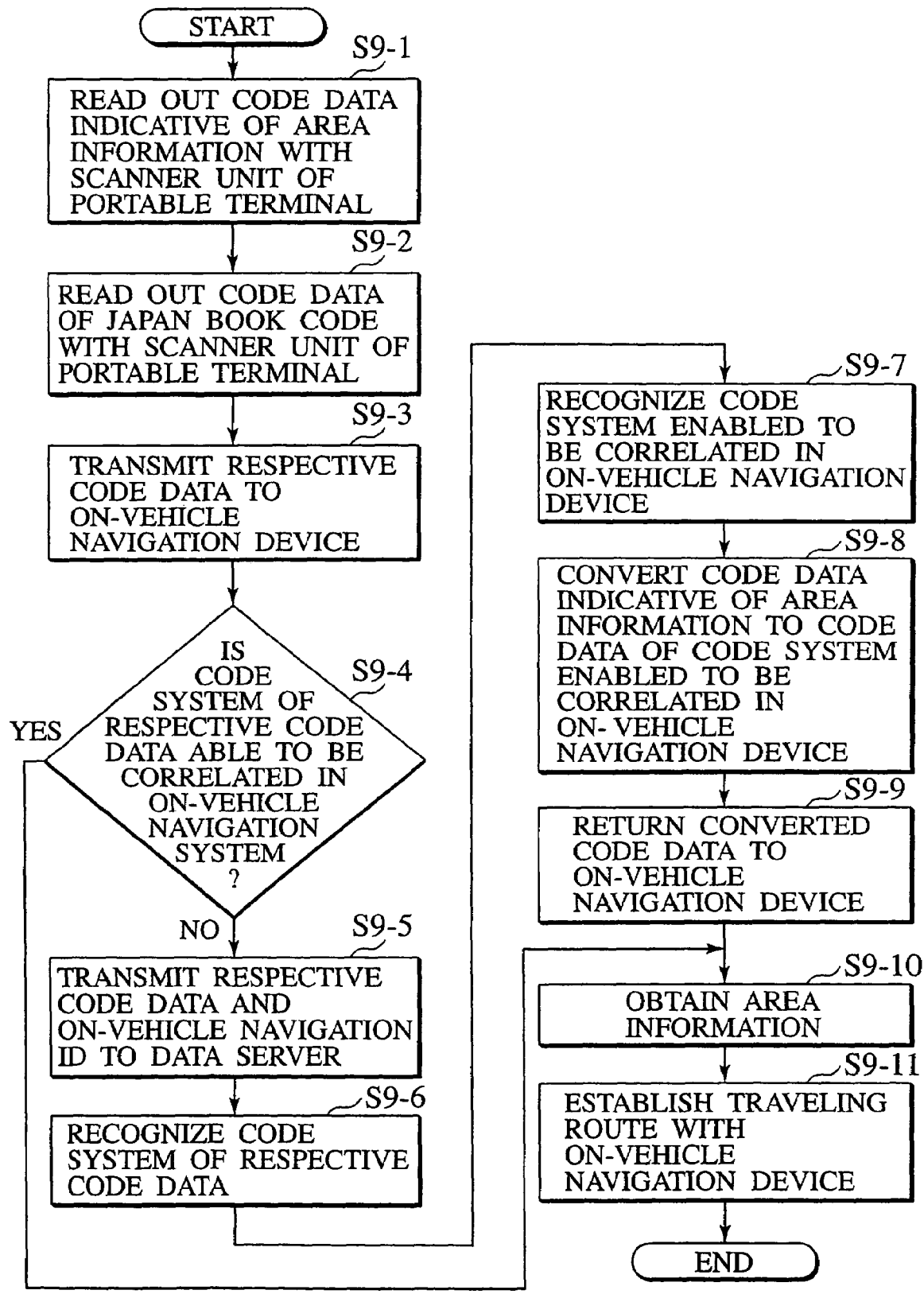
FIG. 40 is a flow chart illustrating the basic sequence of operations of the navigation system shown in FIG. 34.

Now, the basic sequence of operations of the navigation system 100 is described below in detail with reference to a flow chart of FIG. 40.

Figure 41:
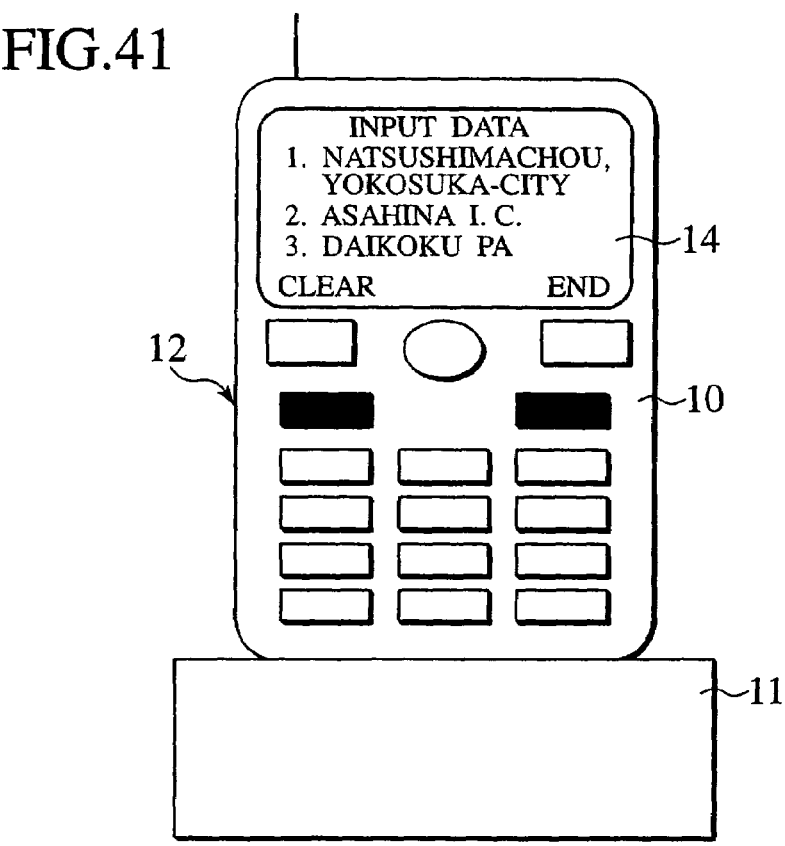
FIG. 41 is a view illustrating a portable terminal device with a display unit provided with a display of information corresponding to read out code data.
Figure 42:
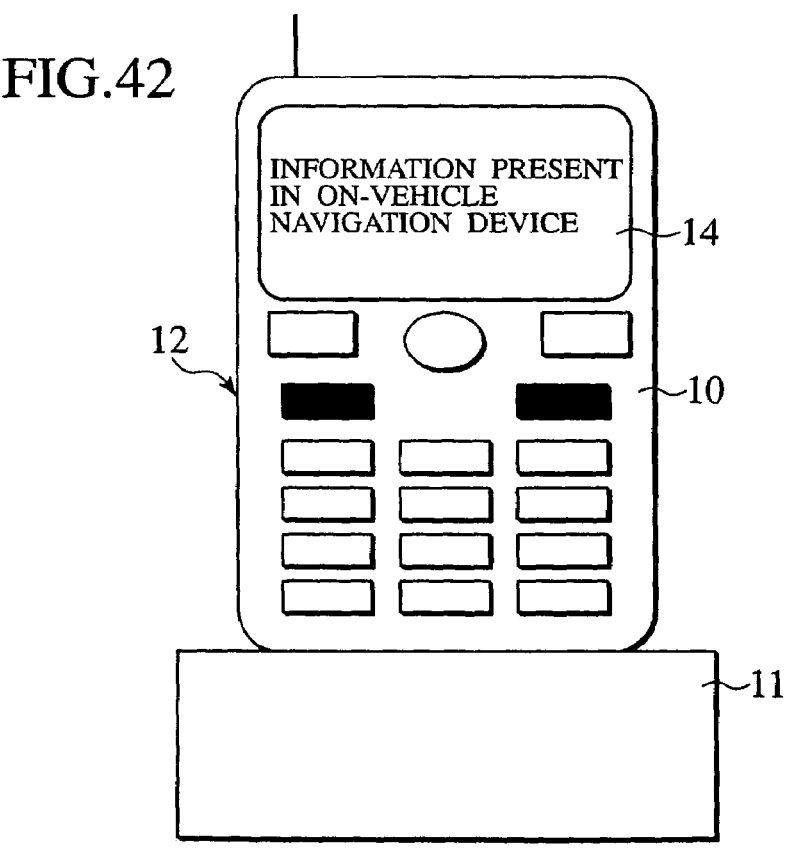
FIG. 42 is a view illustrating the portable terminal device with the display unit provided with a display of information indicative of a situation in which read out code data are transmitted to an on-vehicle navigation device.

First, in step S9-1, in response to user's operation, code data indicative of area information such as the destination and routed spots is read out from the print product such as the map note 112 with the scanner unit 11 of the portable terminal 10. The code data read out with the scanner unit 11 is then temporarily stored in the code data memory unit 16a of the controller 16. Further, when code data is read out with the scanner unit 11, the beep sound is produced by the speaker 15 in dependence on control of the voice output control unit 16d of the controller 16, or information correlated with code data as shown in FIG. 41 is displayed over the display unit 14 in dependence on control of the display control unit 16c of the controller 16. In such a manner, the user is provided with an indication that code data has been read out.

Upon termination of reading out of code data indicative of desired area information, in step S9-2, the scanner unit 11 of the portable terminal 10 reads out code data such as Japan Book Code for specifying the print product such as the map note 112. Code data such as Japanese Book Code read out with the scanner 11 is also temporarily stored in the code data memory unit 16a. In this respect, the reading out of code data such as Japan Book Code may be executed prior to reading out code data indicative of area information. Further, in the presence of code data indicative of the page number for each page printed on the print product such as the map note, code data, indicative of the page number from which code data indicative of area information is read out, in addition to code data such as Japan Book Code may be read out. These code data may be read out in a way in accordance with a method designated for each print product such as the map note 112 to be used.

Upon termination of reading out of respective code data, in step S9-3, the communication unit 13 is responsive to operational input made by the user to transmit code data, indicative of area information temporarily stored in the code data memory unit 16a, and code data such as Japan Book Code to the on-vehicle navigation device 104 over the radio communication base station 110 and the communication network 108. When this takes place, further, in response to control of the display control unit 16c of the controller 16, the display unit 14 provides a display of information representing that respective code data have been transmitted to the on-vehicle navigation device 104.

Respective code data transmitted to the on-vehicle navigation device 104 is received with the first communication unit 121 and temporarily stored in the non-volatile memory 123 until the main power supply of the on-vehicle navigation device is turned on. When the main power supply of the on-vehicle navigation device 104 is turned on, the code data analysis processing unit 129a of the control unit 129 operates to read out respective code data stored in the non-volatile memory 123, i.e., code data, indicative of area information, and code data such as Japan Book Code, both of which are read out from the print product such as the map note 112 with the scanner unit 11 of the portable terminal 10 by the user. In succeeding step S9-4, discrimination is made as to whether or not the code system of these code data can be treated in the corresponding relationship in the on-vehicle navigation device 104.

If it is discriminated that the code system of respective code data read out from the non-volatile memory 123 is out of the corresponding relationship to be treated in the no-vehicle navigation device 104, then in step S9-5, these code data and the on-vehicle navigation ID for specifying the relevant on-vehicle navigation device 104 are transmitted from the second communication unit 122 to the information processing server 106 over the radio communication base station 110 and the communication network 108.

These code data and the on-vehicle navigation ID are received with the communication unit 131 of the information processing server 106. In succeeding step S9-6, the book ID acquire unit 134a of the control unit 134 obtains the book ID of the print product such as the map note 112 from code data such as Japan Book Code received from the on-vehicle navigation device 104 while the code system recognition processing unit 134b refers to the book ID-code correlated table 132 such that the code system of code data printed on the print product such as the map note 112 is recognized.

In subsequent step S9-7, the code system recognition processing unit 134*b* refers to the on-vehicle navigation ID-code system correlated table 133 and, on the basis of the on-vehicle navigation ID received from the on-vehicle navigation device 104, recognizes the code system that can be treated in the corresponding relationship in the relevant on-vehicle navigation device 104.

Upon recognition of the code system of code data printed on the print product such as the map note 112 and the code system that can be treated in the corresponding relationship in the on-vehicle navigation device 104, then in step S9-8, the code data conversion processing unit 134*c* converts code data, indicative of area information received from the on-vehicle navigation device 104, to code data of the code system that can be treated in the corresponding relationship in the on-vehicle navigation device 104. Then in step S9-9, such converted code data indicative of area information is returned to the on-vehicle navigation device 104 over the radio communication base station 110 and the communication network 108.

The second communication unit 122 receives such code data and, in step S9-10, the code data analysis processing unit 129*a* of the control unit 129 analyzes this code data to obtain area information correlated with such code data.

When the code data analysis processing unit 129*a* obtains area information, correlated with code data converted with the information processing server 106, i.e., area information of the destination and routed spots designated by the user, in step S9-11, the route establishment processing unit 129*c* establishes a traveling route of the own vehicle on the basis of such area information. Thus, the own vehicle is guided with the route guidance processing unit 129*d* along the traveling route established with the route establishment processing unit 129*c*, with a series of operations of the navigation system 100 incorporating the concept of the present invention being completed.

As set forth above, with the navigation system 100 of the presently filed embodiment, in a case where code data, read out from the print product such as the map note 112 with the scanner unit 11 of the portable terminal 10 and transmitted to the relevant on-vehicle navigation device 104, is based on the code system that can not be treated in the corresponding relationship in the on-vehicle navigation device 104, this code data and the on-vehicle navigation ID are transmitted to the information processing server 106 by which such code data is converted into code data of the code system that can be treated in the corresponding relationship in the relevant on-vehicle navigation device 104 and returned to the relevant on-vehicle navigation device 104. Based on such converted code data, the relevant on-vehicle navigation device 104 determines the traveling route of the own vehicle to allow the own vehicle to be guided along the determined traveling route. As a result, even in a case where the code system of code data printed on the print product such as the map note 112 differs from that of code data that can be correlated in the relevant navigation device 104, it is possible for the on-vehicle navigation device 104 to properly guide the own vehicle along the traveling route.

Moreover, with the navigation system 100 previously mentioned, the information processing server 106 is configured to specify the relevant on-vehicle navigation device 104, to which information is to be transmitted, on the basis of the on-vehicle navigation ID transmitted from the relevant on-vehicle navigation device 104 and to convert code data of the code system, that can not be treated in the one-to-one correspondence in the relevant on-vehicle navigation device 104, into code data of the code system that can be treated in the one-to-one correspondence in the relevant on-vehicle navigation device 104 with resultant code data being returned thereto. Thus, the information processing server 106 can be operated in a simplified process for specifying the relevant on-vehicle navigation device 104 to which information is to be transmitted, enabling a load of the information processing server 106 to execute various operations to be eliminated.

While, in the presently filed embodiment, the navigation system 100 has been described in conjunction with an example in which, in a case wherein the code system of code data read out with the scanner unit 11 of the portable terminal 10 is not correlated with the code system of the no-vehicle navigation device 104, the information processing server 106 is operative to convert this code data into code data of the code system that can be treated in the one-to-one correspondence in the relevant on-vehicle navigation device 104 with converted code data being returned thereto, information to be transmitted from the information processing server 106 to the on-vehicle navigation device 104 may not be limited to such converted code data and may include information which is able be interpreted with the on-vehicle navigation device 104.

More particularly, in the case where the code system of code data read out with the scanner unit 11 of the portable terminal 10 is not correlated with the code system of the no-vehicle navigation device 104, the information processing server 106 may have an alternative structure which converts such code data into area information that can be interpreted with the on-vehicle navigation device 104 with resulting area information being transmitted to the on-vehicle navigation device 104. In such a case, no conversion of area information into code data is required in the on-vehicle navigation device 104, resulting in a further simplified operation in the on-vehicle navigation device 104.

Further, the information processing server 106 may be altered such that, in a case where the code system of code data read out with the scanner unit 11 of the portable terminal 10 differs from the code system that can be correlated in the on-vehicle navigation device 104, such code data is converted to an operation command that can be interpreted with the on-vehicle navigation device 104 with resulting converted operation command being transmitted to the on-vehicle navigation device 104. With such an alternative, no conversion of code data into the operation command is required for the on-vehicle navigation device 104, resulting in a further simplified execution in the on-vehicle navigation device 104.

Furthermore, while the navigation system 100 set forth above has been described in conjunction with the example in which the on-vehicle navigation device 104 is provided with the map database 126 to allow desired map data to be retrieved from the same to be displayed over the display unit 127 when the traveling route of the own vehicle is established on the basis of area information designated by the user, the navigation system 100 may be altered to have the map database to be incorporated in the information processing server 106 whereby, when code data is transmitted from the on-vehicle navigation device 104, such code data is converted with the information processing server 106 into area information whereupon desired map data is retrieved from the map database on the basis of such area information with retrieved map data being converted into a format suited to the on-vehicle navigation device 104 and returned to the on-vehicle navigation device 104. With such an alternative, no map database 126 is required in the on-vehicle navigation device 104, resulting in a simplified structure of the on-vehicle navigation device 104.

In addition, while the navigation system 100 discussed above has been described with reference to an example in which various code data are read out from the print product such as the map note 112 with the scanner unit 11 of the portable terminal 10 with read out code data being transmitted to the on-vehicle navigation device 104, the navigation system 100 may have an alternative structure in which the on-vehicle navigation device 104 includes a scanner unit similar to the scanner unit 11 of the portable terminal 10 to allow the scanner unit of the on-vehicle navigation device 104 to read out various code data from the print product such as the map note 112.

(Tenth Preferred Embodiment)

Figure 43:
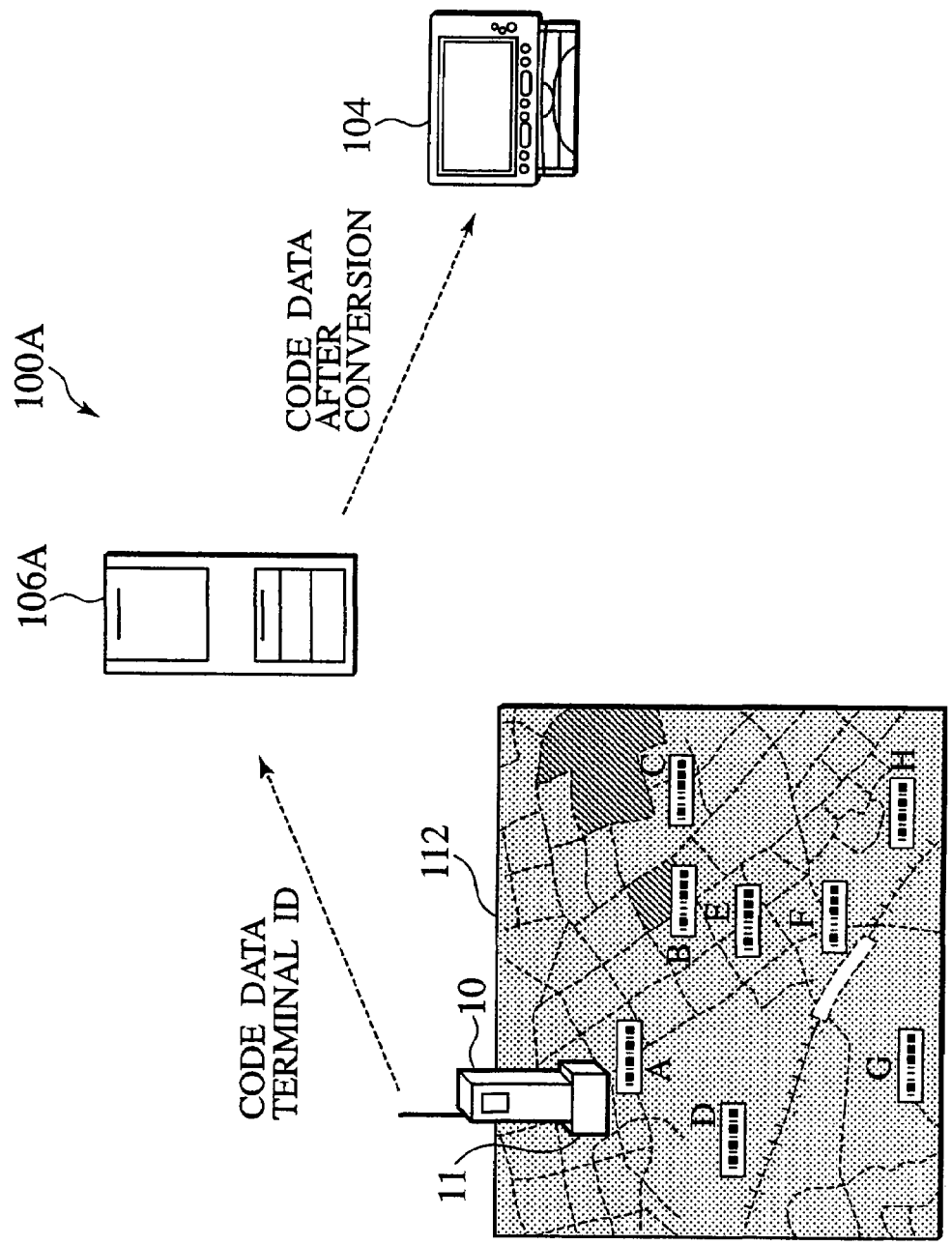
FIG. 43 is a typical view showing an example in which a navigation system of tenth embodiment according to the present invention is applied.

A navigation system of a tenth embodiment according to the present invention is shown in FIG. 43, with like parts bearing the same reference numerals as those used in FIG. 34 to omit the redundant description of the same parts. The navigation system 100A of the tenth embodiment has the same structure as that of the ninth embodiment shown in FIG. 34 except that the portable terminal 10 is directly associated with an information processing server 106A, without intervening the radio communication base station 110, while the on-vehicle navigation device 104 is directly associated with the information processing server 106A.

Namely, with the navigation system 100 of the ninth embodiment, various code data read out from the print product such as the map note 112 with the scanner unit 11 of the portable terminal 10 is first transmitted to the on-vehicle navigation device 104 from which code data and the on-vehicle navigation ID indicative of identification information of the on-vehicle navigation device 104 are transmitted to the information processing server 106A. With the navigation system 100A of the tenth embodiment, on the contrary, various code data read out from the print product such as the map note 112 with the scanner unit 11 of the portable terminal 10 is directly transmitted to the information processing server 106.

More particularly, the navigation system 100A features the provision of the portable terminal 10 adapted to read out various code data, indicative of area information such as the destination and routed spots, and code data indicative of Japan Book Code from the print product such as the map note 112 with the scanner unit 11 and to transmit read out code data and a terminal ID indicative of the relevant portable terminal 10, the information processing server 106A adapted to convert code data transmitted from the portable terminal 10 into code data of the code system that can be correlated in the on-vehicle navigation device 104, and the on-vehicle navigation device 104 which directly communicates with the information processing server 106A to receive converted code data.

Figure 44:
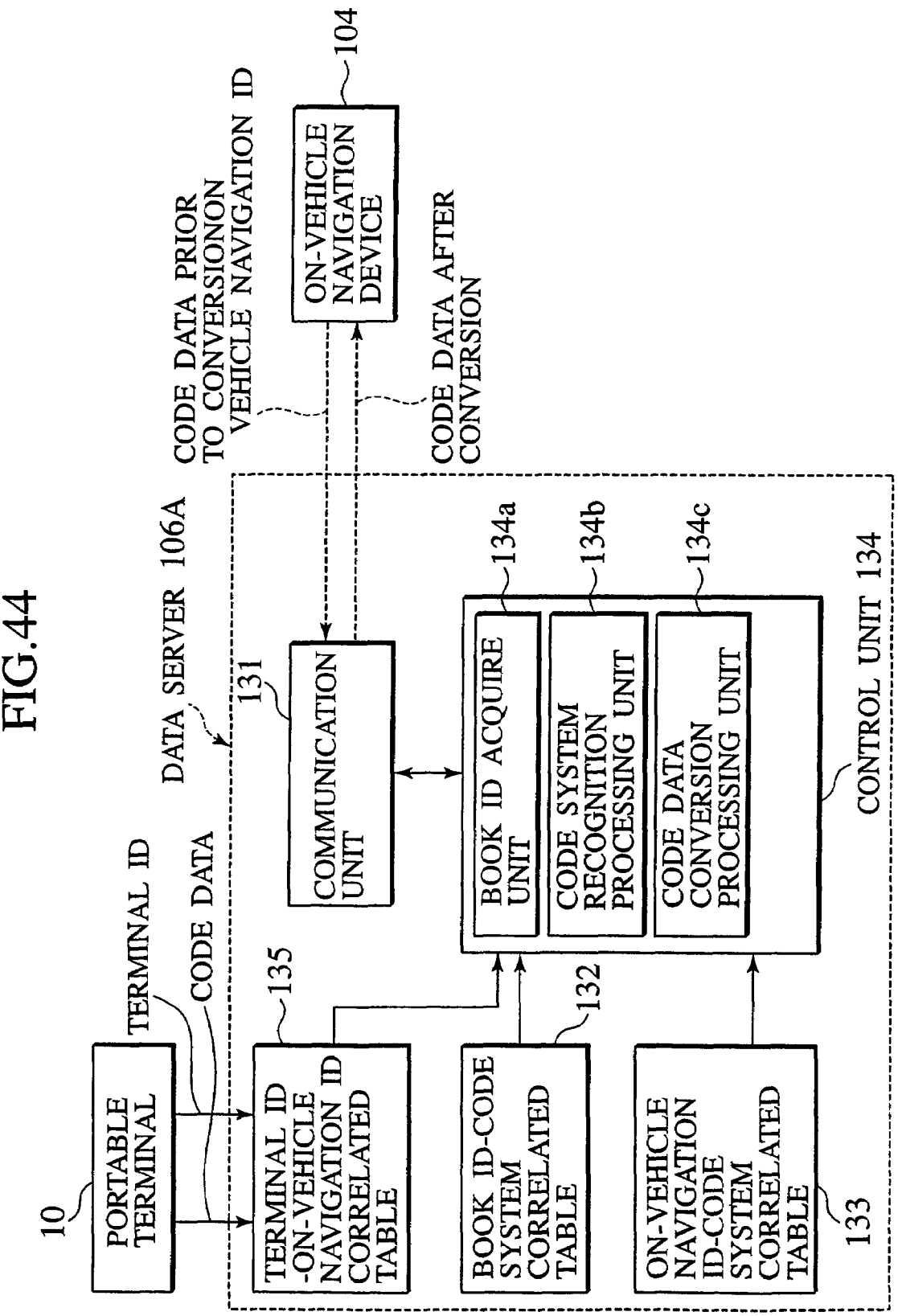
FIG. 44 is a block diagram illustrating a modified form of the information processing server of the navigation system of the ninth embodiment.

With the navigation system 100A, as previously noted, since various code data read out from the print product such as the map note 112 with the scanner unit 11 of the portable terminal 10 is directly transmitted to the information processing server 106A, the on-vehicle navigation ID, indicative of identification information of the on-vehicle navigation device 104, and code data are not transmitted to the information processing server 106A. For this reason, the navigation system 100A is configured such that, in order for the information processing server 106A to be able to specify the on-vehicle navigation device 104 to which converted code data is to be transmitted, the information processing server 106A is provided with identification information (portable ID), indicative of a source which transmits various code data read out from the print product such as the map note 112, and a terminal ID-on-vehicle ID correlated table 135 (see FIG. 44) describing the relationship with identification information (on-vehicle navigation ID) of the on-vehicle navigation device 104 to which converted code data is to be transmitted.

With the navigation system 100A, further, when the portable terminal 10 transmits code data read out from the print product such as the map note 112 with the scanner unit 11 is transmitted to the information processing server 106A, the portable terminal 10 is configured to transmit the terminal ID of the relevant portable terminal 10 in addition to various code data to the information processing server 106. As the information processing server 106A receives various code data and the terminal ID from the portable terminal 10, the information processing server 106A obtains the on-vehicle navigation ID of the relevant on-vehicle navigation device 104 correlated with the portable terminal 10, which forms the source of various code, referring to the terminal ID-on-vehicle navigation ID correlated table 135 and, on the basis of this on-vehicle navigation device 104, the information processing server 106A specifies the relevant on-vehicle navigation device 104 to which converted code data is to be transmitted.

With such a navigation system 100A discussed above, when preparing a drive plan for a user at a home outside the vehicle, using the scanner unit 11 of the portable terminal 10 and reading out code data such as the bar code printed on the print product such as the map note 112 enables desired area information including a destination and routed spots to be designated at a site outside the vehicle. As the user completely reads out code data indicative of desired area information using the scanner unit 11 of the portable terminal 10 and additionally reads out code data such as Japan Book Code whereupon the user executes the operational input using the operation input unit 12 of the portable terminal 10 to cause code data to be transmitted, code data, indicative of area information such as the destination and routed spots, and code data such as Japan Book Code as well as the terminal ID of the portable terminal are transmitted to the information processing server 106A.

Upon receipt of respective code data and the terminal ID of the portable terminal 10 transmitted from the portable terminal 10, the information processing server 106 initially refers to the terminal ID-on-vehicle navigation ID correlated table 135 and, on the basis of the terminal ID received from the portable terminal 10, obtains the on-vehicle navigation ID of the on-vehicle navigation device 104 associated with the relevant portable terminal 10, i.e., of the relevant on-vehicle navigation device 104 to which converted code data is to be transmitted. Subsequently, the information processing server 106 obtains the book ID based on Japan Book Code and, on the basis of this Japan Book Code, recognizes the code system of code data printed on the print product such as the map note 112 while, on the basis of the on-vehicle navigation ID, the information processing server 106A recognizes the code system that can be correlated in the on-vehicle navigation device 104. Thus, the information processing server 106A converts code data, indicative of area information received from the on-vehicle navigation device 104, into code data of the code system that can be correlated in the on-vehicle navigation device 104, with converted code data being transmitted to the relevant on-vehicle navigation device 104.

Upon receipt of code data converted to the code system that can be correlated in the relevant on-vehicle navigation device 104, the relevant on-vehicle navigation device 104 analyzes this code data and obtains area information associated with this code data. Then, the on-vehicle navigation device 104 determines a traveling route of the own vehicle on the basis of such area information, allowing the vehicle to be guided along the traveling route.

Figure 45:
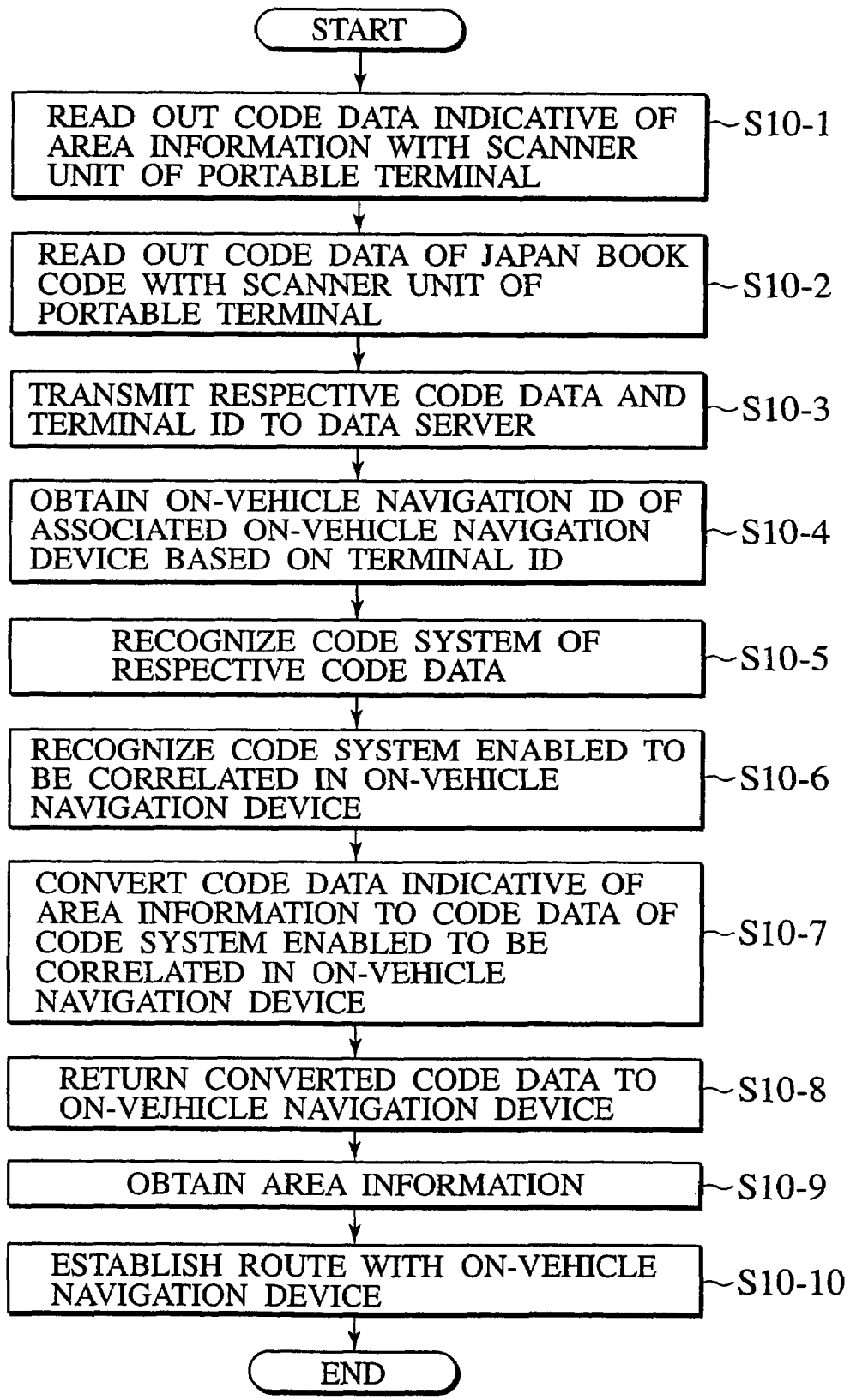
FIG. 45 is a flow chart illustrating the basic sequence of operations of the navigation system shown in FIG. 43.

Now, the basic flow of operations of the navigation system 100A is described below in detail with reference to a flow chart of FIG. 45.

First, in step S10-1, in response to user's operation, code data indicative of area information such as the destination and routed spots is read out from the print product such as the map note 112 with the scanner unit 11 of the portable terminal 10. The code data read out with the scanner unit 11 is then temporarily stored in the code data memory unit 16*a* of the controller 16. Further, when code data is read out with the scanner unit 11, the beep sound is produced by the speaker 15 in dependence on control of the voice output control unit 16*d* of the controller 16, or information correlated with code data is displayed over the display unit 14 in dependence on control of the display control unit 16*c* of the controller 16. In such a manner, the user is provided with an indication that code data has been read out.

Upon termination of reading out of code data indicative of desired area information, in step S10-2, the scanner unit 11 of the portable terminal 10 is operated to read out code data such as Japan Book Code for specifying the print product such as the map note 112. Code data such as Japanese Book Code read out with the scanner 11 is also temporarily stored in the code data memory unit 16*a*. These code data may be read out in a way in accordance with a method designated for each print product such as the map note 112 to be used.

Upon termination of reading out of respective code data, in step S10-3, code data, indicative of area information temporarily stored in the code data memory unit 16*a*, and code data such as Japan Book Code are transmitted to the information processing server 106 in response to the operational input executed by the user. During such operation, the terminal ID of the portable terminal 10 together with code data indicative of area information and code data such as Japan Book Code is transmitted to the information processing server 106A.

Upon receipt of code data indicative of area information, code data such as Japan Book Code and the terminal ID from the portable terminal 10, in step S10-4, the control unit 134 of the information processing server 106A refers to the terminal ID-on-navigation ID correlated table 135 (see FIG. 44) and, on the basis of the terminal ID transmitted from the portable terminal 10, obtains the on-vehicle navigation ID of the on-vehicle navigation device 104 associated with the portable terminal 10.

In subsequent step S10-5, the control unit 134 of the information processing server 106 obtains the book ID of the print product such as the map note 112 on the basis of code data such as Japan Book Code transmitted from the portable terminal 10 and recognizes the code system of code data printed on the print product such as the map note 112 referring to the book ID-code system correlated table 132.

In succeeding step S10-6, the control unit 134 of the information processing server 106A refers to the on-vehicle navigation ID-code system correlated table 133 and, on the basis of the on-vehicle navigation ID of the on-vehicle navigation device 104 associated with the portable terminal 10 serving as the source of transmitting code data, recognizes the code system that can be correlated in the on-vehicle navigation device 104.

Upon recognition of the code system of code data printed on the print product such as the map note 112 and the code system that can be correlated in the on-vehicle navigation device 104, then in step S10-7, the code data conversion processing unit 134*c* converts code data, indicative of area information received from the on-vehicle navigation device 104, to code data of the code system that can be correlated in the on-vehicle navigation device 104. Then in step S10-8, such converted code data indicative of area information is returned to the on-vehicle navigation device 104 from the information processing device 106A.

The second communication unit 122 receives such code data transmitted from the information processing server 106A and, in step S10-9, the code data analysis processing unit 129*a* of the control unit 129 analyzes this code data to obtain area information correlated with such code data.

When the code data analysis processing unit 129*a* obtains area information, correlated with code data converted with the information processing server 106A, i.e., area information indicative of the destination and routed spots designated by the user, in step S10-10, the route establishment processing unit 129*c* establishes a traveling route of the own vehicle on the basis of such area information. Thus, the own vehicle is guided with the route guidance processing unit 129*d* along the traveling route established with the route establishment processing unit 129*c*, with a series of operations of the navigation system 100A incorporating the concept of the present invention being completed.

As set forth above, with the navigation system 100A of the tenth embodiment, code data, read out from the print product such as the map note 112 with the scanner unit 11 of the portable terminal 10 is converted in the information processing server 106A into code data of the code system that can be correlated in the on-vehicle navigation device 104 and transmitted to the relevant on-vehicle navigation device 104 and, based on such converted code data, the relevant on-vehicle navigation device 104 determines the traveling route of the own vehicle to allow the own vehicle to be guided along the determined traveling route. As a result, even in a case where the code system of code data printed on the print product such as the map note 112 differs from that of code data that can be correlated in the relevant navigation device 104, it is possible for the on-vehicle navigation device 104 to properly guide the own vehicle along the traveling route like in the navigation system 100 of the ninth embodiment.

With the navigation system 100A of the tenth embodiment, since code data read out from the print product such as the map note 112 with the scanner unit 11 of the portable terminal 10 is directly transmitted to the information processing server 106A without passing through the on-vehicle navigation device 104 to permit the information processing server 106A to specify the on-vehicle navigation device 104, to which converted code data is to be transmitted, on the basis of the terminal ID of the portable terminal 10, the operations of the on-vehicle navigation device 104 can be simplified with a resultant decrease in load of the on-vehicle navigation device 104 to be operated.

(Eleventh Preferred Embodiment)

A navigation system 100B of an eleventh embodiment is described below in detail with reference to FIG. 46. The navigation system 100B is comprised of an on-vehicle navigation device 104A that realizes the same function as that of the navigation system 100 of the ninth embodiment set forth above. More particularly, in a case where the code system of code data read out from the print product such as the map note 112 differs from the code system that can be correlated in the relevant on-vehicle navigation device 104A, the on-vehicle navigation device 104A serves to convert code data of the code system that can be correlated in the on-vehicle navigation device 104A and to establish a traveling route of the own vehicle on the basis of area information indicative of such code data to allow the own vehicle to be guided along the traveling route.

Figure 46:
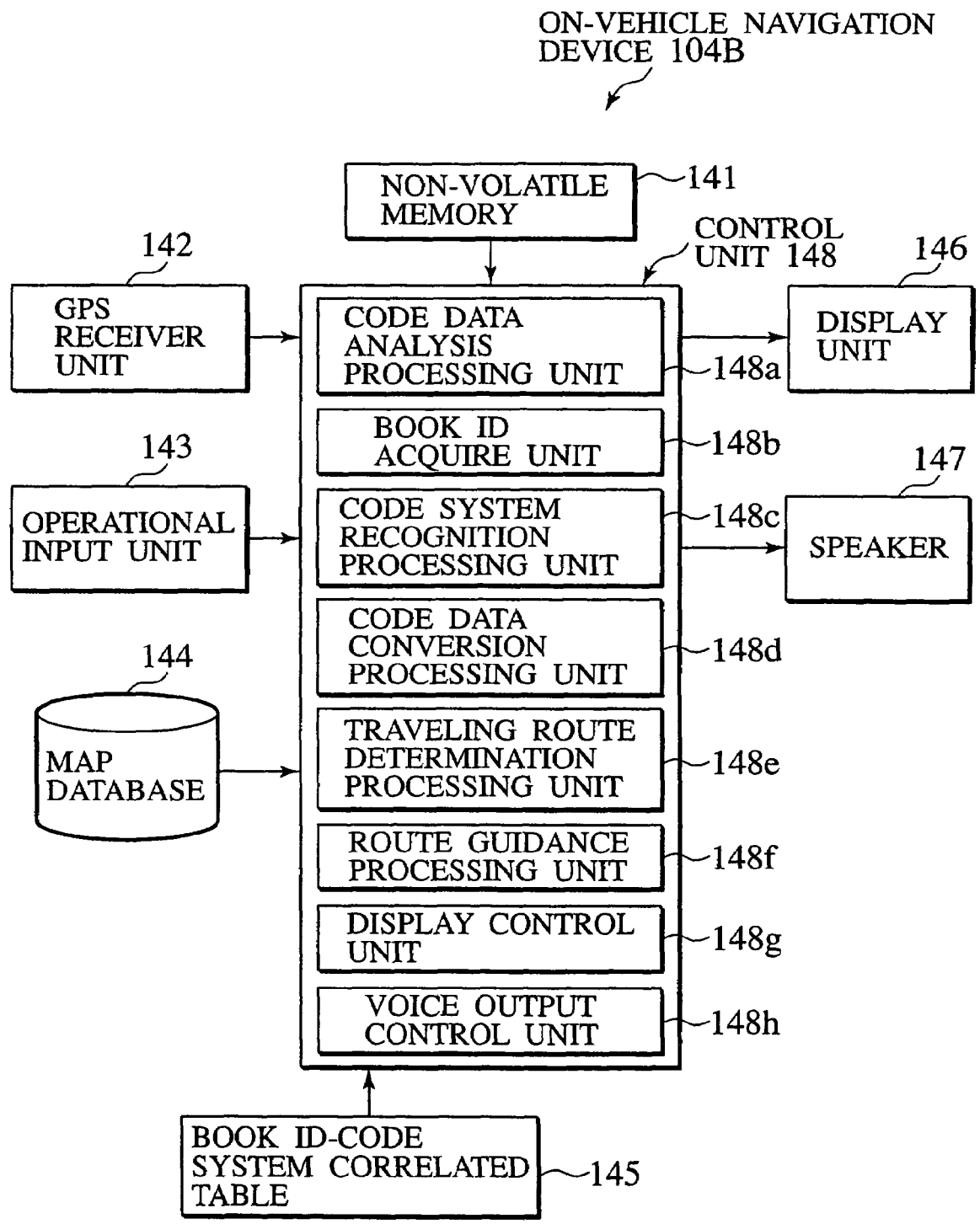
FIG. 46 is a block diagram of an on-vehicle navigation device of an eleventh embodiment according to the present invention.

As shown in FIG. 46, the on-vehicle navigation device 104A is comprised of scanner unit 141, a GPS receiver unit 143, an operational input unit 143, a map database 144, a book ID code system correlated table 145, a display unit 146, a speaker 147 and a control unit 148.

The scanner unit 141 serves to optically read out code data such as a bar code, indicative of desired area information or a given command, and code data for specifying the print product such as the Japan Book Code. Various code data read out with the scanner unit 141 are supplied to the control unit 148.

The GPS receiver unit 142 serves to receive a GPS signal from a GPS satellite and obtains area information indicative of the current position of the own vehicle on which the on-vehicle navigation device 104A is installed. Area information indicative of the current position of the own vehicle obtained with the GPS receiver unit 142.

The operational input unit 143 forms a user interface that receives an operational input executed by the user and may include a plurality of input buttons and a joy stick. When using this operational input unit 143 to execute the operational input, input signals depending on the operational inputs are supplied to the control unit 148. Also, the operational input unit 143 may be formed in a unitary structure with the display unit 146 to form a so-called touch panel type operational input interface.

The map database 144 is comprised of a computer readable medium such as a CD-ROM in which desired map data is registered. The map database 144 is arranged so as to allow map data of a designated district to be read out in a sequence in accordance with the processing of the control unit 148.

The book ID-code system correlated table 145 includes a correlated table in which the relationship is given between a book ID obtained from code data, for specifying the print product such as Japanese Book Code, and a code system of code data printed on the print product. By referring to the book ID-code system correlated table 145 with the control unit 148, it is enabled to recognize the code system, on the basis of the book ID, of code data printed on the print product specified with such book ID.

The display unit 146 provides a display of map data and various information read out from the map database 144 in response to the operation of the control unit 148. Further, the speaker 147 serves to produce a voice for designating the traveling direction in response to the operation of the control unit 148.

The control unit 148 serves to execute an operational program for thereby controlling whole operation of the on-vehicle navigation device 104A. In particular, the control unit 148 operates to execute the operational program to provide respective functions of a code data analysis processing unit 148a, a book ID acquire unit 148b, a code system recognition processing unit 148c, a code data conversion processing unit 148d, a route establishment processing unit 147e, a route guidance processing unit 147f, a display control unit 147g and a voice output control unit 147h.

The code data analysis processing unit 148a is operative to analyze various code data indicative of area information and code data such as Japan Book Code read out from the print product such as the map note 112 with the unit 141 and obtains area information correlated with these code data.

The book ID acquire unit 148b analyzes code data, such as Japan Book Code, for specifying the print product such as the map note 112 read out with the scanner unit 141 for thereby obtaining the book ID contained in code data of Japanese Book Code when respective code data read out from the print product such as the map note 112 with the scanner unit 141 are based on the code system that can not be analyzed with the code data analysis processing unit 148a.

The code system recognition processing unit 148c refers to the book ID-code system correlated table 145 and, based on the book ID acquired with the book ID acquire unit 148b, recognizes the code system of code data printed on the print product specified with such book ID.

The code data conversion processing unit 148d serves to convert code data, indicative of area information of the code system that can not be analyzed with the code data analysis processing unit 148a, into code data of the code system that can be analyzed with the code data analysis processing unit 148a on the basis of a resulting recognition obtained by the code system recognition processing unit 148c. Code data, indicative of area information, whose code system is converted with the code data conversion processing unit 148d is analyzed with the code data analysis processing unit 148a to obtain area information.

The route establishment processing unit 148e serves to establish a traveling route of the own vehicle on the basis of area information, indicative of the destination and routed spots obtained with the code data analysis processing unit 148a, and area information indicative of the current position of the own vehicle obtained with the GPS receiver unit 142.

The route guidance processing unit 148f serves to guide the own vehicle to allow the same to properly travel along the traveling route established with the route establishment processing unit 148e. In particular, as the traveling route is established with the route establishment processing unit 148e, the route guidance processing unit 148f reads out a desired map data from the map database 144 to provide a display of the same over the display unit 146. In addition, the route guidance processing unit 148f grasps the current position of the own vehicle on the basis of area information obtained with the GPS receiver unit 142, with a subsequent processing being executed to overlay the current position of the own vehicle over the map data to compel the resulting data to be displayed over the display unit 146. Further, when the own vehicle comes nearer the intersection at which the own vehicle is to be turned right or left, the route guidance processing unit 148f operates to designate the traveling direction of the own vehicle by means of the voice outputted from the speaker 147.

The display control unit 148g serves to control the operation of the display unit 146 in dependence on the processing of the route guidance processing unit 148f, with the desired map data and associated various information being displayed over the display unit 146.

The voice output control unit 148h serves to control the operation of the speaker 147 in dependence on the processing of the route guidance processing unit 148f, thereby causing the speaker 147 to produce the voice for designating the traveling direction of the own vehicle.

With such a structure the navigation system 100B comprised of the on-vehicle navigation device 104A set forth above, in a case where code data read out from the print product such as the map note 112 with the scanner unit 141 is based on the code system that can not be analyzed with the code data analysis processing unit 148a of the control unit 148, the code system of such code data is recognized and this code data is converted into code data of the code system that can be analyzed with the code data analysis processing unit 148a. Then, converted code data is analyzed with the code data analysis processing unit 148a to obtain area information whereupon, based on such area information, the traveling route of the own vehicle is established to allow the own vehicle to be guided along such a traveling route.

With the navigation system 100B previously discussed, in a case where code data read out from the print product such as the map note 112 with the scanner unit 141 is based on the code system that can not be correlated in the relevant on-vehicle navigation device 104A, since this code data is converted into code data that can be correlated in the relevant on-vehicle navigation device 104A whereupon, on the basis of such converted code data, the traveling route of the own vehicle is established to permit the own vehicle to be guided along such a traveling route, it is possible for the vehicle to be guided in an appropriate way even in a situation where the code system of code data printed on the print product such as the map note 112 is different from the code system that can be correlated in the relevant on-vehicle navigation device 104A.

(Twelfth Preferred Embodiment)

A navigation system 200 of a twelfth embodiment according to the present invention is described below in detail with reference to FIG. 47.

Figure 47:
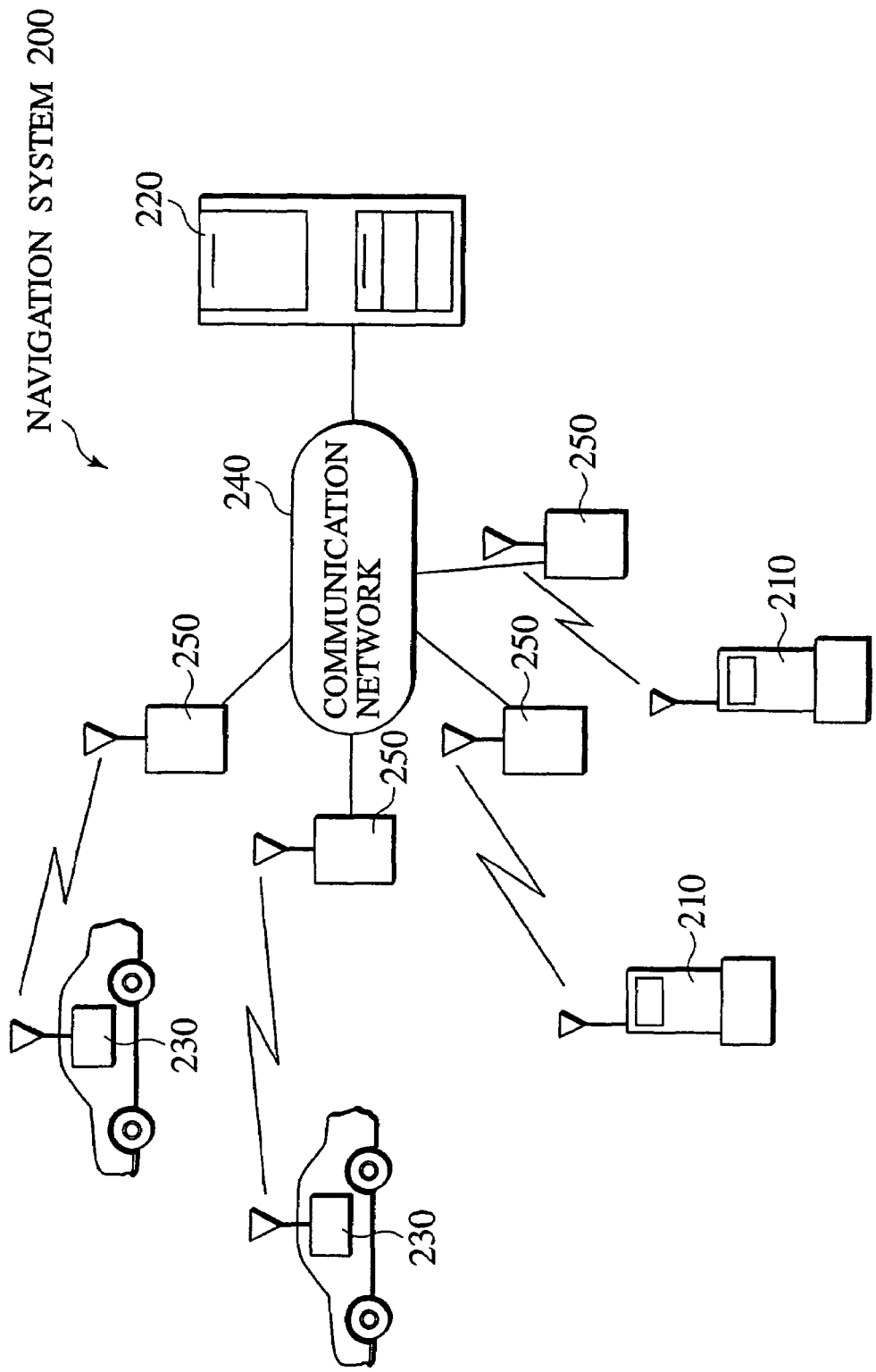
FIG. 47 is a schematic overall view of a navigation system of a twelfth embodiment according to the present invention.

In FIG. 47, the navigation system 200 is shown having a portable terminal 210 which is freely portable, a data server 220 and an on-vehicle navigation devices 230, with data being transmitted and received with these components over a communication network 240 such as an Internet. In particular, connected to the communication network 240 are the data server 220 and a plurality of radio communication base stations 250 which allow a radio communication to be established between the portable terminal 210 and the radio communication base stations 250. With such a communication, data transmitted from the portable terminal 210 is received with the data server 220 via the radio communication base station 250 and the communication network 240. Further, a capability of radio communication between the on-vehicle navigation device 230 and the radio communication base station 250 allows data transmitted from the data server 220 to be received with the on-vehicle navigation device 230 via the communication network 240 and the radio communication base station 250.

With the navigation system 200, further, the portable terminal 210 is designed to read out code data, such as a bar code or a map code number printed on a print product such as a map note, to enable a user to designate a destination and a routed spot of a vehicle at a site outside the vehicle to cause area information of the destination and routed spots to be stored in the data server 220 to allow this area information to be supplied to the on-vehicle navigation device 230 on request. Then, the on-vehicle navigation device 230 determines an optimum traveling rout, indicative of a specified destination path, on the basis of the area information transmitted from the data server 220 such that the own vehicle on which the on-vehicle navigation device 230 is installed is guided along the traveling route so as to arrive at the destination via the routed spots designated by the on-vehicle navigation device 30.

Figure 48:
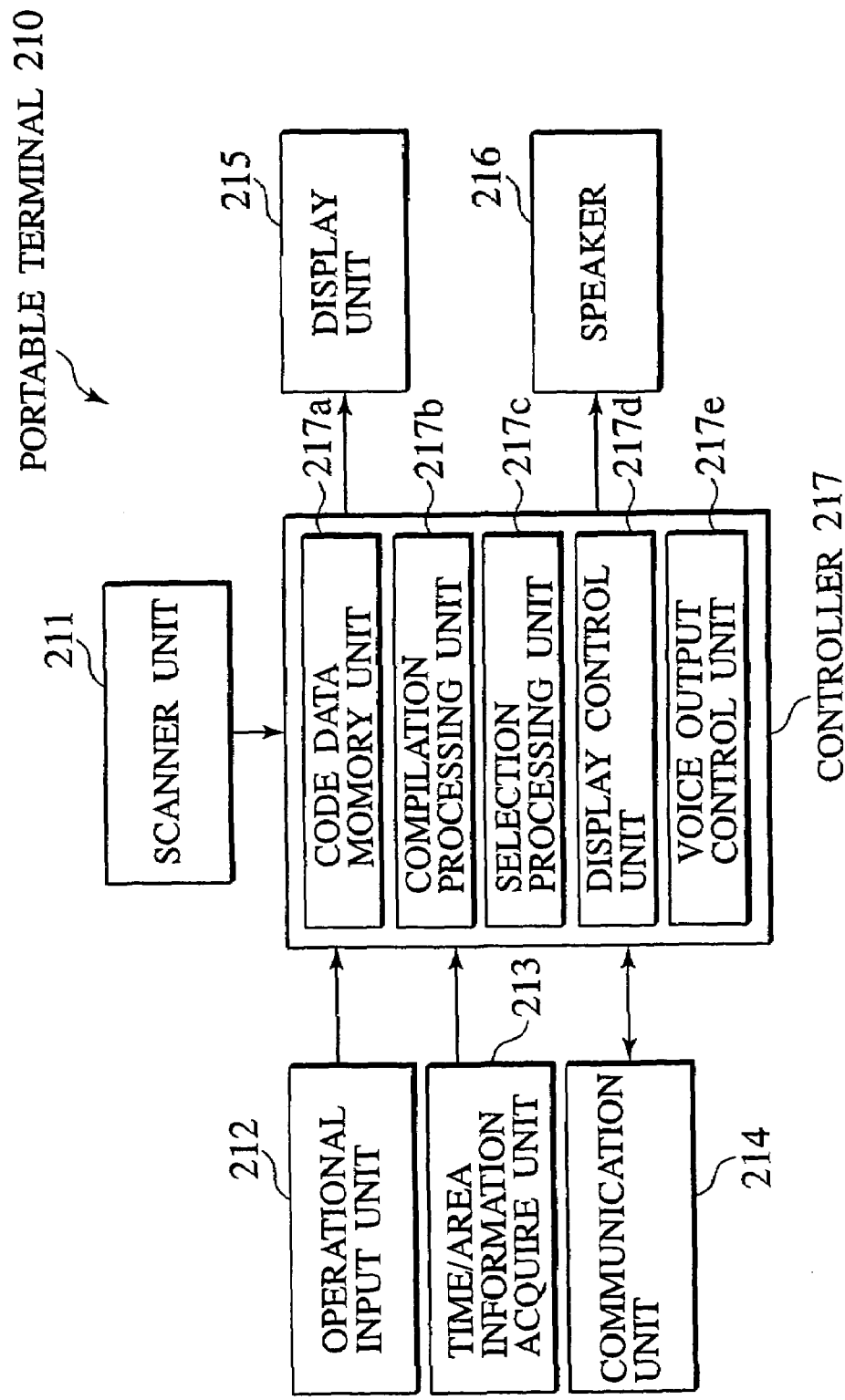
FIG. 48 is a block diagram of a portable terminal forming part of the navigation system shown in FIG. 47.

As shown in FIG. 48, the portable terminal 210 is comprised of a scanner unit 211, an operational input unit 212, a time/area information acquire unit 213, a communication unit 214, a display unit 215, a speaker 216 and a controller 217.

The scanner unit 211 is responsive to operational inputs made by the user and serves to optically reads out desired code data, such as code data indicative of the destination and routed spots of the own vehicle to travel, from the print product such as the map note having printed thereon code data such as bar codes indicative of locations of principal intersections and tourist spots. The code data, such the bar codes, read out with the scanner unit 211 is inputted to the controller 217.

The operation input unit 212 serves as a user interface, for receiving operational inputs applied by the user, and includes ten keys and a jog dial. If the user executes the operational input using the operational input unit 212, the operational input unit 212 produces output signals in dependence on the operational input with the output signals being inputted to the controller 217.

The time/area information acquire unit 213 serves to obtain time information indicative of current time and area information indicative of a current position of the portable terminal 210. The time information and area information obtained with the time/area information acquire unit 213 are supplied to the controller 217.

The communication unit 214 is controlled with the controller 217 to permit the radio communication between the radio communication base station 230 and the communication unit 214 to allow the same to transmit or receive data via the communication network 240. Data transmitted from the portable terminal 210 is supplied to the radio communication base station 250 from the communication unit 214 from which data is then applied to the data server 220 via the communication network 240.

The display unit 215 provides a display of images and sentences in response to controlled operation of the controller 217. Further, the speaker 216 produces a voice like a beep sound in response to control operation of the controller 217.

The controller 217 serves to execute an operational control program for thereby controlling entire operation of the portable terminal 210. In particular, the controller 217 executes the operational control program and, to this end, includes a code data memory unit 217a, a compilation processing unit 217b, a selection processing unit 217c, a display control unit 217d and a voice output control unit 217e to perform respective functions.

The code data memory unit 217a temporarily stores code data such as bar codes read out from the map note with the scanner unit 211. That is, as code data is read out with the scanner unit 211, the portable terminal 210 functions such that read out code data is added with an order number, in which code data is read out, or a routed spot number depending on the operational input made by the user using the operational input unit 212 and is temporarily stored in the code data memory unit 217a for plural code data indicative of a series of destinations and routed spots for determining one traveling route. When this takes place, in synchronism with reading out of code data with the scanner unit 211, time information indicative of current time and area information indicative of the current position of the portable terminal 210 are obtained from the time/area information acquire unit 213. Then, a plurality of code data to determine the one traveling route are correlated with time information and area information obtained with the time/area information acquire unit 213 during reading out operation of the scanner unit 211 and stored in the code data memory unit 217a.

The compilation processing unit 217b serves to compile code data, read out with the scanner unit 211 and temporarily stored in the code data memory unit 217a, in dependence on the operational input made by the user using the operational input unit 212. In particular, as the user executes the operational input using the operational input unit 212 to input a command for deleting a portion of plural code data indicative of the series of destinations and routed spots to determine the one traveling route, the compilation processing unit 217b responds to this command and executes the operation for deleting a relevant portion of code data in accordance with such command. Further, as the user executes the operational input using the operational input unit 212 to input a command for inserting code data indicative of a new routed spot into plural code data indicative of the series of destination and routed spots to determine the one traveling route and code data to be inserted is read out with the scanner unit 211, the compilation processing unit 217b operates to add and insert a designated routed spot number to the relevant code data in accordance with such command. Furthermore, as the user executes the operational input using the operational input unit 212 to input a command for altering the routed spot numbers of plural code data indicative of the series of destination and routed spots to determine the one traveling route, the compilation processing unit 217b executes the operation to alter the routed spot numbers of relevant code number in accordance with such command.

In a situation where the print product such as the map note is printed with, in addition to code data such as the bar code indicative of the destination and the routed spots, code data such as the bar code for commanding these code data to be deleted or to be additionally inserted or the routed spot number to be altered, when code data for commanding these code data to be deleted or to be additionally inserted or the routed spot number to be altered are read out with the scanner unit 211, the compilation processing unit 217b executes the operations to delete and additionally insert code data or to alter the routed spots in accordance with such command.

The selection processing unit 217c serves to read out the series of code data, selected by the user among code data temporarily stored in the code data memory unit 217a, i.e., the plural code data indicative of the series of destination and routed spots to determine the one traveling route selected by the user, with read out plural code data being transmitted from the communication unit 214 to the data server 20.

The display control unit 217d controls operation of the display unit 215 to allow the same to provide a display of the image and the sentences over the display unit 215. In particular, the display control unit 217d operates to provide a display of information correlated with code data over the display unit 215 in response to code data read out from the print product, such as the map note, with the scanner unit 211. Further, during compiling operation of code data temporarily stored in the code data memory unit 217a and performed with the compilation unit 217b, the display control unit 217d operates to allow a compiling screen, indicative of compiled contents executed with the compilation processing unit 217b, to be displayed over the display unit 215. Furthermore, the display control unit 217d operates to cause the display unit 215 to provide a package of display of information, correlated with plural code data temporarily stored in the code data memory unit 217a, i.e., time information and area information, obtained with the time/area information acquire unit 213, as well as the name of the district of the destination.

The voice output control unit 217e controls the operation of the speaker 216 and generates the voice over the speaker 216. In particular, when code data is read out from the print product such as the map note with the scanner unit 211, the voice output control unit 217e operates to output the voice, such as the beep sound, over the speaker 216 for informing the user about the reading of code data.

More particularly, the portable terminal 210 set forth above is realized by coupling a small sized scanner to a portable phone, with a program being incorporated in the portable phone to permit the same to play as roles as the code data memory unit 217a, the compilation processing unit 217b, the selection processing unit 217c, the display control unit 217d and the voice output control unit 217e. Also, in addition to the portable phone, the portable phone 210 may be widely applied to a variety of portable communication terminals, such as personal data assistants (PDA), note type personal computers and palm-top computers etc., which can be freely portable and execute given data processing. In actual practice, the small sized scanner is coupled to the portable communication terminal that is incorporated with the program such that it plays as roles as the code data memory unit 217a, the compilation processing unit 217b, the selection processing unit 217c, the display control unit 217d and the voice output control unit 217e.

Figure 49:
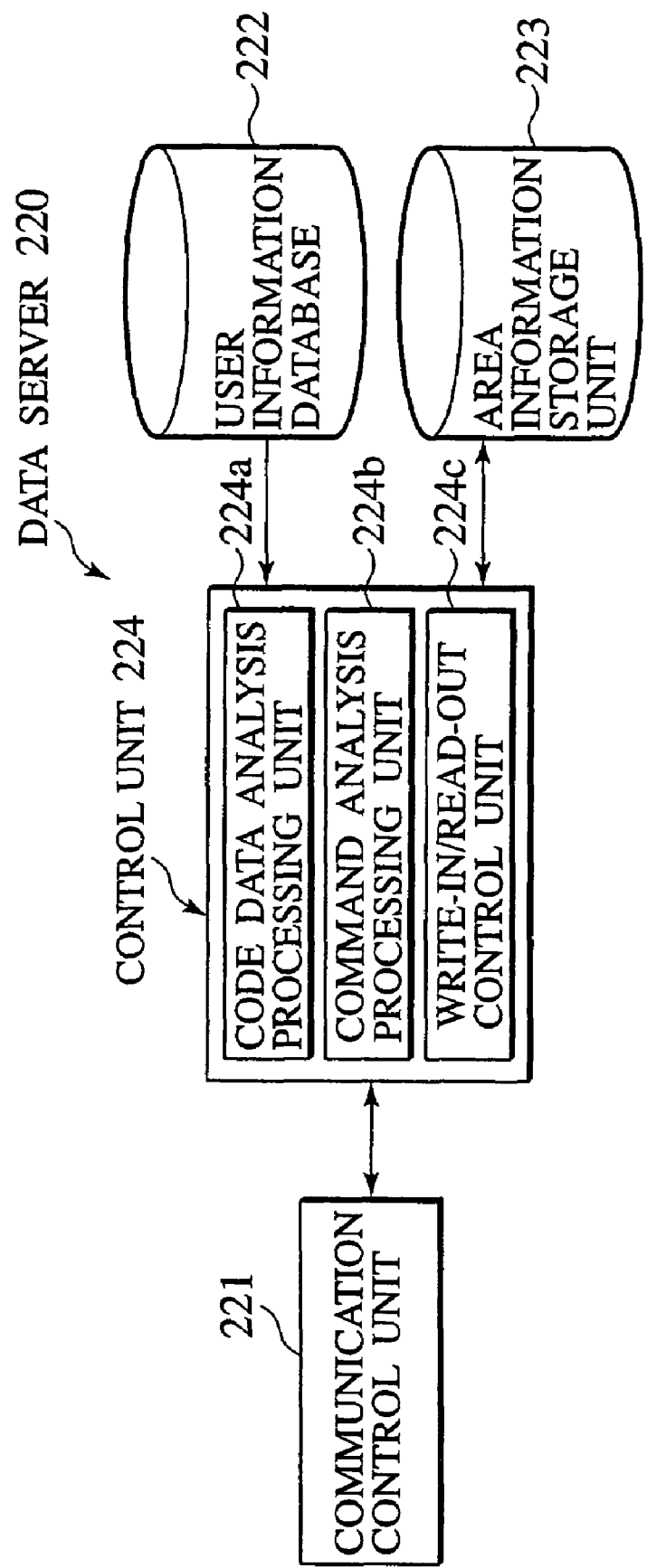
FIG. 49 is a block diagram of a data server forming part of the navigation system shown in FIG. 47.

As shown in FIG. 49, the data server 220 is comprised of a communication control unit 221, a user information database 222, an area information storage unit 223 and a control unit 224.

The communication control unit 21 serves to control transmission and receipt of data over the communication network 250. Information such as code data and a variety of commands, which is transmitted from the communication unit 214 of the portable terminal 210 via the radio communication base station 250 and the communication network 240, is received with the communication control unit 221 and supplied to the control unit 224. Further, area information read out from the area information storage unit 223 with the control unit 224 is then transmitted to the on-vehicle navigation device 230 from the communication control unit 221 via the communication network 240 and the radio communication station 250 in a manner as will be subsequently described.

The user information database 222 stores user-related information, registered as a user who utilizes the navigation system 200, i.e., more specifically, various sorts of information such as a terminal ID that forms an identification information of the portable terminal 210 used by the user, or a on-vehicle navigation ID that forms an identification information of the on-vehicle navigation device 230 which the user uses.

The area information storage unit 223 serves to temporarily store area information correlated with code data, transmitted from the portable terminal 210, according to control of the control unit 224. The area information storage unit 223 stores therein area information, correlated with code data transmitted from the portable terminal 210, in a correlation with the terminal ID of the portable terminal 210 that forms a source of transmission of code data. Thus, designating the terminal ID allows area information, stored in a correlation with the designated terminal ID, to be read out from the area information storage unit 223.

The control unit 224 serves to execute the operational control program and controls the entire operation of the data server 220. In particular, the control unit 224 is operative to execute an operational control program and, to this end, includes code data analysis processing unit 224a, a command analysis processing unit 224b, and a write-in/read-out control unit 224c to perform respective functions.

The code data analysis processing unit 224a serves to analyze code data, which is transmitted from the portable terminal 210 to the data server 220 over the radio communication base station 250 and the communication network 240, and obtains area information correlated with such code data. In particular, the code data analysis processing unit 224a has a conversion table which is described with code data and associated various information both of which are correlated with respect to one another for each code system, with code data transmitted from the portable terminal 210 being converted to area information in correlation with such code data.

The command analysis processing unit 224b is configured to analyze commands, which are transmitted from the portable terminal 210 to the data server 220 over the communication network 240 and the radio communication base station 250 and which are received with the communication control unit 221, and performs various processing operations in accordance with the commands. With such configuration, if there is a command indicative of operation to cause the portable terminal 210 to read out area information, stored in the area information storage unit 223, and to transmit read out information to the on-vehicle navigation device 230, the command analysis processing unit 224b operates to analyze such command to permit the write-in/read-out control unit 224c to operate. When this takes place, the command analysis processing unit 224b reads out relevant area information stored in the area information storage unit 223 and proceeds to transmit read out area information from the communication control unit 221 to the on-vehicle navigation device 230.

The write-in/read-out control unit 224c serves to cause area information, converted from the code data with the code data analysis processing unit 224a, to be correlated with the terminal ID of the portable terminal 210 serving as the source of transmission of code data and controls the writing of area information in the area information storage unit 223, while controlling the reading out of area information from the area information storage unit 223 in accordance with the command analyzed by the command analysis processing unit 224b. Area information, read out from the area information storage unit 223 with the write-in/read-out control unit 224, is then transmitted to the on-vehicle navigation device 230 from the communication control unit 221 over the communication network 240 and the radio communication base station 250.

Figure 50:
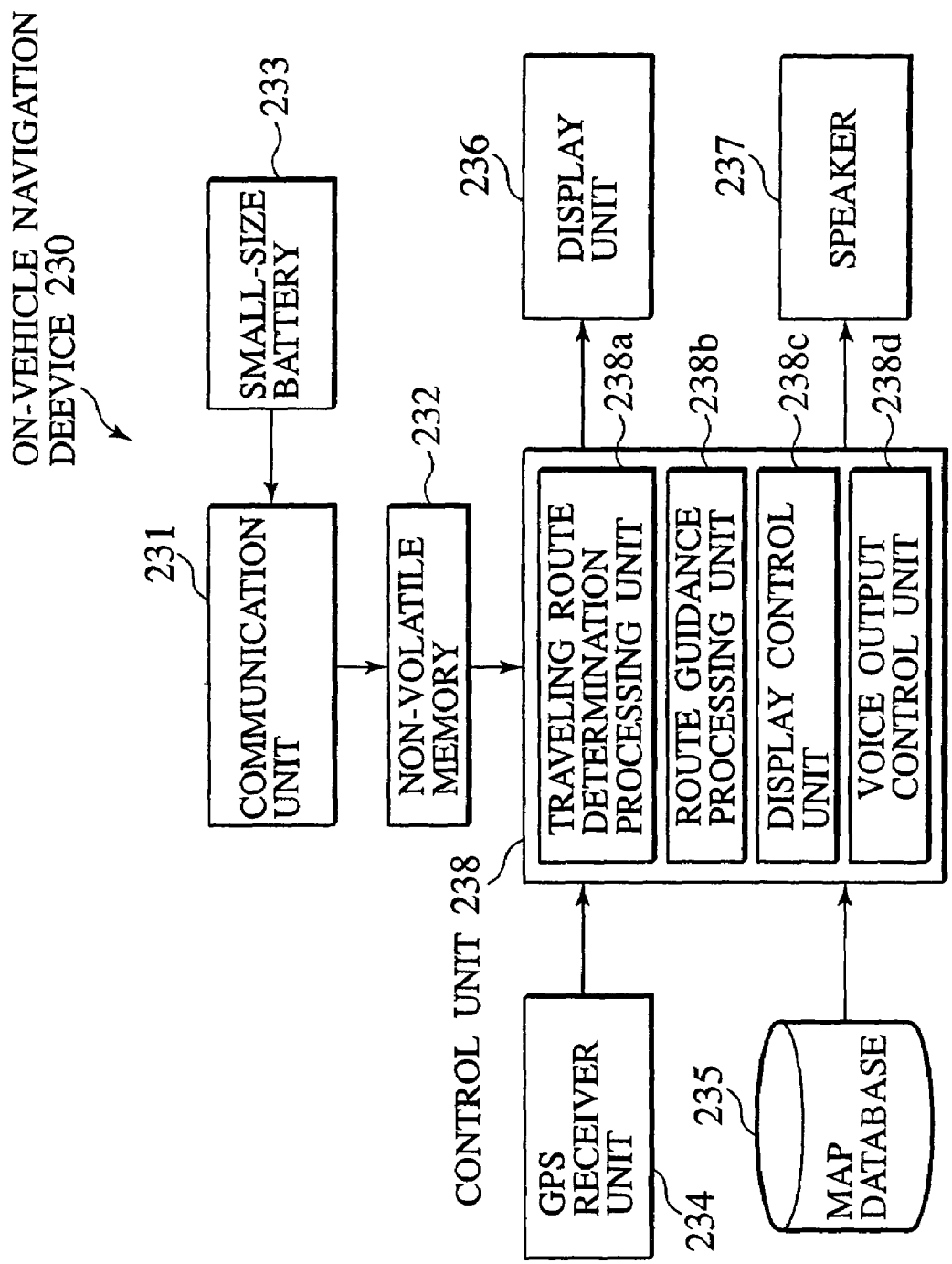
FIG. 50 is a block diagram of an on-vehicle navigation device forming part of the navigation system shown in FIG. 47.

As shown in FIG. 50, the on-vehicle navigation device 230 is comprised of a communication unit 231, a non-volatile memory 232, a small size battery 233, a GPS receiver unit 234, a map database 235, a display unit 236, a speaker 237 and a control unit 238.

The communication unit 231 serves to perform transmission and receipt of data between the communication unit 231 and the radio communication base station 250 over the communication network 240 through radio communication. Area information (area information correlated with code data indicative of the destination and the routed spots read out from the map note with the scanner unit 211 of the portable terminal 210) transmitted from the data server 220 is supplied to the on-vehicle navigation device 230 over the communication network 240 and the radio communication base station 250 and is received with the communication unit 231.

The non-volatile memory 232 is connected to the communication unit 231 to temporarily store area information that is transmitted from the data server 220 to the on-vehicle navigation device 230 and received with the communication unit 231.

The small size battery 233 includes a Li ion battery and is connected to communication unit 231 to be used as a power supply thereof. The presence of power output supplied from the small battery 233 to the communication unit 231 enables the communication unit 231 to be operative for receiving data even when a main power supply is shut off.

The GPS receiver unit 234 receives a GPS signal from a GPS satellite to obtain area information indicative of a current position of the own vehicle on which the on-vehicle navigation device 230 is installed. Area information, indicative of the current position of the own vehicle, obtained from the GPS receiver unit 234 is supplied to the control unit 238.

The map database 235 is comprised of a computer readable medium such as a CD-ROM in which necessary map data is registered. The map database 235 is arranged so as to allow map data of a designated district to be read out in a sequence in accordance with the processing of the control unit 238.

The display unit 236 serves to provide a display of map data and a variety of information, read out from the map database 235, in dependence on control of the control unit 238. Further, the speaker 237 provides a voice for designating a travel direction in dependence on the control unit 238.

The control unit 238 serves to execute an operational control program for controlling entire operation of the on-vehicle navigation device 230. In particular, execution of the operational control program with the control unit 238 allows respective functions of a route establishment processing unit 38a, a route guidance processing unit 238b, a display control unit 238c and a voice output control unit 238d.

The route establishment processing unit 238a serves to execute for establishing a traveling route of the own vehicle on the basis of area information (area information correlated with code data indicative of the destination and the routed spots read out from the print product, such as the map note, with the scanner unit 211 of the portable terminal 210) which is received with the communication unit 231 and temporarily stored in the non-volatile memory 232 and which is transmitted from the data server 220, and area information indicative of the current position of the own vehicle obtained with the GPS receiver unit 234. Namely, upon turning on of the main power supply of the on-vehicle navigation device 230 to start-up the same, the route establishment processing unit 238a reads out area information indicative of the destination and the routed spots from the non-volatile memory 232. Then, the route establishment processing unit 238a establishes the traveling route of the own vehicle starting from the current position of the own vehicle to the destination via the designated routed spots on the basis of area information indicative of the destination and the routed spots read out from the non-volatile memory 232 and area information indicative of the current position of the own vehicle obtained with the GPS receiver unit 234.

The route guidance processing unit 238b serves to guide the own vehicle to allow the same to properly travel along the traveling route established with the route establishment processing unit 238a. In particular, as the traveling route is established with the route establishment processing unit 238a, the route guidance processing unit 238b reads out a desired map data from the map database 235 to provide a display of the same over the display unit 236. In addition, the route guidance processing unit 238b grasps the current position of the own vehicle on the basis of area information obtained with the GPS receiver unit 234, with a subsequent processing being executed to overlay the current position of the own vehicle over the map data to compel the resulting data to be displayed over the display unit 236. Further, when the own vehicle comes nearer to the intersection at which the own vehicle is to be turned right or left, the route guidance processing unit 238b operates to designate the traveling direction of the own vehicle by means of the voice outputted from the speaker 237.

The display control unit 238c serves to control the operation of the display unit 236 in dependence on the processing of the route guidance processing unit 238b, with the desired map data and associated various information being displayed over the display unit 236.

The voice output control unit 238d serves to control the operation of the speaker 237 in dependence on the processing of the route guidance processing unit 238b, thereby causing the speaker 237 to produce the voice for designating the traveling direction of the own vehicle.

Figure 51B:
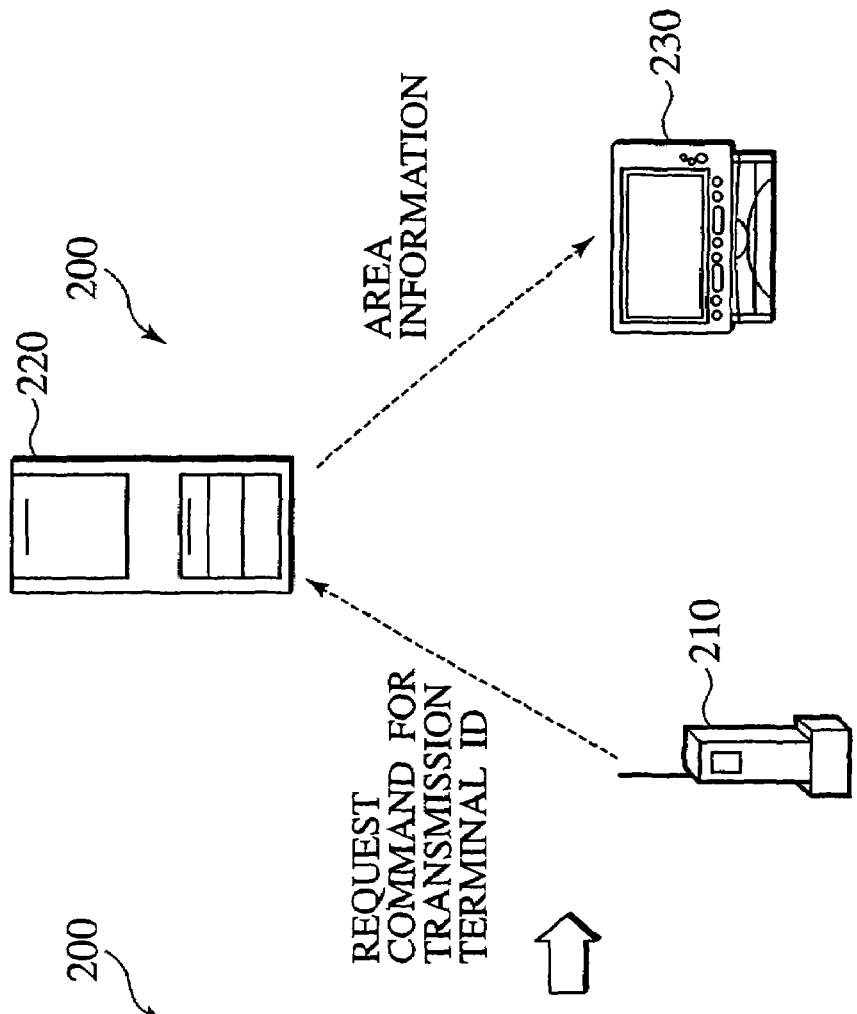
FIGS. 51A and 51B are typical views showing examples in which the navigation system of the twelfth embodiment is applied, with FIG. 51A illustrating a mode in which code data are transmitted from the portable terminal to a data server and FIG. 51B illustrating another mode in which area information is transmitted from the data server to the on-vehicle navigation device.
Figure 51A:
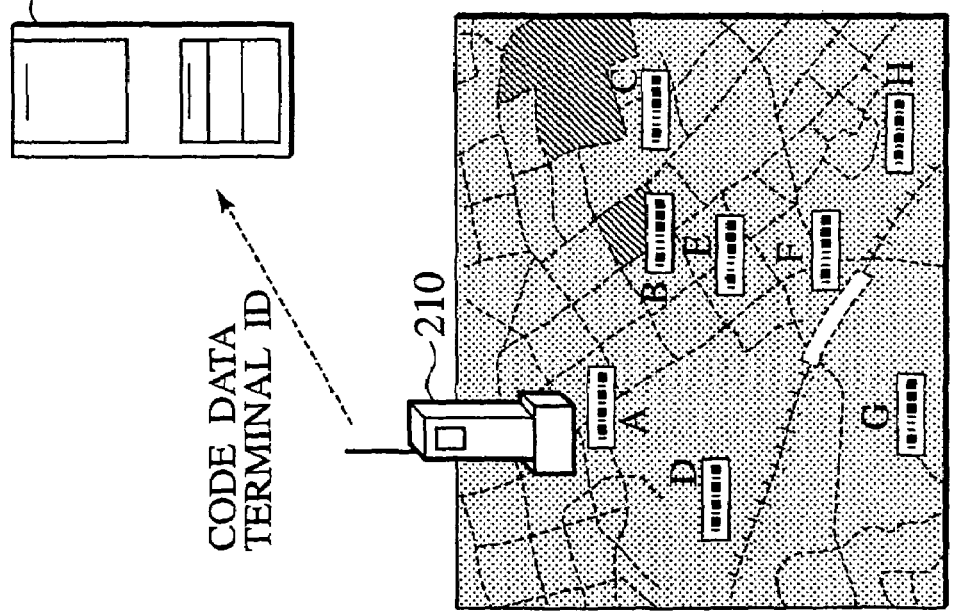

With such a structure of the navigation system 200 set forth above, when preparing a drive plan outside the own vehicle in a user's home, as shown in FIG. 51A, using the scanner unit 211 of the particular portable terminal 210 and reading out code data such as the bar codes printed on the print product such as the map note enables the user to designate a desired destination and routed spots. When this takes place, the control unit 217 allows the display unit 215 to provide a display of an image indicative of a relative positional relationship between the designated destination and routed posts whereby when the user refers to the display unit 215 of the portable terminal 210, the user is able to confirm if the destination and the routed spots are correctly inputted. Further, the control unit 217 is also configured to allow the display unit 215 to provide a display of a compiled screen to assist the user when compiling such as deleting or additionally inserting code data indicative of the destination and routed spots. Thus, referring to the display unit 215 of the portable terminal 210 enables the user to use the operational input unit 212 of the portable terminal 210 for compiling, such as deleting or additionally inserting, code data. Furthermore, the control unit 217 is also configured to allow the display unit 215 to provide a list of display of information correlated with plural code data temporarily stored in the code data memory unit 217a, i.e., time information and area information, obtained with the time/area information acquire unit 213 when such plural code data are read out with the scanner unit 211, as well as the destination and routed spots for plural code data to determine the one traveling route. Thus, the user is enabled to select plural code data among these lists for determining a desired traveling route.

Then, after termination of completely reading out of desired code data through the use of the scanner unit 211 of the portable terminal 210, using the operational input unit 212 of the portable terminal 21 to execute the operational input for code data to be transmitted enables code data, indicative of the destination and routed spots, read out from the print product such as the map note with the scanner unit 211 to be transmitted, together with the terminal ID indicative of identification information of the portable terminal 210, to the data server 220.

Also, upon receipt of code data, indicative of the destination and routed spots, and the terminal ID transmitted from the portable terminal 210, the data server 220 operates to convert such code data into area information indicative of a designated position on a detailed coordinate system of the designated destination and routed spots, with converted area information being stored in the information storage unit 223 in correlation with the terminal ID.

In subsequent step, when the user rides on the own vehicle and uses the operational input unit 212 of the portable terminal 210 for executing the operational input to request area information of the desired destination and routed spots to be transmitted to the on-vehicle navigation device 230, as shown in FIG. 51B, the portable terminal 210 issues a request command, for request of area information to be transmitted, and the terminal ID, indicative of identification information of the particular portable terminal 210, which are transmitted to the data server 220. Upon receipt of such a request command for requesting area information to be transmitted, the data server 220 reads out particular area information, indicative of the desired destination and routed spots designated by the user, from the area information storage unit 223, with read out area information being transmitted again to the on-vehicle navigation device 230.

Upon receipt of area information transmitted from the data server 220, the on-vehicle navigation device 230 serves to store received area information in the non-volatile memory 232 until the main power supply is turned on. Subsequently, when the main power supply is turned on, the on-vehicle navigation device 230 reads out area information stored in the non-volatile memory 232 and, on the basis of read out area information, operates to establish a desired traveling route for the own vehicle to enable the own vehicle to be guided on a path determined with the traveling route.

Figure 52:
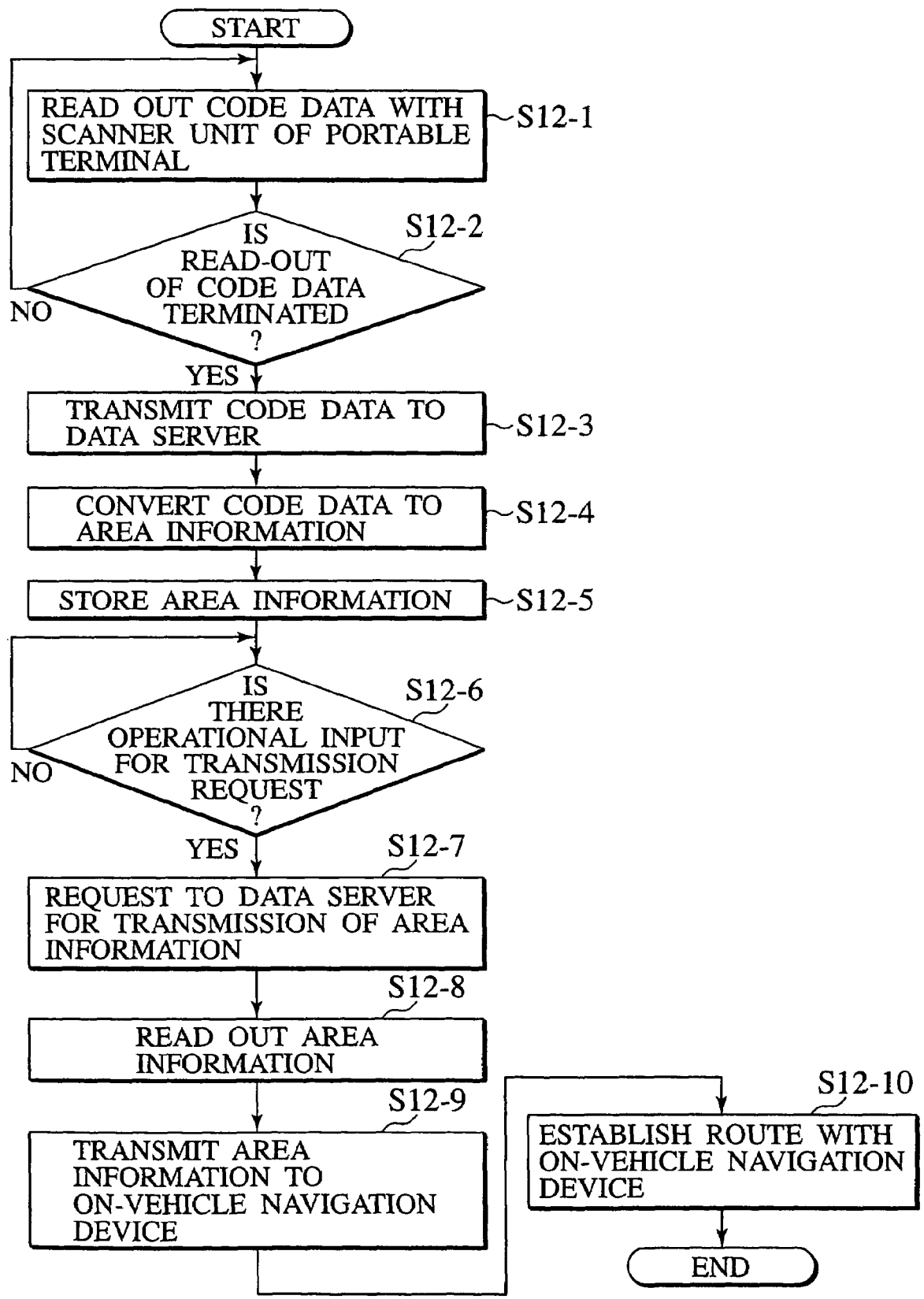
FIG. 52 is a flow chart illustrating the basic sequence of operations of the navigation system shown in FIG. 47.

Now, the basic sequence of operations of the navigation system 200 is described below in detail with reference to a flow chart of FIG. 52.

First, in step S12-1, in response to user's operation, code data indicative of the destination and routed spots is read out from the print product such as the map note with the scanner unit 211 of the portable terminal 210. The code data read out with the scanner unit 211 is added with a number of a sequence order, which the reading out executed, and a routed spot number depending on the user's operational input through the use of the operational input and is temporarily stored in the code data memory unit 217a of the controller 217 for plural code data indicative of the series of destinations and routed spots for determining one traveling route. Further, when code data is read out with the scanner unit 211, the beep sound is produced by the speaker 215 in dependence on control of the voice output control unit 217e of the controller 217 to provide an indication that code data has been read out.

Further, when code data is read out with the scanner unit 211, the display unit 215 of the portable terminal 210 provides a display of information related to read out code data depending on a controlled status of the display control unit 217d. Here, information correlated to code data to be displayed over the display unit 215 may be comprised of numeral rows or character rows indicative of respective code data, but use of the numeral rows or the character rows undergoes a difficulty in instantaneously grasping the positional relationship of the destination and routed spots represented with read out code data. To address this issue, the display control unit 217d operates to calculate the relative positional relationship of the destinations and routed spots represented with respective code data when code data are read out with the scanner unit 211, with the display unit 215 being enabled to provide a display of an image of the relative positional relationship between the destination and the routed spots as viewed in FIG. 53.

More particularly, in a case where code data read out with the scanner unit 211 contain area information such as area information of the latitude and the longitude or the map code, the display control unit 217d executes the operation to cause area information to be correlated with the coordinate system of the display unit 215 to allow the display unit 215 to provide a display of the image indicative of the relative positional relationship of the destination ad routed spots represented with respective code data. On the contrary, in a case where code data read out with the scanner unit 211 do not contain area information, these code data are transmitted from the communication unit 214 to the data server 220 and, then, these code data are converted into area information with the data server 220. Converted area information are obtained from the data server 220 and are correlated with the coordinate of the display unit 215 to cause the display unit 215 to provide a display of the image indicative of the relative positional relationship of the destinations and routed spots represented with respective code data. Allowing the display unit 215 of the portable terminal 210 to provide the display of the image indicative of the relative positional relationship of the destination and routed spots represented with code data read out with the scanner unit 211 in such a manner set forth above enables the user to read in code data at a site while confirming whether the destination and routed spots are correctly inputted. That is, in a situation in which the user intends to designate the destination and routed spots on a route as viewed in FIG. 53 but, in actual practice, the user happens to input an erroneous route as viewed in FIG. 54, it is possible for the user to instantaneously recognize such an erroneous input operation.

Moreover, if the erroneous input operations of the destination and routed spots arise, then, the user utilizes the operational input unit 212 or executes the operational input for compiling the destination and routed spots by reading in the code data such as the bar code commanding the compiling operation. When this takes place, the display control unit 217d of the control unit 217 executes control to allow the display unit 215 of the portable terminal 210 to provide a display of the compiling screen for compiling such as deletion or additional insertion of code data indicative of the destination and routed spots. Then, while referring to the compiling screen of the display unit 215, the user executed the operational input using the operational input unit 212 enables code data to be deleted or additionally inserted in the compiling operation.

Figure 53:
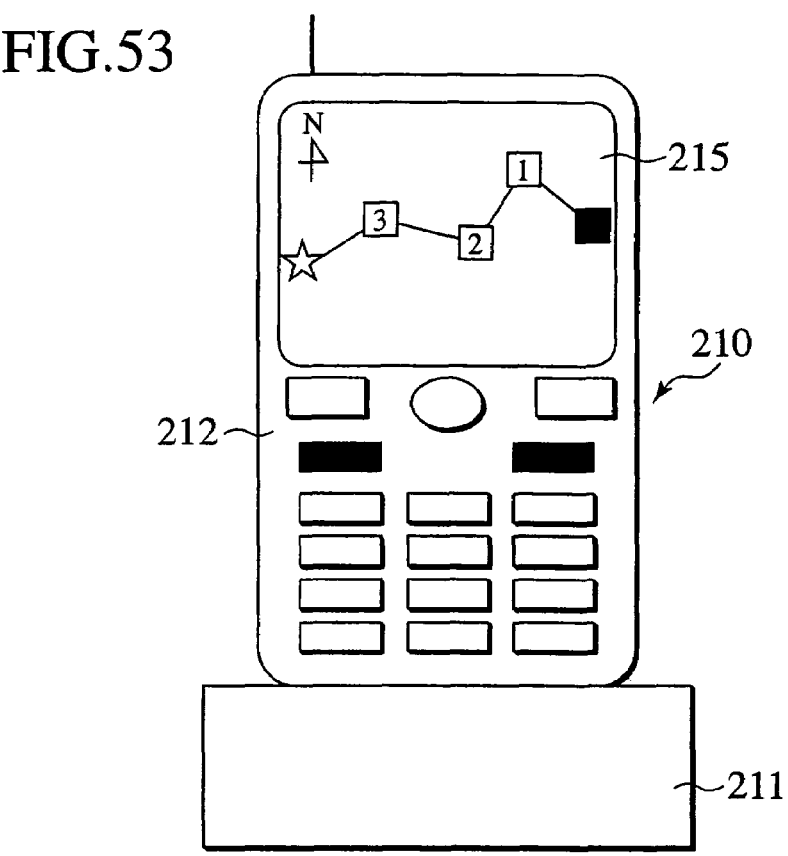
FIG. 53 is a view illustrating the portable terminal with a display unit provided with a display of an image showing a relative positional relationship related to a destination and routed spots.
Figure 54:
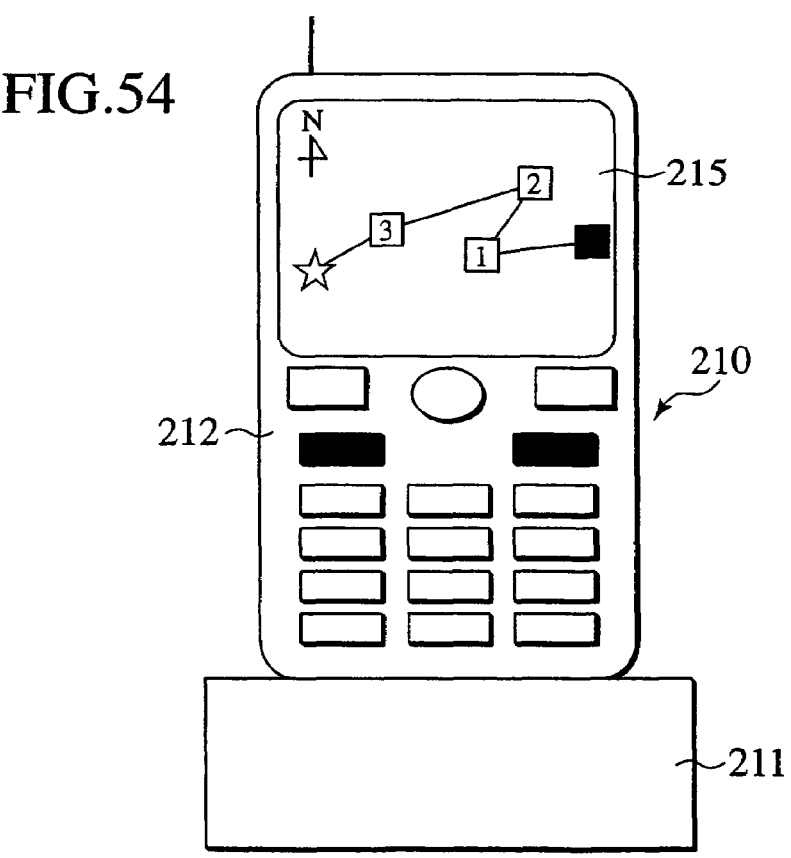
FIG. 54 is a view illustrating the portable terminal with the display unit provided with a display of the image showing the relative positional relationship related to the destination and routed spots in a situation in which the destination and routed spots are erroneously inputted.
Figure 55:
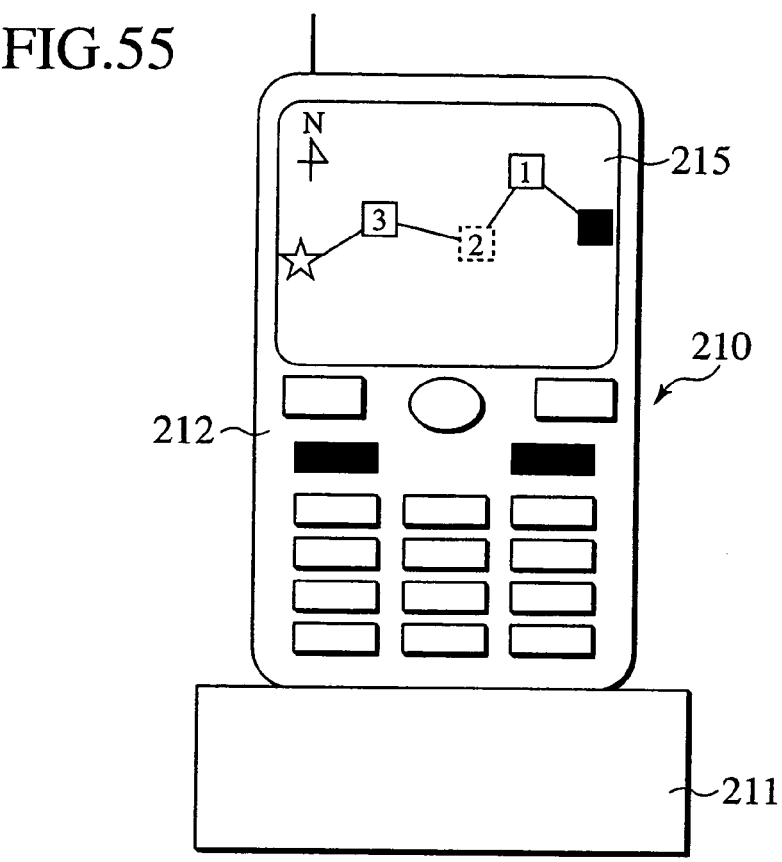
FIG. 55 is a view illustrating the portable terminal with the display unit provided with a display of a screen to be deleted.

More particularly, when an input is applied by the user to provide a command for deleting the destination and routed spots, the display unit 215 provides a display of a deletion screen with a description of the character row indicative of the deletion screen in a screen surface by flashing on and off an icon indicative of the destination on the display unit 215 shown in FIG. 53. Then, the user operates to alter the icon, which is flashing on and off, by executing the operational input through the use of the operational input unit 212 whereupon the user operates to allow the icon indicative of the destination to be deleted, i.e., to render the icon indicative of the routed spot of the routed spot number "2" as viewed in FIG. 55 to be flashed on and off and executes an input for designating a determination. When this takes place, this command input is received with the compilation processing unit 217b of the control unit 217 to allow the operation to be executed to delete code data indicative of the routed spot of the routed spot number stored in the code data memory unit 217a.

Figure 56:
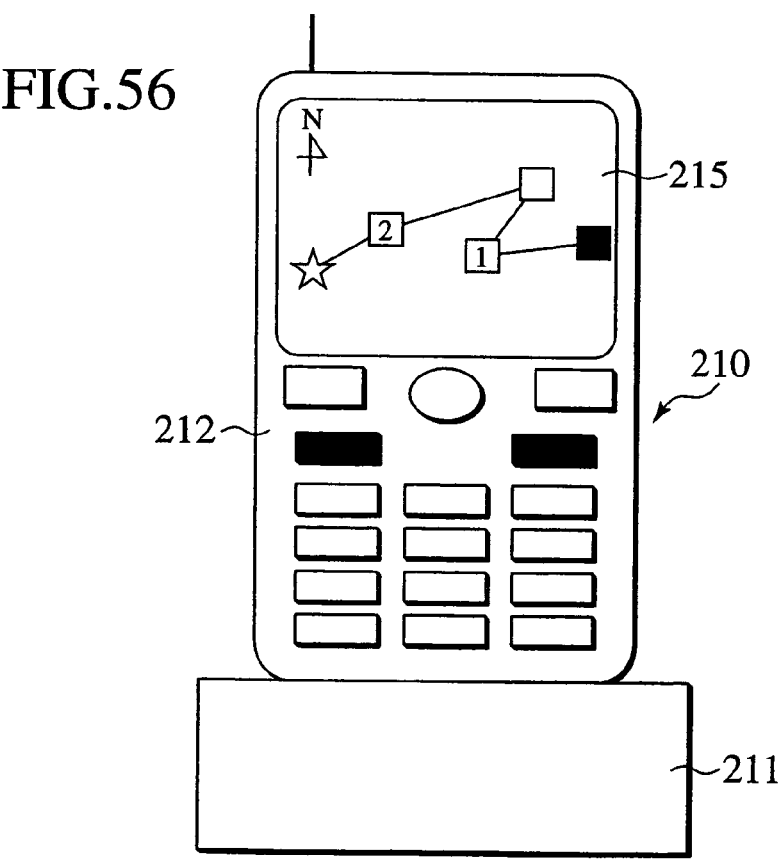
FIG. 56 is a view illustrating the portable terminal with the display unit provided with a display of a screen to be additionally inserted.

Also, when an input is applied by the user to provide a command for additionally inserting the destination and routed spots, the display unit 215 provides a display of an additionally insertion screen with a description of the character row indicative of the additionally insertion screen on the screen surface by flashing on and off an icon indicative of the additionally insertion on the display unit 215 shown in FIG. 53. Then, the user operates to alter the icon, which is flashing on and off, by executing the operational input through the use of the operational input unit 212 whereupon the user further operates to allow the icon indicative of a destination next to the routed spot to be additionally inserted, i.e., to render the icon indicative of the routed spot of the routed spot number "2" as viewed in FIG. 56 to be flashed on and off and executes an input for reading out code data of the routed spot to be additionally inserted. When this takes place, the compilation processing unit 217b of the control unit 217 allows code data of the routed spot read out with the scanner unit 211 to be stored in the code data memory unit 217a while additionally inserting the routed spot, shown in a solid frame in FIG. 56, into an area between the routed spot number "1" and the routed spot number "2" for thereby executing to allocate the routed spot number again.

In next step S12-2, the user executes the operation input indicative of termination of reading-out operation with the operation input unit 212 of the portable terminal 210. Alternatively, the scanner unit 211 reads out code data indicative of the termination of the reading-out operation. With such operation, the controller 217 of the portable terminal 210 operates to discriminate as to whether or not the command is issued by the user to indicate the termination of the reading-out operation of code data for designating the desired destination and routed spots.

Figure 57:
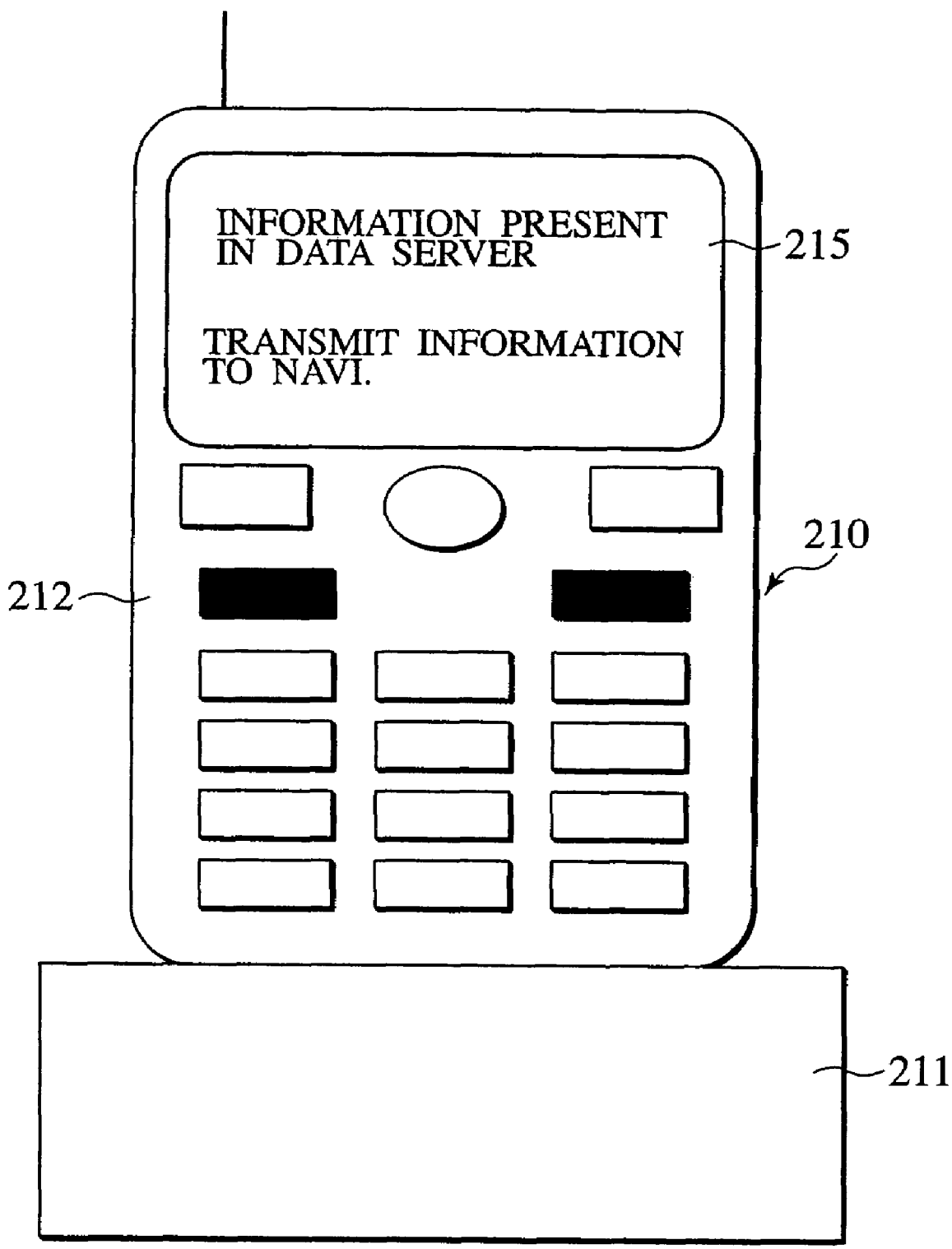
FIG. 57 is a view illustrating the portable terminal with the display unit provided with a display of information indicative of a situation in which read out code data are transmitted to a data server.

Upon discrimination of the command indicating that the reading-out of code data has been terminated, then in step S12-3, code data indicative of the destination and routed spots temporarily stored in the code data memory unit 217a is read out from the code data memory unit 217a either in response to the user's operation input or in an automatic fashion, with read out code data as well as the terminal ID indicative of identification information of the particular portable terminal 210 being transmitted from the communication unit 214 to the data server 220 over the radio communication base station 250 and the communication network 240. Further, when this takes place, in response to control of the display control unit 217d of the controller 217, the display unit 215 is provided with a display of information indicating that code data has been transmitted to the data server 220 as viewed in FIG. 57.

In the meantime, when the user comes up with an idea of a new drive plan during looking at the print product such as the map note printed with code data, in an actual practice, it is desired for the idea of the drive plan to be preserved even in the absence of a schedule of traveling the own vehicle. In such a case, after the reading out operation of code data for designating the destination and routed spots has been terminated, code data indicative of the destination and routed spots are stored in the code data memory unit 17a of the portable terminal 210 without such code data being transmitted to the data server 220. During such operation, these code data are correlated with time information, area information, obtained with the time/area information acquire unit 213, and the names of the destinations for plural code data indicative of the series of the destination and routed spots to determine one traveling route, and are stored in the code data memory unit 217*a*.

Figure 58:
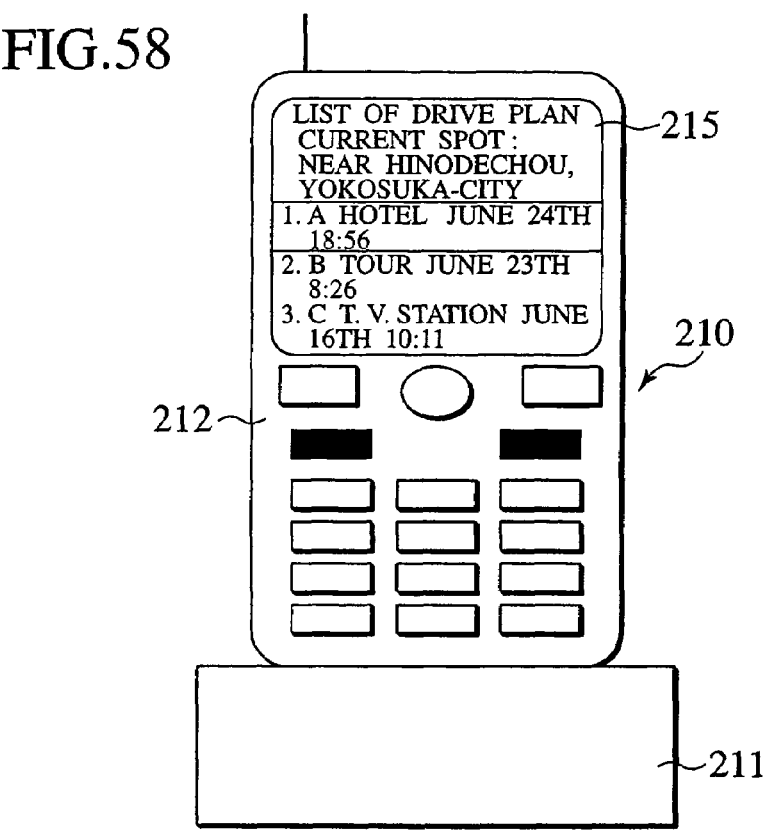
FIG. 58 is a view illustrating the portable terminal with the display unit provided with a display of a list of information corresponding to read out data.

If the operation input is made by the user through the use of the operational input unit 212, the display control unit 217*a* controls the display unit 215 to cause the same to provide a display of a list of information, correlated with these code data, i.e., more particularly, time information and area information, obtained with the time/area information acquire unit 213, and the name of the destination as viewed in FIG. 58 when these code data are read out. Thus, the user is enabled to select plural code data for determining a desired traveling route among the list of information.

Figure 59:
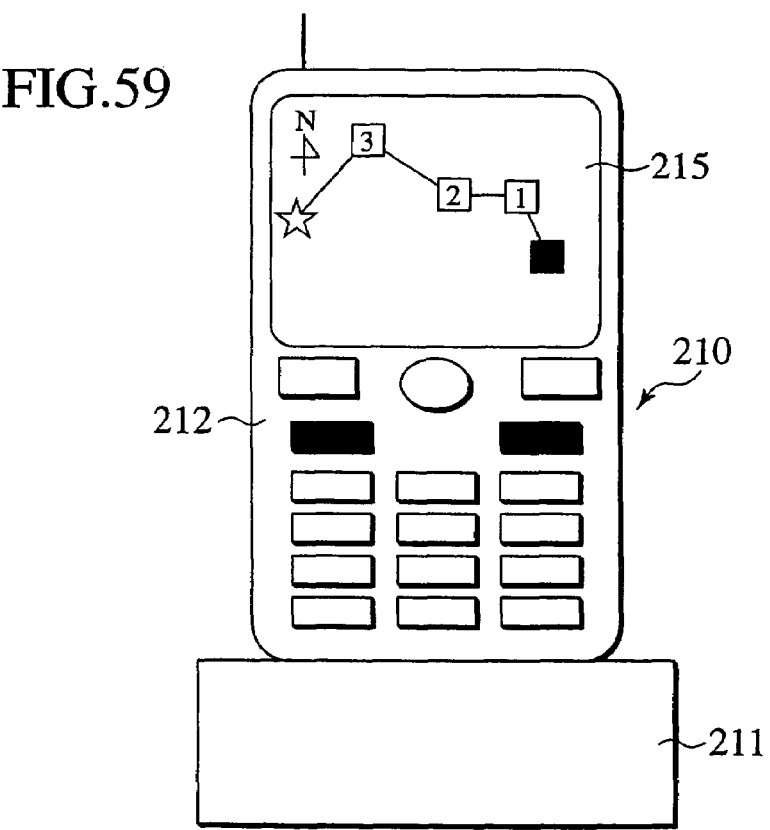
FIG. 59 is a view illustrating the portable terminal with the display unit provided with a display of an image of the relative positional relationship of the destination and routed spots.

Here, as the user uses the operational input unit 212 and selects plural code data for establishing a desired traveling route, i.e., when the user selects code data indicative of the series of destination and routed spots, the display control unit 217*a* controls the display unit 215 such that it provides a display of an image indicative of the relative positional relationship of the destination and routed spots as viewed in FIG. 59. Then, as the user refers to the image displayed over the display unit 215 and operates the operational input unit 212 to input a command for code data indicative of the destination and routed spots to be transmitted to the data server 220, the selection processing unit 217*c* executes to cause code data indicative of the destination and routed spots to be read out from the code data memory unit 217*a*, with read out code data being transmitted with the terminal ID forming identification information of the portable terminal 210 from the communication unit 214 to the data server 220 over the radio communication base station 250 and the communication network 240.

With code data, indicative of the destination and routed spots designated by the user, being transmitted from the portable terminal 210, the communication control unit 221 of the data server 210 receives such code data. In subsequent step S12-4, code data transmitted from the portable terminal 210 is converted into area information with the code data analysis processing unit 224*a* of the control unit 224. In succeeding step S12-5, under the control of the write-in/read-out control unit 224*c*, such area information is stored in the area information storage unit 223 in correlation with the terminal ID. Also, when the code data analysis processing unit 224*a* of the control unit 224 operates to convert code data into area information, the code data analysis processing unit 224*a* is operative to specify a model of the on-vehicle navigation device 230, to which area information is to be transmitted, on the basis of an on-vehicle navigation ID indicative of identification information of the on-vehicle navigation device 230 stored in the user information database 222, while converting code data into area information so as to comply with a data format of map data treated in the on-vehicle navigation device 230.

In next step S12-6, the controller 217 of the portable terminal 210 discriminates whether the operational input is executed by the user through the use of the operational input unit 212 of the portable terminal 210 to provide a request command for area information, stored in the data server 220, to be transmitted to the on-vehicle navigation device 230.

When it is discriminated that the request command is issued for requesting area information, stored in the data server 220, to be transmitted to the on-vehicle navigation device 230, then in step S12-7, the compilation processing unit 217*b* of the controller 217 generates an instruction command on transmitting area information. Then, the instruction command and the terminal ID are transmitted from the communication unit 214 to the data server 220 over the communication network 240 and the radio communication base station 250.

With the request command on transmitting area information being issued from the portable terminal 210, the communication control unit 221 of the data server 220 receives this request command. In step S12-8, the request command is analyzed with the command analysis processing unit 224*b* of the control unit 224 and, in response to such a request command, the writ-in/read-out control unit 224*c* of the control unit 224 reads out area information stored in the area information storage unit 223 on the basis of the terminal ID. In succeeding step S12-9, area information read out from the area information storage unit 223 is transmitted from the communication control unit 221 to the relevant on-vehicle navigation device 230, to which transmission of area information is designated, over the communication network 240 and the radio communication base station 250.

Area information transmitted to the on-vehicle navigation device 230 is received with the communication unit 231 and temporarily stored in the non-volatile memory 232 until the main power supply of the on-vehicle navigation device 230 is turned on. With the main power supply of the on-vehicle navigation device 230 being turned on, operation proceeds to read out area information stored in the non-volatile memory 232, i.e., area information indicative of the destination and routed spots designated by the user. In subsequent step S12-10, on the basis of area information read out from the non-volatile memory unit 232 and area information indicative of the current position of the own vehicle obtained with the GPS receiver unit 234, a desired traveling route of the own vehicle is established with the route establishment processing unit 238*a*. Then, the navigation system 200 conducts a route guidance with the route guidance processing unit 238*b* in accordance with the traveling route established with the route establishment processing unit 38*a*, completing a series of operations.

With the navigation system 200 set forth above, when code data indicative of the destination and routed spots are read out with the scanner unit 211 of the portable terminal 210 due to user's operation, since the display control unit 217*d* of the control unit 217 renders the display unit 215 operative to provide the display of the image indicative of the relative positional relationship of the destination and routed spots represented with these code data, it is possible for the user to refer to the image displayed over the display unit 215 of the portable terminal 210 to confirm if the destination and routed spots are correctly inputted, providing an ease for the user to properly input desired information of the destination and routed spots.

With the navigation system 200 set forth above, further, since the compiled screen is displayed over the display unit 215 of the portable terminal 210 in dependence on the operational inputs executed by the user, the user is enabled to compile code data read out with the scanner unit 211 of the portable terminal 210 while confirming the compile contents referring to the compiled screen and, hence, it is possible for the user to perform a compiling work, such as deletion and additional insertion of the destination and routed spots, in an easy and appropriate fashion.

With the navigation system 200 described above, furthermore, since code data read out with the scanner unit 211 of the portable terminal 210 are stored in the code data memory unit 217*a* together with information indicative of time at which the reading out operation is carried out and a location at which the reading out operation is conducted to allow information correlated with code data stored in the code data memory unit 217a to be displayed in a list over the display unit 215 of the portable terminal 210 on request, the user is enabled to prepare a drive plan at a desired time and at a desired site to compel the destination and routed spots to be stored in the portable terminal 210 and to confirm the contents of information referring to the list of information displayed over the display unit 215 of the portable terminal 210 if desired. Also, transmitting code data, selected by the user from the list of information displayed over the display unit 215 of the portable terminal 210, to the data server 220 enables the user to read out the drive plan, which has been prepared in the past, at a desired timing to compel the on-vehicle navigation device 230 to establish a traveling route based on the read out drive plan.

While the navigation system 200 has been described as one example in which a concept of the present invention is applied, the present invention is not limited to the precise construction stated above and many alternatives, modifications, and variations will be apparent to those skilled in the art without departing from the scope of the present invention. More particularly, although the navigation system 200 is structured to compel the display control unit 217d of the control unit 217 of the portable terminal 210 to determine various information of the characters and images to be displayed over the display unit 215, the data server 220 may be configured to have a function of determining the contents to be displayed over the display unit 215 of the portable terminal 210 to deliver display data from the data server 210 to the portable terminal 210 which in turn provides a display of various information depending on display data.

Figure 60:
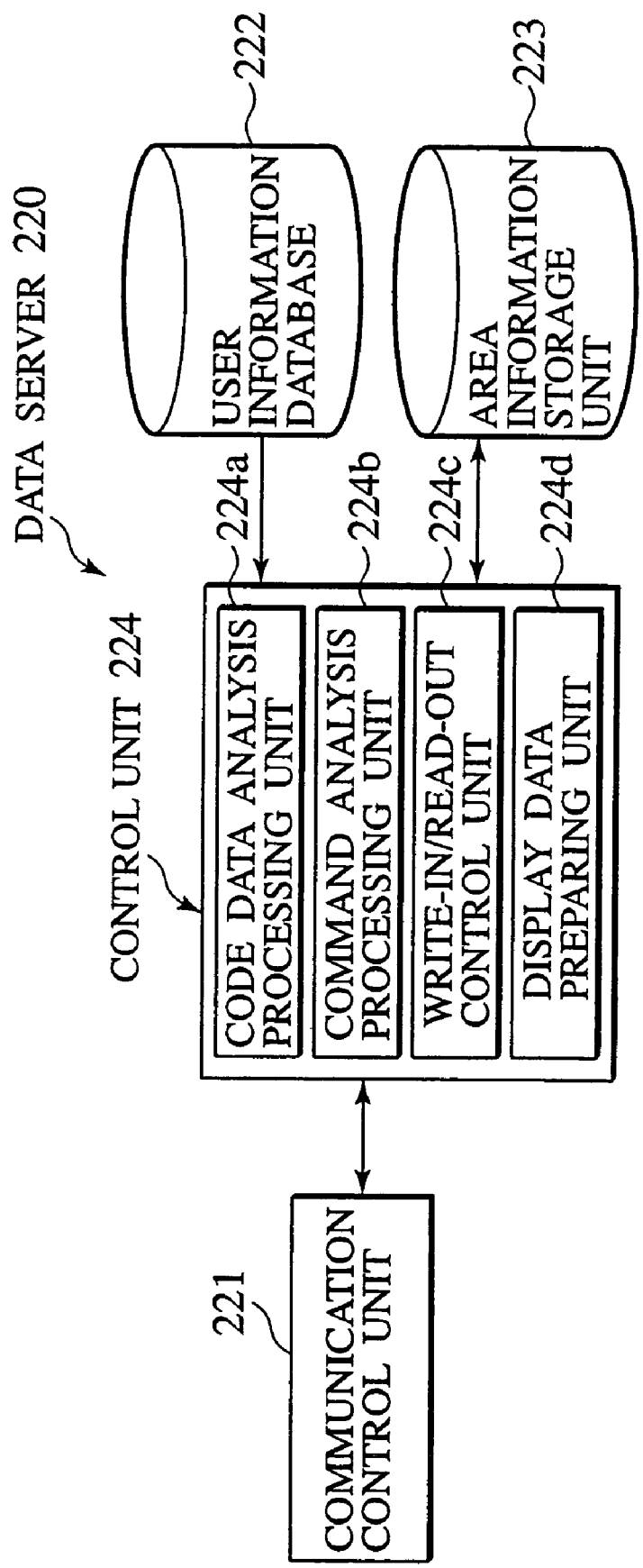
FIG. 60 is a block diagram of an alternative form of the data server shown in FIG. 49.

With such alteration, as shown in FIG. 60, the control unit 224 of the data server 220 includes the code data analysis processing unit 224a, the command analysis processing unit 22ab and the write-in/read-out control unit 224c and, in addition thereto, includes a display data preparing (producing) unit 224d which produces display data of various information, correlated with code data received from the portable terminal 210, to be displayed over the display unit 215 of the portable terminal 210. The display data preparing unit 224d is configured to receive a plurality of code data, indicative of a series of destination and routed spots for determining one traveling route, from the portable terminal 210 and, in response thereto, operates to calculate the relative positional relationship of the destination and routed spots represented with respective code data for producing display data to cause the display unit 215 of the portable terminal 210 to provide the display of the image of the relative positional relationship of the destination and routed spots. Under such a state, if display data prepared with the display data preparing unit 224d is requested by the user to be transmitted to the portable terminal 210, then, the control unit 224 of the data server 220 transmits display data to the portable terminal 210 on request such that the display unit 215 provides the display of the image indicative of the relative positional relationship of the destination and routed spots.

Further, with the alteration described above, the control unit 224 of the data server 220 may be configured to have a function corresponding to the compilation processing unit 217d of the portable terminal 210 and to compel the compiled contents executed with the compilation processing section to be displayed over the portable terminal 210. In such a case, the display data preparing unit 224d of the control unit 224 of the data server 220 prepares display data for each compilation processing operation to be executed in the compilation processing section to compel the compiled contents to be displayed over the display unit 215. Display data prepared with the display data preparing unit 224d is transmitted to the portable terminal 210 on request from the portable terminal 210, permitting the display unit 215 of the portable terminal 210 to provide a display of information indicative of the compiled contents executed in the compilation processing section of the data server 220.

Furthermore, the area information storage unit 223 of the data server 220 may be configured to store area information, correlated with code data transmitted form the portable terminal 210, together with information of the time and location at which the reading operation is executed, providing a capability for the display unit 215 of the portable terminal 210 to provide a display of these information in a list. In this respect, the display data preparing unit 224d realized in the control unit 224 of the data server 220 is configured to respond to the request from the portable terminal 210 for the list of information to be transmitted to the portable terminal and, to this end, prepares display data of the list, to be displayed over the display unit 215 of the portable terminal 210, referring to the area information storage unit 223. Then, with display data prepared in the display data preparing unit 224d of the control unit 224 being transmitted from the data server 220, the display unit 215 of the portable terminal 210 is operative to provide the display of the list of information of the time ad location at which the reading out operation of code data is executed.

Moreover, while the navigation system 200 has been described in conjunction with a case in which code data is read out from the print product such as the map note using the portable terminal 210 with read out code data being transmitted to the data server 220, it is apparent to those skilled in the art that the portable terminal 210 may be replaced with a fixed type information processing terminal such as a personal computer placed either in the user's house or user's job site. In such a case, a small size scanner may be coupled to the fixed type information processing terminal to which a program is installed to render the same to play roles as the code data memory unit 217a, the compilation processing unit 217b, the selection processing unit 217c, the display control unit 217d and the voice output control unit 217e.

(Modified Form of Navigation System 200)

A modified form 200A of the navigation system is described below in conjunction with FIG. 61 that shows a data server 220A. The navigation system 200A has the same basic structure as that shown in FIG. 47 except for the data server 220A and a portable terminal 210A shown in FIG. 62 and, therefore, a detailed description will be given below with reference to the data server 220A and the portable terminal 210A. The portable terminal 210A has the same principal structure as that shown in FIG. 48 with a slight modification being made in the display control unit 217d. More particularly, the navigation system 200A differs from the structure shown in FIG. 47 in that, when code data indicative of the destination and routed spots are read out with the scanner unit 211 of the portable terminal 210, the navigation system 200 is operative to compel the display unit 215 of the portable terminal 210 to provide the display of the image indicative of the relative positional relationship of the destination and routed spots whereas, with the navigation system 200A, when code data indicative of the destination and routed spots are read out with the scanner unit of the portable terminal 210A, the display control unit of the portable terminal 210A is operative to control the display unit of the portable terminal 210A such that it provides a display of an image indicative of a positional relationship associated with a principal road to which the destination and routed spots belong.

Figure 61:
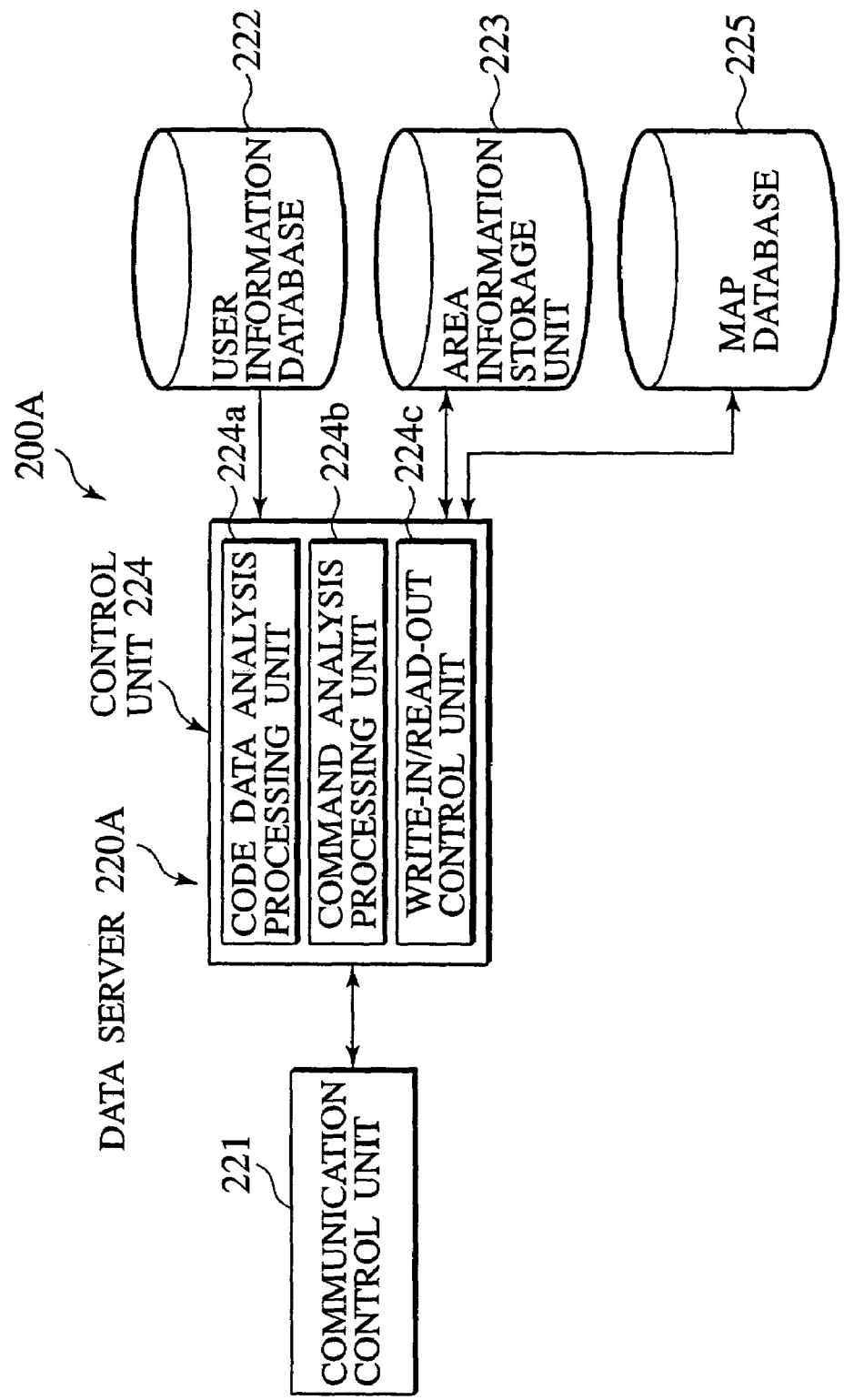
FIG. 61 is a block diagram of a modified form of the data server shown in FIG. 49.
Figure 62:
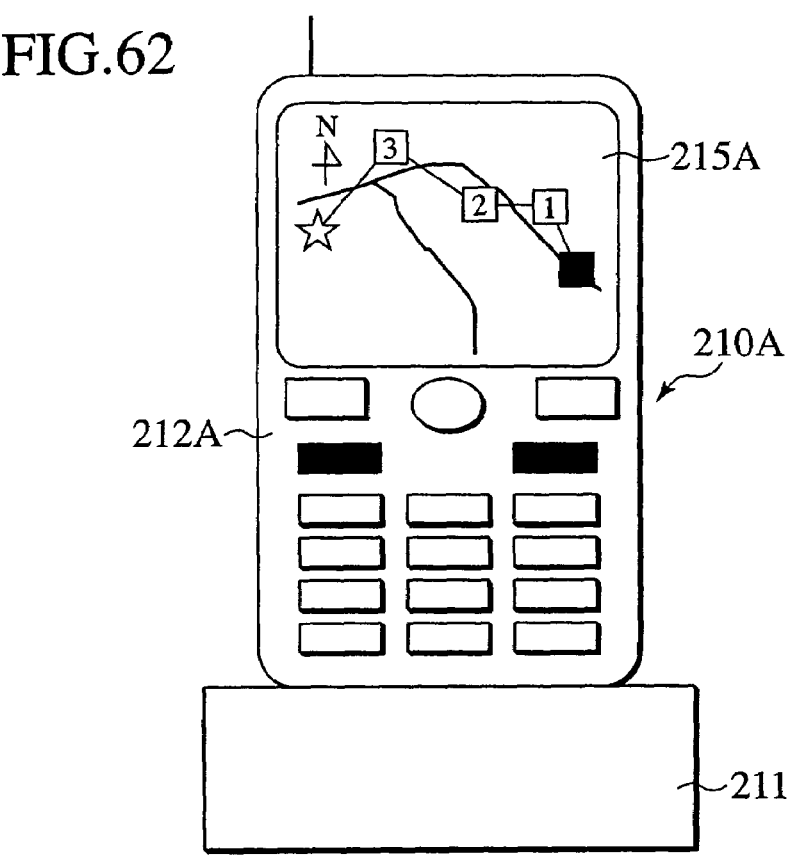
FIG. 62 is a view illustrating the portable terminal with the display unit provided with a display of an image of the relative positional relationship of the destination and routed spots.

More particularly, as shown in FIG. 61, the data server 220A includes a map database 225 in addition to the other component parts that have been previously described, with the map database storing map data to allow map data to be delivered. With such a structure, if the communication control unit 221 of the data server 220A receives the request command from the portable terminal 210A for delivering data of principal roads in a district covering the destination and routed spots indicative of code data read out with the scanner unit 211A of the portable terminal 210A, the data server 220A is operative to read out data of the relevant principal roads from the map database 225 and transmit the same to the portable terminal 210A. Upon receipt of data of the relevant principal road, the display control unit of the control unit of the portable terminal 210A is responsive to display data supplied from the data server 220A and compels the display unit 215A of the portable terminal 210A to provide a display of an image indicative of the positional relationship between the relevant principal roads and the destination and routed spots as viewed in FIG. 62.

With the navigation system 200A, when the user reads out code data indicative of the destination and routed spots using the scanner unit 211A of the portable terminal 210A, since the display unit 215A of the portable terminal 210A is rendered operative to provide the display of the image indicative of the positional relationship between the destination and routed spots, represented with these code data, and the principal roads, the user is able to precisely confirm if the locations of the destination and routed spots are correctly inputted by referring to the image indicative of the positional relationship between the destination and routed spots and the relevant principal roads displayed over the display unit 215A of the portable terminal 210A.

(Alternative of Navigation System 200A)

With the navigation system 200A set forth above, further, the display unit 215A of the portable terminal 210A may be arranged to provide a display of an image indicative of the positional relationship between the destination and routed spots and the relevant principal roads in response to display data supplied from the data server 220A, like in the navigation system 200 of the twelfth embodiment.

Figure 63:
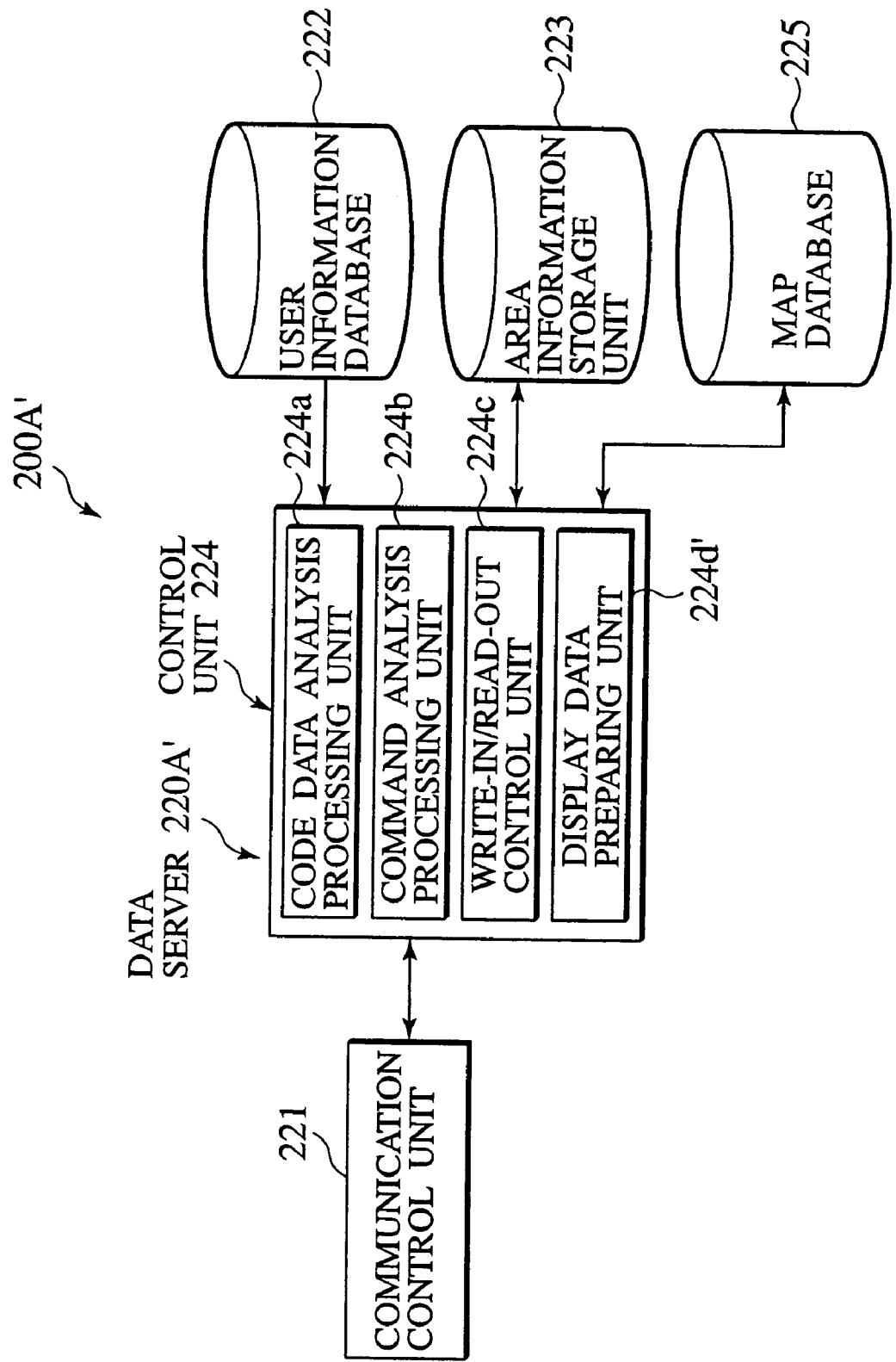
FIG. 63 is a block diagram of another alternative form of the data server shown in FIG. 49.

Such an alternative may be realized with a navigation system 200A' which incorporates a data server 220A' in which a display data preparing unit 224d' is additionally provided as viewed in FIG. 63, with like parts bearing the same reference numerals as those of the data server 220 shown in FIG. 60 to omit redundant description of the same component parts. The display data preparing unit 224d' is configured to be responsive to a plurality of code data, indicative of a series of destination and routed spots for determining one traveling route, transmitted from the portable terminal 210A and obtain information of the relevant principal roads of the district covering the destination and routed spots represented with respective code data to calculate the positional relationship between the destination and routed spots and the relevant principal roads, with display data being prepared to cause the display unit 215A of the portable terminal 210A to provide a display of an image of resulting positional relationship between the destination and routed spots and the relevant principal roads. Upon request made by the portable terminal 210A for transmission of display data, prepared with the display data preparing unit 224d', such display data is transmitted from the data server 220A' to the portable terminal 210A to allow the display unit 215A to provide the display of the image of the positional relationship between the destination and routed spots and the principal roads.

(Another Modified Form of Navigation System 200)

Figure 64:
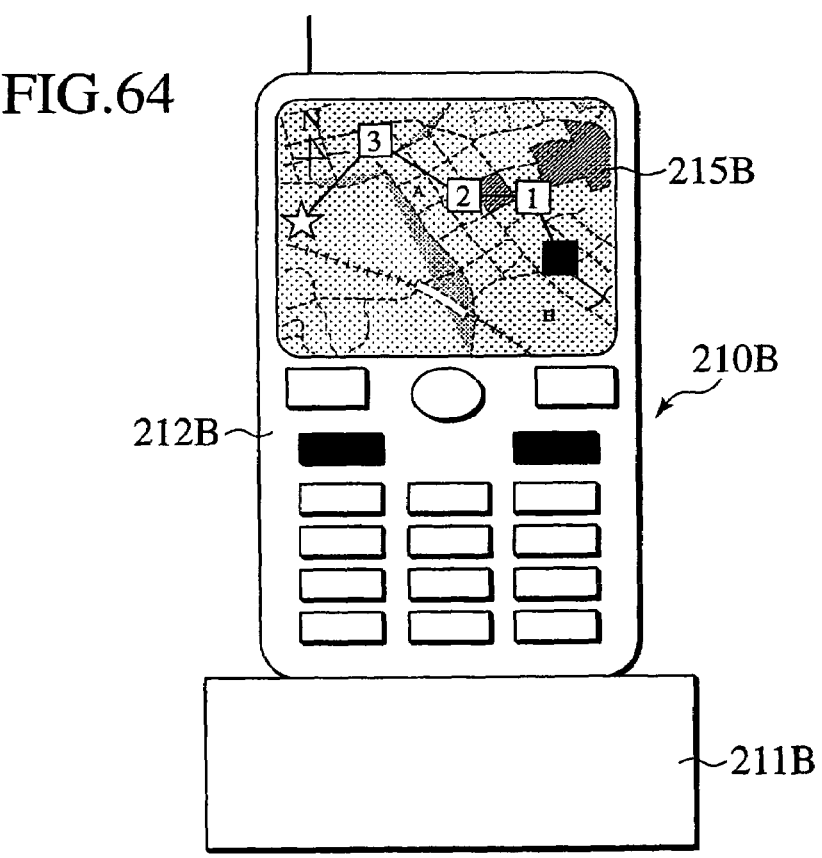
FIG. 64 is a view illustrating the portable terminal with the display unit provided with a display of the destination and routed spots indicated as points on a map image.

Another modified form of the navigation system 200 is described below with reference to FIGS. 63 and 64. The modified navigation system is identical with the alternative navigation system 200A with an exception in that, when code data are read out with a scanner unit 211B of a portable terminal 211B, a display unit 215B of the portable terminal 210B is operative to provide a display of the destination and routed spots, represented with these code data, which are overlaid as points on a map image as viewed in FIG. 64.

More particularly, another modified form of the navigation system may be realized using the data server 220A', shown in FIG. 63, which contains the map database 225 that is stored with map data to allow the same to be delivered on request like in the alternative of the navigation system 200A. Upon receipt of a command request issued from the portable terminal 210B for map data of a district, containing the destination and routed spots designated with code data read out with the scanner unit 211B, to be transmitted to the portable terminal 210B, the data server 220A' is operative to read out relevant map data from the map data base 225 and transmit the same to the portable terminal 210B. Then, the portable terminal 210B is responsive to relevant map data, and the display control unit of the portable terminal 210B is operative to cause the display unit 215B to provide a display pattern in which area information such as the destination and routed spots are overlaid on map data as shown in FIG. 64.

With such an alternative of the navigation system 200, when code data indicative of the destination and routed spots are read out with the scanner unit 211b of the portable terminal 210B due to user's operation, since the display unit 215B of the portable terminal 210B is operative to provide the display of the display pattern with the destination and routed spots, represented with these code data, being overlaid on the map image, the user is able to appropriately confirm if the operational input for these destination and routed spots are correctly made by precisely grasping the locations of the destination and routed spots upon referring to the map image displayed over the display unit 215B of the portable terminal 210B.

With the alternative navigation system set forth above, further, the display unit 215B of the portable terminal 210B may be arranged to provide a display of a map image with the destination and routed spots, represented with code data read out with the scanner unit 211B of the portable terminal 210B, being plotted as points in response to display data supplied from the data server 220A', like in the navigation system 200 of the twelfth embodiment.

Such an alternative may be realized with the navigation system 200A' which incorporates the data server 220A' in which the display data preparing unit 224d' is additionally provided, with like parts bearing the same reference numerals as those of the data server 220 shown in FIG. 60 to omit redundant description of the same component parts. The display data preparing unit 224d' is configured to be responsive to a plurality of code data, indicative of a series of destination and routed spots for determining one traveling route, transmitted from the portable terminal 210B and obtain information of the relevant principal roads of the district covering the destination and routed spots represented with respective code data to prepare display data to cause the display unit 215B of the portable terminal 210B to provide a display of a map image containing points indicative of the destination and routed spots overlaid on the map image. Upon request made by the portable terminal 210B for transmission of such display data, prepared with the display data preparing unit 224d', such display data is transmitted from the data server 220A' to the portable terminal 210B to allow the display unit 215B to provide the display of the destination and routed spots overlaid on the map image.

(Thirteenth Preferred Embodiment)

A navigation system 300 of a thirteenth embodiment according to the present invention is described below with reference to FIG. 65, with like parts bearing the same reference numerals as those of the navigation system 1 of the first embodiment for the sake of simplicity of description. The navigation system 300 has the same structure as the navigation system 1 of the first embodiment except for information servers 304, 304 and a data server 320 and, so, a detailed description will be given in conjunction with the information servers 304, 304 and the data server 320.

Figure 65:
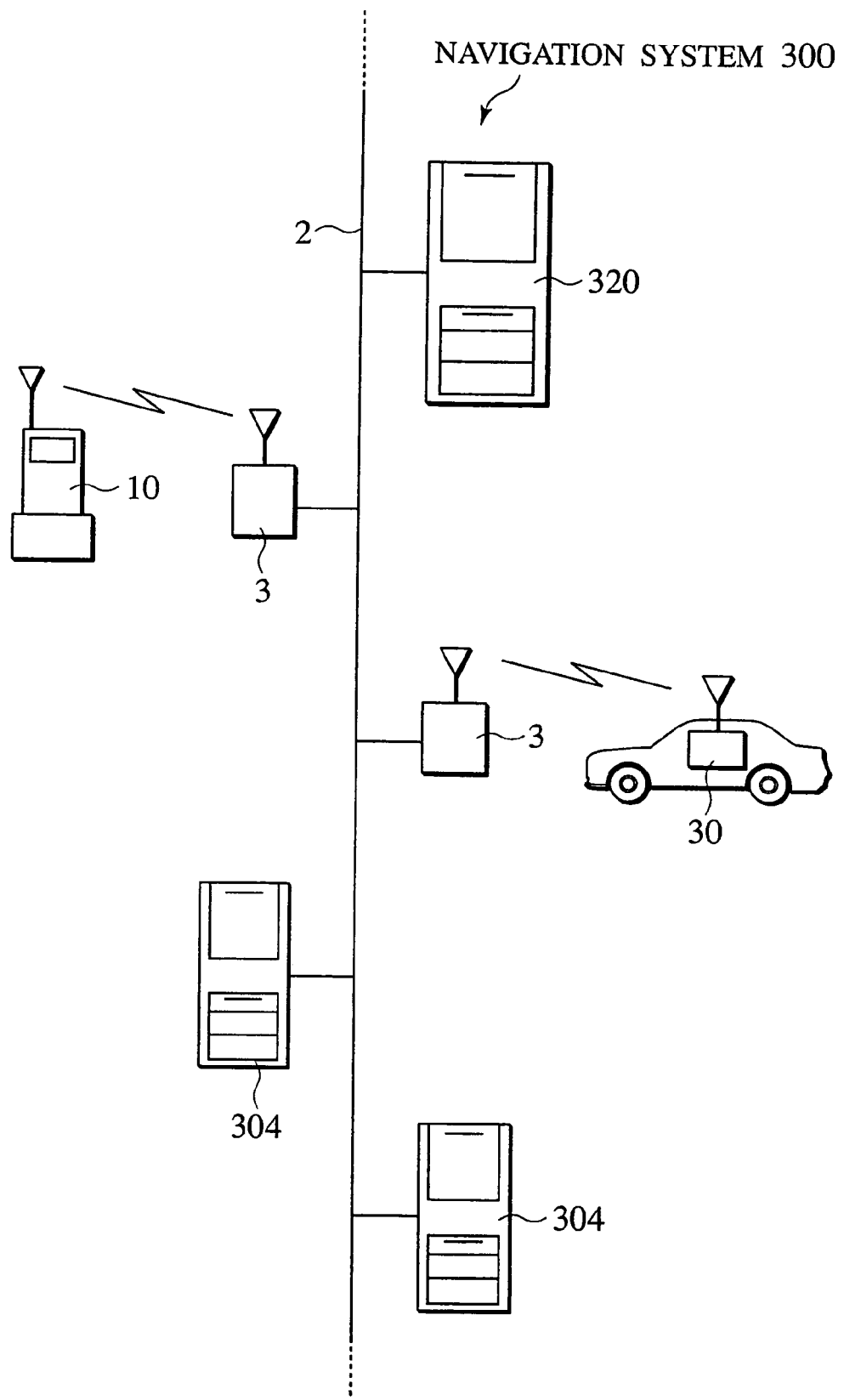
FIG. 65 is a schematic overall view of a navigation system of a thirteenth embodiment according to the present invention.

As shown in FIG. 65, the navigation system 300 is comprised of the plurality of radio communication base stations 3 connected to the communication network 2, the portable terminal 10 capable of performing radio communication with the radio communication base station 3 to be coupled with the data server 320 over the communication network 2 and the radio communication base station 3, the on-vehicle navigation device 30 and the information servers 304, 304.

With the navigation system 300 set forth above, the information servers 304, 304 may include a facility information server, that provides various information associated with destinations and routed spots of a vehicle to travel, such as a reservation management server that performs reservation managements, for facilities such as locations, parking lot capacities and currently reserved status with availability information, of a parking lot, a restaurant, a theater and a hotel, etc, a tourist spot information providing server that provides tourist spot information on a real time basis, and a traffic information providing server that provides traffic information on the real time basis. The data server 320 is operative to access to these information servers 304, 304 and has a capability of obtaining the currently reserved status with availability information of a desired parking lot, tourist spot information on the real time basis and traffic information on the real time basis. Various information, such as the currently reserved status of the parking lot, tourist information on the real time basis and traffic information on the real time basis form extremely useful information for confirming the destination and routed spots of the traveling vehicle and a situation of a traveling route.

With the structure of the navigation device 300, the input processing unit 16b (see FIG. 2) of the portable terminal 10 is structured such that, When the operational input unit 12 is operated by the user to issue a request command for obtaining information (involving the facilities such as the currently reserved status of the parking lot, tourist information on the real time basis and traffic information on the real time basis which have been set forth above and which are remarkably useful for confirming the situations of the destination and routed spots and traveling rout, with these information being referred to as related information hereinafter) associated with a designated destination and routed spots, the input processing unit 16b is responsive to this request command to issue a command for relevant information to be transmitted with a resulting command being transmitted from the communication unit 13 (see FIG. 2) to the data server 320.

Upon receipt of the command transmitted from the portable terminal 10, the data server 320 is operative to transmit display data of related information, associated with the destination and routed spots, to the portable terminal 10. When this takes place, the display control unit 16c of the controller 16 responds to this display data and executes the operation to allow the display unit 14 to provide a display of an image of relevant information.

Figure 66:
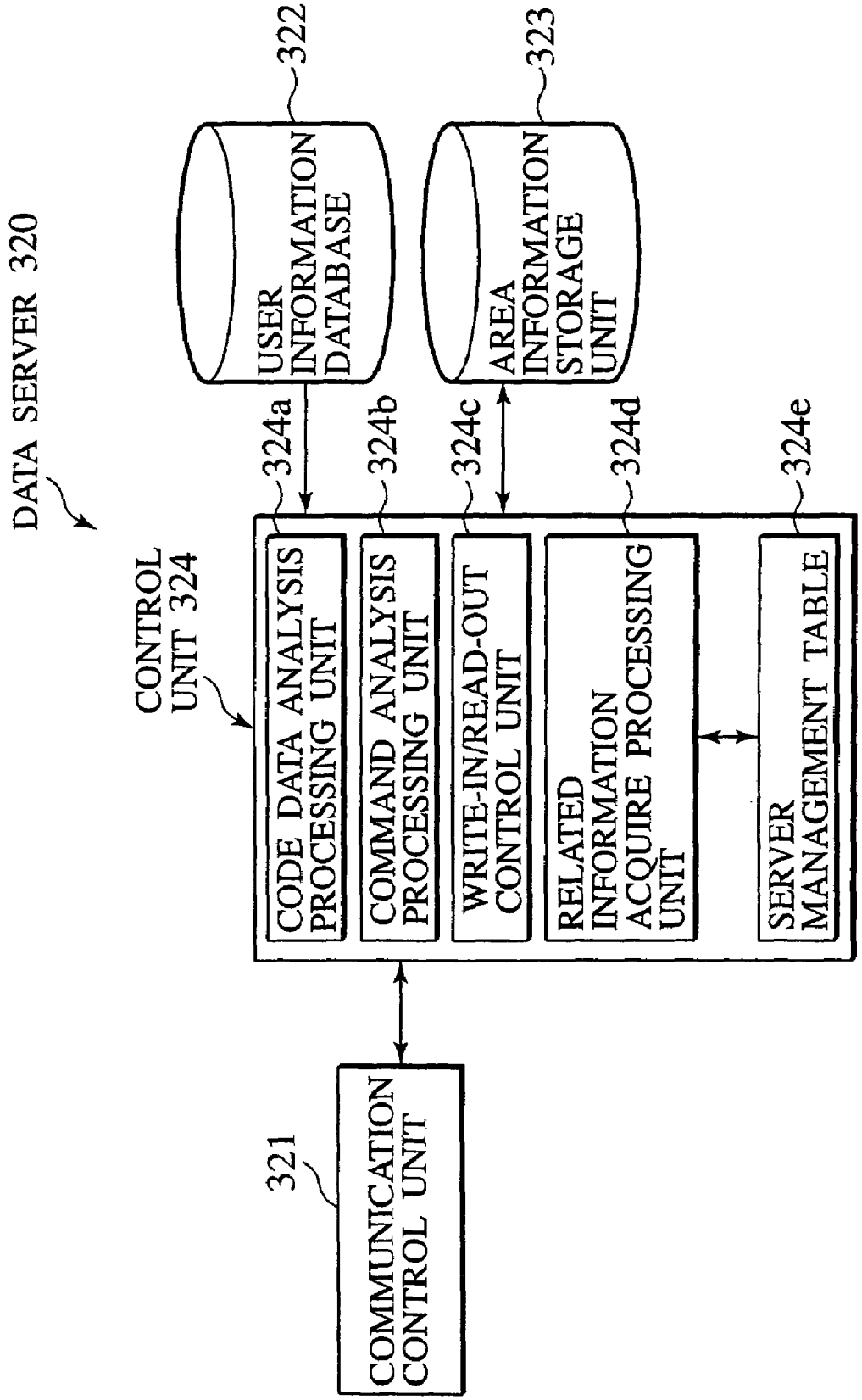
FIG. 66 is a block diagram of a data server forming part of the navigation system shown in FIG. 65.

As shown in FIG. 66, the data server 320 is comprised of a communication control unit 321, a user information database 322, an area information storage unit 323 and a control unit 324.

The communication control unit 321 serves to control transmission and receipt of data over the communication network 2. Information such as code data and a variety of commands, which are transmitted from the communication unit 13 of the portable terminal 10 via the radio communication base station 3 and the communication network 2, are received with the communication control unit 321 and supplied to the control unit 324. Further, area information read out from the area information storage unit 323 with the control unit 324 is then transmitted to the on-vehicle navigation device 30 from the communication control unit 321 via the communication network 2 and the radio communication station 3 in a manner as will be subsequently described. Furthermore, the data server 320 is operative to access the information servers 304, 304 that provide related information associated with the destination and routed spots via the communication control unit 321.

The user information database 322 stores user-related information, registered as a user who utilizes the navigation system 300, i.e., more specifically, various sorts of information such as a terminal ID that forms an identification information of the portable terminal 300 used by the user, or a on-vehicle navigation ID that forms an identification information of the on-vehicle navigation device 30 which the user uses.

The area information storage unit 323 serves to temporarily store area information correlated with code data, transmitted from the portable terminal 10, according to control of the control unit 324. The area information storage unit 323 stores therein area information, correlated with code data transmitted from the portable terminal 10, in a correlated relationship with the terminal ID of the portable terminal 10 that forms a source of transmission of code data. Thus, designating the terminal ID and the on-vehicle navigation ID allows area information, stored in a correlation with the designated terminal ID, to be read out from the area information storage unit 323.

The control unit 324 serves to execute the operational control program and controls the entire operation of the data server 320. In particular, the control unit 324 is operative to execute an operational control program and, to this end, includes code data analysis processing unit 324a, a command analysis processing unit 24b, a write-in/read-out control unit 324c, a related information acquire processing unit 324d and a server management processing unit 324e to perform respective functions.

The code data analysis processing unit 324a serves to analyze code data, which is transmitted from the portable terminal 10 to the data server 320 over the radio communication base station 3 and the communication network 2, and obtains area information correlated with such code data. In particular, the code data analysis processing unit 324a has a conversion table which is described with code data and associated various information both of which are correlated with respect to one another for each code system, with code data transmitted from the portable terminal 10 being converted to area information in correlation with such code data by referring to the conversion table.

The command analysis processing unit 324*b* is configured to analyze commands, which are transmitted from the portable terminal 10 to the data server 320 over the communication network 2 and the radio communication base station 3 and which are received with the communication control unit 321, and performs various processing operations in accordance with the commands. With such configuration, if the portable terminal 10 is operated to issue a request command for area information, stored in the area information storage unit 323, to be read out and to be transmitted to the on-vehicle navigation device 30, the command analysis processing unit 324*b* operates to analyze such request command to permit the write-in/read-out control unit 324*c* to operate. When this takes place, the command analysis processing unit 324*b* reads out relevant area information from the area information storage unit 323 and proceeds to transmit read out area information from the communication control unit 321 to the on-vehicle navigation device 30. Furthermore, if a request command is issued from the portable terminal 10 or the on-vehicle navigation device 30 to request for related information, associated with the destination and routed spots designated by the user, to be transmitted to the portable terminal 10 or the on-vehicle navigation device 30, the command analysis processing unit 324*b* operates to analyze such request command to permit the relevant information acquire processing unit 324*d* to operate. When this takes place, the related information acquire processing unit 324*d* operates to obtain related information associated with the destination and routed spots from the information server 304 and execute to transmit relevant information to the portable terminal or the on-vehicle navigation device 30.

The write-in/read-out control unit 324*c* serves to control area information, converted from the code data with the code data analysis processing unit 324*a*, to be correlated with the terminal ID of the portable terminal 10, serving as the source of transmission of code data, and the on-vehicle navigation ID of the on-vehicle navigation device 30 that forms a source of transmission of area information and to be written in the area information storage unit 323, while in response to the command analyzed with the command analysis processing unit 324*b*, controlling area information so as to be read out from the area information storage unit 323. Area information, read out from the area information storage unit 323 by the write-in/read-out control unit 324*c*, is then transmitted to the on-vehicle navigation device 30 from the communication control unit 21 over the communication network 2 and the radio communication base station 3.

The related information acquire processing unit 324*d* is operative to respond to the request command issued from the portable terminal 10 or the on-vehicle navigation device 30 for requesting related information associated with the destination and routed spots designated by the user and to select one of the information servers 304, 304 that provides appropriate information, on the basis of area information indicative of the destination and routed spots stored in the area information storage unit 323 whereupon the related information acquire processing unit 324*d* accesses the selected information server 304 to obtain related information associated with the destination and routed spots. Further, the related information acquire processing unit 324*d* is also responsive to a request command issued from the portable terminal 10 or the on-navigation device 30 for requesting a procedure to reserve the parking lot to select the parking lot reservation management server which performs a reservation management of the parking lot among the information servers 304, 304 for thereby permitting an access to the parking lot reservation management server to execute the reservation procedure of the parking lot.

Also, connected to the relevant information acquire processing unit 324*d* is a server management table 324*e* which is described with a list of the information servers 304, 304 to which access can be executed by the data server 320. With such a structure, the relevant information acquire processing unit 324*d* is operative to instantaneously judge the information server 304 to be accessed by referring to the server management table 324*e* to be able to access to the appropriate information server 304 that provides an optimum relevant information. Relevant information (involving elapsed information and resulting information, etc.) obtained from the related information acquire processing unit 324*d* is transmitted from the communication control unit 321 to the on-vehicle navigation device 30 over the communication network and the radio communication base station 3.

The display control unit 38*c* (see FIG. 4) of the on-vehicle navigation device 30 is responsive to executing operation of the traveling route guidance processing unit 38*b* and operative to control the operation of the display unit 36 to compel the same to provide a display of desired map data and various information. In addition, the display control unit 38*c* is also responsive to display data transmitted from the data server 320 for providing a display of an image of relevant information associated with the destination and routed spots.

Figure 67:
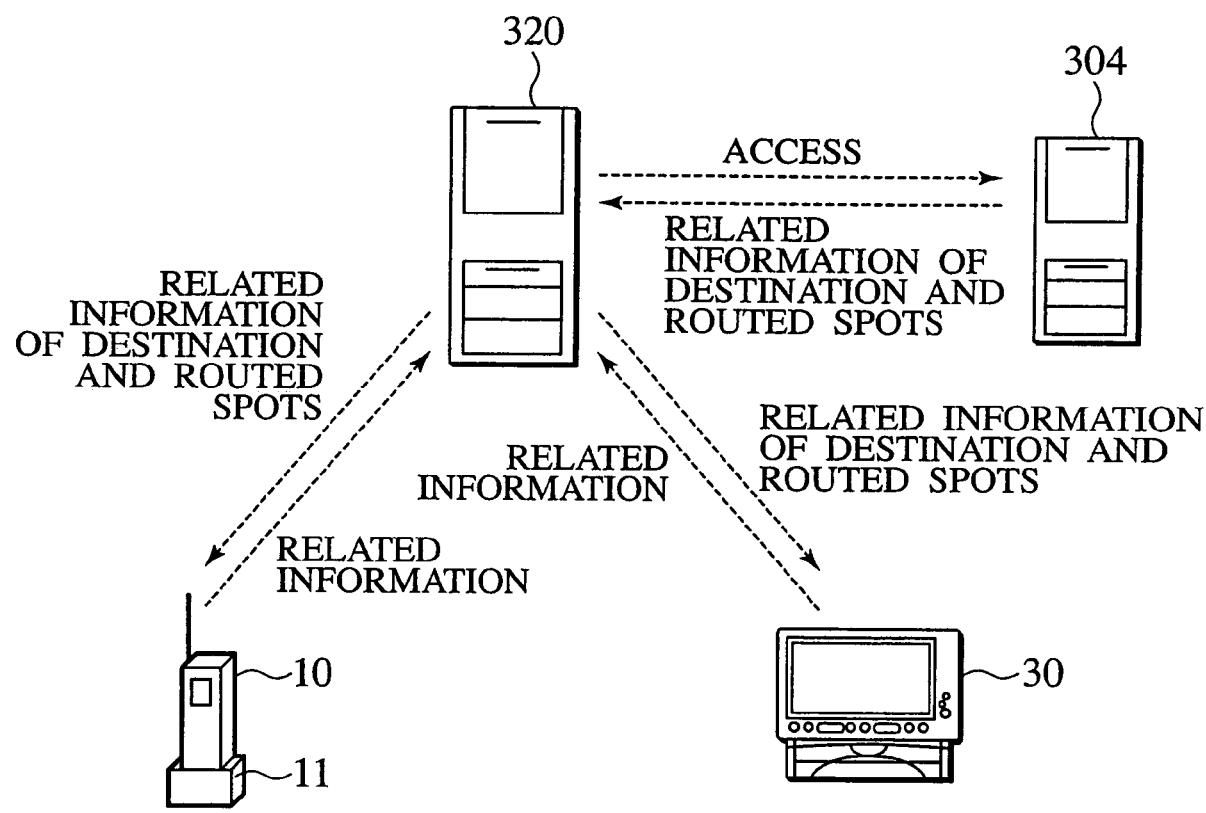
FIG. 67 is a typical view showing an example in which the navigation system of the thirteenth embodiment is applied and illustrates a mode in which the data server operates to obtain related information of a destination and routed spots from an associated information server with related information being transmitted to a portable terminal and an on-vehicle navigation device.

With such a structure of the navigation system 300, if the portable terminal 10 or the on-vehicle navigation device 30 are operated by the user to execute the operational input to issue a request command for requesting related information, associated with the destination and routed spots, in order to confirm situations of the destination and routed spots designated by reading out code data through the use of the scanner unit 11 of the portable terminal 10, as viewed in FIG. 67, the request commands are transmitted from the portable terminal 10 or the on-vehicle navigation device 30 to the data server 320. Upon receipt of the request commands for related information to be transmitted, the data server 320 is operative to respond to the request commands to access to the information server 304 and to obtain related information associated with the destination and routed spots therefrom, with resulting related information being transmitted to the portable terminal 10 or the on-vehicle navigation device 30.

Thus, the user is able to utilize the portable terminal 10 or the on-vehicle navigation device 30 for confirming the situations of the destination and routed spots designated by the user and, if desired, the user is able to read out code data again using the scanner unit 11 of the portable terminal 10 for thereby newly designating the destination and routed spots.

Figure 68:
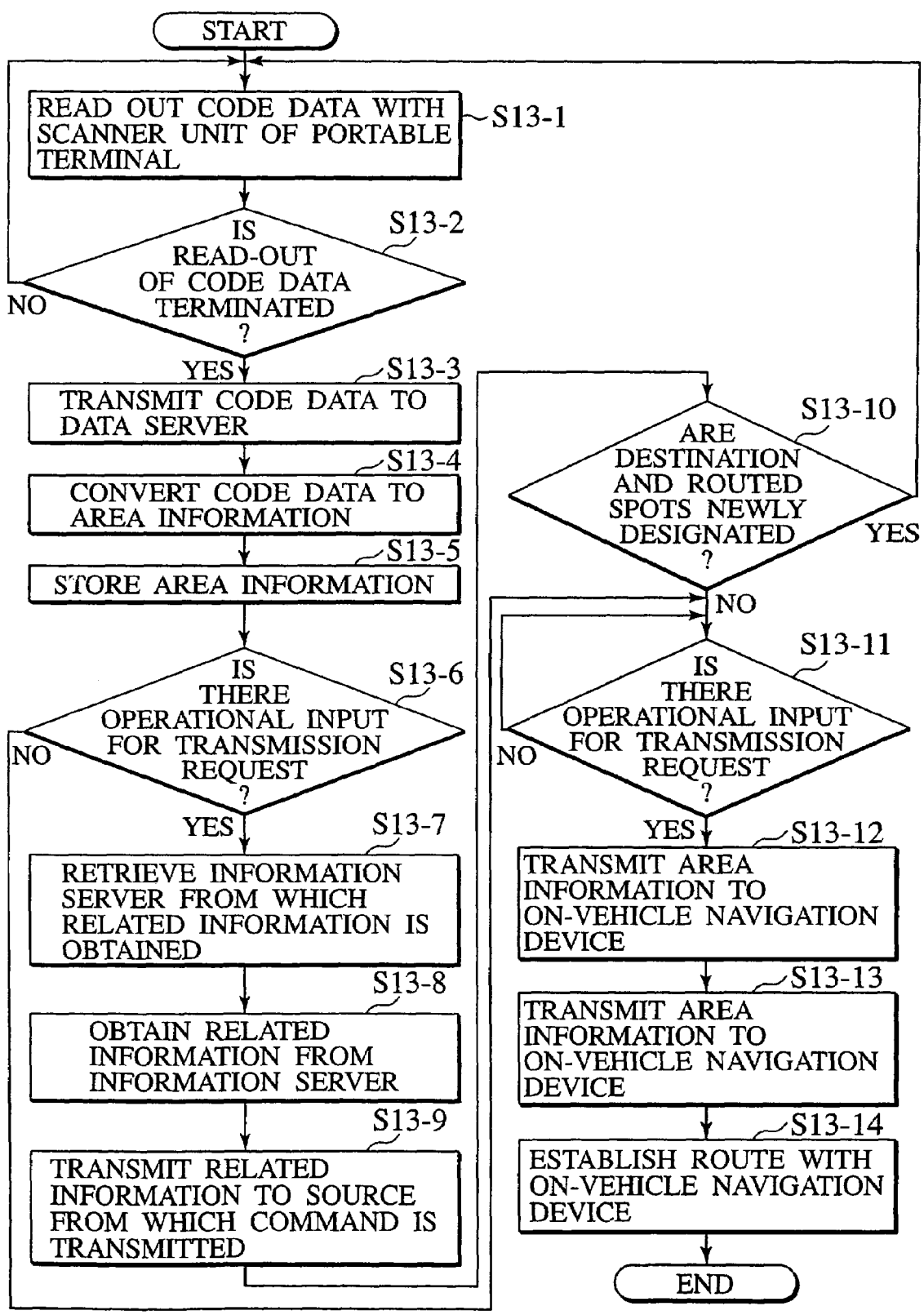
FIG. 68 is a flow chart illustrating the basic sequence of operations of the navigation system shown in FIG. 65.

Now, the basic sequence of operations of the navigation system 300 is described below in detail with reference to a flow chart of FIG. 68, and FIGS. 2 and 4 which show the portable terminal 10 and the on-vehicle navigation device 30, respectively.

First, in step S13-1, in response to user's operation, code data indicative of the destination and routed spots are read out from the print product such as the map note with the scanner unit 11 of the portable terminal 10. The code data read out with the scanner unit 11 are then added with an order, in which the reading out operations are performed, or routed spot number responsive to the operational inputs made by the user using the operational input unit 12 and are temporarily stored in the code data memory unit 16a of the controller 16. Further, when code data are read out with the scanner unit 11, the beep sound is produced by the speaker 15 in dependence on control of the voice output control unit 16d of the controller 16, or information correlated with code data are displayed over the display unit 14 in dependence on control of the display control unit 16c of the controller 16. In such a manner, the user is provided with an indication that code data have been read out.

In next step S13-2, the operational input is made by the user to indicate termination of reading-out operation with the use of the operational input unit 12 of the portable terminal 10. Alternatively, code data indicative of the termination of the reading-out operation is read out with the scanner unit 11. With such operation, the controller 16 of the portable terminal 10 is operative to discriminate if the designation is made by the user to indicate that the reading-out operation of code data for designating the desired destination and routed spots are terminated.

Upon discrimination of the designation indicating that the reading-out of code data has been terminated, then in step S13-3, code data indicative of the destination and routed spots temporarily stored in the code data memory unit 16a are read out from the code data memory unit 16a either in response to the user's operational input or in an automatic fashion, with read out code data as well as the terminal ID indicative of identification information of the particular portable terminal 10 being transmitted from the communication unit 13 to the data server 320 over the radio communication base station 3 and the communication network 2.

With code data, indicative of the destination and routed spots designated by the user, being transmitted from the portable terminal 10, the communication control unit 321 of the data server 320 receives such code data. In subsequent step S13-4, code data transmitted from the portable terminal 10 is converted into area information. In succeeding step S13-5, upon control of the write-in/read-out control unit 324c, such area information is stored in the area information storage unit 323 in correlation with the terminal ID of the portable terminal 10 that forms a source of transmitting code data and the on-vehicle navigation ID of the on-vehicle navigation device 30 that forms a source of transmitting area information. Also, when the code data analysis processing unit 324a of the control unit 324 operates to convert code data into area information, the code data analysis processing unit 324a is operative to specify a model of the on-vehicle navigation device 30, to which area information is to be transmitted, on the basis of the on-vehicle navigation ID stored in the user information database 322, while converting code data into area information so as to comply with a data format of map data treated in the on-vehicle navigation device 30.

In next step S13-6, the controller 324 of the data server 320 discriminates whether the operational input is executed by the user through the use of the portable terminal 10 or the on-vehicle navigation device 30 to issue a request command for related information, associated with the destination and routed spots, to be transmitted. In a case where the request command is issued from the portable terminal 10 or the on-vehicle navigation device 30 for requesting related information, such a request command is analyzed with the command analysis processing unit 324b and, in response to this request command, in step S13-7, the server management table 324e is referred to with the related information acquire processing unit 324d of the control unit 324 for retrieving the information server 304 from which the optimum related information can be obtained.

If the information server 304 that can provide the optimum related information is detected, then in step S13-8, the operation is executed with the related information acquire processing unit 324d to access to the detected information server 304 from which related information is retrieved. In succeeding step S13-9, retrieved related information is transmitted from the communication control unit 321 to the portable terminal 10 or the on-vehicle navigation device 30, that form the sources of transmitted request commands, over the communication network 2 and the radio communication base station 3.

Upon receipt of related information at the portable terminal or the on-vehicle navigation terminal 30 that form the sources of transmitted request commands, related information is displayed over the display unit 14 of the portable terminal 10 or the display unit 36 of the on-vehicle navigation device 30. Then, in step S13-10, the user confirms the situations of the routed spots and the destination referring to such related information and discriminates whether the operational input is made for newly designating the destination and routed spots. In a case where the user newly designates the destination and routed spots, the operation returns to step S13-1 for a subsequent cycle of repeated operations to be executed.

On the contrary, in a case where the user does not newly designate the destination and routed spots, then in step S13-11, the control unit 324 of the data server 320 operates to discriminate whether the request command is issued from the portable terminal 10 for requesting area information, indicative of the destination and routed spots stored in the area information storage unit 323, to be transmitted to the on-vehicle navigation device 30. In a case where the request command is issued from the portable terminal 10 for requesting area information to be transmitted, such request command is analyzed with the command analysis processing unit 324b of the control unit 324 and, in step S13-12, the write-in/read-out processing unit 324c of the control unit 324 reads out area information indicative of the destination and routed spots from the area information storage unit 323. In succeeding step S13-13, area information read out from the area information storage unit 323 is transmitted from the communication control unit 321 to the on-vehicle navigation device 30 over the communication network 2 and the radio communication base station 3.

Area information transmitted to the on-vehicle navigation device 30 is received with the communication unit 31 and temporarily stored in the non-volatile memory 32 until the main power supply of the on-vehicle navigation device 30 is turned on. With the main power supply of the on-vehicle navigation device 30 being turned on, operation proceeds to read out area information stored in the non-volatile memory 32, i.e., area information indicative of the destination and routed spots designated by the user. In subsequent step S13-14, on the basis of area information read out from the non-volatile memory unit 32 and area information indicative of the current position of the own vehicle obtained with the GPS receiver unit 34, a desired traveling route of the own vehicle is established with the route establishment processing unit 38a. Then, the navigation system 300 conducts a route guidance with the route guidance processing unit 38b in accordance with the traveling route established with the route establishment processing unit 38a, completing a series of operations.

With the navigation system 300 set forth above, if the user executes the operational input to issue the request command, for requesting related information associated with the destination and routed spots, using the portable terminal or the on-vehicle navigation device 30, the data server 320 responds to this request command to access to the information server 304 to retrieve related information associated with the destination and routed spots from the same with retrieved related information being transmitted to the portable terminal 10 or the on-vehicle navigation device 30. Thus, by referring to related information using the portable terminal 10 or the on-vehicle navigation device 30, the user is able to properly grasp the situations in the destination and routed spots and, if desired, the user operates to read out code data again using the scanner unit 11 of the portable terminal 10 to enable the destination and routed spots to be newly designated.

(First Application of Navigation System 300)

Now, a detailed description is given to a first application of the navigation system 300 in which the data server 320 is adapted for performing a reservation procedure of a parking lot designated as one of a destination and routed spots.

In this example, the print product such as the map note is printed with code data such as bar codes, indicative of parking lots, which are read out through the use of the scanner unit 11 of the portable terminal 10 to provide a capability of designating the parking lot as one of the destination and routed spots. Code data indicative of the parking lot contains a request command for requesting a reservation procedure for the parking lot to be undertaken and, hence, when such code data are transmitted to the data server 320 from the portable terminal 10, the data server 320 responds to this request command for taking the reservation procedure for the parking lot.

Figure 69:
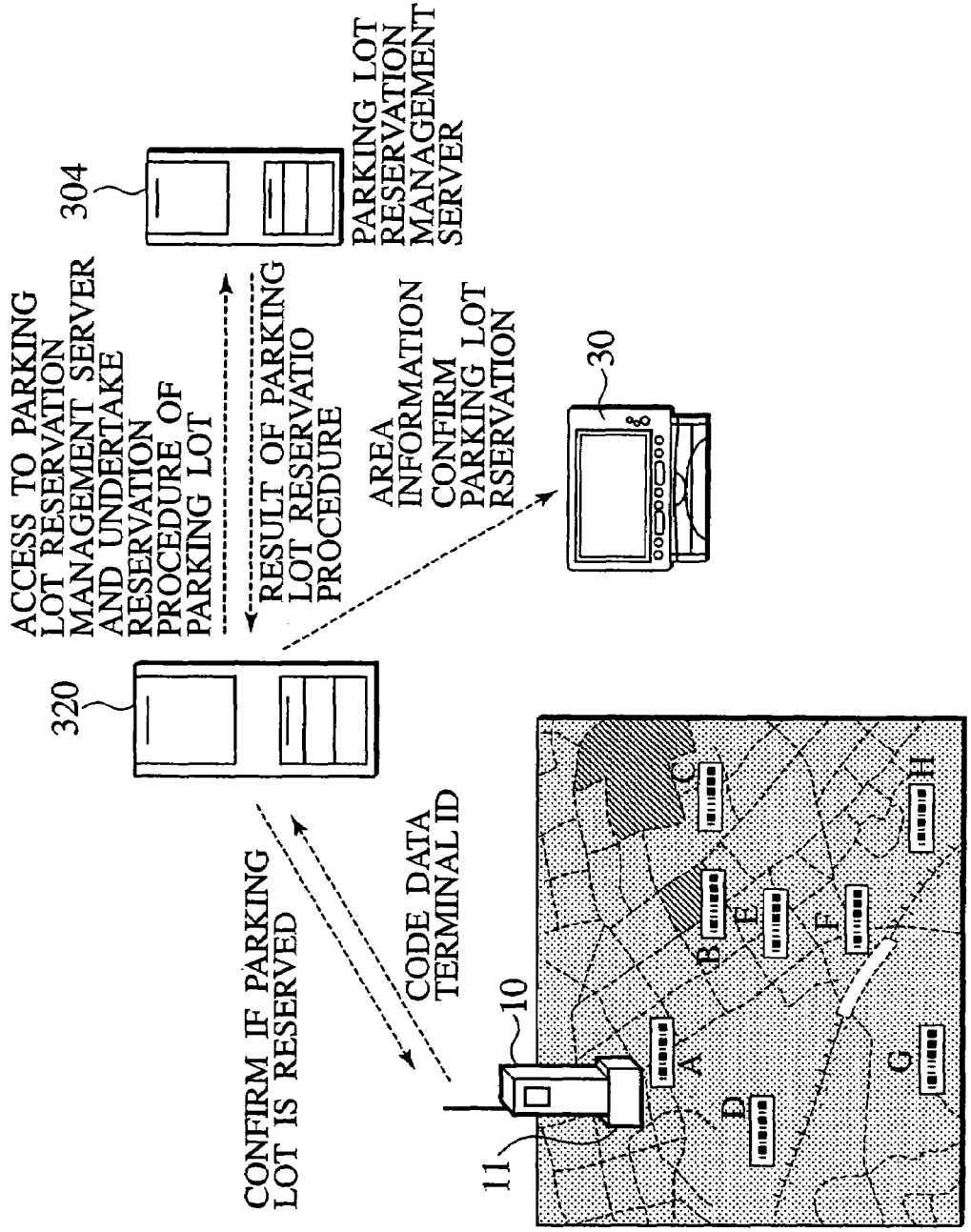
FIG. 69 is a typical view showing an example in which the navigation system shown in FIG. 65 is applied a case in which the data server is connected to a parking lot management server that serves as an information server to enable the data server to access to the parking lot management server to perform a reservation procedure for the parking lot.
Figure 70:
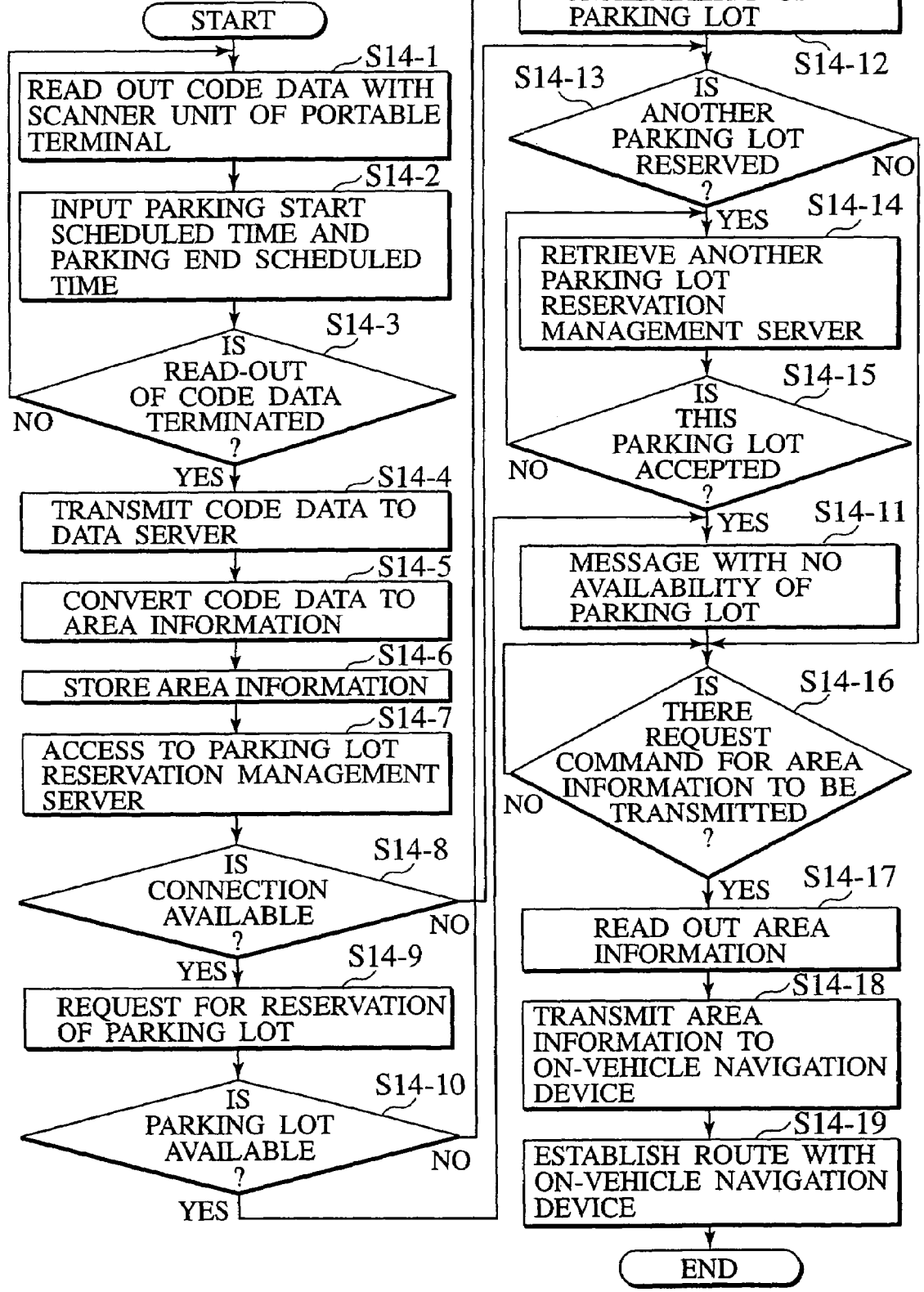
FIG. 70 is a flow chart illustrating the basic sequence of operations, for executing the reservation procedure of the parking lot, of the navigation system applied to the case shown in FIG. 69.

When preparing a drive plan at a home outside the own vehicle for the user, as shown in FIG. 69, as the user reads out code data indicative of the parking lot printed on the print product such as the map note using the scanner unit 11 of the portable terminal 10, the parking lot comes to be designated as one of the destination and routed spots. In this connection, the controller 16 of the portable terminal 10 may be structured to receive inputs related to a parking start scheduled time and a parking end schedule time in response to the reading out operation of code data indicative of the parking lot performed with the scanner unit 11.

If the user executes the operational input using the operational input unit 12 of the portable terminal 10, after completely reading out desired code data by the user, to cause code data to be transmitted, a series of code data, containing code data indicative of the parking lot, and the terminal ID forming identification information of the portable terminal 10 are transmitted from the portable terminal to the data server 320. In an event that the parking start scheduled time and parking end scheduled time are inputted, also, these time information and code data are transmitted to the data server 320.

Upon receipt of the series of code data and the terminal ID transmitted from the portable terminal 10, the data server 320 analyzes these code data to convert these code data into area information on a map coordinate system, respectively, and stores these area information in the area information storage unit 322 with the area information being correlated with the portable terminal 10. When this takes place, since code data indicative of the parking lot contains the request command for undertaking the reservation procedure for the parking lot, the request command is analyzed with the command analysis processing unit 324b of the control unit 324 to execute the reservation procedure for the parking lot with the related information acquire processing unit 324d.

In particular, the related information acquire processing unit 324d initially specifies a designated parking lot on the basis of area information of the parking lot and retrieves the information server 304 (hereinafter referred to as the parking lot reservation management server) to undertake a service of a reservation management of the parking lot. If, in this instance, the information server 304 serving as the parking lot reservation management server to undertake the service of the reservation management designated by the user, the related information acquire processing unit 324d operates to access to the parking lot reservation management server 304 and transmits a request command, for requesting the parking lot reservation to be undertaken, to the same to undertake the reservation procedure for the parking lot.

The parking lot reservation management server 304 is provided with a parking lot reservation database to enable a reservation status of the parking lot to be managed for the size of the vehicle and a time range. Upon receipt of the request command from the related information acquire processing unit 324d of the data server 320, the parking lot reservation management server 304 operates to confirm the reservation status of the parking lot referring to the parking lot reservation database.

In the presence of the current vacancy status in the parking lot, the operation is executed to register the terminal ID and the on-vehicle navigation ID, transmitted from the related information acquire processing unit 324d of the data server 320, i.e., the ID of the portable terminal 10 of the user, by which the relevant parking lot is designated as one of the destination and routed spots, and the ID of the on-vehicle navigation device 30 in the parking lot reservation database. Thus, the reservation procedure of the parking lot is completed.

Upon completion of the reservation procedure of the parking lot, the related information acquire processing unit 324d of the data server 320 operates to prepare a message of the reservation being terminated for transmission to the portable terminal 10. When this takes place, the display unit 14 of the portable terminal 10 provides a display of the message designating the completion in reservation management procedure of the parking lot. Thus, the user is able to recognize that the reservation of the parking lot has been completed by referring to the message displayed over the display unit 14 of the portable terminal 10.

On the contrary, in the absence of the current vacancy status in the parking lot when the request command is issued to the related information acquire processing unit 304 for requesting the parking lot reservation, the related information acquire processing unit 324d of the data server 320 prepares a message, indicative of the absence of the current vacancy status in the parking lot, to be transmitted to the portable terminal 10. When this takes place, the message of the absence of availability of parking is displayed over the display unit 14 of the portable terminal 10. Then, in a case where the user, who refers to the message displayed over the display unit 14 of the portable terminal 10, executes the operational input for requesting a reservation procedure of another parking lot in a neighboring area with a relevant request command being transmitted from the portable terminal 10 to the data server 320, the related information acquire processing unit 324d of the data server 320 retrieves another parking lot reservation management server that performs a reservation management of another parking lot in the neighboring area and, if another parking lot reservation management server is found, the reservation procedure of another parking lot is implemented in the same way as that described above.

If the user executes the operational input to issue a request command for area information of the destination and routed spots to be transmitted to the on-vehicle navigation device 30 using the operational input unit 12 of the portable terminal 10 when riding on the own vehicle after the reservation procedure of the parking lot has been terminated, the request command is transmitted from the portable terminal 10 to the data server 320. Upon receipt of the request command for area information to be transmitted, the data server 320 retrieves relevant area information from the area information storage unit 323 on the basis of the terminal ID, with retrieved area information being transmitted to the on-vehicle navigation device 30. In this respect, the data server 320 may be structured to transmit a message of the reservation of the parking lot, designated as one of the destination and routed spots being completed, together with area information to the on-vehicle navigation device 30.

As the on-vehicle navigation device 30 receives area information from the data server 320, received area information is temporarily stored in the non-volatile memory unit 32 until the main power supply is turned on. If the main power supply is turned on the on-vehicle navigation device 30 retrieves area information from the non-volatile memory unit 32 to determine a traveling route of the own vehicle to permit the own vehicle to be guided along the traveling route. Further, if the message of the parking lot reservation being completed is transmitted from the data server 320 and is displayed over the display unit 36. Thus, it becomes possible for the user, who refers to the message displayed over the display unit 36, to newly confirm that the reservation of the parking lot has been completed.

Now, the basic sequence of operations, involving a reservation procedure of the parking lot, of the navigation system 300 is described below in detail with reference to a flow chart of FIG. 68, and FIGS. 2 and 4 which show the portable terminal 10 and the on-vehicle navigation device 30, respectively.

First, in step S14-1, in response to user's operation, code data indicative of the destination and routed spots are read out from the print product such as the map note with the scanner unit 11 of the portable terminal 10. During such operation, code data indicative of the parking lot is read out. The code data read out with the scanner unit 11 are then added with an order, in which the reading out operations are performed, or routed spot number responsive to the operational inputs made by the user using the operational input unit 12 and are temporarily stored, as a series of code data for determining one traveling route, in the code data memory unit 16a of the controller 16.

Figure 71A:
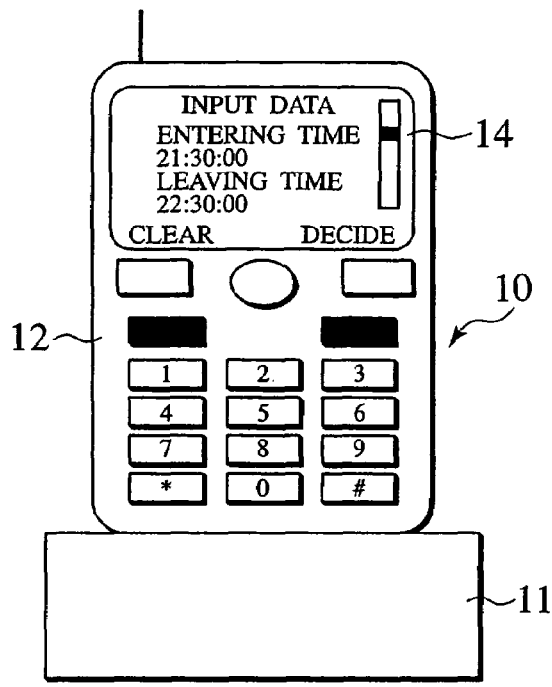
FIGS. 71A to 71D are views illustrating the portable terminals with various display modes appearing for the user to undertake a reservation procedure for the parking lot in the sequence shown in FIG. 70, with FIG. 71A illustrating the portable terminal with a display unit provided with a display of a screen to assist a user for inputting a parking start scheduled time and a parking lot leaving scheduled time, FIG. 71B illustrating the display unit in the display mode with a message indicative of no availability in the parking lot, FIG. 71C illustrating the display unit in a display mode with a message if the user wants to find another parking lot, and FIG. 71D illustrating another display mode with a message confirming if the reservation procedure is to be undertaken in the other parking lot.

In next step S14-2, the operational input made by the user to indicate that the parking lot is designated as one of the destination and routed spots is recognized with the controller 16 of the portable terminal 10, which under the control of the controller 16, in turn compels the display unit 14 to provide a display of the input screen to allow the user to input a parking lot start scheduled time and a parking lot end scheduled time as viewed in FIG. 71A. Thus, by referring to the input screen displayed over the display unit 14 of the portable terminal 10, the user is able to execute the operational input using the operational input unit 12 and input the parking lot start scheduled time and a parking lot end scheduled time.

In subsequent step S14-3, discrimination is executed with the controller 16 of the portable terminal 10 as to whether the operational input is made by the user to designate the termination of reading out of code data for the destination and routed spots to be designated. In the presence of designation indicative of reading out of code data being terminated, then in step S14-4, code data, indicative of the destination and routed spots, temporarily stored in the code data memory unit 16a is read out and transmitted with the terminal ID forming identification information of the portable terminal 10 to the data server 320. When this takes place, the parking lot start scheduled time and a parking lot end scheduled time inputted by the user are also transmitted with code data to the data server 320 from the portable terminal 10.

In succeeding step S14-5, the code data analysis processing unit 324a of the control unit 324 converts code data, indicative of the destination and routed spots designated by the user, to area information. In next step S14-6, the write-in/read-out control unit 324c controls such that converted area information are correlated with the terminal ID and the on-vehicle navigation ID and stored in the area information storage unit 323.

Under such a condition, among code data transmitted from the portable terminal 10, code data indicative of the parking lot contains the request command for the reservation procedure to be undertaken for the parking lot. Thus, in step S14-7, if such code data is analyzed with the command analysis processing unit 324b, then, the related information acquire processing unit 324d accesses to the parking lot reservation management server 304 that manages the reservation status of this parking lot.

In subsequent step S14-8, discrimination is made as to whether the data server 320 is connected to the parking lot reservation management server 304. If the data server 320 is connected to the parking lot reservation management server 304, then in step S14-9, a request command is transmitted from the related information acquire processing unit 324d of the data server 320 to the parking lot reservation management server 304 for the reservation procedure of the parking lot to be undertaken. An attempt may be made here to achieve judgment as to whether the data server 320 is connected to the parking lot reservation management server 304 through a simple operation of "ping" to be applied to the parking lot reservation server 304 whereupon a returned packet of "ping" is analyzed to execute judgment as to whether connection is established between the data server 320 and the parking lot reservation server 304.

In next step S14-10, in response to the request command transmitted to the parking lot reservation server 304 for the reservation procedure of the parking lot to be undertaken, the parking lot reservation server 304 refers to the parking lot reservation database to confirm if a parking availability exists in the parking lot for a designated parking time period (time interval between the parking start scheduled time and the parking end scheduled time). In the presence of the parking availability in the parking lot for the designated time period, in step S14-11, the terminal ID and the on-vehicle navigation ID are transmitted from the related information acquire processing unit 324d of the data server 320 to the parking lot reservation database to be stored therein, with the reservation procedure of the parking lot being thus completed.

Figure 71B:
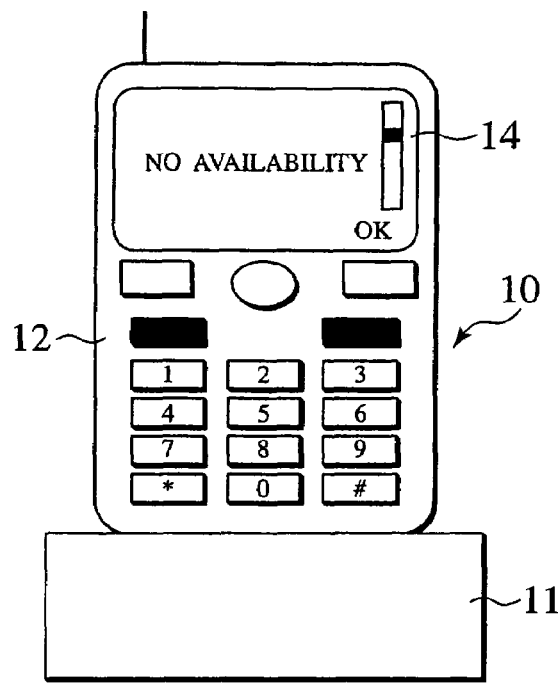

In the absence of the parking availability in the parking lot for the designated time period, a message is transmitted from the data server 320 to the portable terminal 10 indicating the absence of the parking availability in the parking lot. In step S14-12, as viewed in FIG. 71B, the display unit 14 of the portable terminal 10 provides a display of the message of no parking availability in the parking lot.

Figure 71C:
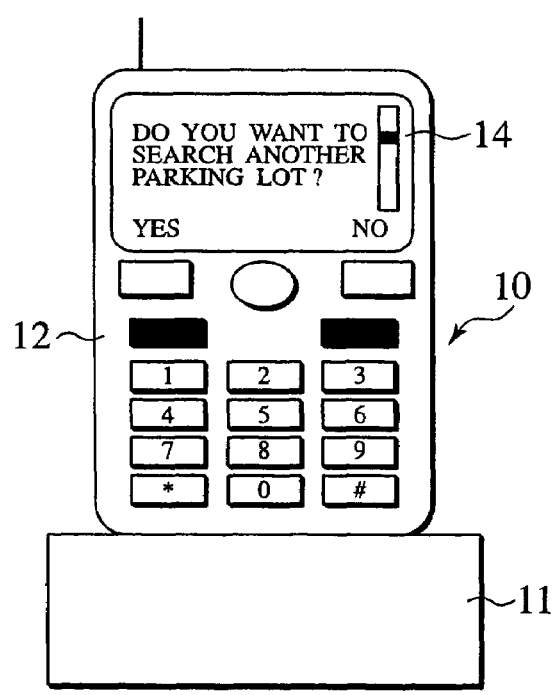

In step S14-8, if the data server 320 is not connected to the parking lot reservation server 304, then in step S14-10, it is discriminated that there is no availability in the parking lot, with the data server 320 transmitting a message of no parking availability to the portable terminal 10. In step S14-12, such a message is displayed over the display unit 14 of the portable terminal 10. Then in step S14-13, as shown in FIG. 71C, a message whether to reserve another parking lot in a neighboring area is displayed over the display unit 14 of the portable terminal 10. If the user executes the operational input to issues a request command for the reservation procedure of another parking lot to be undertaken with such a request command being transmitted from the portable terminal 10 to the data server 320, then in step S14-14, the related information acquire processing unit 324d of the data server 320 operates to conduct a search for another parking lot reservation management server that performs the reservation management of another parking lot in the neighboring area.

Figure 71D:
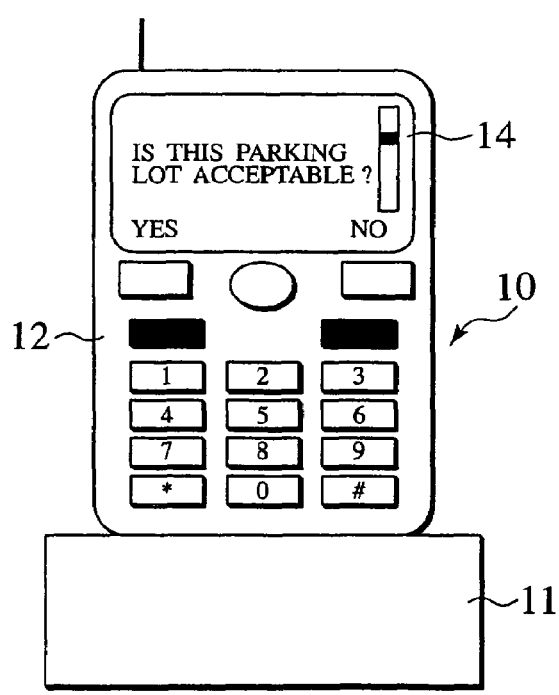

During such operation, if another parking lot reservation management server is found, the data server 320 operates to transmit information related to another parking lot in the neighboring area, i.e., various information indicative of a location of another parking lot and a parking lot capacity, etc. to the portable terminal 10. Here, in consideration of a difficulty encountered in confirming the location of another parking lot with the display unit 14 of the portable terminal 10, the navigation system 300 may be altered such that the above described various information are arbitrarily transmitted to the on-vehicle navigation device 30 to cause the display unit 36 to provide such various information to assist the user for appropriately confirming the location of another parking lot. And, in step S14-15, as shown in FIG. 71D, if the operational input is made by the user to provide a request command for the reservation procedure of another parking lot to be undertaken with such a request command being transmitted from the portable terminal 10 to the data server 320, then the operation proceeds to step S14-11 in which the reservation procedure of another parking lot is undertaken in a manner previously mentioned with the related information acquire processing unit 324d of the data server 320.

In succeeding step S14-16, the control unit 324 of the data server 320 operates to discriminate whether the request command is issued from the portable terminal 10 for requesting area information, indicative of the destination and routed spots stored in the area information storage unit 323, to be transmitted to the on-vehicle navigation device 30. In a case where the request command is issued from the portable terminal 10 for requesting area information to be transmitted, in step S14-17, the write-in/read-out processing unit 324c of the control unit 324 reads out area information indicative of the destination and routed spots from the area information storage unit 323. In succeeding step S14-18, area information read out from the area information storage unit 323 is transmitted from the communication control unit 321 to the on-vehicle navigation device 30. During such operation, if the operation is completed to undertake the reservation procedure of the parking lot designated by the user as one of the destination and routed spots, the data server 320 provides a message of the reservation procedure being completely undertaken for the parking lot, with such message and area information being transmitted to the on-vehicle navigation device 30.

Area information transmitted to the on-vehicle navigation device 30 is temporarily stored in the non-volatile memory 32 until the main power supply of the on-vehicle navigation device 30 is turned on. With the main power supply of the on-vehicle navigation device 30 being turned on, operation proceeds to read out area information stored in the non-volatile memory 32. In subsequent step S14-19, on the basis of area information read out from the non-volatile memory unit 32 and area information indicative of the current position of the own vehicle obtained with the GPS receiver unit 34, a desired traveling route of the own vehicle is established with the route establishment processing unit 38a. Then, the navigation system 300 conducts route guidance with the route guidance processing unit 38b in accordance with the traveling route established with the route establishment processing unit 38a, completing a series of operations. Also, in a case where the message of the reservation procedure for the parking lot being completed is transmitted from the data server 320, this message is displayed over the display unit 36 of the on-vehicle navigation device 30.

With the navigation system 300 set forth above, in a case where the user operates to read out code data indicative of the parking lot, with such a parking lot being designated as one of the destination and routed spots, from the print product such as the map note using the scanner unit 11 of the portable terminal 10 to issue a request command for the parking lot to be reserved, since the data server 320 responds to this request command issued from the portable terminal 10 due to the user's operation and accesses to the parking lot reservation management server 304 in charge of the reservation management service of the parking lot to undertakes the reservation procedure of the parking lot, it is possible for the user to have a remarkably high utility value.

While the navigation system 300 discussed above has been described in conjunction with the application example in which the request command for reservation of the parking lot contained in code data indicative of the parking lot is analyzed with the control unit 324 of the data server 320 which is responsive to such a request command and executes operations to undertake the reservation procedure of the parking lot, it may be altered such that the data server 320 operates to undertake the reservation procedure of the parking lot in response to the operational input made by the user using the operational input unit 12 of the portable terminal to request for the reservation procedure of the parking lot to be undertaken, or in response to the operational input made by the user using the on-vehicle navigation device 30 to request for the reservation procedure of the parking lot to be undertaken.

(Second Application of Navigation System 300)

Now, a detailed description is given to a second application of the navigation system 300 in which the data server 320 is associated with information server 304 for obtaining real time based information of tourist spots, designated as the destination and routed spots, to allow such information to be provided to the user.

In a case where the user prepares a drive plan referring to the print product such as a map note or a tourist guide, it is hard for the user to grasp from these print products about a real time status of the tourist spots which are intended be designated as the destinations and routed spots, i.e., specifically, information as to jammed statues of the tourist spots, as to whether these tourist spots are in business, or as to season's variations in landscapes. For this reason, the user is apt to be hesitating as to whether or not these tourist pots are designated as the destinations and routed spots. To address this issue, the navigation system 300 is arranged to have an application with a capability for the user to read out code data of tourist spots using the scanner unit 11 of the portable terminal 10 to cause read out code data to be transmitted to the data server 320 whereupon the data server 320 responds to such code data and operates to access to a tourist spot information providing server that provides real time based information of these tourist spots for obtaining real time based tourist spot information to be provided to the user. In the presently filed example, the navigation system 300 is described hereinafter in conjunction with an example in which the tourist spot information server includes a park information providing server 304 to allow the user to designate a park, such as a recreation ground or an amusement park, as one of the destination and routed spots.

In this example, the print product such as the map note is printed with code data such as bar codes, indicative of the park, which are read out through the use of the scanner unit 11 of the portable terminal 10 to provide a capability of designating the park as one of the destination and routed spots. Code data indicative of the park contains a request command for requesting real time based park information to be obtained and, hence, when such code data are transmitted to the data server 320 from the portable terminal 10, the data server 320 responds to this request command and obtains real time based park information to be provided to the user.

When preparing a drive plan at a home outside the own vehicle for the user, as shown in FIG. 72, as the user reads out code data indicative of the park printed on the print product such as the map note using the scanner unit 11 of the portable terminal 10, the park comes to be designated as one of the destination and routed spots. If the user executes the operational input using the operational input unit 12 of the portable terminal 10, after completely reading out desired code data by the user, to cause code data to be transmitted, a series of code data, containing code data indicative of the park, and the terminal ID forming identification information of the portable terminal 10 are transmitted from the portable terminal 10 to the data server 320.

Upon receipt of the series of code data and the terminal ID transmitted from the portable terminal 10, the data server 320 analyzes these code data to convert these code data into area information on a map coordinate system, respectively, and stores these area information in the area information storage unit 322 with the area information being correlated with the terminal ID. When this takes place, since code data indicative of the park contains the request command for real time based park information to be obtained, the request command is analyzed with the command analysis processing unit 324b of the control unit 324 to execute the operation for real time based park information to be obtained with the related information acquire processing unit 324d.

In particular, the related information acquire processing unit 324d initially specifies the park designated by the user on the basis of area information stored in the area information storage unit 323 and conducts a search for the park information providing server 304 that provides real time based park information. And, the related information acquire processing unit 324d operates to access to the park information providing server 304 and transmits a request command for requesting real time based park information.

The park information providing server 304 is provided with a park status grasping database to enable related information, such as a jammed condition, a weather (an atmospheric condition, atmospheric temperature, etc.), and the degree of popularity (for male or female, and for an age bracket), to be managed. Further, the park status grasping database incorporates therein real time images snapped with cameras or real time information detected with sensors, providing a capability for the user to precisely grasp the real time status of the park. Also, the park information providing server 304 may has a reservation management database that manages a reservation status of respective attractions of the park and, with such application, it is possible for the user to reserve the attractions of the park while achieving the reservation of the parking lot in a manner set forth above. In such a case, in response to the operational input made by the user utilizing the portable terminal 10 or the on-vehicle navigation device 30, a request command is transmitted form the related information acquire processing unit 324d of the data server 320 to the park information providing server 304 for requesting the reservation of the attractions to allow the reservation procedure to be undertaken for the attractions.

Upon receipt of the request command from the related information acquire processing unit 324d of the data server 320 for requesting real time based park information, the park information providing server 304 operates to obtain various information (park information), for grasping the real time status of the park, from the park status grasping database and transmits these park information to the related information acquire processing unit 324d of the data server 320.

As the related information acquire processing unit 324d of the data server 320 receives real time based park information from the park information providing server 304, these real time based park information are transmitted to the portable terminal 10 that forms a source of transmitting code data or the on-vehicle navigation device 30 that forms a source of transmitting area information. Thus, the display unit 14 of the portable terminal 10 or the display unit 36 of the on-vehicle navigation device 30 provide a display of real time based park information such that referring to real time based park information displayed over the display unit 14 of the portable terminal 10 or the display unit 36 of the on-vehicle navigation device 30 enables the user to confirm the real time status of the park.

Here, when newly establishing a drive plan for the user who has confirmed the real time based status of the park, code data are read out again using the scanner unit 11 of the portable terminal 10 and associated area information are stored in the area information storage unit 323 of the data server 320. On the other hand, with no drive plan being altered, if the user executes the operational input, using the portable terminal 10 when riding on the own vehicle, for transmitting area information of the destination and routed spots to the on-vehicle navigation device 30, a request command is transmitted from the portable terminal 10 to the data server 320. Upon receipt of the request command for area information to be transmitted, the data server 320 reads out relevant area information from the area information storage unit 323 on the basis of the terminal ID, with read out area information being transmitted to the on-vehicle navigation device 30.

Upon receipt of area information transmitted from the data server 320, the on-vehicle navigation device 30 compels received area information to be temporarily stored in the non-volatile memory 32 whereupon, when the main power supply is turned on, area information is read out from the non-volatile memory 32 to allow a traveling route of the own vehicle to be established to guide the own vehicle along the traveling route. In such a manner, the vehicle is guided along the traveling route with the park being designated as the destination and routed spots.

Figure 73:
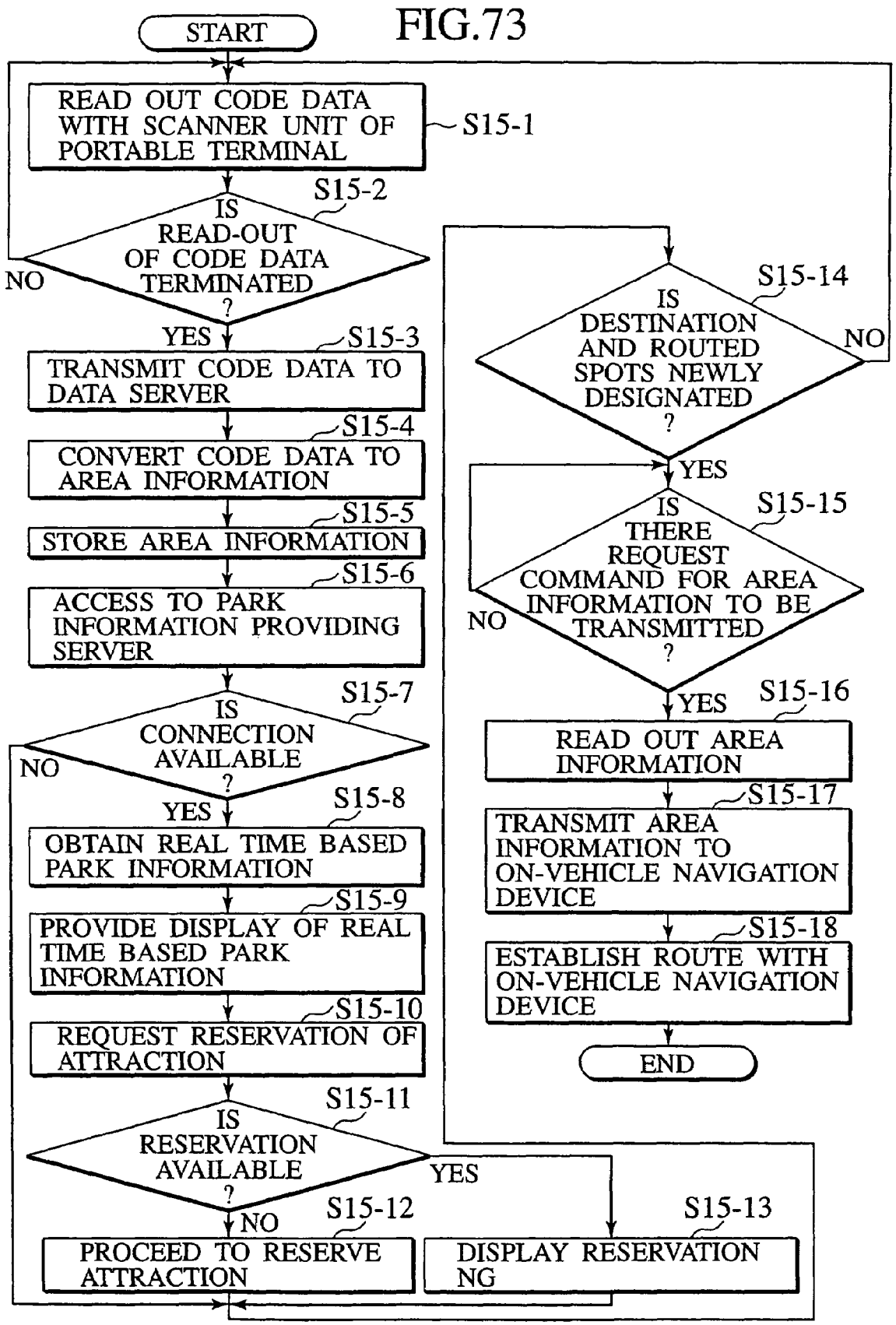
FIG. 73 is a flow chart illustrating the basic sequence of operations, involving operation to obtain real time based park information to be transmitted to the portable terminal or the on-vehicle navigation device and operation to undertake the reservation procedure of attractions, of the navigation system applied to the case shown in FIG. 72.

Now, the basic sequence of operations, involving a reservation procedure of the attractions in the park, of the navigation system 300 is described below in detail with reference to a flow chart of FIG. 73, and FIGS. 2 and 4 which show the portable terminal 10 and the on-vehicle navigation device 30, respectively.

First, in step S15-1, in response to user's operation, code data indicative of the destination and routed spots are read out from the print product such as the map note with the scanner unit 11 of the portable terminal 10. During such operation, code data indicative of the park is read out as one of code data indicative of the destination and routed spots. The code data read out with the scanner unit 11 are then added with an order, in which the reading out operations are performed, or routed spot number responsive to the operational inputs made by the user using the operational input unit 1-2 and are temporarily stored, as a series of code data for determining one traveling route, in the code data memory unit 16a of the controller 16.

In subsequent step S15-2, discrimination is executed with the controller 16 of the portable terminal 10 as to whether the operational input is made by the user to designate the termination of reading out of code data for the destination and routed spots to be designated. In the presence of designation indicative of reading out of code data being terminated, then in step S15-3, code data, indicative of the destination and routed spots, temporarily stored in the code data memory unit 16a is read out and transmitted with the terminal ID forming identification information of the portable terminal 10 to the data server 320.

In succeeding step S15-4, the code data analysis processing unit 324a of the control unit 324 converts code data, indicative of the destination and routed spots designated by the user, to area information. In next step S15-5, the write-in/read-out control unit 324c controls such that converted area information are correlated with the terminal ID and the on-vehicle navigation ID and stored in the area information storage unit 323.

Under such a condition, among code data transmitted from the portable terminal 10, code data indicative of the park contains the request command for requesting real time based park information. Thus, in step S15-6, if such code data is analyzed with the command analysis processing unit 324b, then, the related information acquire processing unit 324d accesses to the park information providing server 304 that provides real time based information of the park.

In subsequent step S15-7, discrimination is made as to whether the data server 320 is connected to the park information providing server 304. If the data server 320 is connected to the park information providing server 304, a request command is transmitted from the related information acquire processing unit 324d of the data server 320 to the park information providing server 304 for requesting real time based park information.

In next step S15-8, in response to the request command transmitted to the park information providing server 304 for requesting real time based park information, real time based park information is obtained from the park information grasping database with the park information providing server 304, with such real time based park information being transmitted to the data server 320. And, real time based park information is transmitted to the portable terminal 10 that forms the source of transmitting code data, or the on-vehicle navigation device 30 that forms the source of transmitting area information.

Figure 74:
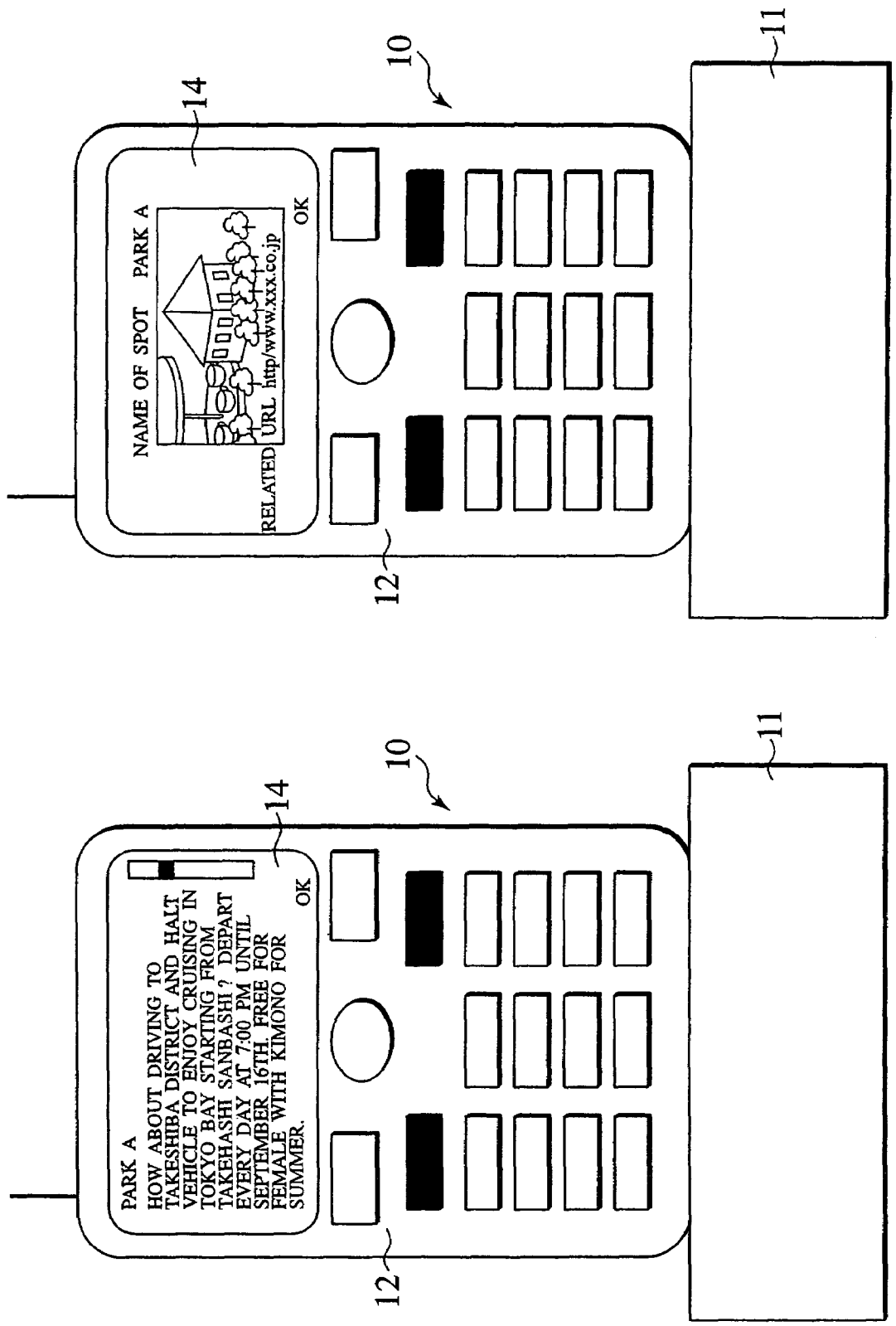
FIGS. 74A and 74B are views illustrating the portable terminals with various display modes resulting from the operations shown in FIG. 73, with FIG. 74A illustrating the portable terminal with a display unit provided with a display of real time based park information on a text base, and FIG. 74B illustrating the display unit provided with an image of real time based park information.

Upon receipt of real time based park information, in step S15-9, real time based park information is displayed over the display unit 14 of the portable terminal 10 or the display unit 36 of the on-vehicle navigation device 30 in a text base shown in FIG. 74A or in an image as shown in FIG. 74B to be provided to the user. Also, in order to provide further detailed park information, the navigation system 300 may be arranged to allow park information to be provided to the user through voice communication due to a "phoneto" function or to allow the portable terminal 10 or the on-vehicle navigation device 30 to directly access to the park information providing server 304 to cause real time based park information to be provided to the user.

Here, as the user who refers to real time based park information executes the operational input using the portable terminal 10 or the on-vehicle navigation device 30 for requesting the attractions to be reserved, in step S15-10, a request command is transmitted from the related information acquire processing unit 324d of the data server 320 to the park information providing server 304 for requesting the reservation of the attractions. In succeeding step S15-11, the park information providing server 304 accesses to the reservation management server that manages the reservation status of the respective attractions and confirms whether there is an availability in reservation of the designated attractions. In the presence of the availability in reservation of the designated attractions, in step S15-12, the reservation management database registers the terminal ID and the on-vehicle navigation ID transmitted from the related information acquire processing unit 324d of the data server 320, resulting in a completion of the reservation procedure of the attractions.

On the contrary, in the absence of the availability in reservation of the designated attractions, a message indicative of no reservation of the attractions is transmitted from the data server 320 to the portable terminal 10 or the on-vehicle navigation device 30. In step S15-13, such a message is displayed over the display unit 14 of the portable terminal 10 or the display unit 36 of the on-vehicle navigation device 30.

In subsequent step S15-14, discrimination is made as to whether the operational input is made by the user, who refers to real time based park information, for newly designating the destination and routed spots. In a case where the destination and routed spots are newly designated by the user, the operation returns to step S15-1 for a subsequent cycle of repeated operations to be executed.

On the contrary, in a case where the user does not newly designate the destination and routed spots, then in step S15-15, the control unit 324 of the data server 320 operates to discriminate whether the request command is issued from the portable terminal 10 for requesting area information, indicative of the destination and routed spots stored in the area information storage unit 323, to be transmitted to the on-vehicle navigation device 30. In a case where the request command is issued from the portable terminal 10 for requesting area information to be transmitted, such request command is analyzed with the command analysis processing unit 324b of the control unit 324 and, in step S15-16, area information indicative of the destination and routed spots are read out from the area information storage unit 323. In succeeding step S15-17, area information read out from the area information storage unit 323 is transmitted from the communication control unit 321 to the on-vehicle navigation device 30. During such operation, if the operation has been completed to make the reservation procedure of the attractions of the park designated as one of the destination and routed spots, the data server 320 transmits a message, indicative of the reservation procedure of the attractions being completed, together with area information to the on-vehicle navigation device 30.

Upon receipt of area information transmitted from the data server 320, such area information is temporarily stored in the non-volatile memory 32 until the main power supply of the on-vehicle navigation device 30 is turned on. With the main power supply of the on-vehicle navigation device 30 being turned on, operation proceeds to read out area information stored in the non-volatile memory 32. In subsequent step S15-18, on the basis of area information read out from the non-volatile memory unit 32 and area information indicative of the current position of the own vehicle obtained with the GPS receiver unit 34, a desired traveling route of the own vehicle is established with the route determination processing unit 38*a*. Then, the navigation system 300 conducts a route guidance with the route guidance processing unit 38*b* in accordance with the traveling route established with the route determination processing unit 38*a*; completing a series of operations. Also, in the presence of the message, indicative of the reservation of the attractions of the park being completed, transmitted from the data server 320, this message is displayed over the display unit 36 of the on-vehicle navigation device 30.

With the navigation system 300 set forth above, in a case where the user operates to read out code data, indicative of the tourist spot such as the park to designate the same as one of the destination and routed spots, from the print product such as the map note using the scanner unit 11 of the portable terminal 10, the data server 320 is operative to access to the park information providing server 304 to obtain real time based park information which in turn is provided to the user Thus, it is possible for the user to appropriately grasp the statuses of the tourist spots, such as the park designated as one of the destination and routed spots, from park information and, in some instances, the user is able to take a measure for rebuilding the drive plan again. Further, in addition to an ability of providing real time based park information to the user, the navigation system 300 has a capability of undertaking the reservation procedure of the attractions of the park, resulting in a remarkably increased utility value to be provided for the user.

While the navigation system 300 discussed above has been described in conjunction with the application example in which the park information request command contained in code data indicative of the park is analyzed with the control unit 324 of the data server 320 to allow operations to be executed in dependence on the command, it may be altered such that, by executing the operational input using the portable terminal 10 or the on-vehicle navigation device 30 for requesting park information, the data server 320 operates to obtain real time based park information to be provided to the user in response to the operational input made by the user.

(Third Application of Navigation System 300)

Now, a detailed description is given to a third application of the navigation system 300 in which the data server 320 is associated with the information server 304 composed of a traffic information providing server for obtaining real time based traffic information to allow such information to be provided to the user.

In a case where the user prepares a drive plan referring to the print product such as a map note or a tourist guide, it is hard for the user to grasp from these print products about real time traffic statuses of roads that form routed spots. For this reason, the user is apt to be hesitating as to which roads are selected to establish a route to an intended destination. To address this issue, in this application, the navigation system 300 is arranged to have an application with a capability for the user to read out code data, indicative of roads to be routed, using the scanner unit 11 of the portable terminal 10 to cause read out code data to be transmitted to the data server 320 whereupon the data server 320 operates to access to the traffic information providing server 304, that provides real time based traffic information, to allow real time based jammed statuses of the roads designated by the user to be confirmed and to be provided to the user.

In this example, the print product such as the map note is printed with code data such as bar code indicative of a principal road, and reading out code data indicative of the principal road using the scanner unit 11 of the portable terminal 10 enables the user to select the rout passing across this road. Code data indicative of the principal road contains a request command for requesting real time based traffic information to be obtained and, hence, when such code data are transmitted to the data server 320 from the portable terminal 10, the data server 320 responds to this request command and obtains real time based traffic information from which the jammed status of the principal road is confirmed and is provided to the user.

Figure 75:
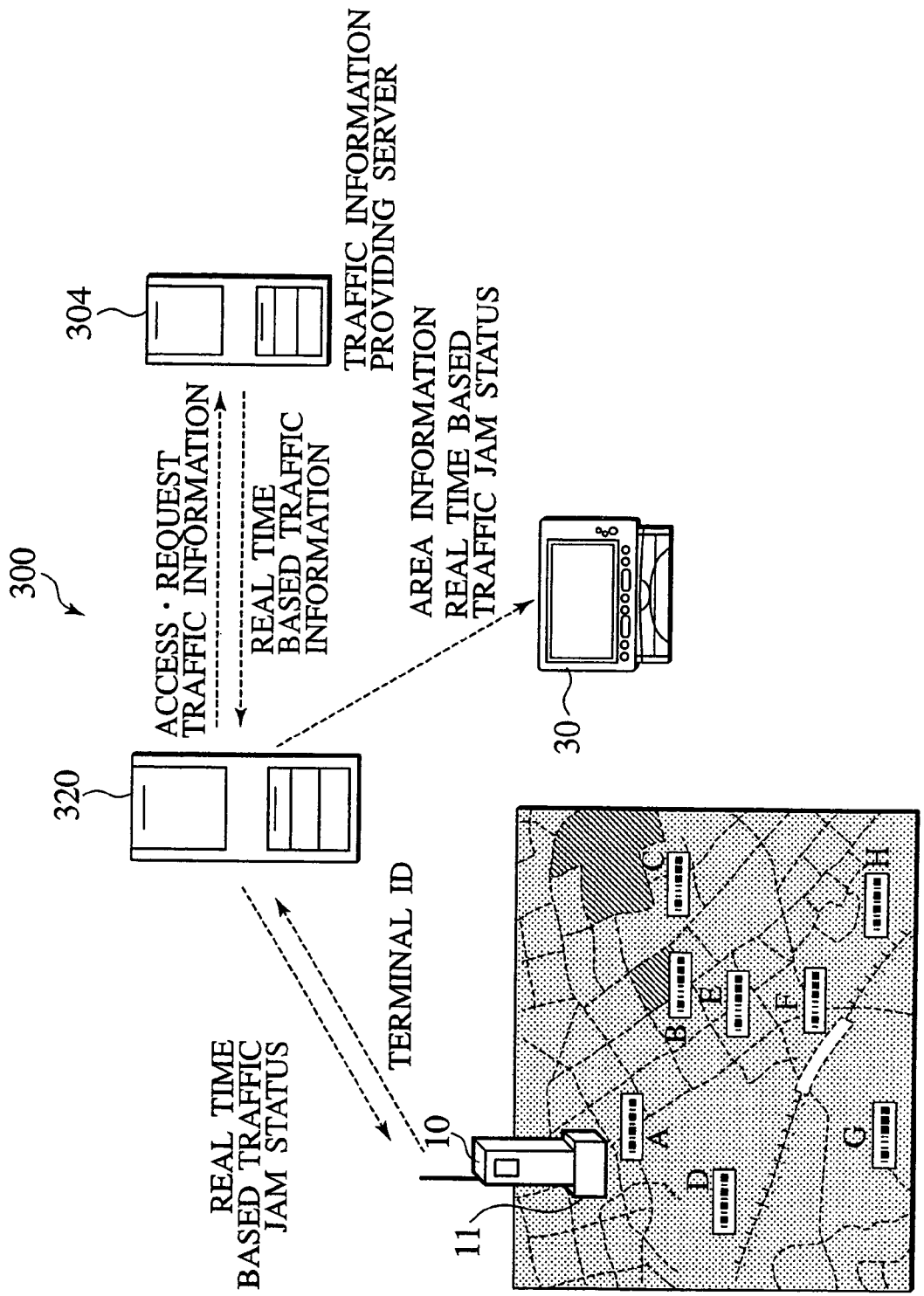
FIG. 75 is a typical view showing another application of the navigation system shown in FIG. 65, with the navigation system incorporating a traffic information providing service with the use of the information server comprised of a traffic information providing server to which the data server of the navigation system is able to access to obtain real time based traffic information with jammed statuses of roads which are transmitted to the portable terminal or the on-vehicle navigation device.

When preparing a drive plan at a home outside the own vehicle for the user, as shown in FIG. 75, as the user reads out code data indicative of the principal road printed on the print product such as the map note using the scanner unit 11 of the portable terminal 10, the route passing across this road comes to be selected. If the user executes the operational input using the operational input unit 12 of the portable terminal 10, after completely reading out desired code data by the user, to cause code data to be transmitted, a series of code data, containing code data indicative of the principal road, and the terminal ID forming identification information of the portable terminal 10 are transmitted from the portable terminal 10 to the data server 320.

Upon receipt of the series of code data and the terminal ID transmitted from the portable terminal 10, the data server 320 analyzes these code data to convert these code data into area information on a map coordinate system, respectively, and stores these area information in the area information storage unit 322 with the area information being correlated with the terminal ID. When this takes place, since code data indicative of the principal road contains a request command for requesting the real time based jammed status to be obtained, the request command is analyzed with the command analysis processing unit 324*b* of the control unit 324 to execute the operations for obtaining real time based traffic information and confirming the jammed status of this road.

In particular, the related information acquire processing unit 324*d* initially specifies the road designated by the user on the basis of area information stored in the area information storage unit 323 and conducts a search for the traffic information providing server 304 that provides real time based traffic information. And, the related information acquire processing unit 324*d* operates to access to the traffic information providing server 304 and transmits a request command for requesting real time based traffic information.

The traffic information providing server 304 is provided with a road status grasping database which manages a real time status of a registered principal road, such as the presence of or the absence of construction sites or road surface conditions, delayed spots and required transit time and a weather (an atmospheric condition, atmospheric temperature, etc.). Further, the road status grasping database incorporates therein real time images snapped with fixed point cameras, real time information detected with sensors, and real time information obtained with VICS and automotive number read out systems, providing a capability for the user to precisely grasp the real time status of the respective principal roads.

Upon receipt of the request command from the related information acquire processing unit 324d of the data server 320 for requesting real time based traffic information, the traffic information providing server 304 operates to obtain various information (including park information), for grasping the real time based road status, from the road status grasping database and transmits these traffic information to the related information acquire processing unit 324d of the data server 320.

As the related information acquire processing unit 324d of the data server 320 obtains real time based traffic information from the traffic information providing server 304, the operation is executed to select information, related to the road designated by the user, among these traffic information to confirm the real time based jammed status of the relevant road. And, the real time based jammed status of the relevant road designated by the user is transmitted from the data server 320 to the portable terminal 10 that forms the source of transmitting code data or the on-vehicle navigation device 30 that forms the source of transmitting area information. Thus, the display unit 14 of the portable terminal 10 or the display unit 36 of the on-vehicle navigation device 30 provide a display of characters or images indicative of real time based jammed status of the road designated by the user such that referring to the characters or images displayed over the display unit 14 of the portable terminal 10 or the display unit 36 of the on-vehicle navigation device 30 enables the user to confirm the real time based jammed status of the relevant road designated by the user.

Here, when rebuilding a drive plan for the user who has confirmed the real time based jammed status of the relevant road designated by the user, code data are read out again using the scanner unit 11 of the portable terminal 10 and associated area information are stored in the area information storage unit 323 of the data server 320. On the other hand, with no drive plan being altered, if the user executes the operational input, using the portable terminal 10 when riding on the own vehicle, for transmitting area information of the destination and routed spots to the on-vehicle navigation device 30, a request command is transmitted from the portable terminal 10 to the data server 320. Upon receipt of the request command for area information to be transmitted, the data server 320 reads out relevant area information from the area information storage unit 323 on the basis of the terminal ID, with read out area information being transmitted to the on-vehicle navigation device 30.

Upon receipt of area information transmitted from the data server 320, the on-vehicle navigation device 30 compels received area information to be temporarily stored in the non-volatile memory 32 whereupon, when the main power supply is turned on, area information is read out from the non-volatile memory 32 to allow a traveling route of the own vehicle to be established to guide the own vehicle along the traveling route. In such a manner, the vehicle is guided along the traveling route to the destination passing across the road designated by the user.

Figure 76:
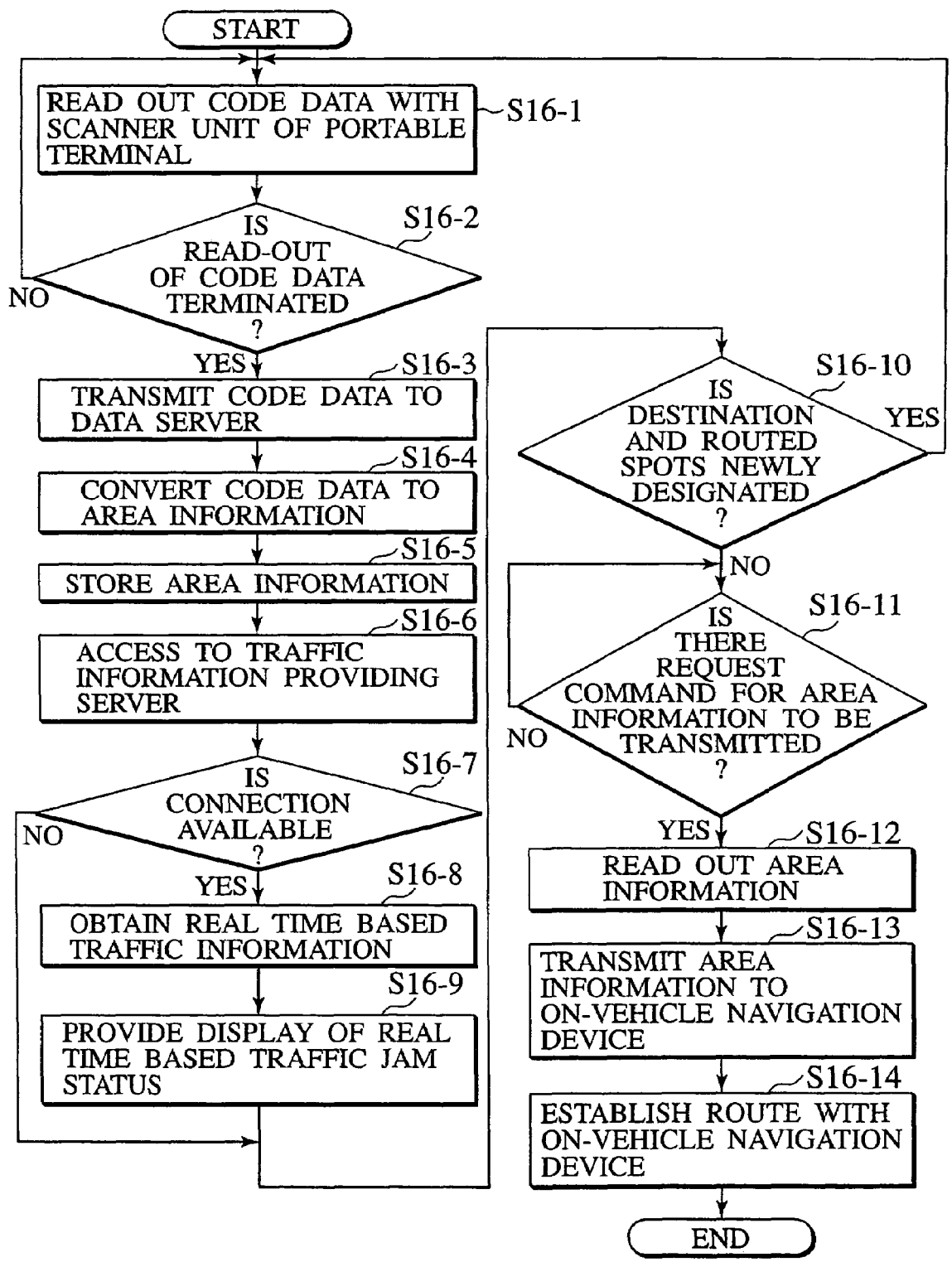
FIG. 76 is a flow chart illustrating the basic sequence of operations, involving operation to obtain real time based jammed statuses of roads to be transmitted to the portable terminal or the on-vehicle navigation device, of the navigation system applied to the case shown in FIG. 75.

Now, the basic sequence of operations of the navigation system 300 in the presently filed application is described below in detail with reference to a flow chart of FIG. 76, and FIGS. 2 and 4 which show the portable terminal 10 and the on-vehicle navigation device 30, respectively.

First, in step S16-1, in response to user's operation, code data indicative of the destination and routed spots are read out from the print product such as the map note with the scanner unit 11 of the portable terminal 10. During such operation, code data indicative of the principal road, which the user desires to select as the route connected to the destination, is read out. The code data read out with the scanner unit 11 are then added with an order, in which the reading out operations are performed, or routed spot number responsive to the operational inputs made by the user using the operational input unit 12 and are temporarily stored, as a series of code data for determining one traveling route, in the code data memory unit 16a of the controller 16.

In next step S16-2, discrimination is executed with the controller 16 of the portable terminal 10 as to whether the operational input is made by the user to designate the termination of reading out of code data for the destination and routed spots to be designated. In the presence of designation indicative of reading out of code data being terminated, then in step S16-3, code data, indicative of the destination and routed spots, temporarily stored in the code data memory unit 16a is read out and transmitted with the terminal ID forming identification information of the portable terminal 10 to the data server 320.

In succeeding step S16-4, the code data analysis processing unit 324a of the control unit 324 converts code data, indicative of the destination and routed spots designated by the user, to area information. In next step S16-5, the write-in/read-out control unit 324c controls such that converted area information are correlated with the terminal ID and the on-vehicle navigation ID and stored in the area information storage unit 323.

Under such a condition, among code data transmitted from the portable terminal 10, code data indicative of the principal road contains the request command for requesting real time based jammed status. Thus, in step S16-6, if such code data is analyzed with the command analysis processing unit 324b, then, the related information acquire processing unit 324d accesses to the traffic information providing server 304 that provides real time based traffic information.

In subsequent step S16-7, discrimination is made as to whether the data server 320 is connected to the traffic information providing server 304. If the data server 320 is connected to the traffic information providing server 304, a request command is transmitted from the related information acquire processing unit 324d of the data server 320 to the traffic information providing server 304 for requesting real time based traffic information.

In next step S16-8, in response to the request command transmitted to the traffic information providing server 304 for requesting real time based traffic information, various information indicative of real time based road status are obtained from the traffic information grasping database with the traffic information providing server 304, with such real time based various information indicative of such a road status being transmitted from the traffic information providing server 304 to the data server 320.

Upon receipt of various information indicative of the real time based road status, the related information acquire processing unit 324d of the data server 320 operates to select information related to the road designated by the user among these various information and to confirm the real time based jammed status of the designated road. And, the real time based jammed status of the road designated by the user is transmitted to the portable terminal 10, that forms the source of transmitting code data, and the on-vehicle navigation terminal 30 that forms the source of transmitting area information.

Figure 77A:
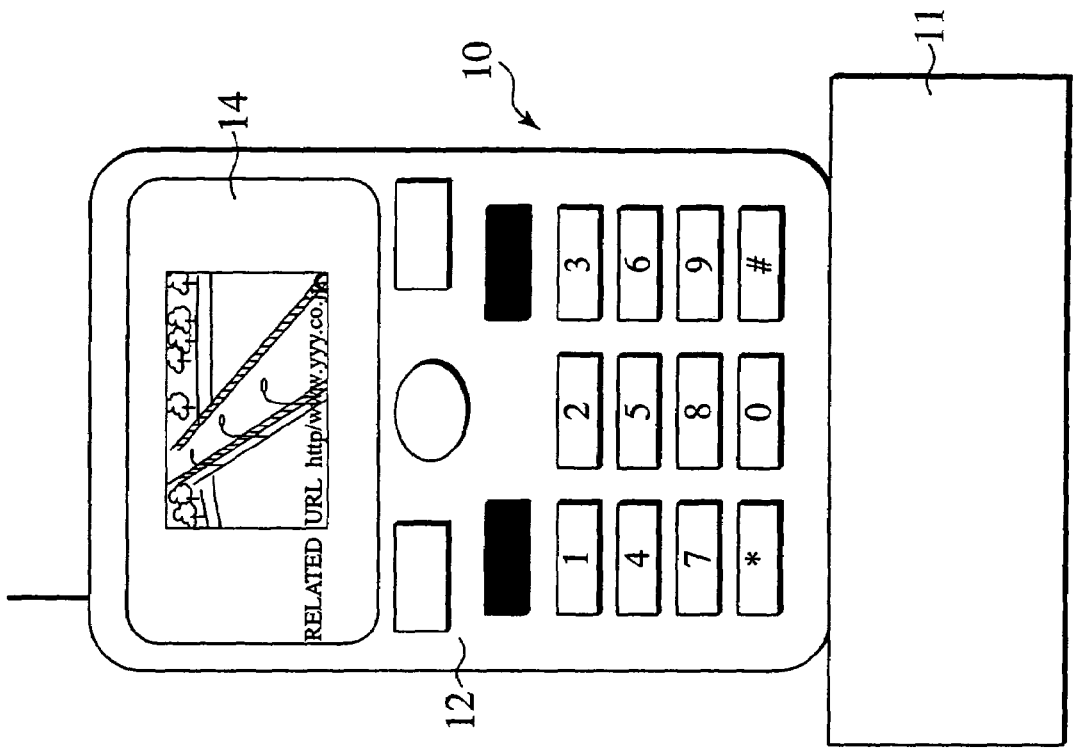
FIGS. 77A and 77B are views illustrating the portable terminals with various display modes resulting from the operations shown in FIG. 76, with FIG. 77A illustrating the portable terminal with a display unit provided with a display of real time based jammed statuses of the roads on a text base, and FIG. 77B illustrating the display unit provided with an image of real time based jammed conditions of the roads.
Figure 77B:
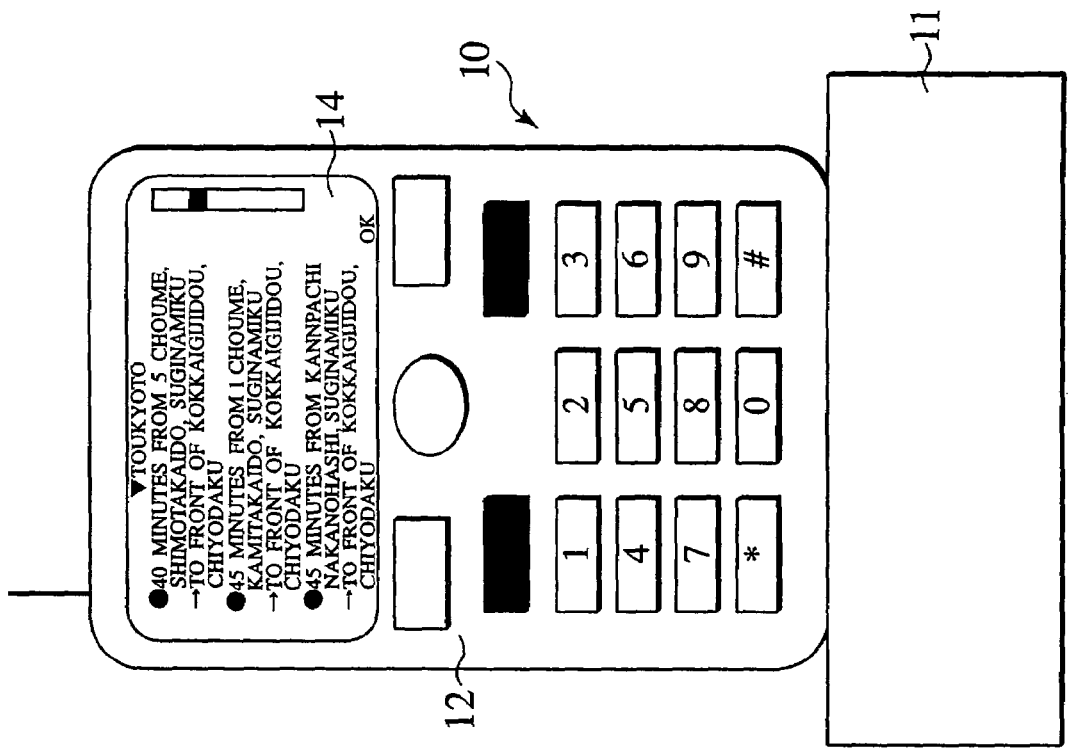

In step S16-9, real time based jammed status of the road designated by the user is displayed over the display unit 14 of the portable terminal 10 or the display unit 36 of the on-vehicle navigation device 30 in a text base shown in FIG. 77A or in an image of the real time based jammed status as shown in FIG. 77B to be provided to the user. Also, in order to provide further detailed park information, the navigation system 300 may be arranged to allow a further detailed jammed status to be provided to the user through voice communication due to a "phoneto" function or to allow the portable terminal 10 or the on-vehicle navigation device 30 to directly access to the traffic information providing server 304 to cause real time based jammed status to be provided to the user.

In subsequent step S16-10, discrimination is made as to whether the operational input is made by the user, who refers to the display unit 14 of the portable terminal 10 or the display unit 36 of the on-vehicle navigation device 30, for newly designating the destination and routed spots. In a case where the destination and routed spots are newly designated by the user, the operation returns to step S16-1 for a subsequent cycle of repeated operations to be executed.

On the contrary, in a case where the user does not newly designate the destination and routed spots, then in step S16-11, the control unit 324 of the data server 320 operates to discriminate whether the request command is issued from the portable terminal 10 for requesting area information, indicative of the destination and routed spots stored in the area information storage unit 323, to be transmitted to the on-vehicle navigation device 30. In a case where the request command is issued from the portable terminal 10 for requesting area information to be transmitted, area information indicative of the destination and routed spots are read out from the area information storage unit 323. In succeeding step S16-13, area information read out from the area information storage unit 323 is transmitted from the data server 320 to the on-vehicle navigation device 30.

Upon receipt of area information transmitted from the data server 320, such area information is temporarily stored in the non-volatile memory 32 until the main power supply of the on-vehicle navigation device 30 is turned on. With the main power supply of the on-vehicle navigation device 30 being turned on, operation proceeds to read out area information stored in the non-volatile memory 32. In subsequent step S16-14, on the basis of area information read out from the non-volatile memory unit 32 and area information indicative of the current position of the own vehicle obtained with the GPS receiver unit 34, a desired traveling route of the own vehicle is established with the route determination processing unit 38*a*. Then, the navigation system 300 conducts route guidance with the route guidance processing unit 38*b* in accordance with the traveling route established with the route determination processing unit 38*a*, completing a series of operations.

With the navigation system 300 set forth above, in a case where the user operates to read out code data, indicative of the principal road desired to be routed, from the print product such as the map note using the scanner unit 11 of the portable terminal 10 for thereby designating such a principal road as a part of the traveling route to the destination, the data server 320 is operative to access to the traffic information providing server 304 to obtain real time based traffic information and to confirm the jammed status of the principal road, designated by the user, which in turn is provided to the user. Thus, it is possible for the user to appropriately grasp the real time based jammed status of the principal road designated by the user and, in some instances, the user is able to take a measure for rebuilding the drive plan again, resulting in a remarkably increased utility value to be provided for the user.

While the navigation system 300 discussed above has been described in conjunction with the application example in which the command contained in code data indicative of the principal road is analyzed with the control unit 324 of the data server 320 to allow operations to be executed in dependence on the command to cause the real time based jammed status to be provided to the user, it may be altered such that, by executing the operational input using the portable terminal 10 or the on-vehicle navigation device 30 for requesting the real time based jammed status of the principal road, the data server 320 is responsive to the operational input made by the user and operative to obtain real time based traffic information and to confirm the real time based jammed status of the principal road designated by the user to be provided to the user.

The present disclosure relates to subject matters contained in Japanese Patent Application No. 2001-336613, filed on Nov. 1, 2001, Japanese Patent Application No. 2001-337316, filed on Nov. 2, 2001, Japanese Patent Application No. 2001-359568, filed on Nov. 26, 2001, Japanese Patent Application No. 2001-377111, filed on Dec. 11, 2001 and Japanese Patent Application No. 2001-377255, filed on Dec. 11, 2001, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. A navigation system for executing route guidance for a vehicle, comprising:
    a portable information processing device operative to read out code data indicative of map information from a print product and to transmit the code data;
    a code data processing unit operative to convert the code data into area information indicative of a location on a map coordinate system, to store the area information, to read out the stored area information and to transmit the read out area information; and
    an on-vehicle navigation device installed on a vehicle and operative to establish a traveling route in response to the area information transmitted from the code data processing unit to execute route guidance for the vehicle along the established traveling route.

2. The navigation system according to claim 1, wherein:
    the portable information processing device includes a portable terminal having a code data read out unit to read out the code data from the print product, and a communication unit operative to transmit the read out code data to the code data processing device; and
    the code data processing unit includes a data server including a communication unit to receive code data from the portable terminal, and a code data conversion unit operative to convert the received code data into the area information to be stored in a storage unit.

3. The navigation system according to claim 1, wherein:
the code data processing unit is incorporated in the portable information processing device; and
the portable information processing device includes a scanner unit to read out the code data from the print product, a code data conversion unit operative to convert the code data into the area information to be stored in a storage unit, and a communication unit operative to transmit the area information to the on-vehicle navigation device.

4. The navigation system according to claim 1, wherein:
the on-vehicle navigation device has a small-size battery to enable the area information to be received from the information processing unit when a main power supply of the on-vehicle navigation device is turned off.

5. The navigation system according to claim 1, wherein:
the portable information processing device is operative in response to a user's operational input to provide a request command to compel the area information to be transmitted from the code processing device to the on-vehicle navigation device.

6. The navigation system according to claim 1, wherein:
the portable information processing device and the on-vehicle navigation device include short-range communication units, respectively, operative to perform data communication in short-range distances, respectively; and
wherein when a communication link is established between the portable information processing device and the on-vehicle navigation device via the short-range communication units, the area information is transmitted from the code data processing device to the on-vehicle navigation device.

7. The navigation system according to claim 2, wherein:
the storage unit of the data server includes a registration area for each user; and
wherein the registration area is enabled to store area information correlated with code data from the portable terminal of another user.

8. The navigation system according to claim 2, wherein:
the storage unit of the data server includes a common registration area to be occupied with a plurality of users; and
wherein the area information stored in the common registration area are enabled to be received with a plurality of the non-vehicle navigation devices.

9. The navigation system according to claim 3, wherein:
the portable information processing device is operative to transmit the area information to and receive the area information from another portable information processing device.

10. The navigation system according to claim 9, wherein:
the portable information processing device is operative to download the area information from another portable information processing device.

11. The navigation system according to claim 1, wherein:
the print product has printed thereon the code data indicative of area information of a destination and routed spots or of a given command, and supplementary code data which specifies the relevant print product;
the portable information processing device includes a portable terminal having a code data read out unit to read out the code data and supplementary code data from the print product, and a communication unit operative to transmit the code data and the supplementary code data to the code data processing device; and
the code data processing device includes an information processing server with which the on-vehicle navigation device is operative to communicate, the information server being operative to produce information interpretable with the on-vehicle navigation device on the basis of respective code data, read out with the read out unit from the print product, and identification information specifying the on-vehicle navigation device to cause interpretable information to be transmitted to the navigation device.

12. The navigation system according to claim 11, wherein:
the on-vehicle navigation device is operative to obtain the respective code data from the code data read out unit, to transmit the respective code data, together with the identification information of the relevant on-vehicle navigation device, to the information processing server, and to receive the interpretable information from the information processing server.

13. The navigation system according to claim 11, wherein:
the information processing server is operative to receive the respective code data, read out from the print product with the code data read out unit, and the identification information specifying the code data read out unit, and to produce the information interpretable with the on-vehicle navigation device on the basis of the respective code data and the identification information, with the interpretable information being transmitted to the on-vehicle navigation device.

14. The navigation system according to claim 11, wherein:
the information processing server is operative to receive the respective code data, read out from the print product with the code data read out unit, and the identification information specifying the code data read out unit, and to produce the information interpretable with the on-vehicle navigation device on the basis of the respective code data and the identification information, with the interpretable information being transmitted to the on-vehicle navigation device.

15. The navigation system according to claim 11, wherein:
the information processing server is operative to provide an operation command of a command system suited to the on-vehicle navigation device as the information interpretable with the on-vehicle navigation device.

16. The navigation system according to claim 11, wherein:
the information processing server is operative to produce a map data in a format suited to the on-vehicle navigation device as the information interpretable with the on-vehicle navigation device.

17. The navigation system according to claim 2, wherein:
the portable terminal has a display unit and is operative to cause information related to the code data to be displayed over the display unit.

18. The navigation system according to claim 17, wherein:
the portable terminal is operative to calculate a relative positional relationship of the destination and routed spots represented with the code data and to cause an image of the relative positional relationship to be displayed over the display unit.

19. The navigation system according to claim 17, wherein:

the portable terminal is operative to receive information of a principal road in an area covering the destination and routed spots represented with the read out code data from the data server and to cause an image of a positional relationship related to the principal road to be displayed over the display unit.

20. The navigation system according to claim 17, wherein:
the portable terminal includes a compilation processing unit operative to compile the area information of the destination and routed spots represented with the read out code data and is operative to cause a compiled content resulting from the compilation processing unit to be displayed over the display unit.

21. The navigation system according to claim 17, wherein:
the portable terminal is operative to calculate a relative positional relationship of the destination and routed spots represented with the code data and to cause an image of the relative positional relationship to be displayed over the display unit.

22. The navigation system according to claim 17, wherein:
the portable terminal include a memory unit operative to store the read out code data with information indicative of read out time or a location at which read out is executed and to cause information correlated with the code data stored in the memory unit to be displayed over the display unit in a list of the information on request.

23. The navigation system according to claim 17, wherein:
the portable terminal is operative to transmit the code data, selected from the list of information displayed over the display unit on the basis of information indicative of the read out time or the location at which the read out is executed, to the data server.

24. The navigation system according to claim 2, wherein:
the data server is operative to respond to a request from the portable terminal or from the on-vehicle navigation device, to obtain the area information of the destination and routed spots and to transmit the obtained area information to the portable terminal or the on-vehicle navigation device.

25. The navigation system according to claim 24, further comprising:
an information server storing therein related information associated with the area information; and
the data server is operative to access to the information server on the basis of the area information in response to a request from the portable terminal or the on-vehicle navigation device to cause the related information to be provided with the portable terminal or the on-vehicle navigation device.

26. The navigation system according to claim 25, wherein:
the data server includes a server management table described with a list of the information server to permit the data server to access to the information server.

27. The navigation system according to claim 26, wherein:
the information server includes a parking lot reservation management server which performs a reservation management of a parking lot; and
the data server is operative to access to the parking lot reservation management server for executing a reservation procedure of the parking lot therein in response to the request from the portable terminal or from the on-vehicle navigation device.

28. The navigation system according to claim 26, wherein:
the information server includes a tourist information providing server which provides a real time based tourist spot information; and
the data server is operative to access to the tourist information providing server for obtaining the real time based tourist spot information in response to the request from the portable terminal or the on-vehicle navigation device and to transmit the real time based tourist spot information to the portable terminal or the on-vehicle navigation device.

29. The navigation system according to claim 26, wherein:
the information server includes a traffic information providing server which provides a real time based traffic information; and
the data server is operative to access to the traffic information providing server for obtaining the real time based traffic information in response to the request from the portable terminal or the on-vehicle navigation device and to transmit the real time based traffic information to the portable terminal or the on-vehicle navigation device.

30. The navigation system according to claim 24, wherein:
the data server is operative to obtain display data causing the area information of the destination and routed spots to be displayed in an image over the portable terminal or the on-vehicle navigation device in response to the request from the portable terminal or the on-vehicle navigation device and to transmit the display data to the portable terminal or the on-vehicle navigation device.

31. A data server adapted to provide an on-vehicle navigation device, to be installed on a vehicle, with area information to allow the on-vehicle navigation device to establish a traveling route of the vehicle, the data server comprising:
a receiver unit receiving code data, indicative of a destination and routed spots, from a code data transmission source;
a display data producing unit operative to produce display data to cause information related to the code data received with the receiver unit to be displayed over the code data transmission source;
a data conversion unit converting the code data received with the receiver unit into area information indicative of a location on a coordinate system of the destination and routed posts;
a storage unit storing the area information, resulting from the data conversion unit, in correlation with identification information of the code data transmission source; and
a transmitting unit operative to transmit the display data, resulting from the display data producing unit, to the code data transmission source on request while reading out particular area information from the area information stored in the storage unit on request and transmitting the particular area information to an on-vehicle navigation device.

32. The data server according to claim 31, wherein:
the display data producing unit is operative to calculate a relative positional relationship of a destination and routed spots represented with the code data received with the receiver unit and to produce the display data to cause an image of the relative positional relationship of the destination and routed spots to be displayed.

33. The data server according to claim 31, wherein:
the display data producing unit is operative to obtain information of a principal road of an area covering a destination and routed spots represented with the code data received with the receiver unit and to produce the display data to cause an image, indicative of a positional relationship with respect to the principal road of the destination and routed spots, to be displayed.

34. The data server according to claim 31, wherein:
the display data producing unit is operative to obtain map information of an area covering a destination and routed spots represented with the code data received with the receiver unit and to produce the display data to cause the area information of the destination and routed spots to be overlaid on the map information to be displayed as spots on a map image.

35. The data server according to claim 31, further comprising:
an area information compiling unit allowing the area information of a destination and routed spots represented with the code data received with the receiver unit to be compiled; and
wherein the display data producing unit is operative to produce the display data to cause a compiled content resulting from the area information compiling unit to be displayed.

36. The data server according to claim 31, wherein:
the storage unit stores the area information, resulting from the data conversion unit, together with information indicative of a read out time or a location at which code data are read out; and
wherein the display data producing unit is operative to produce the display data to cause a list of the area information, stored in the storage unit, and the information, indicative of the read out time or the location at which the code data are read out, to be displayed.

37. A data server according to claim 31, further comprising
a related information obtaining unit operative to obtain related information associated with the destination and routed spots in response to a request from the code data transmission source or an on-vehicle navigation device,
wherein the transmitting unit transmits the related information, obtained with the related information obtaining unit, to the code data transmission source or an on-vehicle navigation device on request while reading out particular area information from the area information stored in the storage unit on request and transmitting the particular area information to the on-vehicle navigation device.

38. The data server according to claim 37, further comprising:
an information server connected to the data server to provide the data server with the related information; and
wherein the related information obtaining unit includes a server management table including a list of the information server and operative to obtain the related information from the information server.

39. The data server according to claim 38, wherein:
the information server includes a parking lot reservation management server that conducts a reservation management in a parking lot; and
wherein the related information obtaining unit has a function to access to and perform a reservation procedure for the parking lot in the parking lot reservation management server in response to a request from the code data transmission source or the on-vehicle navigation device.

40. The data server according to claim 38, wherein:
the information server includes a tourist spot information providing server that provides real time based tourist spot information; and
wherein the related information obtaining unit is operative to obtain the real time based tourist spot information from the tourist spot information providing unit in response to a request from the code data transmission source or the on-vehicle navigation device; and
wherein the transmitting unit transmits the real time based tourist spot information to the code data transmission source or the on-vehicle navigation device.

41. The data server according to claim 38, wherein:
the information server includes a traffic information providing server that provides real time based traffic information; and
wherein the related information obtaining unit is operative to obtain the real time based traffic information from the traffic information providing unit in response to a request from the code data transmission source or the on-vehicle navigation device; and
wherein the transmitting unit transmits the real time based traffic information to the code data transmission source or the on-vehicle navigation device.

42. The data server according to claim 37, wherein:
the related information obtaining unit is operative to obtain display data to cause the related information associated with the destination and routed spots to be displayed as an image over the code data transmission source or the on-vehicle navigation device; and
wherein the transmitting unit transmits the display data obtained with the related information obtaining unit to the code data transmission source or the on-vehicle navigation device.

43. A data server adapted to provide an on-vehicle navigation device, to be installed on a vehicle, with area information to allow the on-vehicle navigation device to establish a traveling route of the vehicle, the data server comprising:
receiver means for receiving code data, indicative of a destination and routed spots, from a code data transmission source;
display data producing mans operative to produce display data to cause information related to the code data received with the receiver means to be displayed over the code data transmission source;
data conversion means for converting the code data received with the receiver means into area information indicative of a location on a coordinate system of the destination and routed posts;
storage means for storing the area information, resulting from the data conversion means, in correlation with identification information of the code data transmission source; and
transmitting means for transmitting the display data, resulting from the display data producing means, to the code data transmission source on request while reading out particular area information from the area information stored in the storage means on request and transmitting the particular area information to an on-vehicle navigation device.

44. A data server according to claim 43, further comprising related information obtaining means for obtaining related information associated with the destination and routed spots in response to a request from the code data transmission source or an on-vehicle navigation device;

wherein the transmitting means transmits the related information, obtained with the related information obtaining means, to the code data transmission source or an on-vehicle navigation device on request while reading out particular area information from the area information stored in the storage means on request and transmitting the particular area information to the on-vehicle navigation device.

45. A method of navigating a vehicle, the method comprising:

reading out code data indicative of map information from a print product, and causing the code data to be transmitted;

converting the code data into corresponding area information indicative of a location on a map coordinate system, to store the area information, to read out the stored area information and to transmit the read out area information; and establishing a traveling route in response to the area information transmitted from the code data processing means to execute route guidance for a vehicle along the established traveling route.

46. A method of establishing a traveling route of a vehicle in an on-vehicle navigation device installed on the vehicle, the method comprising:

reading out code data from a print product while causing information related to the code data to be displayed over a display unit of the portable terminal, and transmitting the code data from the portable terminal to a data server;

converting the code data into area information, indicative of a location on a coordinate system with the data server, storing the area information in a storage unit of the data server, reading out the area information on request and transmitting the area information from the data server to an on-vehicle navigation device; and establishing a traveling route of a vehicle, based on the area information transmitted from the data server, using the on-vehicle navigation device.

47. A method of providing an on-vehicle navigation device installed on the vehicle with area information to cause the on-vehicle navigation device to establish a traveling route of the vehicle, the method comprising:

receiving code data from a code data transmission source while causing information related to the code data to be displayed over the code data transmission source, converting the code data into area information, indicative of a location on a coordinate system with the data server, and storing the area information in a storage unit of the data server; and transmitting the area information to the code data transmission source on request, reading out particular area information from among the area information stored in the storage unit on request, and transmitting the particular area information from the data server to an on-vehicle navigation device.

* * * * *